United States Patent [19]
Thornborough et al.

[11] Patent Number: 4,817,131
[45] Date of Patent: Mar. 28, 1989

[54] AUTOMATIC METER READING SYSTEM

[75] Inventors: Raymond J. Thornborough, Menomonee Falls; Walter L. Probert, Shorewood; Dennis L. Wachs, West Bend; Donald H. Strobel, Cedarburg; William L. Kidder, Milwaukee, all of Wis.

[73] Assignee: Badger Meter, Inc., Milwaukee, Wis.

[21] Appl. No.: 876,896

[22] Filed: Jun. 20, 1986

[51] Int. Cl.$^4$ .......................................... H04M 11/00
[52] U.S. Cl. ................................ 379/107; 340/870.03
[58] Field of Search ............... 379/106, 107, 92, 45, 379/47, 49, 50; 340/870.02, 870.03, 870.06, 870.07; 364/483, 200, 900

[56] References Cited

U.S. PATENT DOCUMENTS

| | | |
|---|---|---|
| 3,266,023 | 8/1966 | Werme . |
| 3,293,605 | 12/1966 | Moore . |
| 3,344,408 | 9/1967 | Singer et al. . |
| 3,349,374 | 10/1967 | Gabrielson et al. . |
| 3,384,714 | 5/1968 | Weld et al. . |
| 3,390,234 | 6/1968 | Glidden . |
| 3,414,676 | 12/1968 | Long . |
| 3,427,402 | 2/1969 | Stokes . |
| 3,435,416 | 3/1969 | Kretsch et al. . |
| 3,438,019 | 4/1969 | Gowan . |
| 3,478,342 | 11/1969 | Alldritt et al. . |
| 3,492,426 | 1/1970 | Foreman et al. . |
| 3,503,061 | 3/1970 | Bray et al. . |
| 3,510,841 | 5/1970 | LeJon . |
| 3,524,023 | 8/1970 | Whang . |
| 3,532,827 | 10/1970 | Ewin . |
| 3,541,513 | 11/1970 | Paterson . |
| 3,588,357 | 6/1971 | Sellari . |
| 3,593,293 | 7/1971 | Rorholt . |
| 3,611,363 | 10/1971 | McCrea . |
| 3,747,068 | 7/1973 | Bruner et al. . |
| 3,760,362 | 9/1973 | Copland . |
| 3,820,074 | 6/1974 | Toman . |
| 3,842,208 | 10/1974 | Paraskevakos . |
| 3,868,640 | 2/1975 | Binnie et al. ................. 379/107 X |
| 3,910,322 | 10/1975 | Hardesty, Jr. . |
| 4,008,458 | 2/1977 | Wensley . |
| 4,012,734 | 3/1977 | Jagoda et al. . |
| 4,023,139 | 5/1977 | Samburg . |
| 4,027,289 | 5/1977 | Toman . |
| 4,056,684 | 11/1977 | Lindstrom . |
| 4,077,061 | 2/1978 | Johnston et al. ..................... 364/483 |
| 4,228,519 | 10/1980 | Pfeifer ................................. 364/900 |
| 4,241,237 | 12/1980 | Paraskevakos et al. ......... 379/107 X |
| 4,287,567 | 9/1981 | Lumsden ........................... 379/92 X |
| 4,447,872 | 5/1984 | Nothaft ............................... 364/200 |
| 4,573,115 | 2/1986 | Halgrimson ................... 364/509 X |
| 4,584,602 | 4/1986 | Nakagawa ............................ 379/92 |
| 4,630,108 | 12/1986 | Gomersall . |
| 4,649,538 | 3/1987 | DeLuca et al. ...................... 371/5 X |
| 4,654,869 | 3/1987 | Smith et al. ......................... 379/107 |
| 4,691,344 | 9/1987 | Brown et al. ......................... 379/106 |

OTHER PUBLICATIONS

Schiesl, J. W., "Automatic Hyrologic Observing System", U.S. Department of Commerce, National Weather Service, Silver Spring, MD, Jul. '76.

*Primary Examiner*—Keith E. George
*Attorney, Agent, or Firm*—Neuman, Williams, Anderson & Olson

[57] ABSTRACT

Automatic meter readers are arranged for connection to customers' telephone lines and for automatic dialing for transmission of meter data to a computer of a utility control center, communications being effected through a call collection module which includes a plurality of call collection units connected to separate telephone lines for handling of a large number of calls. Each meter reader is battery-operated and includes a microprocessor which is powered up periodically for a short time interval to store data, to determine whether the number of power-ups since the last meter data transmission is such that a call to the utility control center should be instituted, and to determine whether leakage, tamper or other conditions require an immediate call. An operator at the utility control center can control and receive data from a very large number of meter readers and readily obtain, display and print out a variety of types of data including cumulative consumption, peak rate and time-of-day data and data with respect to leakage conditions and tampering with a reader.

61 Claims, 26 Drawing Sheets

AUTOMATIC METER READING SYSTEM

This invention relates to a meter reading system and more particularly to a meter reading system which uses customer telephone lines without requiring special equipment in a telephone exchange or at a customer's facility and which operates with minimal interference with or annoyance of customers. The system produces accurate data as to the readings of water, gas and electric meters or the like, including peak rate and time-of-day data and it is easily programmable and controllable to facilitate installation and to obtain and store, display and print-out meter data and various analyses of meter data. Operators at a central location can handle a great many readers, on the order of several tens of thousands or more, and the system is highly reliable, efficient and economical. The effective cost per customer per month for equipment, installation, servicing and telephone line usage is minimized.

BACKGROUND OF THE INVENTION

There are a great many prior art proposals for using telephone lines for automatic reporting of meter and status data as well as for control of clocks and the time of telephone calls and the reporting of alarm conditions and other remote metering and control applications. In many of the proposals for using telephone lines, an interrogation signal is sent from a receiving station to a reporting station to initiate the sending of a report, the receiving station being either at a telephone exchange or being connected through a telephone line thereto. Such systems may involve ringing of the customer's telephone or the installation of special ring-suppress equipment at the customer's facility or, alternatively, special equipment at the telephone exchange.

In another type of system, a reporting station initiates the making of a report. For example, the Stonor U.S. Pat. No. 3,098,123 discloses a system in which a pulse-dialing operation is automatically performed, followed by the sending of a message to report the condition at the reporting station. The Diaz U.S. Pat. No. 3,357,011 discloses a system in which the call-in time is controlled by a clock at the reporting station, the clock being also usable to trigger periodically transfers of data to a local memory for later transmission to the receiving station upon command.

In addition to the Diaz patent, there are other systems in which calls are made periodically or at preset times, including the Breen U.S. Pat. No. 3,046,339, the Jackson U.S. Pat. No. 3,294,910, the Klein U.S. Pat. No. 3,510,591, the Lindstrom U.S. Pat. No. 4,056,684, the Bocchi U.S. Pat. No. 4,086,434 and the Martin et al U.S. Pat. No. 4,104,486. In the Klein system, call time data are sent to a station to be stored in a memory and to be compared with clock signals to make a call-back at a desired time. The Vittoz U.S. Pat. No. 4,020,628 and the Emile, Jr. U.S. Pat. No. 4,125,993 illustrate systems in which signals may be transmitted through a telephone line to regulate the frequency or set the time at a remote clock or watch.

The National Weather Service of the National Oceanic Atmospheric Administration of the U.S. Department of Commerce has been a leader in the development of automated systems using telephone lines for the reporting of meter data. In a paper entitled: "AUTOMATIC HYDROLOGIC OBSERVING SYSTEM" by J. W. Schiesl, presented at the International Seminar on organization and operation of hydrological services, Ottawa, Canada, July 15, 1976, an "AHOS" system is described in which an Automatic Data Acquisition System (ADAS) includes a computer which operates on a standard interrogation cycle to collect data. Periodically, once every six hours, the ADAS transmits the data to a receiving station or user such as a River Forecast Center or a Weather Service Forecast Office. The system is such that a user may have the capability to request a special interrogation cycle which can be at optional intervals other than the standard cycles and to request the type of data to be reported when the ADAS reports in at the special requested time.

The computer and microprocessor technology, of course, developed very rapidly and since about the mid-1970's, microprocessors have been commercially available at relatively low cost to perform many complex functions. In addition, restrictions on the connection of equipment to telephone lines were removed in about the first half of the decade of the 1970's.

However, there has been no extensive use of telephone lines for automatic reading of water, gas and electric meters or the like. Those systems which have been used have been quite complicated and expensive and their use has been limited to special applications such as the monitoring of the meters of large industrial users of electricity or the performance of surveys on a random basis.

SUMMARY OF THE INVENTION

This invention was evolved with the general object providing a practical, economical, efficient and reliable system for automatically obtaining accurate readings and other data from water, gas or electric meters or the like, readily installed and operable with minimal interference or annoyance of customers.

A specific object of the invention is to provide a system which is very efficient in the use of telephone lines and in which a single meter data receiving line or a small number of lines can be used to reliably and economically obtain data sent from a large number of customers without requiring special telephone equipment at a customer's facility or in a telephone exchange.

Another specific object of the invention is to provide a versatile system in which a utility or municipality may readily select types of data to be obtained and the calendar days, days of week and/or times of day when data is obtained as well as select the types of data and the format of storage, display or printing of data and analyses thereof.

A further object of the invention is to provide a system in which alarm indications are produced in response to conditions which indicate an improper operation or malfunction of metering equipment and/or to conditions which are potentially destructive or unsafe.

Another specific object of the invention is to provide a system in which metering units are powered by batteries and in which current consumption is minimized to obtain a long battery life so as to increase reliability and minimize maintenance expenses.

Important aspects of the invention relate to the recognition of the limitations and deficiencies of prior art proposals while taking into account the important real needs of utilities and municipalities and their customers with respect to meter reading operations. The invention also takes into account the preformance characteristics and costs of components which are available for processing of data and transmission of data over telephone lines. It provides a system which is very efficient and economical with respect to costs of equipment, installation of equipment and operating and maintenance costs as well as the cost of telephone lines while performing extremely well and being very versatile with respect to satisfying needs.

In a system constructed in accordance with this invention, a large number of automatic meter readers (AMRs) are connected to customer's telephone lines. Each AMR is arranged to call a utility telephone number at a certain time, e.g., at 1:12:20 AM on the 9th day of each month, to send meter data through telephone exchange equipment to a call collection module (CCM) having a memory for temporary storage of such meter data. The CCM may immediately send control data back to the AMR including, for example, call-back time data and data which controls time-of-day (TOD) and peak rate (PR) metering.

The CCM is arranged for bi-directional communication with a utility control center (UCC) which includes a computer with a keyboard, display and one or more disc drives and which is connected to a printer, other peripherals or a network. An operator of the UCC may enter control data of a "global" nature, appropriate for all AMRs and may also enter control data specifically applicable to an AMR as well as the customer's name and address and other identification or status data desired by a utility. Control data entered by the operator or generated by the UCC is sent to the CCM to be processed by the CCM and sent to an AMR for control thereof.

The system of the invention is thus similar to the aforementioned National Weather Service Systems but differs therefrom in that it has the CCM as an instrumentality which acts as a buffer and as an intermediate processor with respect to transmission of control data between the control data entry point at the UCC and an AMR. It also acts as a buffer and as an intermediate processor with respect to transmission of meter data between the AMR and the data storage, display and printing equipment of the UCC.

The provision of the CCM with its buffering and processing capabilities makes it possible to reduce the processing to be performed at the AMR and to use simpler reporting and processing components in the AMR. It thereby reduces the unit cost of manufacture of the AMR which is very important in a system which has a very large number of AMRs. In addition, it permits a great deal of flexibility and versatility with respect to the meter data which is reported and with respect to the mode of reporting thereof.

Another important feature is that the CCM may be equipped to simultaneously receive and handle calls on a plurality of telephone lines and to take advantage of a roll-over feature in which only one number is assigned to all lines and in which, if one or more lines are "busy", the call is directed by the exchange to the first non-busy line of the group. This feature increases the reliability of the system, minimizing the possible blocking of a call from one AMR when a call from another is being processed. It is particularly advantageous when using WATS type lines which are economical to use when a large number of calls are received over one line and which have the advantage of avoiding any toll charges on the customer's line.

Many important features of the invention relate to the operation of the UCC. It is programmed in a manner such that control data are readily entered with a number of operations being automated to permit a very large number of AMRs to be operated from one station. For example, in developing control data for the AMR of a new customer, the program will, if desired, automatically set a date and time for call-in by the unit, a number of options being available. The UCC is also programmed to facilitate control of the days and daily time periods or "windows" in which time-of-day and peak rate accumulations are performed and it has many features relating to displaying and printing data which relate to various aspects of reported data and various aspects of the control data used in operation of the system. The UCC is also designed to facilitate an installation transaction in which a telephone call may be made to a customer to send control data for initialization of the customer's AMR.

Additional important features of the invention relate to the construction and operation of the AMRs which are battery-operated and which have components and circuitry such as to reduce the average power supplied by the battery. Circuitry is provided to use power from the telephone line when the unit is dialing or in an off-hook condition. The circuitry also includes a microprocessor which is not operated continuously but which is normally inactive in a low-power state. It is operated periodically for only very short time intervals and its average current consumption is very low. Other circuitry is operative at all times but with very low power consumption, being limited in use to accumulating meter pulses for relatively short time intervals and for acting to power-up the processor in response to alarm conditions or incoming telephone calls.

Another feature of the AMR units relates to the timing of periods between activation of the processor and the correlation thereof to call-back time control data to obtain accurate control of call-back times. This feature is very important in enabling the system to reliably handle a large number of AMR units per telephone line.

Another feture relates to the detection of leaks through an arrangement which requires that in a relatively long time period such as the time between monthly reports, there must be at least one time period of relatively short duration, two hours, for example, in which no flow is indicated. Otherwise, a leak indication is generated. This feature is particularly advantageous in water metering and is capable of detecting conditions which might otherwise be detected only after severe damage has occurred.

A further feature relates to the transmission to an AMR of a control signal to place it in an inactivated mode, as when service to a customer has been discontinued and when service to a new customer at the same location has not been started. If consumption occurs in the inactivated mode, the AMR operates to immediately send an alarm signal to the CCM.

Additional features relate to detection of freeze, low battery and tamper conditions and operations in response thereto. In response to physical tampering, current meter data is immediately stored in an EEPROM or non-volatile memory and then a dialing operation is initiated to repeat to the CCM. If dial tone is not detected, due to cutting of the line for example, the tamper report and meter data are reported when the wire is reconnected.

This invention has many other objects, features and advantages which will become more fully apparent from the following detailed description taken in conjunction with the accompanying drawings.

DESCRIPTION OF A PREFERRED EMBODIMENT

Figure 1:
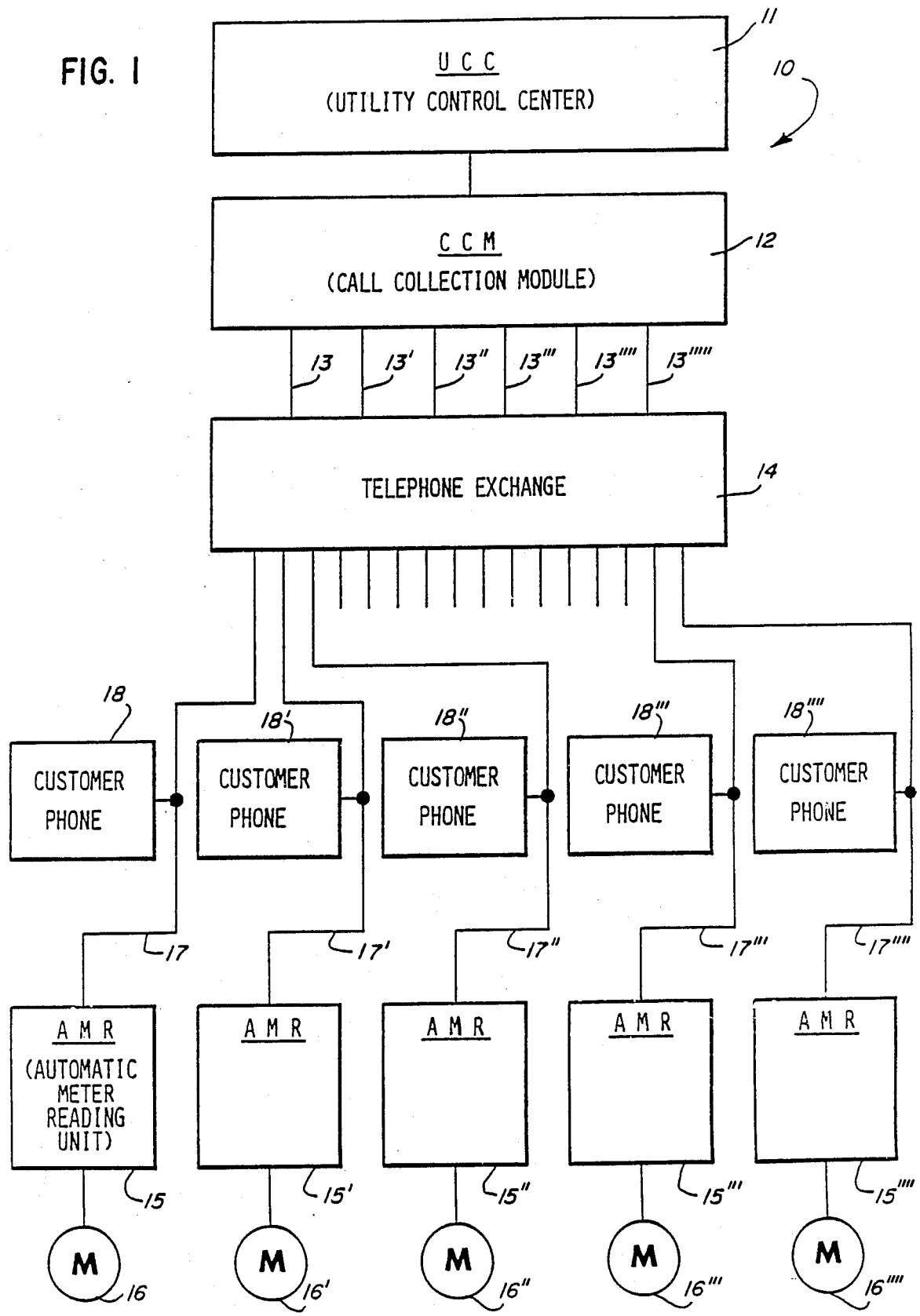
FIG. 1 is a schematic block diagram of a meter reading system constructed in accordance with the principals of this invention.

Reference numeral 10 generally designates an automatic meter reading system constructed in accordance with the principles of the invention. The system 10 comprises a central processing station or utility control center 11, hereinafter referred to as the "UCC", and at least one call collection module 12, hereinafter referred to as a "CCM". Each CCM 12 is connected through one telephone line 13 to telephone exchange equipment 14, and through additional lines as may be desired, five additional lines 13', 13", 13''', 13'''' and 13''''' being shown. The system 10 further includes a plurality of automatic meter reading units 15, 15', 15", 15''', and 15'''' connected to meters 16, 16', 16", 16''' and 16'''' which may be water, gas or electric meters at customers' residences. Each of the units 15-15'''' is referred to herein as an "AMR" and is connected to the exchange equipment 14 through a telephone line which may be a non-dedicated line with a customer's telephone five telephone lines 17, 17", 17''' and 17'''' and five telephones 18, 18', 18", 18''' and 18'''' being provided in the system connected thereto, as shown. In references hereinafter to telephone lines 13, automatic reading units or AMRs 15, meters 16, lines 17 or telephones 18, it will be understood that the items designated by primed numbers in FIG. 1 are included.

The system 10 is very efficient in receiving raw meter data in the form of electrical signals developed at the meters 16, processing of such data and developing highly useful output data for use by a utility or municipality with provisions for storing data as long as required. The output data may include, for example, meter readings obtained at predetermined times, time-of-day accumulation data ("TOD"), peak rate data ("PR") and leakage, tamper and malfunction indications. The mode of operation is readily changeable or programmable from the UCC 11, and the system is such as to facilitate initial installation of AMR units, discontinuing service to one customer and starting service with another, keeping track of the operational status of all units, making analyses of operations and the rendering of reports which may be printed or transmitted. The UCC equipment includes a computer keyboard and display and its construction and operation are described in detail hereinafter.

The system 10 is also advantageous in that it so operates as to be substantially "invisible" with minimal interference with the customer's use of telephone lines and it does not require any modification of the telephone exchange equipment or of the customer lines or equipment.

In operation of the illustrated system, each AMR 15 receives and processes raw meter data, continually developing and updating TOD and PR data as well as accumulated readings. At an assigned time, typically at a certain day of the month and during a night-time period when the customer is least apt to be using the telephone, the AMR 15 goes to an off-hook condition and, if dial tone is detected, it proceeds to dial a telephone number corresponding to a line which is connected to the CCM 12. In one mode of operation, it waits for receipt of a carrier signal from the CCM 12. In another, it waits for the expiration of a certain delay time. In either case, the AMR 15 then proceeds to apply signals to the telephone line 17, in an attempt to send data to the CCM 12, including identification and security data and status data as well as the processed meter data.

The CCM 12 stores received data and processes it, making a security check and making a determination of new data to be sent to the AMR 15. Such new data are preceded by an acknowledgment character and may include security data and the time for the next call-in by the AMR 15. If properly received, the AMR 15 responds with an acknowledgment character and security data. Then the CCM 12 may send another acknowledgment character and control data such as an exemption schedule for holidays when TOD/PR data are not to be accumulated (i.e. when peak use rates or higher than normal rates set for certain times of day are not in effect) and/or data as to new "windows" or periods during each day when TOD or PR data are to be accumulated. After a final acknowledgment character from the AMR, both the AMR and CCM go to on-hook conditions.

Important features of the invention relate to the operation of the CCM 12 and particularly with respect to handling calls from a large number of the AMR units 15. By way of example, one CCM may handle calls from on the order of 60,000 AMR units each month on each line connected thereto. Such calls may be made during night-time hours when there will be minimal interference with use of customer telephones and when the loading of the telephone exchange is at a minimum. As a result, the time available for each call may be on the order of 20 seconds or less. In these circumstances, it is highly desirable that the time of each call-in be minimized to reduce the possible rejection of a call when two or more AMR units call in at about the same time. Also, of course, reducing the call-in time is desirable since it reduces telephone line charges.

As described in detail hereinafter, the CCM 12 stores control data which may include a telephone number of the CCM 12 and other data which might be classed as "global" data applicable to all AMR units and it also stores data corresponding to each individual AMR 15 such as its serial number and data as to the day of the week, month or quarter in which it is to report. Such control data can be changed from the UCC 11. However, at the time of call-in from any AMR 15, the CCM 12 is in a condition to quickly determine, from data stored in its memory, the control data to be sent to the AMR 15 which has initiated the call. Thus no communications with the UCC are required in handling a routine scheduled report from an AMR and the time required for handling each scheduled report is minimized.

Another feature of the CCM 12 is that it is equipped to simultaneously receive and handle calls on a plurality of telephone lines, the illustrated CCM being connected to six lines. With this feature, it is possible to take advantage of a "roll-over" operation which is available in most if not all telephone exchanges, in which only one telephone number is assigned to a group of lines and in which if one or more lines of the group are "busy" when a call is made to the assigned number, the call is directed by the exchange to the first non-busy line of the group. The ability to simultaneously process multiple calls is very important in avoiding the possible blocking of a call from one AMR 15 when a call from another AMR 15 is being handled or when a call is accidentally or maliciously made to the assigned number by a source other than an AMR 15.

These and other features of the CCM 12, as well as associated features of the UCC 11 and the cooperation of the UCC 11 and the CCM 12, are described in detail hereinafter.

AMR UNITS 15

Figure 2:
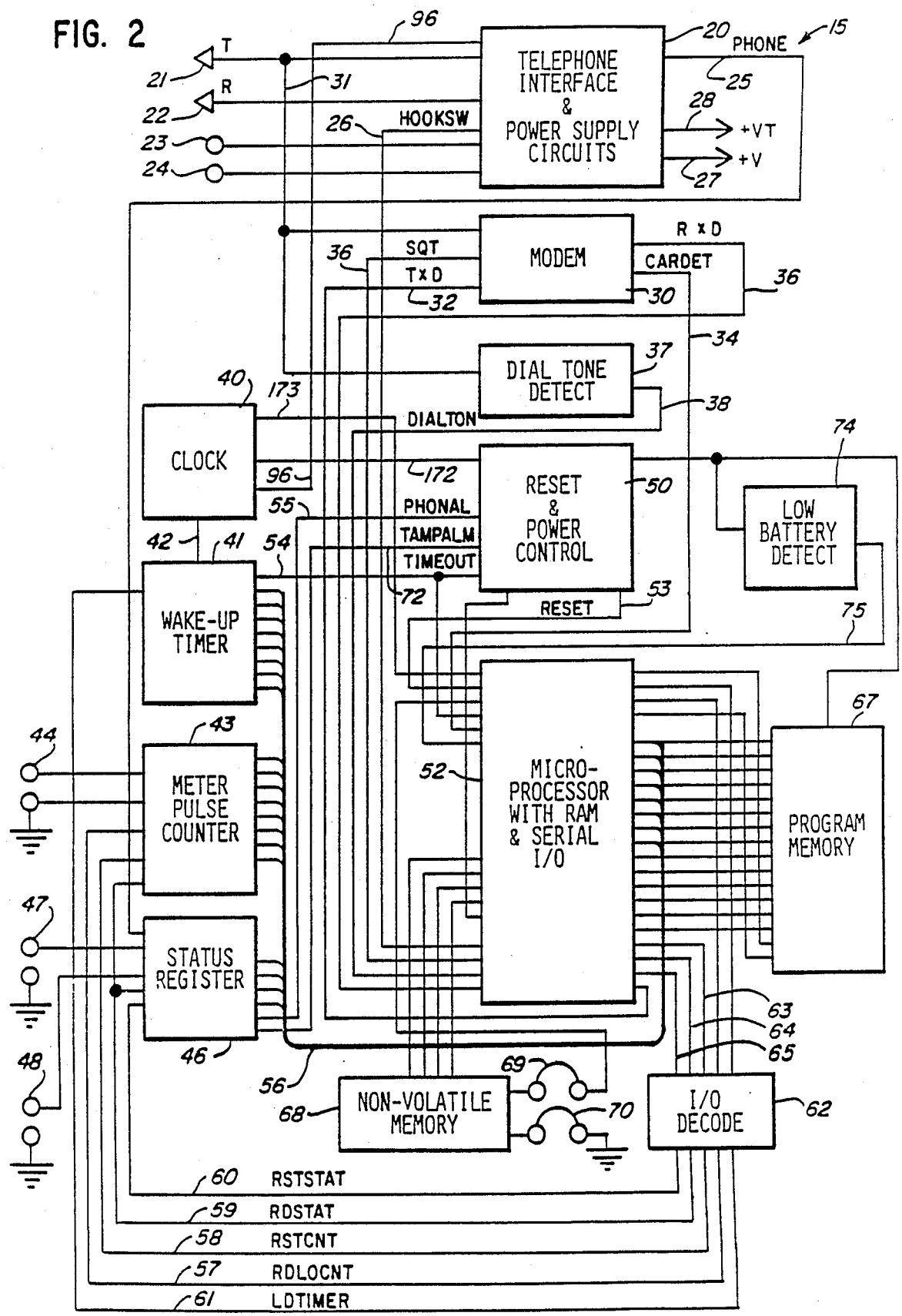
FIG. 2 is a schematic block diagram of an automatic meter reader of of the system of FIG. 1.

FIG. 2 is a schematic block diagram of one of the automatic meter reading units 15. Each unit 15 includes telephone interface and power supply circuitry 20, connected to "tip" and "ring" telephone line terminals 21 and 22 and connected to battery terminals 23 and 24. Circuitry 20 operates to develop a signal on a "PHONE" line 25 when a ring signal is detected on the telephone line and it includes a solid state hook switch operable to an off-hook condition in response to a signal applied thereto on a "HOOKSW" line 26. It also develops "+V" and "+VT" voltages on lines 27 and 28 which supply operating voltages to various circuits of the AMR 15. The +VT voltage on line 28 is developed from the telephone line voltage in the off-hook condition and is applied directly to circuits which are operative in the off-hook condition. The +V voltage on line 27 is applied to other circuits and is developed through a regulator from the battery voltage in the on-hook condition and from the +VT voltage in the off-hook condition, battery current being minimized. These and other features of the interface and power supply circuitry 20 are described in detail hereinafter in connection with FIG. 3.

A modem circuit 30 is provided having an input connected through a line 31 to the tip terminal 21. When operative as a modulator, the circuit 30 responds to digital signals applied on a "TXD" line 32 to send frequency shift modulated signals out on the telephone line. When operative as a demodulator, it detects the existence of a carrier signal on the telephone line to develop a signal on a "CARDET" line 34 and in response to a frequency shift modulated signal on the telephone line, it develops a corresponding digital signal on a "RXD" line 35. A disabling "squelch" signal is applied thereto at certain times, through a "SQT" line 36.

The AMR 15 also includes a dial tone detect circuit 37 which responds to a dial tone signal on line 31 to develop a signal on a "DIALTON" line 38. Circuit 37 as well as the modem circuit 30 are energized only in the off-hook condition from the +VT line 27 and do not draw battery current.

Additional circuits of the AMR 15 are provided for registering meter pulses and monitoring conditions and are energized at all times, normally from the battery, such circuits having very low current consumption. These include a clock circuit 40; a wake-up timer circuit 41 which responds to clock pulses applied thereto through a line 42; a meter pulse counter 43 which responds to meter pulses applied from a meter terminal 44; a status register circuit 46 which has inputs connected to the "PHONE" line 25 and to terminals 47 and 48 which are connected to switches for detection of tamper and freeze conditions; and a reset and power control circuit 50. A random access memory portion of a microprocessor 52 is also energized at all times, in both a "sleep" condition and a power-up or active condition. However, other circuits, including the main processing circuitry of the microprocessor 52 and serial input-output circuitry associated therewith, are operative only in the power-up condition which is established periodically for short intervals to store accumulated data, or to make a scheduled report or in response to incoming calls or tamper conditions.

Ordinarily, in the absence of a tamper alarm and except when a scheduled report is due, the microprocessor 52 is operated to the power-up condition periodically, e.g., every 5 minutes, in response to a signal applied through a "RESET" line 53 and developed by the reset and power control circuit 52 in response to a signal applied through a "TIMEOUT" line 54 from the wake-up timer 41. The microprocessor 52 then increments a 5 minute interval register, adds the meter count from the preceding 5 minutes to a total count register, adds counts to or updates time-of-day and peak rate registers, as appropriate, and then returns to the sleep condition.

When a scheduled report is due, the microprocessor 52 initiates an operation in which a signal is applied through the "HOOKSW" line 26 to the circuitry 20 to establish an off-hook condition and to then wait for a signal on the "DIALTON" line 38. Then a pulse-dialing operation is performed, through signals on the "HOOKSW" line 26, to dial the number of the CCM 12 and the microprocessor 52 then waits for a signal on the "CARDET" line 34. Then the microprocessor 52 applies a squelch signal to the modem 30 through the "SQT" line 36 and then it proceeds to apply signals through the "TXD" line 32 to the modem 30, to cause the modem 30 to send FSK modulated signals to the CCM 12 and thereby send data thereto. Then the microprocessor 52 monitors the "RXD" line 35 from the modem 30, for receipt of an acknowledgment character and data from the CCM 12. After data is sent back and forth in this way to effect a complete scheduled report transaction, the microprocessor 52 operates to set the wake-up timer 41, makes a final phone/tamper check and then returns to the sleep condition.

The scheduled report transaction is set forth in more detail hereinafter, along with other transactions which include an installation transaction performed when initially installing an AMR 15; a demand reading transaction which may be initiated by a request or demand call from the CCM to the AMR, as when stopping service to a customer who is moving or when starting service to a new customer at the same location; an emergency report transaction initiated in response to a tamper or other alarm condition; and a "brainwash" transaction usable through a call from the CCM to place an AMR 15 in a pre-installation condition.

Whenever any call is made to the customer's line, a signal is developed on the line 25 and is applied to the status register circuit 46 which, in turn, applies a signal through a "PHONAL" line 55 to the reset and power control circuit 50. The microprocessor 52 is then activated to determine whether the call came from the CCM 12 and, if so, to make an appropriate response, according to whether an installation transaction, a demand read transaction, or a "brainwash" transaction is indicated.

An eight line data bus 56 is provided for transmission of data between the microprocessor 52 and the wake-up timer 41, meter pulse counter 43 and status register 46. A signal is sent on a "RDLOCNT" line 57 to read the least significant 8 bits of data from the meter pulse counter 43 and a signal is sent on a "RSTCNT" line 58 to reset the meter pulse counter 43. Similarly, read and reset signals are sent to the status register through "RDSTAT" and "RSTSTAT" lines 59 and 60, the signal on line 59 being also applied to the meter pulse counter 43 and being used to read the most significant 3 bits of data from the meter pulse counter 43. The wake-up timer 41 is loaded with a predetermined count by applying a signal on a "LDTIMER" line 61. The signals on lines 57-61 are developed by an input/output address decoder circuit 62 which is connected to address lines of the microprocessor 52 through lines 63-65.

A program memory 67 is connected to the data bus 56 and to address lines of the microprocessor 52 and a non-volatile but programmable EEPROM memory 68 is connected to input/output ports of the microprocessor 52. As shown, terminals of the memory 68 are connectable through jumpers 69 and 70 to ground and to a terminal of the microprocessor 52, jumpers 69 and 70 being optional and being installed for a 128×8 EEPROM and being removed for a 16×16 EEPROM.

In response to a tamper condition, the status register circuit 46 immediately sends a signal through a "TAMPAL" line 72 to the reset and power control circuit 50 which applies a reset or "wake-up" signal through line 53 to the microprocessor 52. The microprocessor 52 then operates to immediately store certain key data in the non-volatile memory 68 and also operates to attempt to make a telephone call to the CCM 12 to report the tamper condition.

The AMR further includes a low battery detector 74, the output of which is connected through a line 75 to the processor 52 monitored following time-outs of the wake-up timer 41, the low battery condition being then reported.

TELEPHONE INTERFACE AND POWER SUPPLY CIRCUIT 20

Figure 3:
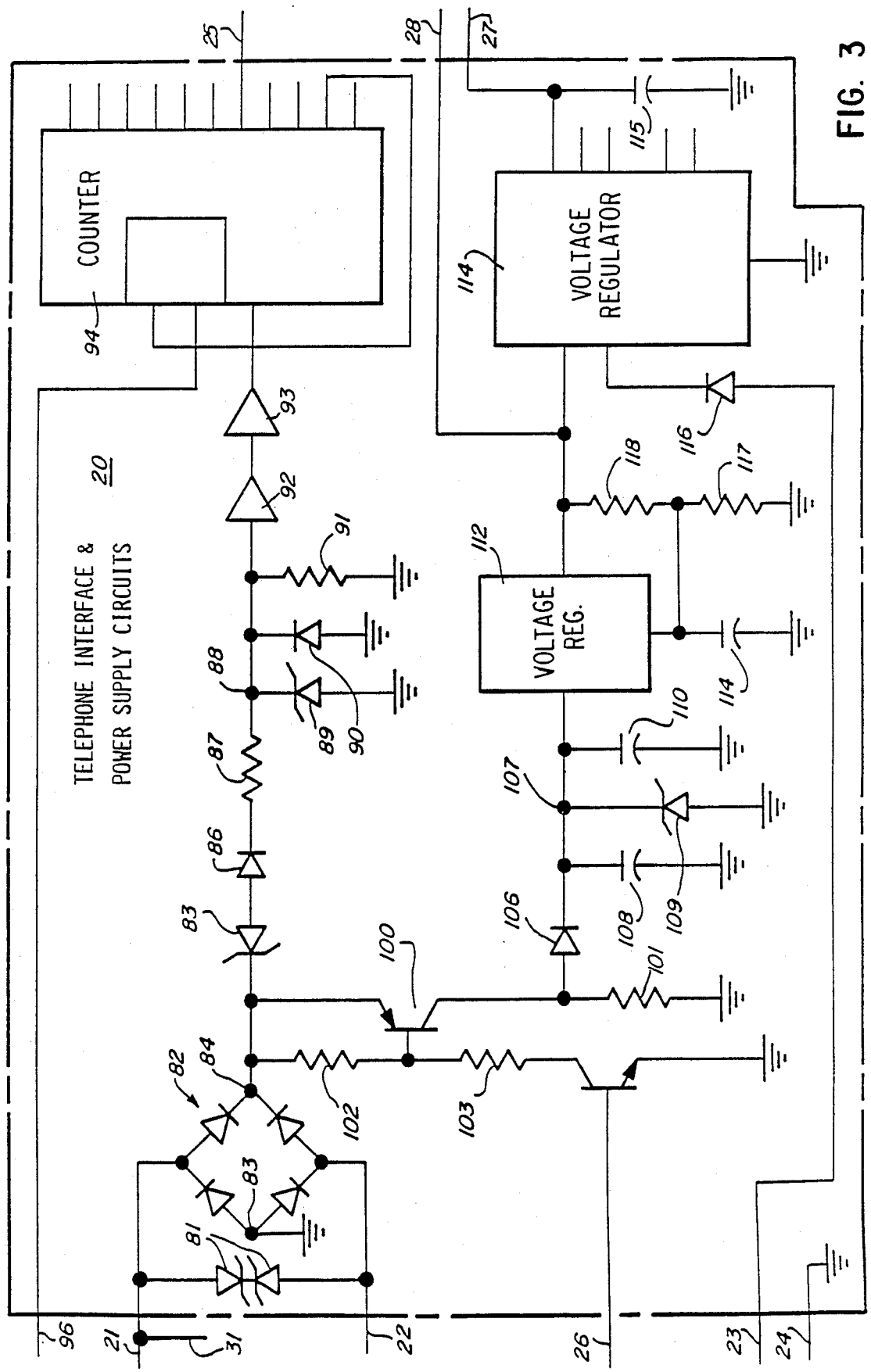
FIG. 3 is a schematic circuit diagram of telephone interface and power supply circuitry of the automatic meter reader of FIG. 2.

FIG. 3 is a circuit diagram of the telephone interface and power supply circuits 20. A pair of voltage-protection diodes 81 are connected in series between the tip and ring terminals 21 and 22 which are connected to the input of a diode bridge circuit 82 which has a grounded output terminal 83 and an ungrounded output terminal 84. Terminal 84 is connected to the input of ring detect circuitry which includes the Zener diode 85, a conventional diode 86 and a resistor 87 connected in series between terminal 84 and a circuit point 88, circuit point 88 being connected to ground through a Zener diode 89, a capacitor 90 and a resistor 91 in parallel and also being connected through two cascaded Schmitt trigger circuits 92 and 93 to a reset input of a counter 94. When an AC ring voltage is developed between the terminals 21 and 22 which has a peak value substantially greater than the limit voltage of Zener diode 85, a reset signal is applied from trigger circuit 93 to the counter 94 which then begins counting clocking pulses which are applied through a line 96. The clocking pulses may be applied to a 1 Hz rate and after a certain number of pulses (6 pulses for example), an output signal is developed on the "PHONE" line 25. After nine pulses, a signal is developed on a line 97 to inhibit clocking of the counter 94.

The output terminal 84 of the bridge rectifier 82 is also connected to the emitter of a transistor 100 having a collector connected to ground through a line loading resistor 101. The base of the transistor 100 is connected through a resistor 102 to the terminal 84 and also through a resistor 103 to the collector of a transistor 104 which has a grounded emitter and which has its base connected to the "HOOKSW" line 26. When line 26 is brought high, transistor conducts to cause conduction of transistor 100 and to develop a low impedance between terminals 21 and 22 such as to establish an off-hook condition while also developing a DC voltage across the line loading resistor 101. The voltage developed across resistor 101 is applied through diode 106 to a circuit point 107 which is connected to ground through a capacitor 108, a Zener diode 109 and a second capacitor 110. Circuit point 107 is also connected to the input of a voltage regulator 112 which has an output terminal connected directly to the "+VT" line 28 and also connected to the input of a second voltage regulator 114 which has an output terminal connected to the "+V" line 27 which is connected through a filter capacitor 115 to ground. A second input of the regulator 114 is connected through a diode 116 to the battery terminal 23 and the regulator 114 operates as a selector to develop the "+V" voltage on line 27 either from the output of the regulator 112 or from the battery terminal 23, whichever is higher. By way of example, the battery voltage may be approximately 5 volts and the regulator 112 may operate to develop a voltage 5.48 volts in the off-hook condition. The output voltage of regulator 112 is controlled by a reference voltage developed by voltage-divider resistors 117 and 118, the junction between resistors 117 and 118 being connected to a reference voltage input of regulator 112 and being also connected to a filter capacitor 119 to ground.

For pulse-dialing, the transistor 100 is controlled through the transistor 104 from the "HOOKSW" line 26 and the combined capacitance of the capacitors 108 and 110 is sufficient to operate during pulse-dialing to maintain a voltage at the input of the regulator 112 which is substantially higher than the desired regulated output voltage thereof. Thus, no battery current is drawn during either the off-hook condition or during pulse-dialing.

MODEM CIRCUIT 30

Figure 4:
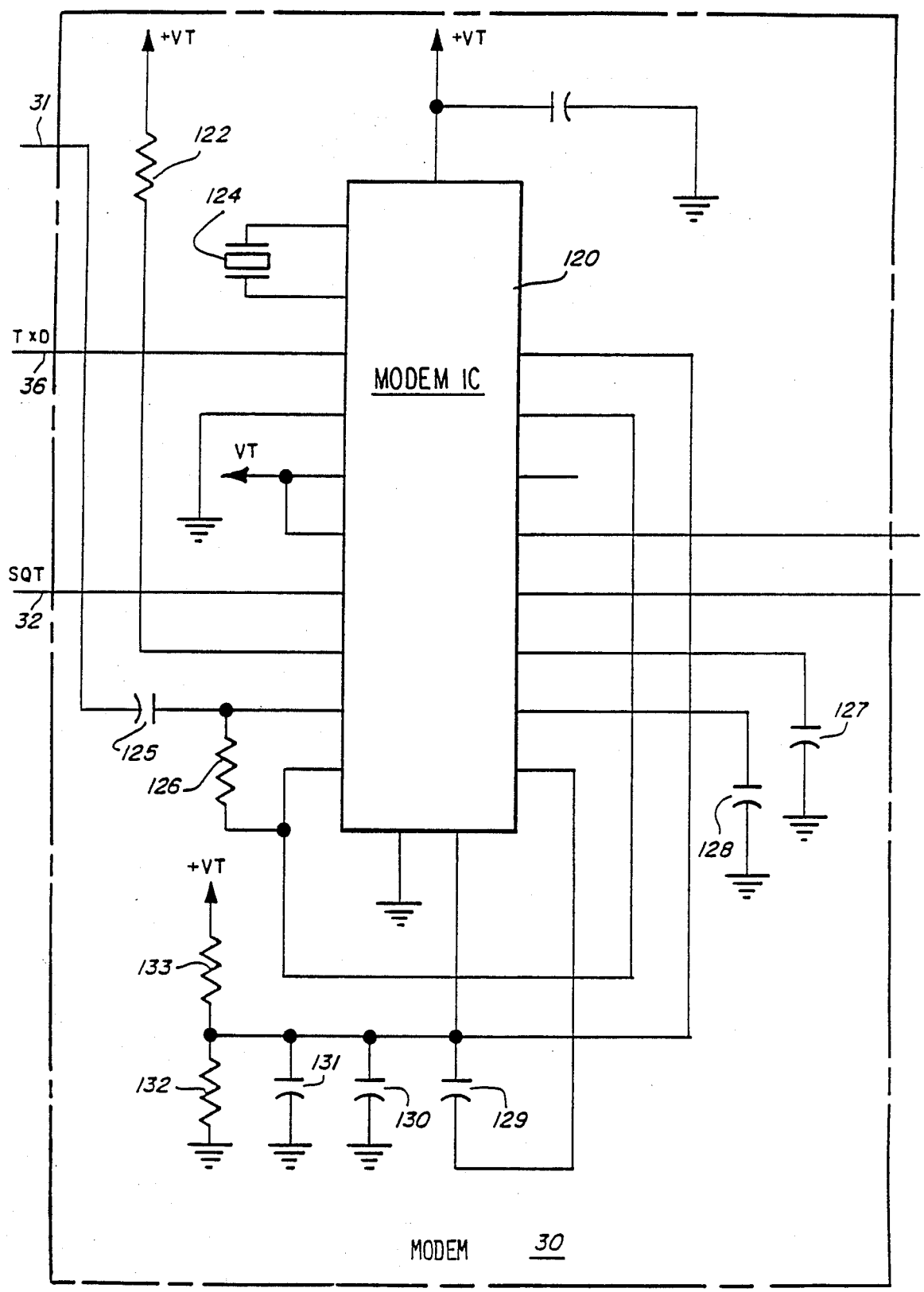
FIG. 4 is a schematic circuit diagram of modem circuitry of the automatic meter reader of FIG. 2.

The modem circuit 30 is shown in FIG. 4 and, as shown, it includes a standard integrated circuit 120 which has "TXD", "CD", "RXD" and "SQT" terminals, respectively connected to the lines 32, 34, 35 and 36. A "VCC" terminal is connected to the "+VT" line 28 and through a filter capacitor 121 to ground, the line 28 being also connected through a resistor 122 to a "TLA" terminal and also to an "ORG" terminal to set the modem at an "originate" mode. The line 31, which is connected to the tip terminal 21, is connected through a capacitor 125 to an "RXA" terminal which is connected through a resistor 126 to a second "RXA" terminal and to a "TXA" terminal. In addition, capacitors 127–131 and resistors 132 and 133 are provided which are connected to terminals as shown and which have values such as to obtain optimum operation especially with respect to attack/release times.

DIAL TONE DETECT CIRCUIT 37

Figure 5:
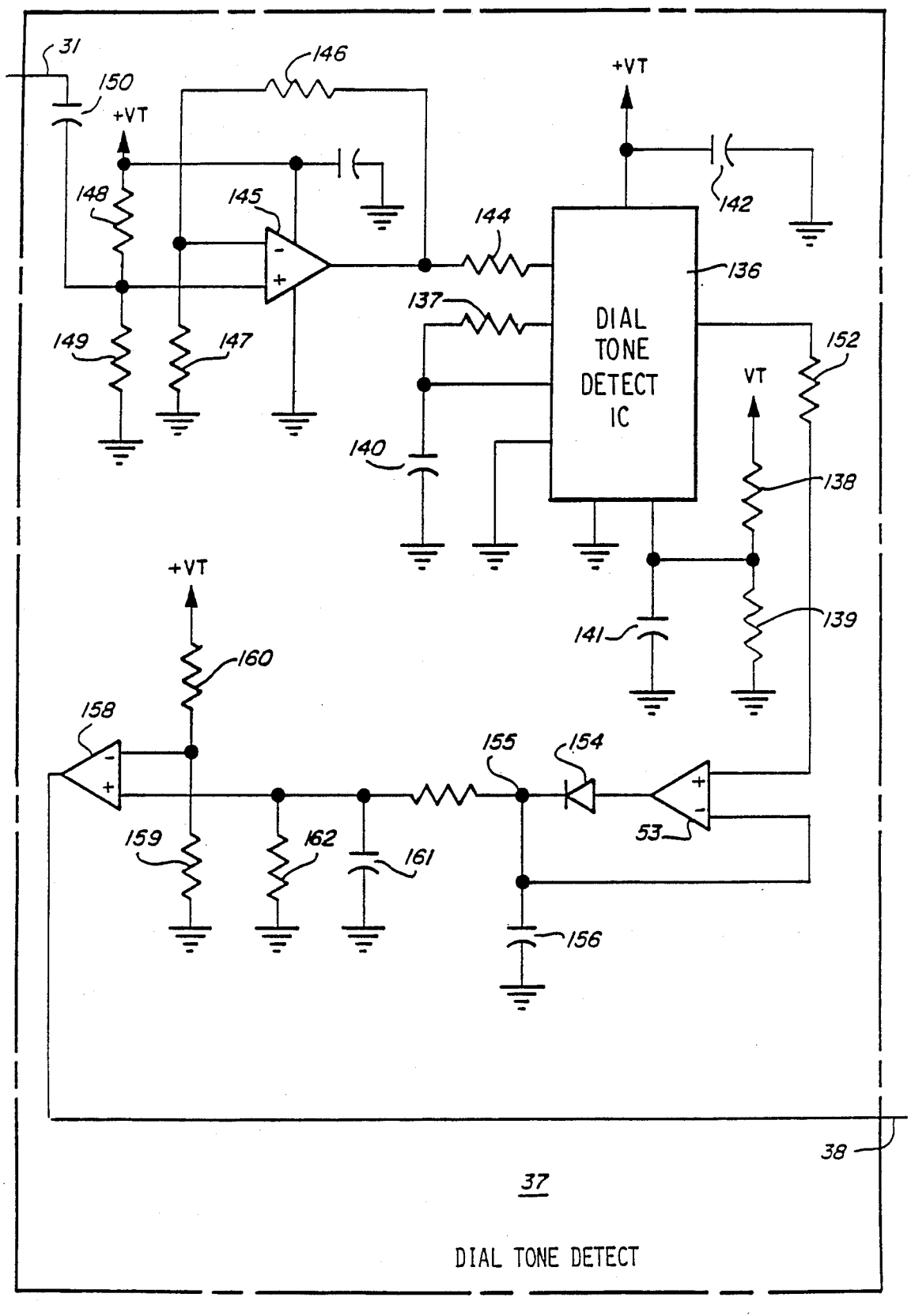
FIG. 5 is a schematic circuit diagram of dial tone detect circuitry of the automatic meter reader of FIG. 2.

FIG. 5 shows the circuitry of the dial tone detect circuit 37 which includes an integrated circuit 136 connected to resistors and capacitors to operate as a notch filter with respect to a dial tone signal, usually a continuous tone made by combining frequencies of 350 Hz and 440 Hz. Such resistors and capacitors include resistors 137, 138 and 139 and capacitors 140 and 141, connected as shown. A supply voltage input terminal is connected to the "+VT" line 28 which is connected to a filter capacitor 142 to ground. An input terminal of the filter 136 is connected through a resistor 144 to the output of an operational amplifier 145 which has a minus input connected through a resistor 146 to its output and through a resistor 147 to ground and which has a plus input connected through a resistor 148 to the +VT line 28 and through a resistor 149 to ground. The plus input is also connected through a coupling capacitor 150 to the line 31 which is connected to the tip phone line terminal 21.

An output terminal of the notch filter 136 is connected through a resistor 152 to the plus input of an operational amplifier 153 which is operable as a peak detector, the output thereof being connected through a diode 154 to a circuit point 155 which is connected to the minus input thereof and which is connected through a capacitor 156 to ground. Circuit point 155 is connected through a resistor 157 to a plus input of an operational amplifier 158 which is operable as a threshold or level detect circuit, the minus input terminal being connected to a voltage divider which is formed by resistors 159 and 160 connected between ground and the +VT line 28. A capacitor 161 and a resistor 162 are connected in parallel between the plus input of amplifier 158 and ground. When the peak amplitude of a dial tone signal exceeds a certain level, the amplifier 158 develops a signal on the "DIALTON" line 38.

CLOCK CIRCUIT 40

Figure 6:
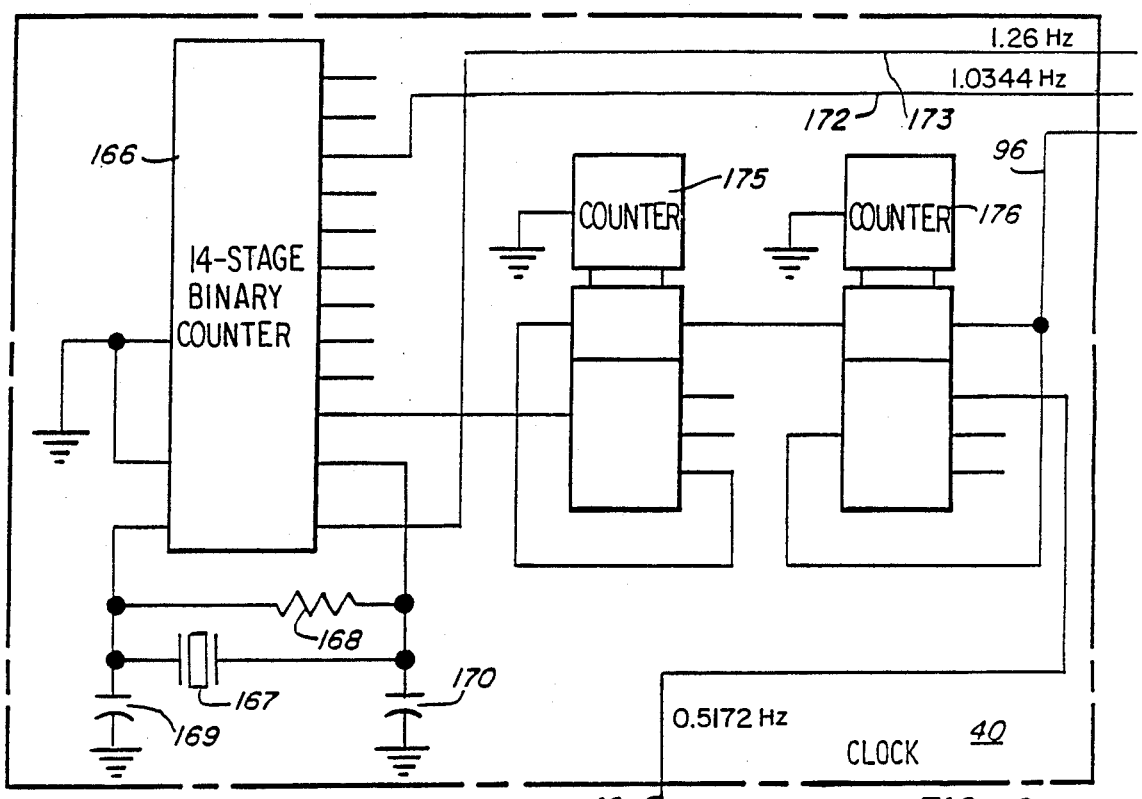
FIG. 6 is a schematic circuit diagram of clock circuitry of the automatic meter reader of FIG. 2.
Figure 7:
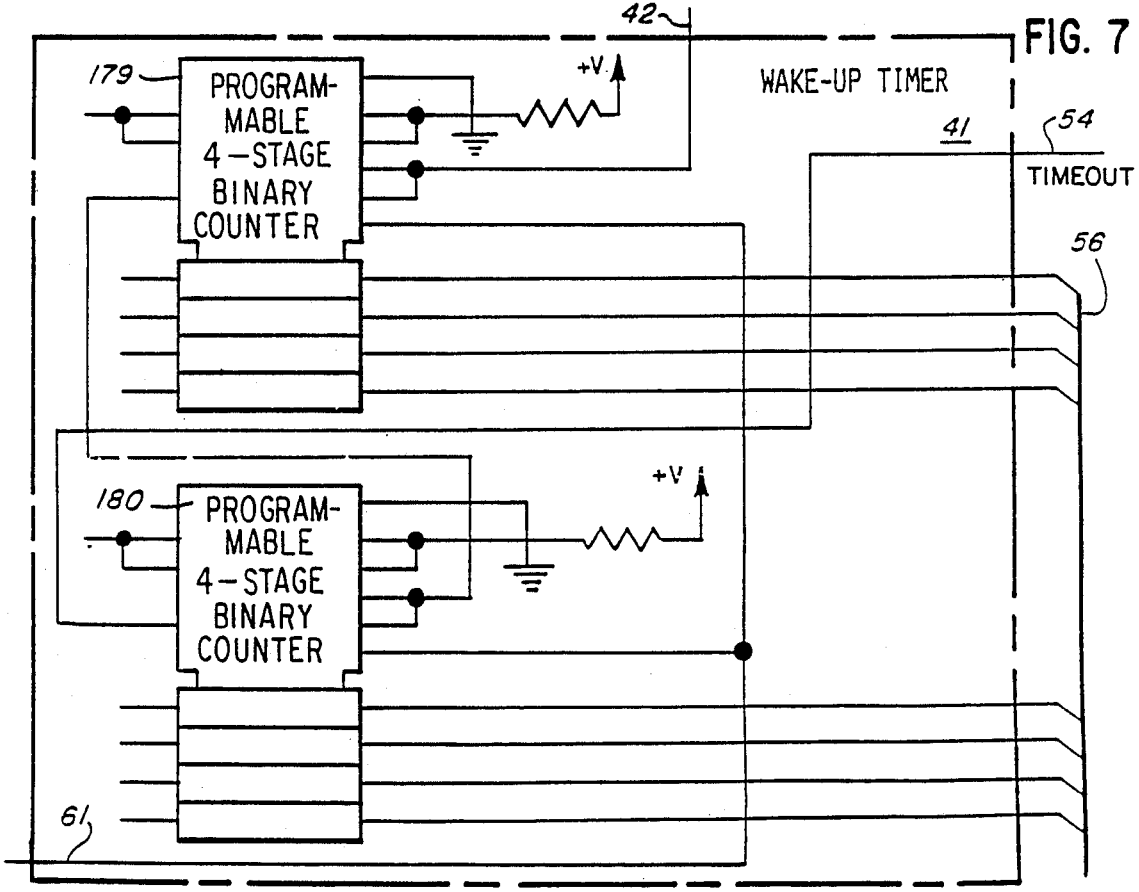
FIG. 7 is a schematic circuit diagram of wake-up timer circuitry of the automatic meter reader of FIG. 2.

The clock circuit 40, as shown in FIG. 6, comprises an integrated circuit 166 which includes a 14 stage binary divider driven by an oscillator circuit which is connected to a crystal 167, a resistor 168 being connected in parallel with the crystal 167 and a pair of capacitors 169 and 170 being connected between the terminals of crystal 167 and ground.

A divide-by-32 signal, developed at the output of a fifth stage of the counter chain in circuit 166, is applied through a line 172 to the reset and power control circuit 50 to clock a shift register thereof, as hereinafter described. A signal at the oscillator frequency, which may be 1.2672 MHz, for example, is applied through a line 173 to the microprocessor to provide the clock signal thereto. In addition, a divide-by-8192 signal is developed at the output of a thirteenth stage of the counter chain and is applied through a line 174 to the input of the first of two cascaded counters 175 and 176. Each of the counters 175 and 176 includes divide-by-2 and divide-by-5 sections, such sections being connected as shown and being operative to develop a signal on the line 42 which has a frequency of 0.5172 Hz in the illustrated embodiment. Also, a 1.0344 Hz signal is developed on line 96 for application to the telephone interface circuits.

WAKE-UP TIMER 41

The 0.5172 Hz signal on line 42 is applied to the input of the first of two cascaded programmable four-stage binary counters 179 and 180 which are connected to the eight line data bus 56. The "TIMEOUT" line 54 is connected to the output of the second programmable counter 180 and the "LDTIMER" line 61 is connected to control inputs of both counters 179 and 180 to control loading of the counters with data on the data bus 56 and to cause development of the signal on the line 54 at the time-out time corresponding to the applied data.

Ordinarily, except when a scheduled report is due, a count of 155 is loaded into the counters from the data bus 56 and a time-out occurs after slightly less than 300 seconds at which time the microprocessor 52 is powered up to add counts to various registers and to re-load the counters 179 and 180 and then return to the sleep condition. When a scheduled report is due in the next 5 minutes, a count of less than 155 may be entered into the counters 179 and 180 and other operations are performed as hereinafter described.

METER PULSE COUNTER 43

Figure 8:
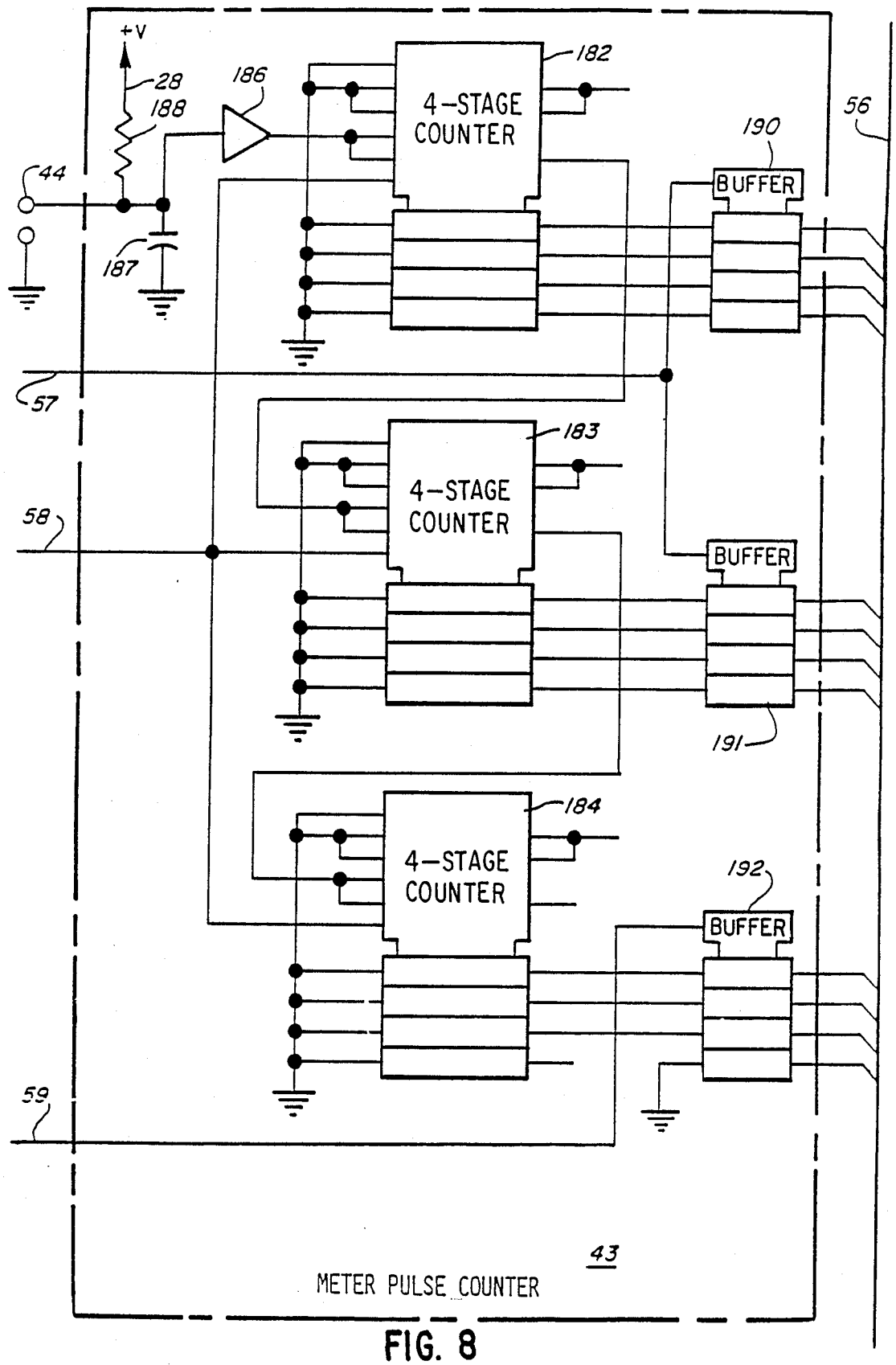
FIG. 8 is a schematic circuit diagram of meter pulse counter circuitry of the automatic meter reader of FIG. 2.

As shown in FIG. 8, the meter pulse counter 43 comprises three cascaded four-stage counters 182, 183 and 184. The input of the first counter 182 is connected to the output of a Schmitt trigger circuit 186, the input of which is connected to the meter pulse input terminal 44 and also through a capacitor 187 to ground and through a resistor 188 to the +VT line 28, filtering and debounce functions being performed. The "RSTCNT" line 58 is connected to reset inputs of all three counters 182, 183 and 184. Three four-stage buffers 190, 191 and 192 are provided between the counters 182, 183 and 184 and the data bus 56. Buffers 190 and 191 are controlled from the "RDLOCNT" line 57 and are used to read the least significant eight bits of the accumulated meter pulse count to the data bus 56. The buffer 193 is controlled from the "RDSTAT" line 59 and is used to read the three most significant bits of the accumulated meter pulse count to the data bus 56, while simultaneously reading 'phone, tamper and freeze status information to the data bus 56. It is noted that only the first three stages of the counter 184 and the first three stages of the buffer 192 are utilized in the illustrated embodiment so that there are a total of 11 stages in the meter pulse counter. A count capacity of 2048 is sufficient for the purposes for which the unit is designed.

STATUS REGISTER 46

Figure 9:
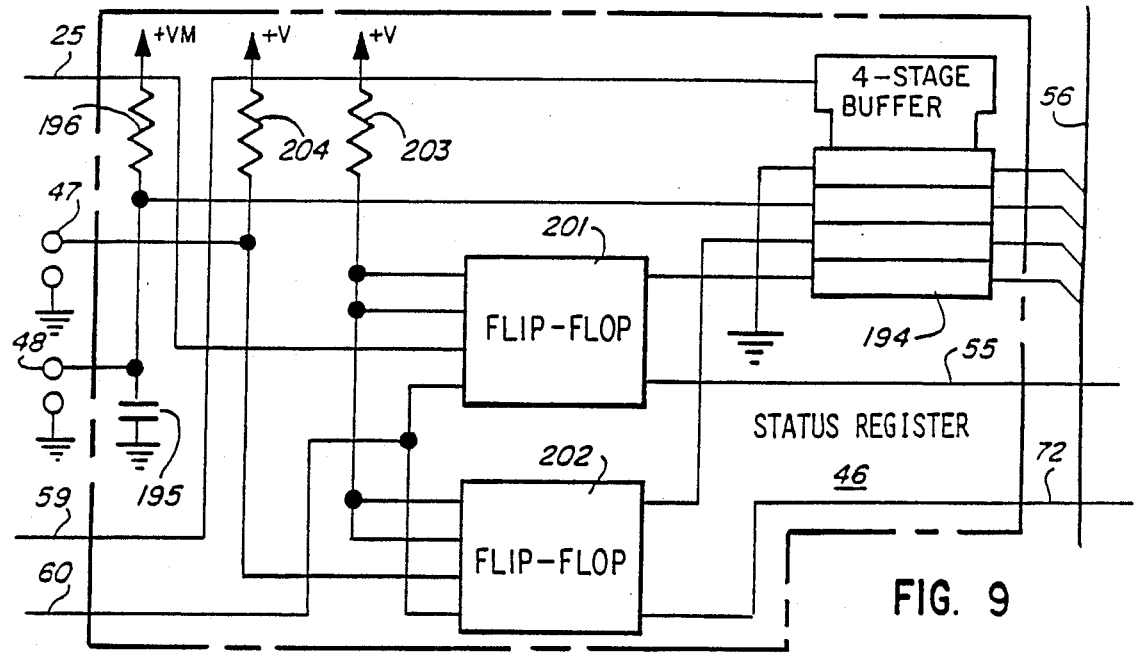
FIG. 9 is a schematic circuit diagram of status register circuitry of the automatic meter reader of FIG. 2.

As shown in FIG. 9, the status register 46 comprises a four-stage buffer 194 connected to the "RDSTAT" line 59 and to the data bus 56. Only three stages of the buffer 194 are used. One stage is connected to the terminal 48 and through a capacitor 195 to ground and through a resistor 196 to a +VM line 198 which is connected to the reset and power control circuit 50. The terminal 48 is connected to a switch of a freeze detector unit, the switch being normally closed but being opened when the temperature drops below a certain value, close to the freezing temperature. During each wake-up time, the reset and power control circuit 50 applies a voltage to the +VM line 198 to apply signal to the freeze detect stage of the buffer 194 and a read signal is then applied through the "RDSTAT" line 59.

The other two operative stages of the buffer 194 are connected to outputs of two flip-flops 201 and 202 which have set inputs connected through a resistor 203 to the +V line 27 and which have reset inputs connected to the "RSTSTA" line 60. The clock input of the flip-flop 201 is connected to the "PHONE" line 25 while the clock input of the flip-flop 202 is connected to the terminal 47 for connection to a normally open tamper switch which closed open in response to a tamper condition. Terminal 47 is connected through a resistor 204 to the +V line 27. Flip-flops 201 and 202 operate as edge triggered flip-flops to be set in response to detection of a ring signal and development of a corresponding signal on the "PHONE" line 25 in response to a closed condition of the tamper switch. Second outputs of the flip-flops 201 and 202 are connected to the "PHONAL" line 55 and to the "TAMPALM" line 72 to immediately initiate operation of the reset and power control circuit 50 in response to an incoming telephone call or a tamper condition.

RESET AND POWER CONTROL CIRTUIT 50

Figure 10:
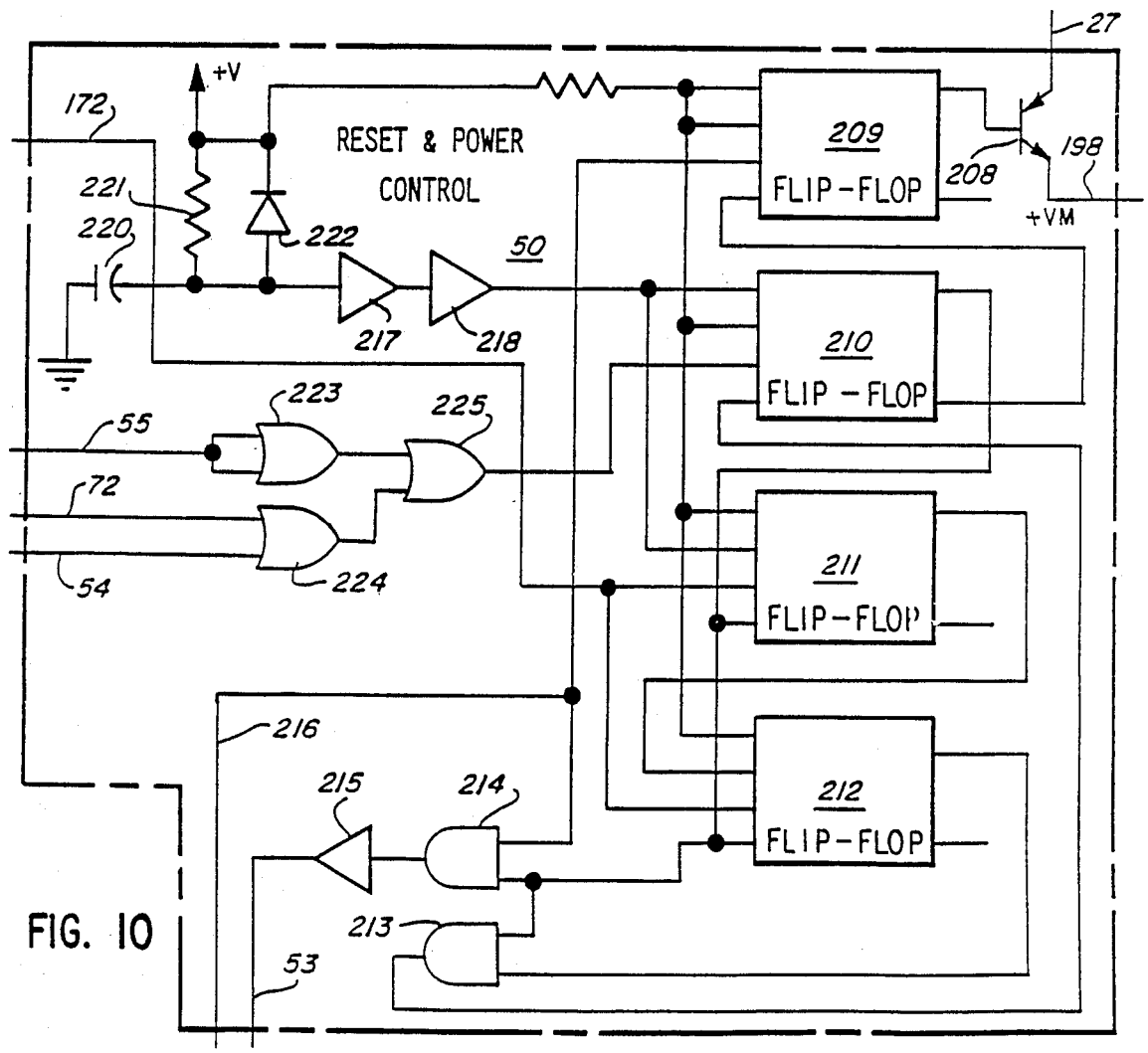
FIG. 10 is a schematic circuit diagram of reset and power control circuitry of the automatic meter reader of FIG. 2.
Figure 11:
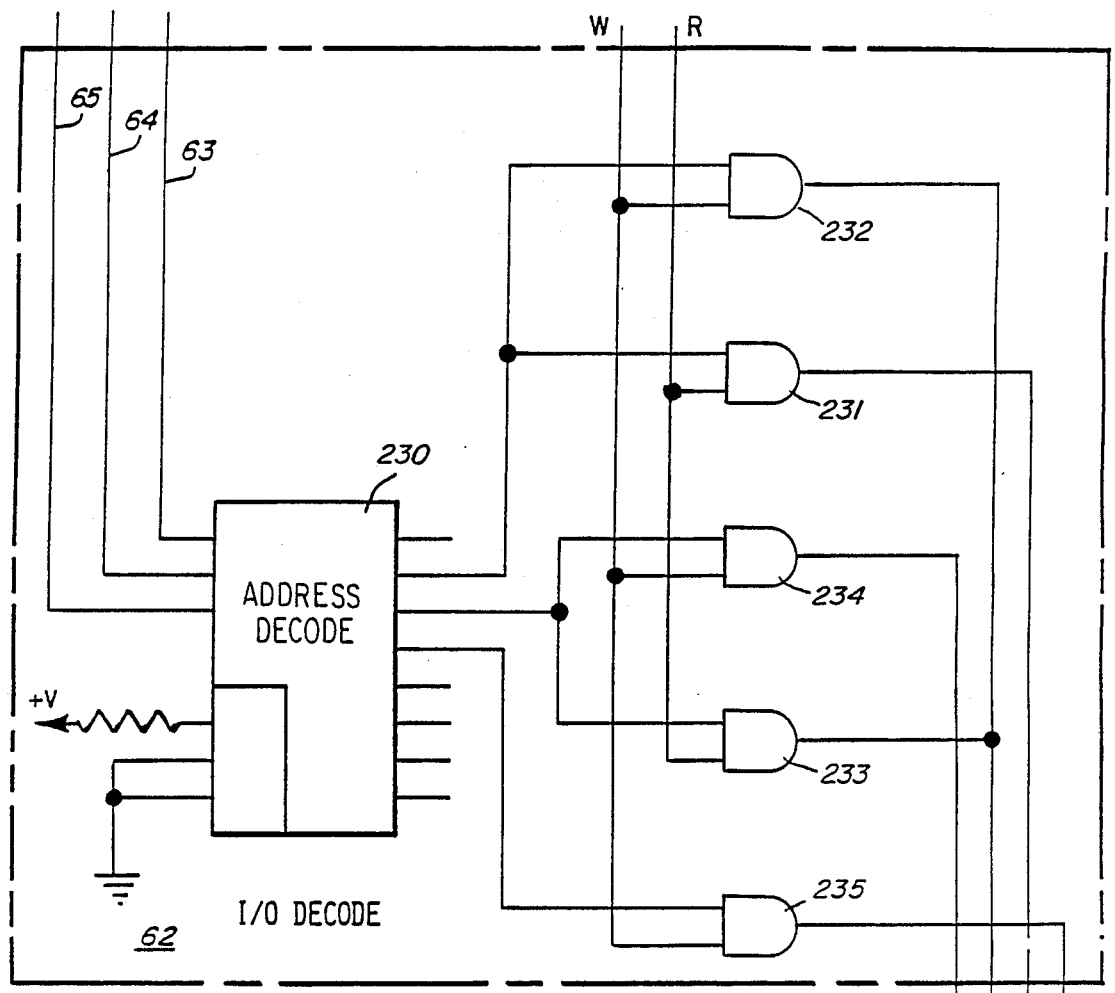
FIG. 11 is a schematic circuit diagram of input/output decode circuitry of the automatic meter reader of FIG. 2.

Referring to FIG. 10, the circuit 50 includes a transistor 208 which is controlled by a flip-flop 209 to be rendered conductive and connect the +V line 27 to the +VM line 198 and to supply operating voltage to the program memory 67 and the non-volatile memory 68 and to also supply voltages for freeze detection and low battery detection. Normally, the flip-flop 209 is in a set condition and the transistor 208 is non-conductive. Flip-flop 209 may then be reset when a flip-flop 210 is set by a "TIMEOUT" signal on line 54, a "TAMPAL" signal on line 55 or a "PHONAL" signal on line 25.

An output of the flip-flop 210 is connected to reset inputs of two cascaded flip-flops 211 and 212 having clock inputs connected through the line 172 to the output of the fifth stage of the divider chain of the clock circuitry. A gate circuit 213 is connected to an output of the flip-flop 212 to apply a reset signal to the flip-flop 210 after 32 clock pulses at the 1.2672 MHz rate. Then a gate circuit 214 applies a signal through a trigger circuit 215 to the line 53 to bring the line 53 low and to apply a reset signal to the microprocessor 52 for initiating operation thereof. After completing a processing operation and just before power-down, the processor 52 develops a signal on a line 216 which is connected to the clock input of the flip-flop 209, flip-flop 209 being then placed in a set condition to discontinue conduction of the transistor 208 and to prevent continued application of the +VM voltage to the memory and other circuits.

An initial power-on reset conditioning operation is performed, when a battery is installed, by circuitry including a pair of trigger circuits 217 and 218 connected to the said input of flip-flop 210 and enabling of flip-flop 211, the input of circuit 217 being connected through a capacitor 220 to ground and being connected to the +V line 27 through the parallel combination of a resistor 221 and a diode 222. The lines 25, 54 and 55 are connected to the clock input of flip-flop 210 through OR gates 223, 224 and 225, connected as shown.

INPUT/OUTPUT DECODE CIRCUIT 62

The decode circuit 62 includes an address decoding integrated circuit 230 which has inputs connected through the lines 63–65 to three address lines of the microprocessor 52. Outputs of the circuit 230 are connected to inputs of gates 231-235 in the manner as shown, the output of gates 231-235 being respectively connected to the lines 57–61 for performing read, write and reset operations, inputs of gates 231 and 233 being connected to a read output of the microprocessor 52 and inputs of gates 232, 234 and 235 being connected to a write output of the microprocessor 52.

LOW BATTERY DETECT CIRCUIT 74

Figure 12:
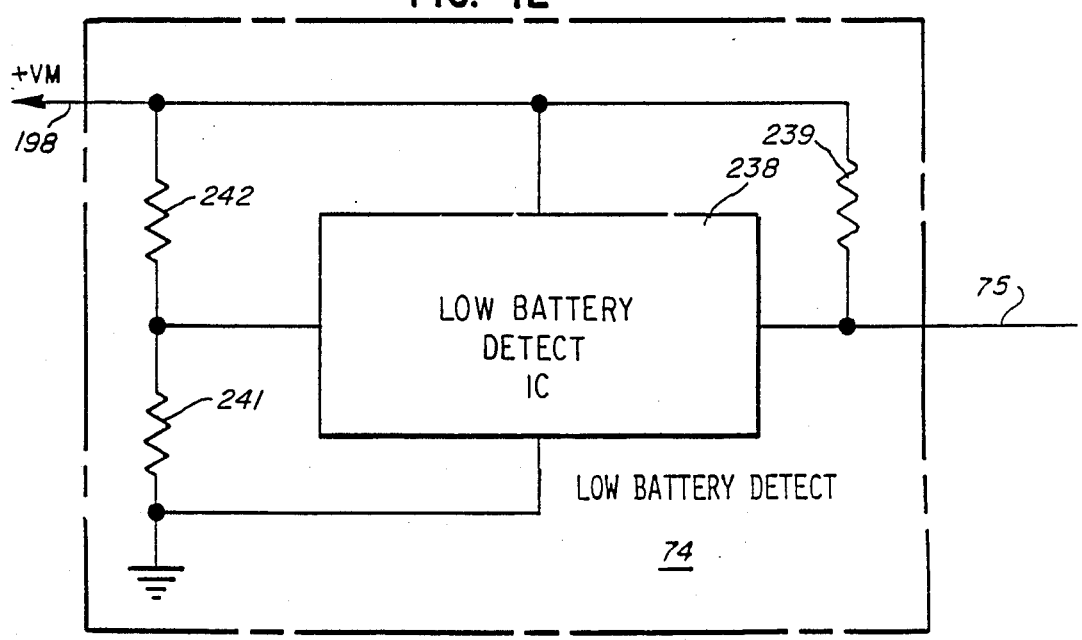
FIG. 12 is a schematic circuit diagram of low battery detect circuitry of the automatic meter reader of FIG. 2.

As shown in FIG. 12, a low battery detect circuit 74 includes an integrated circuit 238 which has an output connected to the line 75 and through a resistor 239 to the +VM line 198. A threshold input terminal of the circuit 238 is connected through a resistor 241 to ground and through a resistor 242 to the +VM line 198. When the +VM signal is applied in the power output condition and when at the same time, the battery voltage is below a certain threshold value, an output signal is applied through the line 75 to signal the low battery condition to the microprocessor 52.

OPERATION OF AMR MICROPROCESSOR 52

Figure 13:
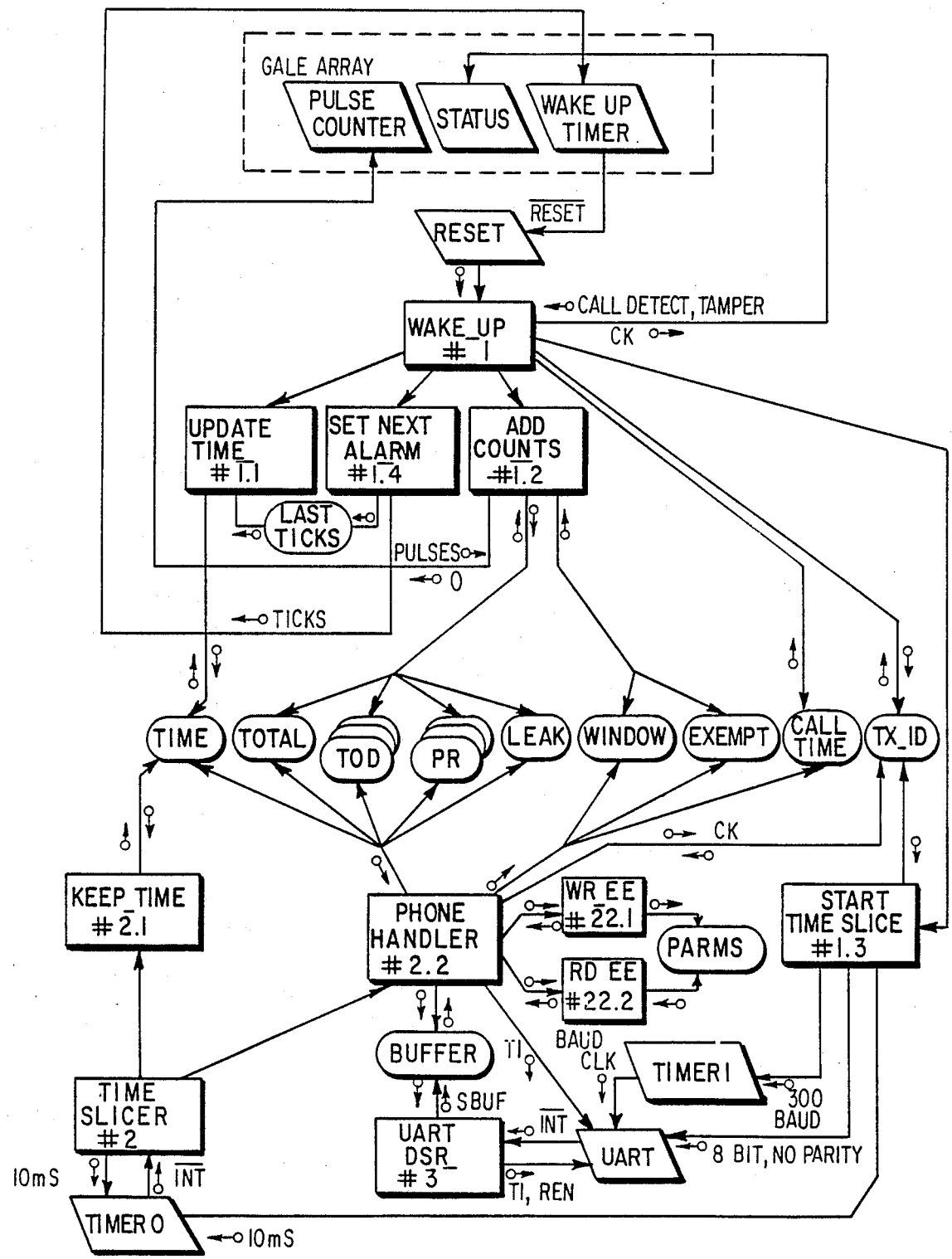
FIG. 13 is a structure chart illustrating the operation of a microprocessor of the automatic meter reader of FIG. 2.

The microprocessor 52 is controlled by a program in the program memory 67. An object called a source listing is submitted as Table I at the end of the descriptive portion of this specification being formulated for an 80C 31 microprocessor. FIG. 13 is a structure chart and FIGS. 14–20 are flow charts which depict the mode of operation of the microprocessor 52.

Referring to FIG. 13, the wake-up timer 41, status register 46 and meter pulse counter 43 are depicted in a welcome line rectangle labeled "Gate Array", this label being applied for the reason that it is expected that the various gates and counters of such circuits and also gates and counters of the clock circuit 40 and reset and power control circuit 50 will be embodied in a single gate array integrated circuit chip.

Figure 14:
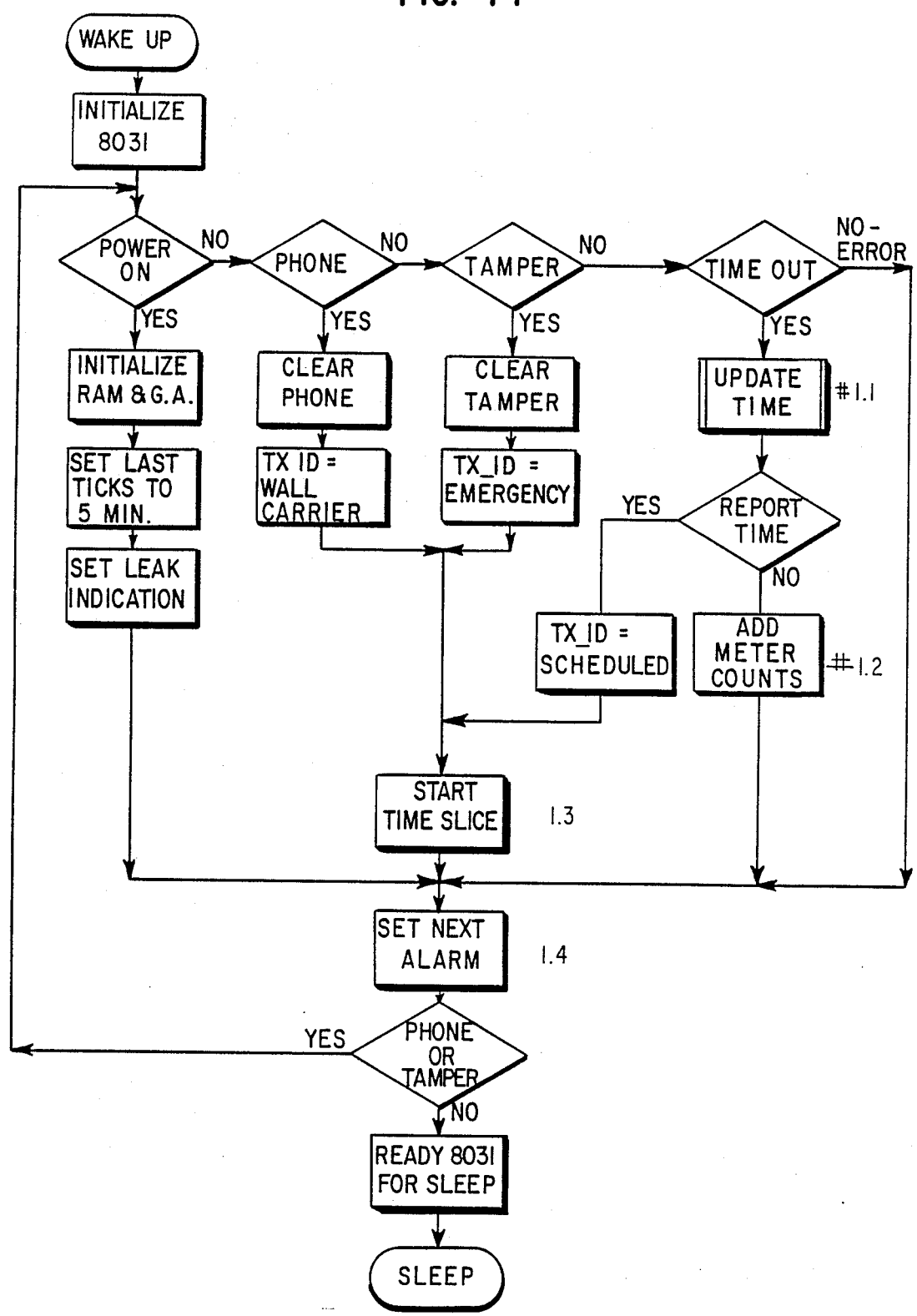
FIG. 14 is a flow chart illustrating operations performed upon receipt of a wake-up signal by a microprocessor of the automatic meter reader.
Figure 18:
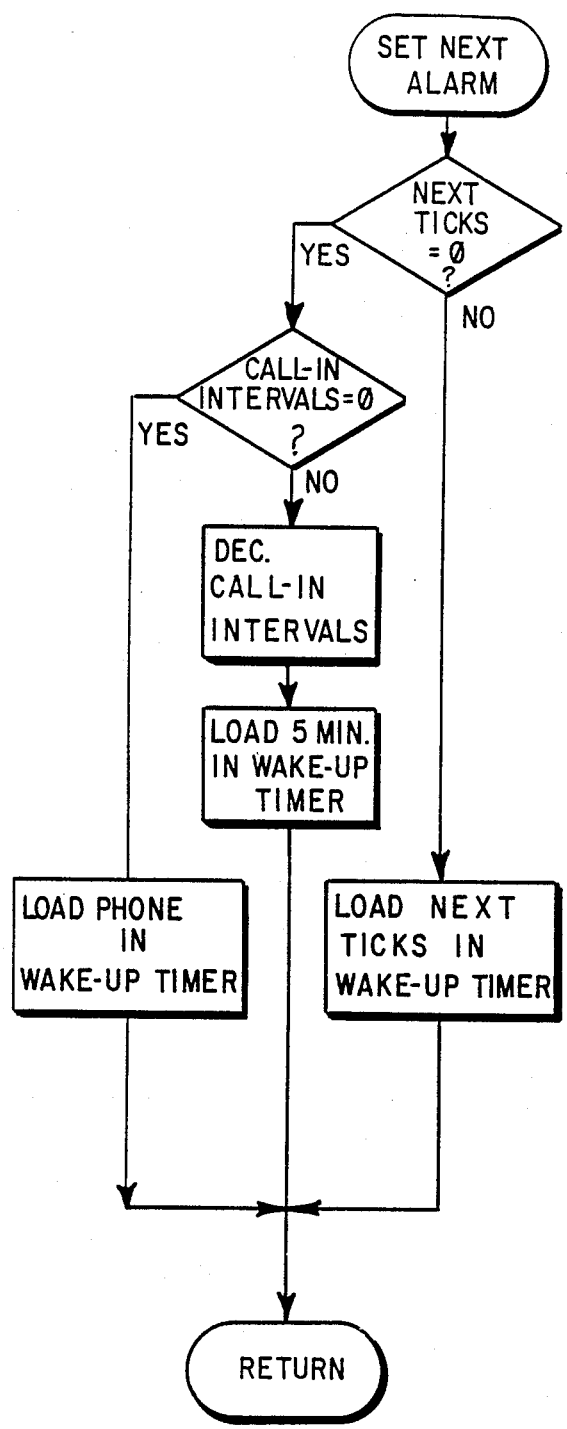
FIG. 18 is a flow chart illustrating a "SET NEXT ALARM" operation of the microprocessor.
Figure 19:
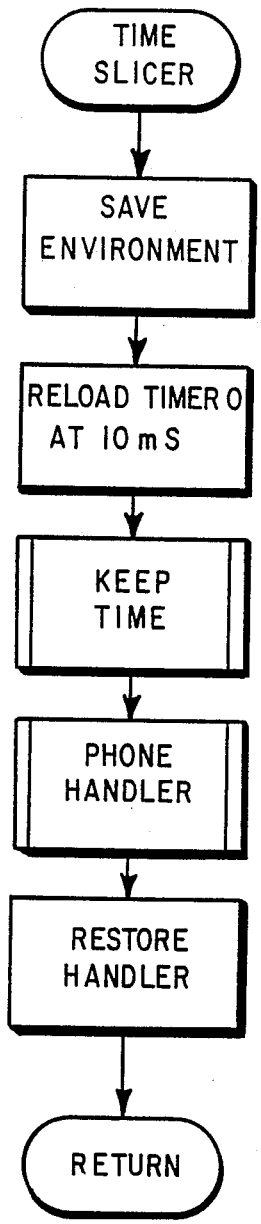
FIG. 19 is a flow chart illustrating a "TIME SLICER" operation of the microprocessor.
Figure 20:
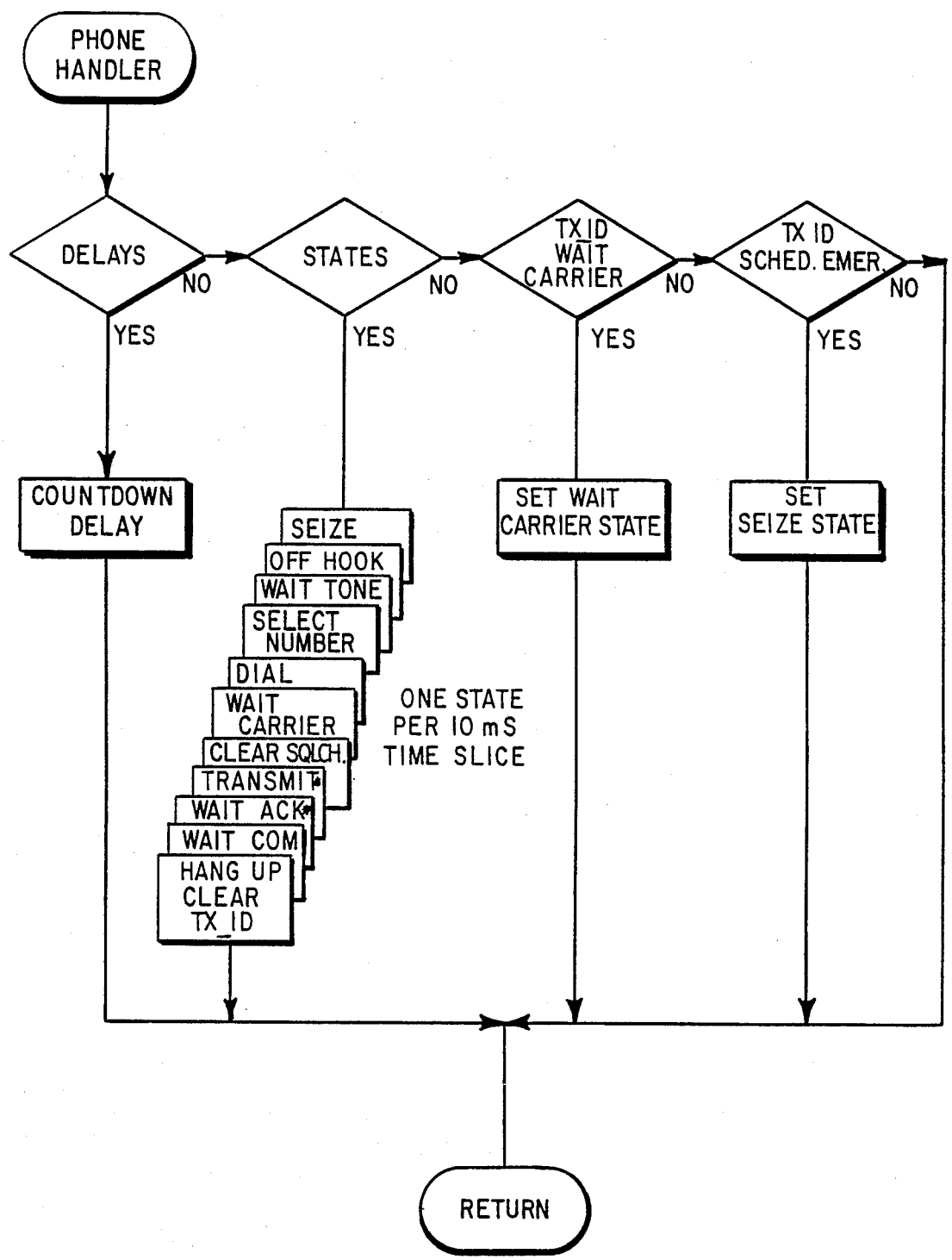
FIG. 20 is a flow chart illustrating a "PHONE HANDLER" operation of the microprocessor.

As indicated in FIG. 13, a wake-up operation is initiated from the wake-up timer or in response to call detect or tamper conditions, the wake-up operation being depicted in the flow chart of FIG. 14. This operation has various subsidiary operations associated therewith including "UPDATE TIME", "ADD COUNTS", "START TIME SLICE" and "SET NEXT ALARM" operations as depicted in FIGS. 15, 16, 17 and 18. A "TIME SLICER" operation is provided which utilizes a timer interrupt at 10 millisecond timer intervals and it is used for handling telephone operations including dialing and communications through the modem. The "TIME SLICER" operation is shown in FIG. 19 while a "PHONE HANDLER" operation is shown in FIG. 20.

Memory locations or registers are provided in RAM for keeping track of elapsed time, meter data and control data. The meter data includes the accumulated total, TOD and TR totals and a leak total. The control data includes selected windows exempt times, call time and transmission control data. The access to such memory locations or registers is indicated in the structure chart of FIG. 13.

FIG. 14 illustrates the wake-up operation which is initiated in response to a signal applied through line 53 from the reset and power control circuit 50. Certain initializing operations are performed including disabling of reset, timer and UART interrupts, the initialization of a stack pointer and setting up of input-output ports to a certain condition. Then a "POWER ON" test is made to determine whether the AMR 15 is being used for the first time, after installation of a battery, which is made by determining whether certain values are stored in certain ram locations. The required, initialization steps are performed, if required. If not a test determines whether there was a signal on the "PHONAL" line 55. If so, a bit of the status register is clear and a control flag or "TX-ID" is set to a "wait carrier" condition. Then the start time slice operation is performed and, as part of the time slicer operation, a phone handler operation is performed. Such operations function to make a check to determine whether the incoming telephone call was originated by the CCM and if so, to take appropriate action such as an installation transaction, a demand reading transaction, or a "brainwash" transaction. A similar sequence takes place if the wake-up was initiated in response to a tamper condition, differing in that a control flag is set to a "seize" state so that in response to the next 10 millisecond time slice interrupt, a seizure of the telephone line is initiated. The hook switch is then placed in an off/hook condition and upon receipt of dial tone, the system effects dialing of the number of the CCM 12, and then transmits data through the application of signals on the line 32 to the modem. Such data, of course, will include information as to the tamper condition, and other information as hereinafter described.

If the wake-up reset is in response to a time-out signal on line 54, an "UPDATE TIME" operation is performed, and then a scheduled report-due check is made and either the time slice operation is initated or the meter data is updated. Then the next alarm time is set in the manner as shown in FIG. 18 to load a certain count into the counters of the wake-up counter 41 and to cause the next signal on line 54 to be generated after a certain time. Then a final check is made and the microprocessor 52 places itself back in the power-down or "sleep" condition.

Figure 15:
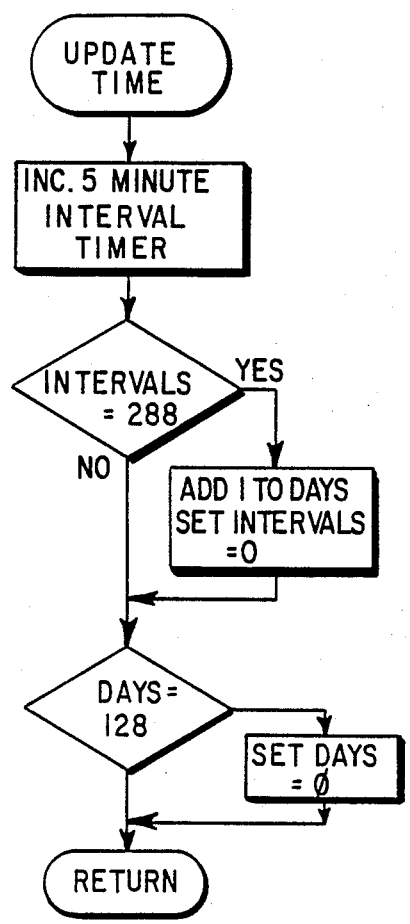
FIG. 15 is a flow chart illustrating an "UP DATE TIME" operation by the microprocessor.

In the "UPDATE TIME" operation of FIG. 15 a five minute interval timer is incremented and then a check is made to see whether one day has elapsed, i.e., whether 288 five minute intervals have been counted. If so, a day counter is incremented. Then if the number of days=128, the number of days is reset to $\emptyset$. The five minute interval and day counters are usable in conjunction with TOD and TR metering, as determined by window and exemption day control data.

Figure 15A:
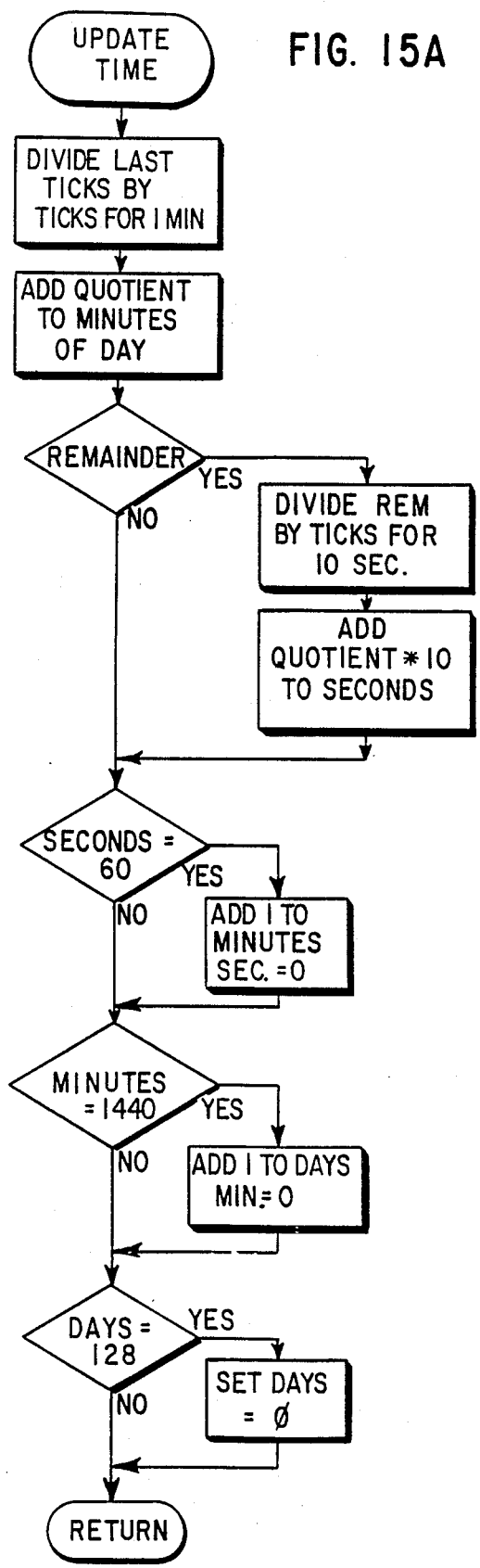
FIG. 15A is a flow chart illustrating a modified "UP DATE TIME" operation.
Figure 16:
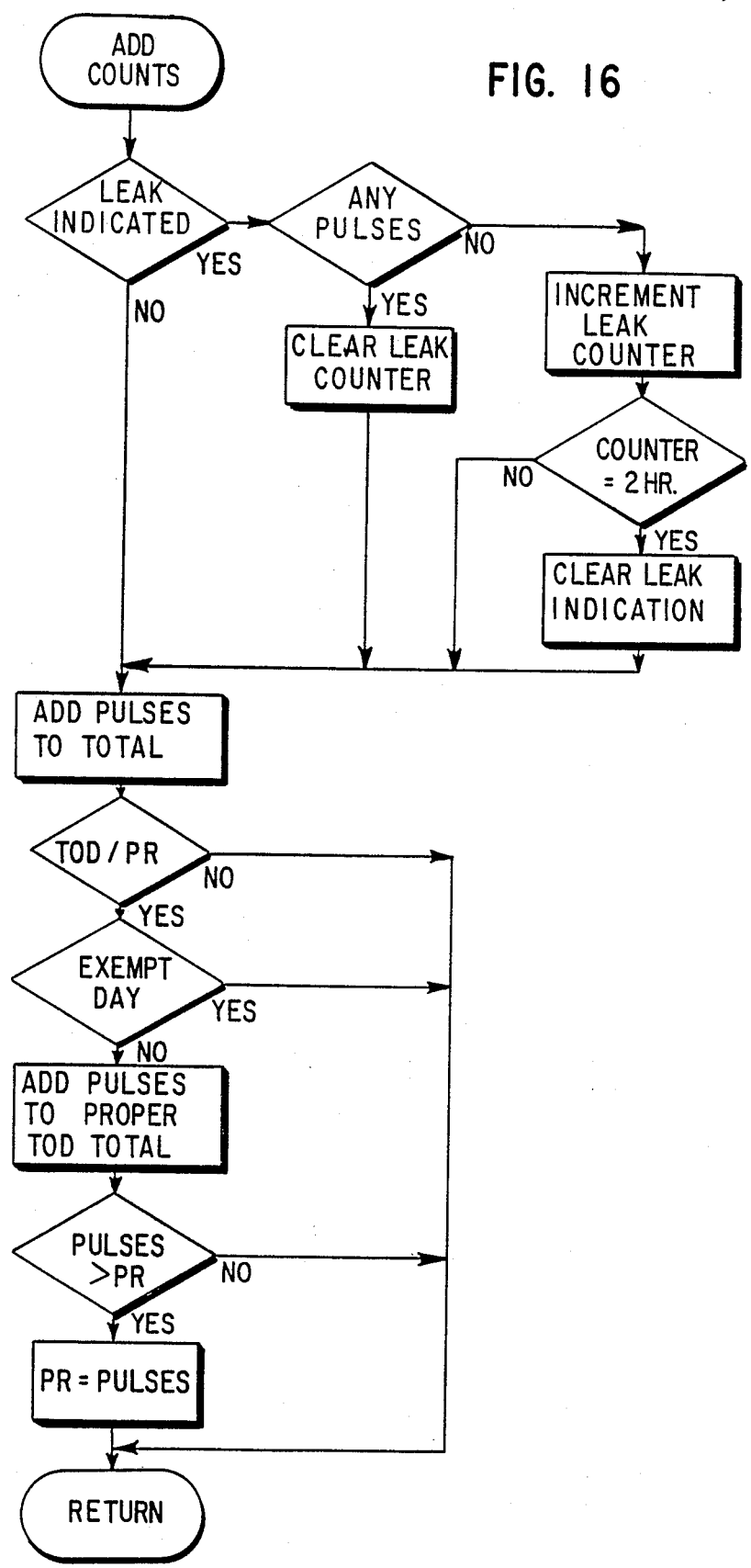
FIG. 16 is a flow chart illustrating an "ADD COUNTS" operation of the microprocessor.
Figure 17:
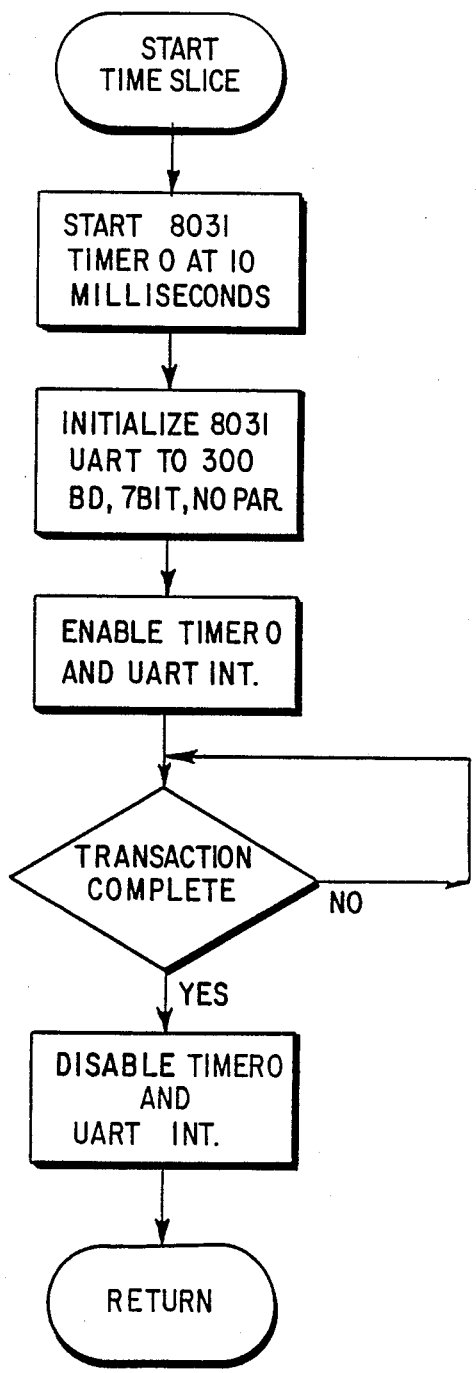
FIG. 17 is a flow chart illustrating a "START TIME SLICE" of the microprocessor.

FIG. 15A shows an alternate "UPDATE TIME" operation which is more complex and in which clock registers are provided which include day, minute and second registers, such registers being updated at certain times in accordance with current time data transmitted from the CCM 12 and being compared with call-back time data in a day, minute, second format. This alternate operation is required for use with an alternate "SET ALARM" operation of FIG. 18A and may also be used with a "SET ALARM" operation of FIG. 18 but is not required for that purpose.

To control of the time of call-ins to make scheduled reports, a call-in time instruction is sent from the CCM 12 in 4 bytes. Byte 1 is called a "NEXT TICKS" byte, being immediately loaded in the wake-up timer after receipt. Bytes 2 and 3 are called a call-in interval timer and contain the number of regular five minute wake-up intervals to the next call-in. Byte 4 is called a "PHONE TICKS" byte and is loaded in the wake-up timer when the call-in interval timer is decremented to zero.

The "SET NEXT ALARM" operation is shown in FIG. 18. After a scheduled report and after loading byte 1 (the "NEXT TICKS" byte) to determine the next wake-up time, the wake-ups occur at regular five minute interval time-outs of the wake-up timer, until the number initially entered in bytes 2 and 3 (the call-in interval timer) has been decremented to zero, byte 4 (the "PHONE TICKS" byte) being then loaded in the wake-up timer. Then at the next wake-up the prior loading of the "PHONE TICKS" byte is detected to indicate that it is report time and a scheduled report transmission is initiated as shown in the flow chart of FIG. 14, resulting in loading of another "NEXT TICKS" byte 1 in the wake-up timer.

If the REPORT MADE and REPORT ALERT flags are both set, the counter of the wake-up timer 41 is loaded with a value such as to cause the next wake-up to occur in slightly less than five minutes and in normal operation it is again loaded with the same value after exactly five minutes or more accurately after a certain total number of oscillator cycles so that timeouts occur regularly at approximately five minute intervals, the accuracy being determined by the accuracy of the oscillator.

With the operation as depicted in FIGS. 14, 15 and 18, the time to the next call-in approximately determined by the number in bytes 2 and 3 of the call-in instruction, multiplied by five minutes, plus the sum of the numbers in bytes 1 and 4 multiplied by the time between "ticks" which are applied to the wake-up timer 41, which may be approximately 1.93 seconds in the illustrated embodiment. Typically, the time interval from one call-in to the next will be an integer number of five minute intervals and, initially, the total of bytes 1 and 4 will correspond to a five minute interval, being determined in accordance with the times by which the desired call-in time precedes and follows five minute clock times. For example, if the desired call-in time is at 2:11:20 AM, byte 1 would correspond to 220 seconds and byte 4 would correspond to 180 seconds. If the call-in occurs too early or too late, either byte 1 or byte 4, or both, may be adjusted to compensate for the initial error and to also compensate for the error which might be expected if the drift of the oscillator continued at the same rate.

If the next call-in occurs at the desired time, one or the other of the bytes may be adjusted in a direction to offset the compensation for the initial error. In following call-ins, if the drift continues at the same rate, no further adjustments will be required.

Bytes 2 and 3 are typically changed to accommodate changes in the number of days in a month while providing a call-in at the same day of each month. The arrangement is quite flexible in that any one of a number of different modes of operation may be obtained through programming of the data sent from the CCM 12. At the same time, the control data is compressed with the number of required bytes being minimized. Also, the AMR 15 is not required to maintain a highly accurate clock or a clock which can be reset from the CCM. At the same time, reasonably accurate TOD and PR windows are obtained and call-in times can be quite accurately controlled to minimize the possibilities of interference.

Figure 18A:
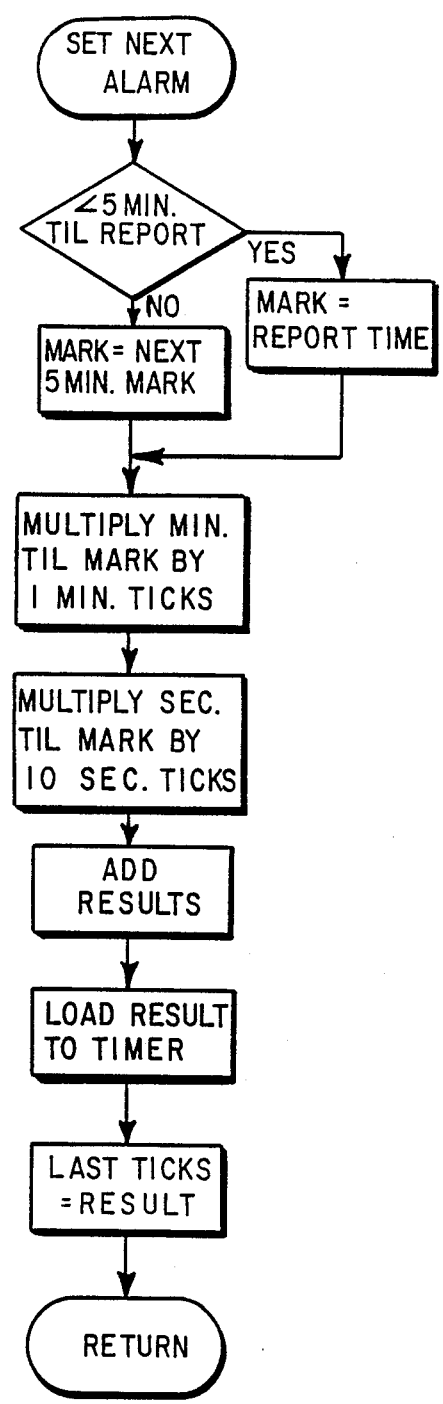
FIG. 18A is a flow chart illustrating a modified "SET NEXT ALARM" operation of the microprocessor.

FIG. 18A illustrates a modified "SET NEXT ALARM" operation usable with the modified "UPDATE TIME" operation of FIG. 15A. A register of current time in a day, minute and second format is maintained 3 bytes in RAM and is updated in scheduled report transactions. The "UPDATE TIME" operation of FIG. 15A then keeps it current and it is compared with a 3 byte call-in time register which is loaded from the CCM 12 during a scheduled report transaction. When the comparison shows that there is less than 5 minutes until the report time, the required number of ticks is computed and loaded into the wake-up timer.

Another important feature of the invention relates to the detection of leaks which is especially important in metering of water consumption. As shown in the "ADD METER COUNTS" flow chart of FIG. 16, a test is made after each five minute time-out to determine whether a leak is indicated, a leak status bit being normally set to indicate a leak, after each scheduled report, installation transaction or demand reading transaction. If the status bit is set, a check is made as to whether any pulses were received in the last five minute interval. If pulses have been received, a leak counter is cleared. If not, the leak counter is incremented and then a check is made to see whether two hours have elapsed, i.e. whether twenty-four five minute intervals have been counted. If not, the operation is continued. If the leak counter is full, then the leak indication is cleared. This arrangement thus requires that in the time between reports, no meter pulses be received for a sampling time period of two hours, such a time period being appropriate for residences and for many businesses having water meters. The sampling time period may, of course, be changed from two hours to some other value. The arrangement permits detection of leakage conditions which are potentially dangerous or destructive as well as being wasteful and which might otherwise be detected only after severe damage has occurred.

UTILITY CONTROL CENTER 11

Figure 21:
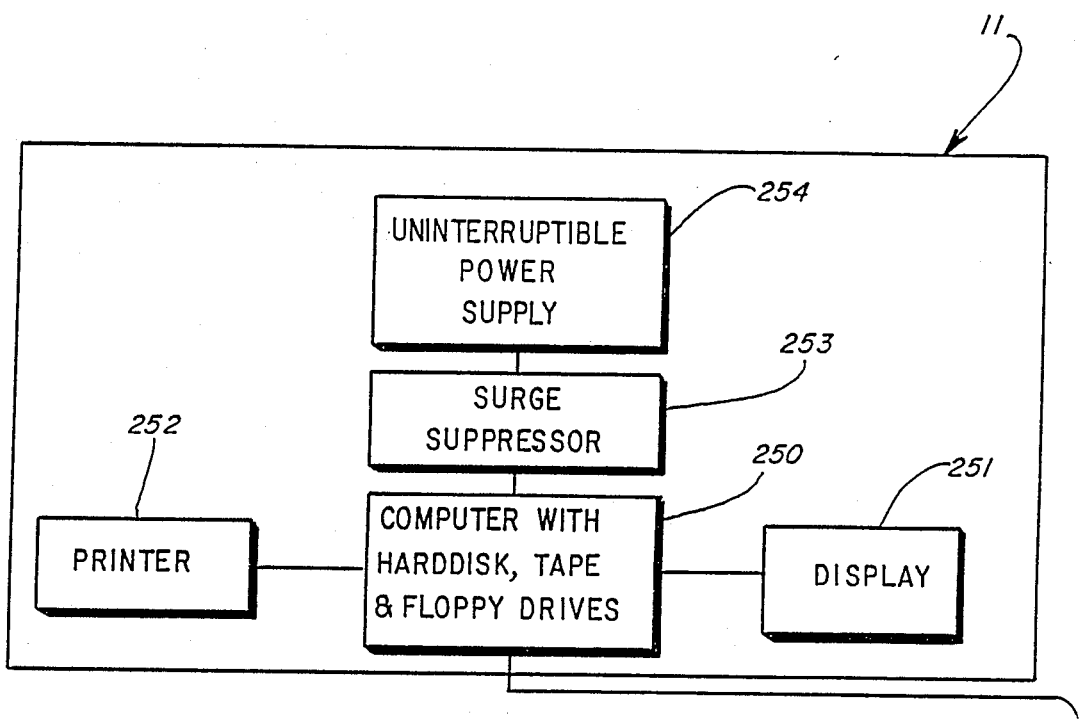
FIG. 21 is a schematic block diagram of equipment and components of a utility control center and FIG. 22 is a schematic block diagram of a call collection module of the system of FIG. 1.

The utility control center 11 is shown diagrammatically in FIG. 21 and it includes a computer 250 with a hard disk drive, a floppy disk drive and an optional tape drive. The computer 250, in the embodiment as herein shown and described, in an IBM PC AT computer. Computer 250 is connected to a display 251 which may be an enhanced color display but a monochrome display may be used, if desired. Computer 250 is also connected to a printer 252 and it is powered through a surge suppressor 253 from an uninterruptable power supply 254.

CALL COLLECTION MODULE 12

Figure 22:
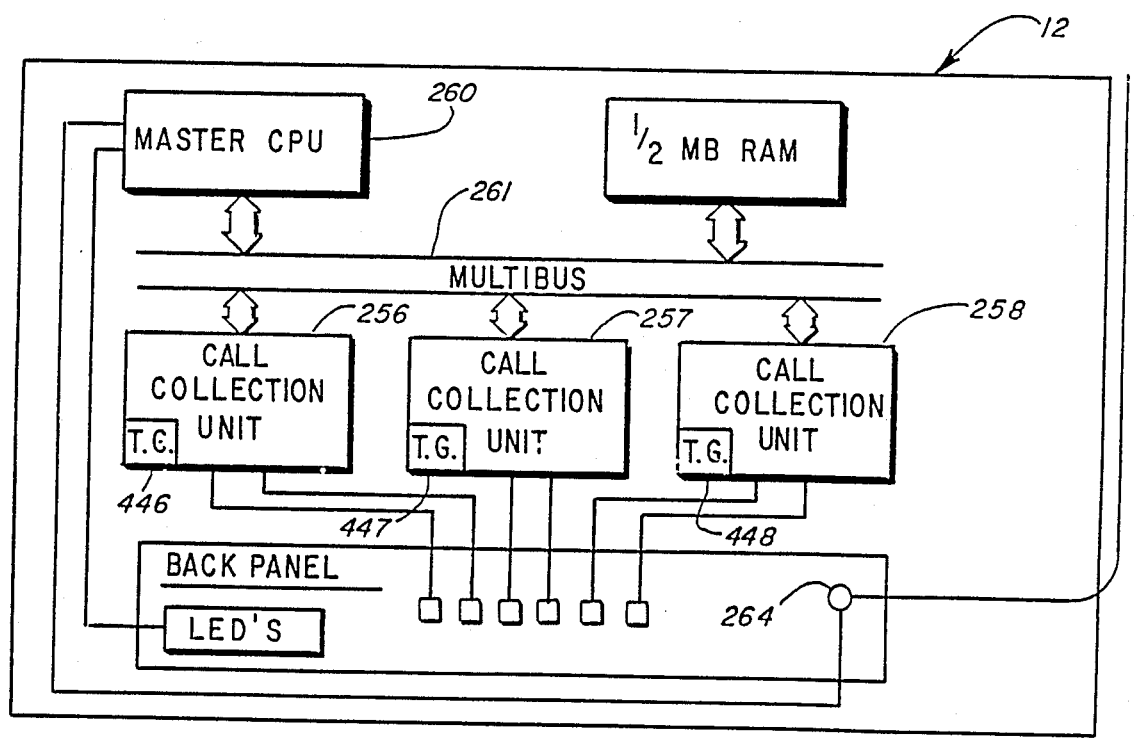
Figure 23:
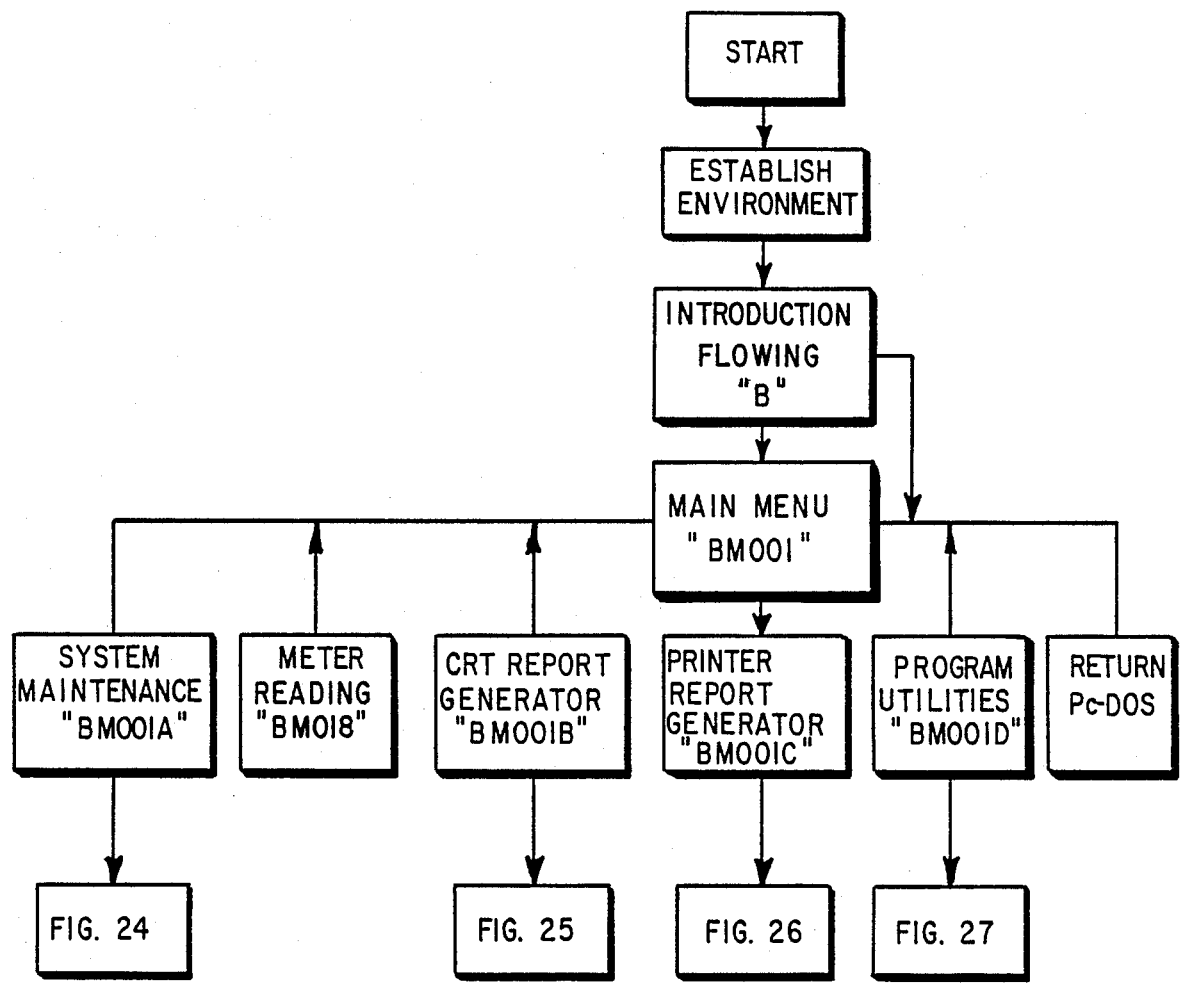
FIGS. 23-27 are flow charts illustrating the operation of the utility control center.
Figure 24:
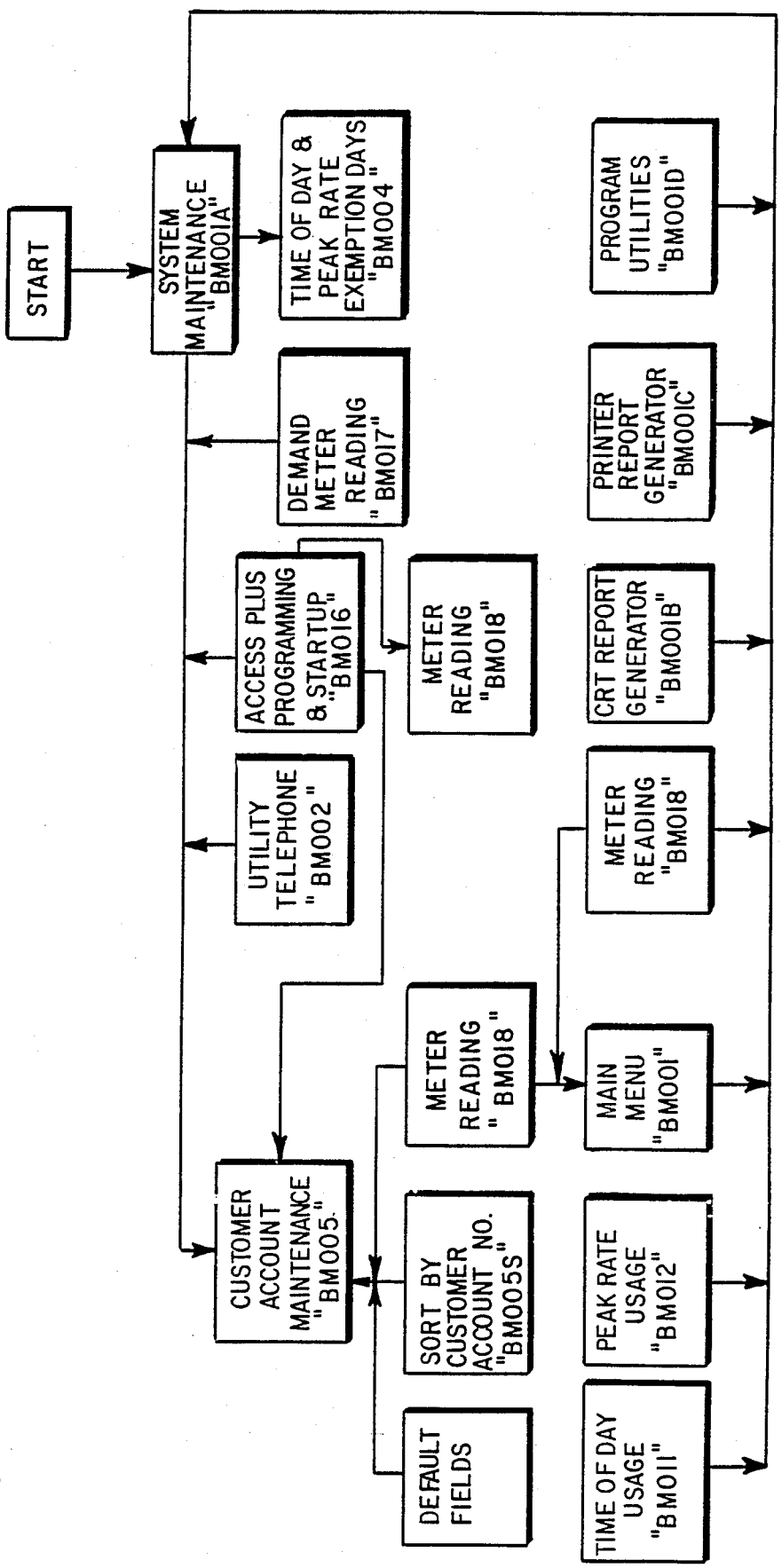
Figure 25:
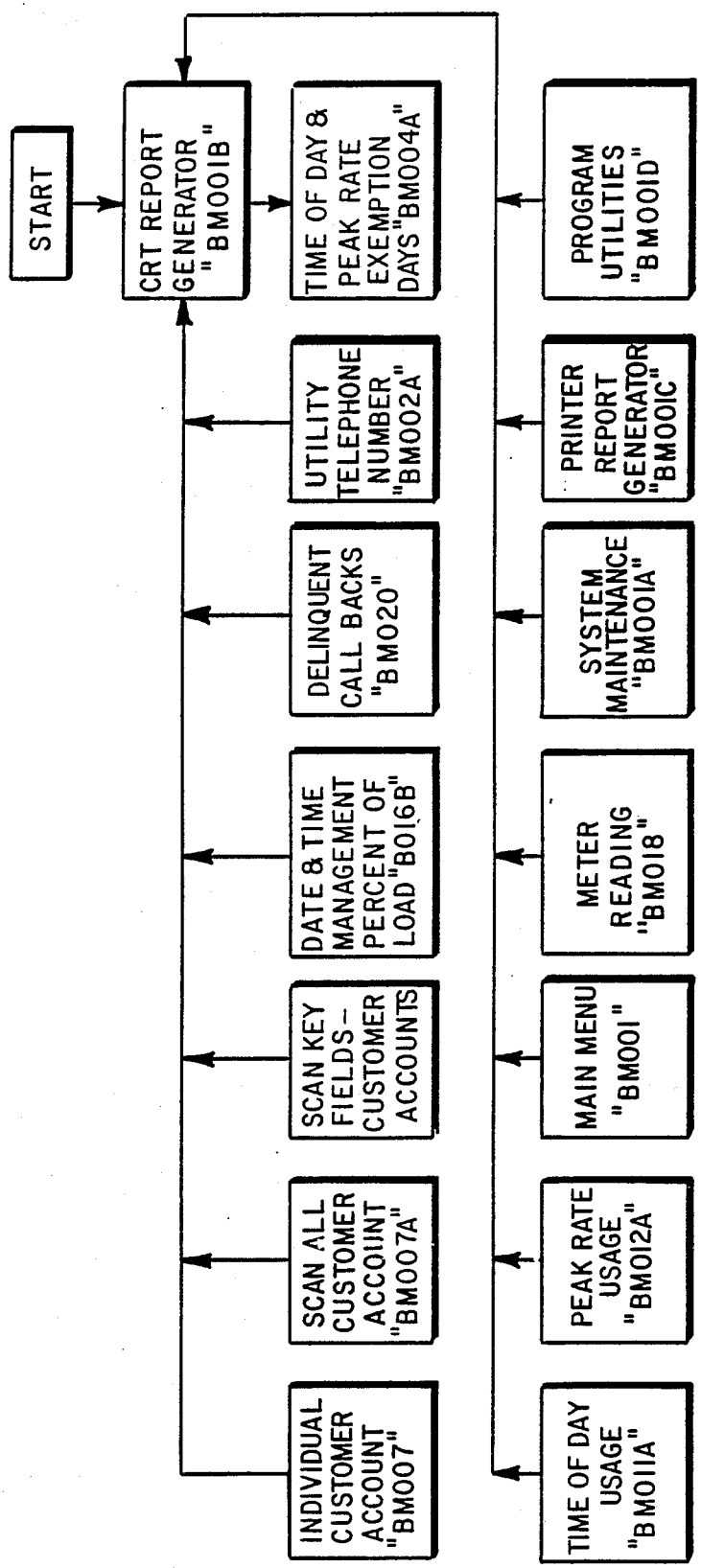
Figure 26:
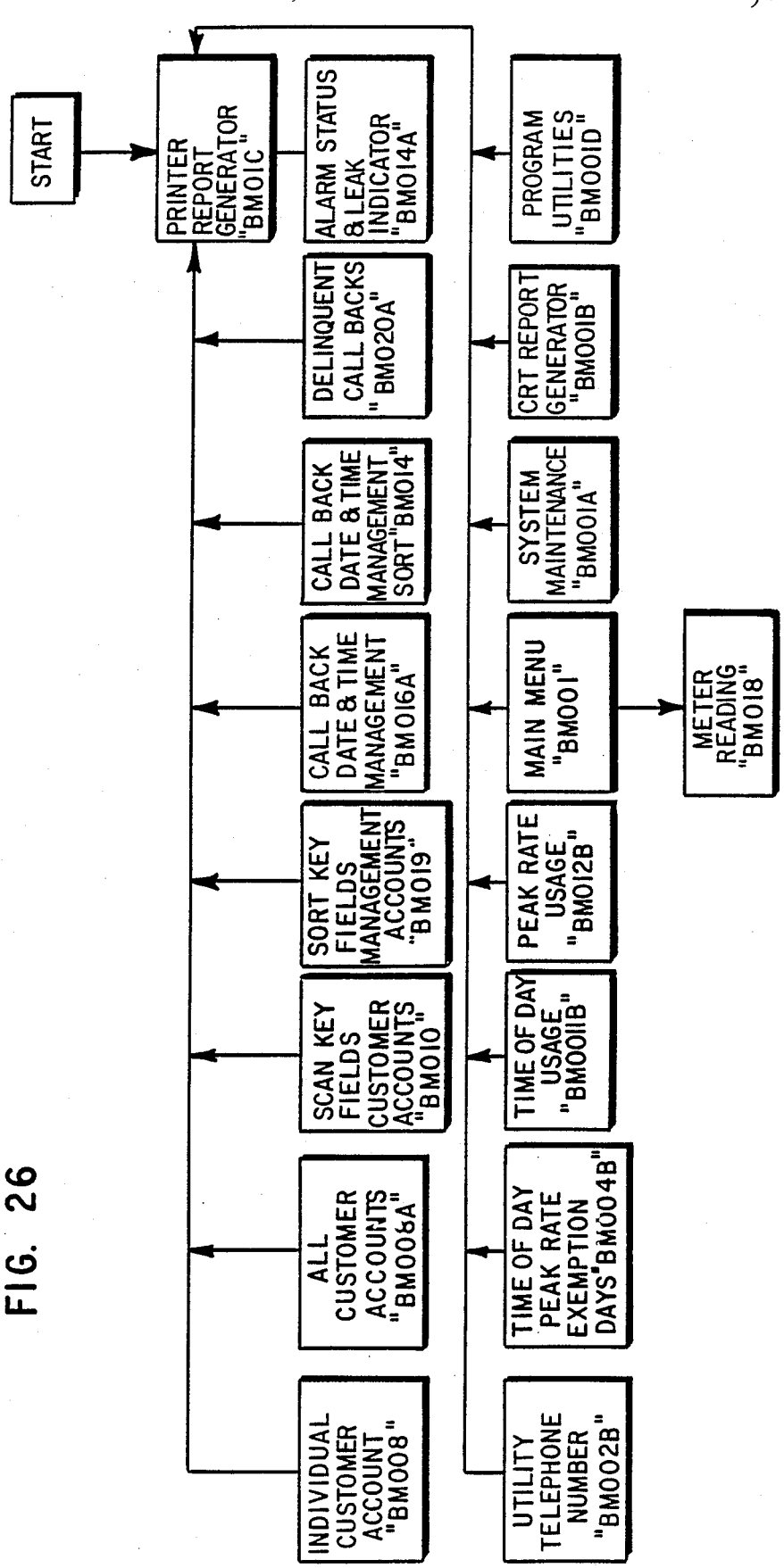
Figure 27:
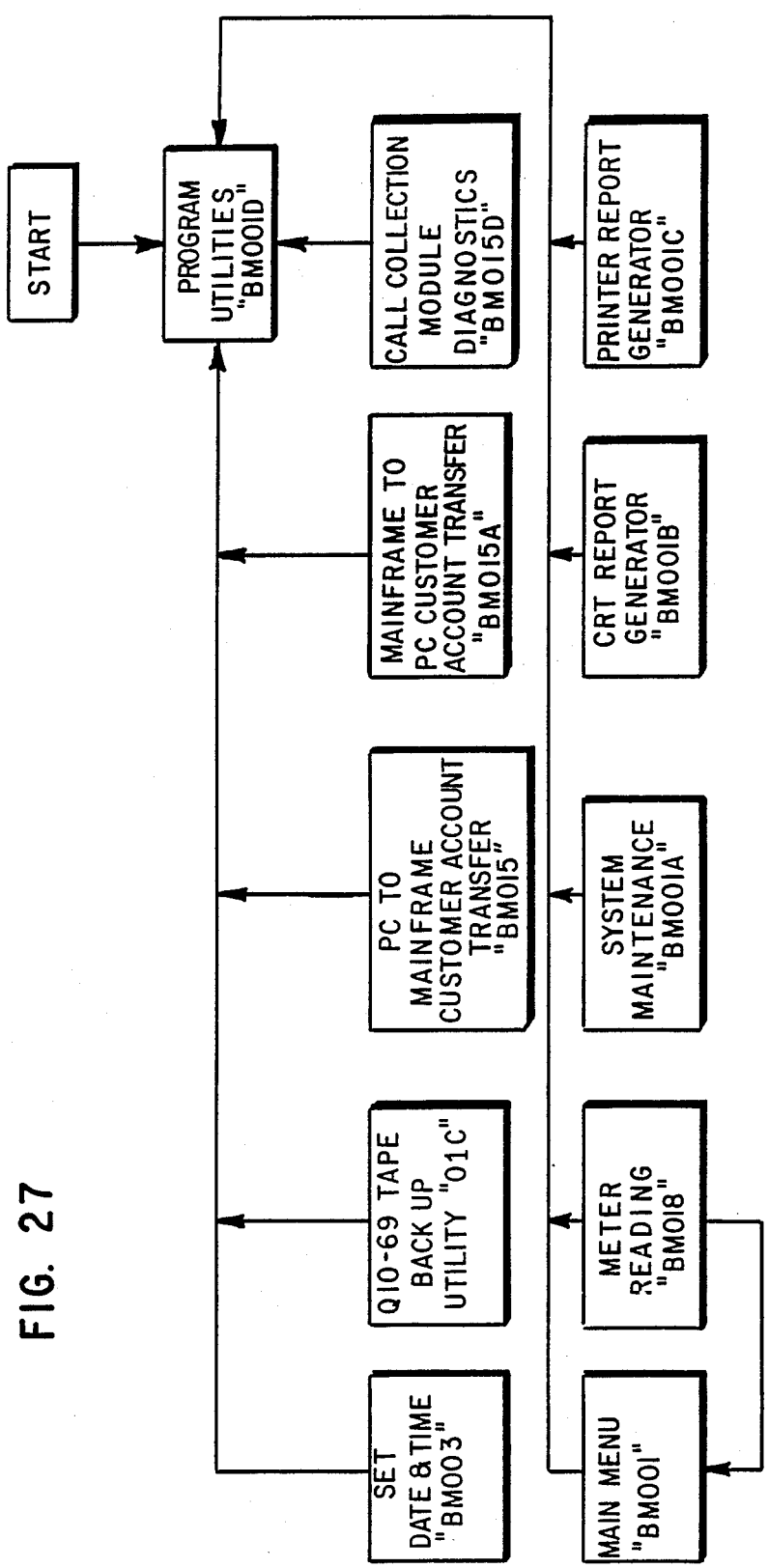

As also shown diagrammatically in FIG. 22, the call collection module 12 comprises three call collection units 256, 257 and 258, a master central processing unit 260 and a RAM 261, all connected to a multi-bus 262. The RAM 261 may have a one-half megabyte capacity. Each of the call collection units 256, 257 and 258, in the illustrated embodiment, is a type mSBC 86/35 single board computer manufactured by Micro Industries, Westerville, Ohio. Each such single board computer has an on-board local bus which is connected to a type mSBX 354 serial I/O Multimodule Board which provides two independent serial I/O channels controlled by a serial communications controller component. Such channels interface with standard modems for connection to two telephone lines. Control and dialing means are provided for responding to an incoming call and for seizing a line and making an outgoing call, as required. Each of the call collection units 256, 257 and 258 has 512K bytes of memory of which approximately half are available for temporary storage of incoming meter data. The master central processing unit 260 is also an mSBC 86/35 single board computer and it is provided with a serial communications controller and a serial interface to the UCC 11, being connected thereto through a cable 264. A conventional RS 232 interface may be used, and a 9600 baud rate is used in communications between the CCM and the UCC. The master central processing unit 260 is also connected to indicator lights 265 on a back panel 266 which carries jacks for the six telephone lines 13 as well as a connector for the UCC 11.

With a UCC 11 and a CCM 12 as shown and with programming as hereinafter described, a very large number of AMR's 15 can be accommodated for efficient, accurate and reliable receipt of meter data therefrom and for compilation, printing, storage and transmission of such data to facilitate billing of customers, keeping records and analyses of operations.

OPERATION OF UTILITY CONTROL CENTER 11

An important function of the UCC 11 is to facilitate entry of control data which is temporarily stored and which can be edited as required, such control data being transmitted to the CCM 12 in a certain form and being translated by the CCM 12 into a form in which it can be stored in RAM of the CCM 12, to be transmitted to the AMR's 15 in an initial installation transaction and also in subsequent scheduled report transactions. The UCC 11 is also operative to receive and store data from the CCM 12 and to store such data, being also operative to disassemble data and to place it in proper fields, compute the next call-in date, and analyze data as well as storing data. It is also, of course, usable to print-out data, using the printer 253.

The program for the UCC 11, written in the BASIC language, is listed in Table II at the end of the descriptive portion of this specification. It is written in modules, the first having the name "AMR" and the second having the name "ACCESS". The remaining listed modules, with the exception of an "LPRINT" module for program listings, has a name in the form of an identifying number, preceded by "BM".

The general mode of operation of the UCC 11 is illustrated in the flow charts of FIGS. 23–27 in which the names of the listed program modules are set forth, for reference. At start-up, an operating system is loaded from a disc into the computer 250 and then the meter reading operating system is loaded from a disc into the computer, the "AMR" and "ACCESS" modules being run. Initially, an introductory screen is produced which includes a "Flowing 'b'" or moving statement "Press Any Key To Start" and, upon pressing any key, a module BM001 operates to produce a main menu which permits selection of any one of the following:

> System Maintenance
> Meter Reading
> CRT Report Generator
> Printer Report Generator
> Program Utilities
> Basic
> Return to PC-DOS
> Flowing 'b'

The "System Maintenance" option is used in initialization of the system. It uses a program identified as "BM001A" and it is depicted in the flow chart of FIG. 24, being operative to display a menu with a large number of items from which to select. This menu is produced from program lines 160–300 and is as follows:

> System Maintenance Menu
> Customer Account Maintenance
> Utility Telephone Number
> Access Plus Programing & Startup
> Demand Meter Reading
> Time of Day & Peak Rate Usage
> Time of Day & Peak Rate Exemption Days
> Time of Day Usage
> Peak Rate Usage
> Main Menu
> Return To Main Menu
> Meter Reading
> CRT Report Generator
> Printer Report Generator -continued > Program Utilities The first item "Customer Account Maintenance" is usable for adding, changing or deleting customer accounts. In adding or changing accounts, a menu is produced in which information as to the items listed in the data statements at lines 430–780 of the AMR module (see first page of Table II). This menu is as follows:

> Customer Name? ———————
> Address? ———————
> City & State? ———————
> Zip Code:? ———
> Cust Phone Number:? ———
> Meter Mfg? ———————
> Type Model & Size? ———————
> Configuration/TC:? —
> Meter Serial #? ———
> Access + Serial #:? ———
> Date Installed:? — — —
> Alarm/Status:? —
> Leak Indicator:? —
> Call In Attempts:? —
> Call In Frequency:? -
> Call Back Date:? - -
> Call Back Time:? —:—:-0
> Account Status:? —
> Prev Mtr Rdng:? ———
> Pres Mtr Rdng:? ———
> Dt Prev Mtr Rdng:? - -
> Dt Pres Mtr Rdng:? - -
> Tm Prev Mtr Rdng:? —:—:-0
> Tm Pres Mtr Rdng:? —:—:-0
> Time of Day Usage? —
> Usage Period #1:? ——
> Usage Period #2:? ——
> Usage Period #3:? ——
> Calculated Usage? ——
> Peak Rate? —
> Rate Period #1:? ——
> Rate Period #2:? ——
> Rate Period #3:? ——
> Access + Password? —
> DTM Deletion Code:? ———

The operator enters or edits appropriate items, such as "Customer Name", "Address", "Cust Phone Number", etc. and when the items appear to be satisfactory to the operator, the information may be stored on hard disc and may also be sent to the CCM 12.

An important feature relates to entry of call back dates and times. If such are not filled in or entered, the program operates to automatically set a time and date. If a date only is selected, and the time is left open, or vice versa, the program automatically sets the time or date. If both a time and a date are selected, they will be used unless previously set for another customer.

The call-ins may be set to occur on a daily, weekly, monthly or quarterly basis and if a date is selected by the operator, subsequent call-ins will be automatically set by the program. For example, if a monthly call-in is selected and if the fifth day of a month is selected, call-ins will be made on the selected day and on the fifth day of each subsequent month. The 29th, 30th and 31st days of a month are not accepted.

Data of a "global" nature are entered separately and are used for all customers or as "default" data to be used if not overridden for a particular cusomter. Utility telephone number data and CCM set-up data are entered using a menu as indicated at lines 130-160 of module BM002. Time of day and peak rate exemption day data are entered for each year using a menu as indicated at lines 120-230 of module BM004. Time of day and peak rate windows are entered using menus as indicated at lines 130-200 of module BM011 and lines 130-200 of BM012.

After entry of control data, the system may be immediately placed in a meter reading mode or state or, if left in any other state and no action is taken after elapse of a certain interval of time, the system automatically reverts to the meter reading mode. This feature insures that the UCC 11 will collect data from the CCM when left unattended overnight or for substantial intervals of time.

In the meter reading made, program module BM018 is operative. Referring to line 470, a command M$ is sent to file #4 which is CCM 12. M$ is initially defined as "DUMP" in line 180 and sending it causes the CCM 12 to send or dump transaction data. Then M is defined as "N" in line 470 which causes the CCM 12 to send or dump the next transaction data to the UCC 11. This operation continues until all transactions which have been sent to and processed by the CCM 12 are dumped to the UCC 11. When all available transaction data have been dumped to the UCC 11, the CCC 11 program will operate in a continual loop, operating to receive more data as it becomes available as a result of receipt and processing of AMR data by the CCM 12. The loop may, of course, be interrupted at the UCC 11 to perform other operations in which case the CCM 12 stores up data in its memory for sending to the UCC 11 at the request of the UCC 11.

As transaction data is received at the UCC, it is disassembled and placed in proper fields. The next call-back date is computed and checked with that sent from the CCM 12 which will have independently computed the call-back date and which will have sent it to the reporting AMR 15 during a scheduled report transaction. This call-back date computation and check is made to detect possible malfunctions and if an error is detected, it is reported.

The UCC 11 also analyzes alarm condition data and indicates and prints alarm data. Received data are sent to the disc drive for storage with a format such that they can be readily retrieved and sent to processing equipment for sending of bills to customers and for record-keeping and such other purposes as may be desired by a utility or municipality.

The program of the UCC 11 also includes many advantageous features relating to display and printing of control, meter and status data. The program modules BM001B and BM001C are usable for control of display and printing of items as indicated in lines 160-310 of module BM001B (CRT Report Generator Menu) and lines 160-340 of module BM001C (Printer Report Generator Menu), by chaining of other modules as respectively indicated in lines 660-790 of module BM001B and lines 690-850 of module BM001C. The CRT and Printer Report Menus are as follows:

---
CRT Report Generator
Individual Customer Account
Scan All Customer Accounts
Scan Key Fields - Customer Accounts
Date & Time Management Percent of Load
Delinquent Call Backs
Utility Telephone Number
Time of Day & Peak Rate Exemption Days
Time of Day Usage
Peak Rate Usage
Main Menu
Return To Main Menu
Meter Reading
System Maintenance
Printer Report Generator
Program Utilities
Printer Report Generator
Individual Customer Account
All Customer Accounts
Scan Key Fields - Customer Accounts
Sort Key Fields - Customer Accounts
Call Back Date & Time Management
Call Back Date & Time Management Sort
Delinquent Call Backs
Alarm/Status & Leak Indicator Sort
Utility Telephone Number
Time of Day & Peak Rate Exemption Days
Time of Day Usage
Peak Rate Usage
Main Menu
Return To Main Menu
Meter Reading
System Maintenance
CRT Report Generator
Program Utilities
---

The operator can readily and quickly obtain all data required for ascertaining the status of operations and for facilitating accurate control of all operations.

For communication between the UCC and CCM, the system operates at 9600 Baud, with 8 data bits, 1 stop bit and no parity, and ASCII characters are used, the ASCII carriage return (CR) being allowable. The following specifications apply to the form of messages:

A. Command Formats

All commands are of the general form:

COMMAND
[KEYWORD=VALUE][KEYWORD=-
VALUE] . . .

where
COMMAND identifies the specific action that is being requested;
KEYWORD identifies a parameter associated with the command;
VALUE is the value being assigned to the associated keyword.

Depending on the command, there may be any number of keyword values assigned. NOTE: the square brackets in the general form of the command are not part of the command string; they are used in the command form description to indicate that the keyword/value pair may be optional (depending on the command).

The CCM will always respond to any command from the UCC with either response "OK" or "REJECT". If the response is "REJECT", an error code is also indicated in the response. Each response line is terminated with a carriage return and a line feed.

The error codes that are returned with the "REJECT" response are command-specific. However, the following error codes are possible with all command:
1—command not recognized
2—command not yet implemented
3—invalid keyword
4—insufficient data available to service command
B. Commands Originated by the UCC 1. PARAM—global parameter initialization
   a. General Description
   This command is used to set the values for certain parameters that are used globally by the CCM (i.e. they are not specific to a particular AMR).
   b. Allowed keywords and associated values
   PHONE—utility phone number.
   TOD—default indication of whether TOD calculations are to be performed.
   PR—default indication of whether TOD and PR calculations are to be preformed on a 5-day or 7-day schedule.
   WINDOWS—TOD/PR window definitions.
   CALLBACK—next call-in interval width.
   MODE—CCM mode of operations.
   c. Additional error codes
2. PREINSTALL—load pre-installation data
   a. General description
   This command is used to pre-load the CCM with information that will be used later with an INSTALL command. By preloading the information using this command, the amount of information required by the INSTALL command is minimized. Thus, the CCM can be pre-loaded by the UCC and the INSTALL command could be more easily issued at a "dumb" ASCII terminal.
   The PREINSTALL command does not initiate a phone call; it merely loads the pre-installation data into the CCM memory.
   b. Allowed keywords and associated values
   ACCT—account number. This parameter is required, as it is used to cross-reference the data in this command with the associated INSTALL command.
   MPHONE—phone number which is dialed to call the AMR.
   PHONE—phone number which is the AMR must call in order to call the CCM. If this parameter is not present the PHONE parameter loaded by the PARAM command is used.
   CALLIN—the next scheduled call-in time for the AMR.
   CALLBACK—used to override the global (via PARAM command) CALLBACK interval width.
   PREV—previous meter reading for the meter. If this parameter is missing the value 000000 is used.
   TOD—used to override the global (via PARAM command) TOD value.
   PR—used to override the global PR value.
   PRMODE—used to override the global PRMODE value.
   METER—meter definitional status' defaults to "ON".
   WINDOWS—used to override the global WINDOWS value.
   SERNO—the serial number of the AMR. This parameter is normally sent with the associated INSTALL command.
   c. Additional error codes
   10—insufficient memory to load pre-installation data.
3. INSTALL—perform AMR installation
   a. General description
   This command will cause an installation phone call to be placed to the specified AMR. The "OK" response does not return until a phone line is assigned for the call. Any of the parameters may be given in associated PREINSTALL command; the ACCT parameter is used to cross-reference the data. If a given parameter appears in both the INSTALL and PREINSTALL command for a given ACCT number, the value specified in the INSTALL command is used.
   b. Allowed keywords and associated values
   All keywords described for the PREINSTALL command also apply to the INSTALL command.
   c. Additional error codes
   20—ACCT parameter not supplied
4. KEYS—load security key
   a. General description
   This command is used to load the security keys into the CCM memory. Sixteen security keys must be loaded using separate KEYS commands before the CCM will become operational.
   b. Allowed keywords and associated values
   INDEX—the index associated with the given key. This value must be in the range 0 to 15.
   KEY—four hexadecimal values specifying the four bytes of the security key.
   c. Additional error codes
5. SCHEDULE—load scheduled call modification information
   a. General description
   This command is used to load information into the CCM that will be sent to a specified AMR when it calls in for its next scheduled report. This command is issued for a given AMR account number only if there is a need to modify either the global parameter data (see PARAM command) for the particular AMR or existing operational data in the AMR.
   b. Allowed keywords and associated values
   The ACCT, CALLIN, CALLBACK, TOD, PR, PRMODE METER, and WINDOWS (see PARAM and PREINSTALL commands) are the allowed parameters for the SCHEDULE command. The ACCT parameter is used to identify the AMR when it calls in.
   c. Additional error codes
   10—insufficient memory in the CCM to hold the SCHEDULE data.
6. DEMAND—load demand call information
   a. General description
   This command is used to load information for a Demand Reading call into the CCM memory. The CCM will then place the call when a line becomes available. The "OK" message is returned to the UCC after the data has been placed into the CCM memory; the "OK" response does not mean that the call has been placed.
   b. Allowed keywords and associated values
   This command allows all the keywords that are recognized by the SCHEDULE command. Additionally, the SERNO parameter (see PREINSTALL command) is required.
   c. Additional error codes
   10—insufficient memory in CCM to hold DEMAND data.
7. EXEMPTIONS—load exemption days
   a. General description
   This command is used to load the exemption days for an entire year into the CCM memory. If the year specified is the current year, then any existing days for the current year are deleted before storing the new ones. If the year specified is for the next year, then they are added to the existing list of exemption days (in the CCM memory).
   b. Allowed keywords and associated values
   YEAR—specifies the year for which the exemption days are being entered.
   DAY—specifies one exemption day in the form "mm/dd"; each exemption day may be specified using a separate DAY keyword/value pair, or multiple days (separated by commas) may be provided with one DAY keyword.
   c. Additional error codes
   30—invalid year (neither current year or next year)
8. DUMP—request AMR call data
   a. General description
   This command is used by the UCC to request that Scheduled Report transaction data be dumped from the CCM. The data is dumped one transaction at a time. At the end of each transaction dump, the CCM waits for a "command" character from the UCC what specifies what the CCM is to do next. These characters are as follows:
   Q—quit dumping data; the CCM will then respond "OK".
   N—dump next transaction data
   b. Allowed keywords and associated values
   No keywords are recognized by this command.
   c. Additional error codes
   40—no transaction data is available.
9. GETTIME—read CCM time and data
   a. General description
   This command allows the UCC to read the current time and date that the CCM is keeping.
   b. Allowed keywords and associated values
   This command requires no keyword parameters.
   c. Additional error codes
   None.
10. SETTIME—set CCM time and date
   a. General description
   This command allows the UCC to set the time and date in the CCM.
   b. Allowed keywords and associated values
   DATE—the current date.
   TIME—the current time.
   c. Additional error codes
   50—invalid date
   51—invalid time
11. REQOLD—request old information report
   a. General description
   This command is used to query the CCM for "old" information that may be in its data bases (scheduled report changes, demand readings, installations). The CCM will report the account number, the associated data base, and the age of the data. No data is deleted by this command; a PURGE command must be issued in order to delete the data.
   b. Allowed keyword and associated values
   DATE, TIME—all data that is older than this indicated date and time is reported to the UCC
   c. Additional error codes
   60—no data available.
12. PURGE—purge old information
   a. General description
   This command will cause all information in the Scheduled Reading Change, Installation, and Demand Reading data bases that is older than the specified date and time to be purged from the CCM memory.
   b. Allowed keywords and associated values
   DATE and TIME.
13. STATS—request memory statistics
14. DIAGNOSTICS—request diagnostics
15. LOAD—download software
   A summary of the commands is as follows:

| COMMANDS ORIGINATED BY UCC |
| --- |
| 1. Global Parameter Initialization<br>   UCC:   PARAM PHONE=nnnnnnnnnnn TOD=f PR=f PRMODE=n<br>            WINDOWS=nn,nn,nn,nn,nn,nn CALLBACK=cccccc<br>            MODE=mmmmmm |
| 2. Pre-load Installation Information<br>   UCC:   PREINSTALL ACCT=nnnnnnnnnnn PHONE=nnnnnnnnnnn<br>            MPHONE=nnnnnnnnnnn CALLIN=mm/dd/yy,hh:mm:ss<br>            CALLBACK=ccccc PREV=nnnnnn TOD=f PR=f PROMODE=n<br>            METER=f WINDOWS=nn,nn,nn,nn,nn,nn SERNO=nnnnnnnnnn<br>   CCM:   OK or REJECT |
| 3. Load Installation Information<br>   UCC:   INSTALL ACCT=nnnnnnnn PHONE=nnnnnnnnnnn<br>            MPHONE=nnnnnnnnnnn CALLIN=mm/dd/yy,hh:mm:ss<br>            CALLBACK=CCCCCC PREV=nnnnnn TOD=f PR=f PRMODE=n<br>            SERNO=nnnnnnnnnn<br>   CCM:   Ok or REJECT |
| 4. Load Encryption Keys<br>   UCC:   KEYS INDEX=NNN key=hh,hh,hh,hh<br>   CCM:   OK or REJECT |
| 5. Load Scheduled Call Information<br>   UCC:   SCHEDULE ACCT=nnnnnnnn CALLIN=mm/dd/yy,hh:mm:ss<br>            CALLBACK=cccccc TOD=f PRMODE=n METER=f<br>            WINDOWS=nn,nn,nn,nn,nn,nn<br>   CCM:   OK or REJECT |
| 6. Load Demand Call Information<br>   UCC:   DEMAND ACCT=nnnnnnnn CALLIN=mm/dd/yy,hh:mm:ss<br>            CALLBACK=ccccc TOD=f PR=f PRMOD=n METER=f<br>            WINDOWS=nn,nn,nn,nn,nn,nn SERNO=nnnnnnnnnn<br>   CCM:   OK or REJECT |
| 7. Load Exemption Days<br>   UCC:   EXEMPTIONS YEAR=nnnn DAY=mm/dd DAY=mm/dd,mm/dd<br>   CCM:   OK or REJECT |
| 8. Request AMR Call Data<br>   UCC:   DUMP<br>   CCM:   REJECT<br>            or<br>            ACCT=nnnnnnnn mm/dd/yy hh:mm:ss<br>            MTIME=mm/dd/tt,hh:mm:ss NUMCALL=nn NUMQUERY=nn<br>            ALARMS=xxxxxxxxx,xxxxxxxxx,... READ=nnnnnn PREV=nnnnnn<br>            TOD=f PR=f METER=f TODDATA=nnnnnn,nnnnnn,nnnnnn |

COMMANDS ORIGINATED BY UCC

PRDATA=nnnnnn,nnnnnn,nnnnnn OLDINEX=nn NEWINDEX=nn
    transaction-status
  UCC:    Q or N
  CCM:   OK or REJECT or more data
  Repeat 9. Read CCM Time and Date
  UCC:    GETIME
  CCM:   mm/dd/yy,hh:mm:ss 10. Set CCM Time and Date
    UCC:   SETTIME DATE=mm/dd/yy TIME=hh:mm:ss 11. Request Old Information Report
    UCC:   REQOLD DATE=mm/dd/yy TIME=hh:mm:ss
    CCM:  REJECT
      or
  ACCT=nnnnnnnn DB=xx mm/dd/yy hh:mm:ss
  ACCT=nnnnnnnn DB=xx mm/dd/yy hh:mm:ss
      .
      .
      .
  ACCT=nnnnnnnn DB=xx mm/dd/yy hh:mm:ss
  OK 12. Purge Old Information
    UCC:   PURGE DATE=mm/dd/yy TIME=hh:mm:ss 13. Request Memory Statistics
    UCC:   STATS
    CCM:  MASTER: nn %
            CCU1: nn %
            CCU2: nn %
            CCU3: nn %

14. Request Diagnostics
    UCC:   DIATNOSTICS
    CCM:  REJECT
        or
        ERROR (nnnn) xxxxxxxxxxxxxx
        ERROR (nnnn) xxxxxxxxxxxxxx
          .
          .
          .
        ERROR (nnnn) xxxxxxxxxxxxxx
        OK 15. Download Software
    UCC:   LOAD MASTER
          ... Intel Hex Records ...
          LOAD CCU
          ... Intel Hex Records ...

COMMANDS ORIGINATED BY CC

1. Report Alarm Condition
    CCM:  ALARM
    UCC:   OK
    CCM:  ACCT=nnnnnnnn mm/dd/yy hh:mm:ss
  MTIME=mm/dd/yy/hh:mm:ss NUMCALL=nn
  NUMQUERY=nn
  ALARMS=xxxxxxx,xxxxxxx, ...
  READ=nnnnnn PREV=nnnnnn TOD=f PR=f METER=f
  TODDATA=nnnnnn,nnnnnn,nnnnnn
  PRDATA=nnnnnn,nnnnnn,nnnnnn
  OLDINEX=nn NEWINDEX=nn
  transaction-status 2. Report CCM Failure
    CCM:   CCMFAIL xxxxxxxxxxxxxxxxxxxxxxxxxxxxx

OPERATION OF THE CALL COLLECTION MODULE 12

The CCM 12 operates to respond various UCC commands as listed above and to send commands to report alarm and failures, as indicated. It also performs a very important function in communicating with the AMR. Such AMR-CCM communications include installation, demand read, scheduled report, emergency report and brainwash transactions which are summarized as follows:

Installation Transaction

| CCM to AMR | AMR to CCM |
|---|---|
| TOD on/off, PR on/off, meter on/off (1 byte) | |
| customer account (4 bytes) | |
| AMR serial number (5 bytes) | |
| date of inti. (3 bytes) | |
| utility phone # (6 bytes) | |
| init. prev. meter (3 bytes) | |
| CCM bookkeeping data (7 bytes) | |
| current time (3 bytes) | |
| next call-in time (4 bytes) | |
| recall day (1 byte) | |
| TOD/PR exemption schedule (8 bytes) | |
| TOD/PR windows (3 bytes) | |
| PR window width (1 byte) | |
| | ACK |
| BOTH HANG UP | |

Demand Reading Transaction

| CCM to AMR | AMR to CCM |
|---|---|
| transaction i.d. 80H (1 byte) | |
| AMR serial number (5 bytes) | |
| | ACK |
| | account number (4 bytes) |
| | CCM bookkeeping data |

-continued

Demand Reading Transaction

| CCM to AMR | AMR to CCM |
|---|---|
| | (7 bytes) |
| | leak, low bat.,freeze, |
| | tamper,TOD on/off |
| | (1 byte) |
| | current meter reading |
| | (3 bytes) |
| | previous meter reading |
| | (3 bytes) |
| | TOD data (9 bytes) |
| | PR data (6 bytes) |
| ACK | |
| CCM bookkeeping data (7 bytes) | |
| next call-in-time (4 bytes) | |
| new TOD/PR window flag, | |
| TOD on/off, PR on/off, | |
| meter on/off (1 byte) | |
| | ACK |
| BOTH HANG UP | |

Scheduled Report Transaction

| CCM to AMR | AMR to CCM |
|---|---|
| | transaction i.d. 80H |
| | (1 byte) |
| | account number (4 bytes) |
| | CCM bookkeeping data |
| | (7 bytes) |
| | leak, low bat., freeze, |
| | tamper,TOD on/off, |
| | PR on/off, meter on/off |
| | (1 byte) |
| | current meter reading |
| | (3 bytes) |
| | previous meter reading |
| | (3 bytes) |
| | TOD data (9 bytes) |
| | PR data (6 bytes) |
| ACK | |
| CCM bookkeeping data (7 bytes) | |
| next call-in time (4 bytes) | |
| new TOD/PR window 1 flag, | |
| TOD on/off, PR on/off, | |
| meter on/off (1 byte) | |
| | ACK |
| BOTH HANG UP | |

Emergency Report Transaction

| CCM to AMR | AMR to CCM |
|---|---|
| | transaction i.d. 40H |
| | (1 byte) |
| | CCM bookkeeping data |
| | (7 bytes) |
| | leak, low bat.,freeze, |
| | ramper,TOD on/off |
| | PR on/off, meter on/off |
| | (1 byte) |
| | current meter reading |
| | (3 bytes) |
| | previous meter reading |
| | (3 bytes) |
| | TOD data (9 bytes) |
| | PR data (6 bytes) |
| ACK | |
| CCM bookkeeping data (7 bytes) | |
| nex call-in time (4 bytes) | |
| new TOD/PR window, flag, | |
| TOD on/off, PR on/off, | |
| meter on/off (1 byte) | |
| | ACK |
| BOTH HANG UP | |

To handle such communications with the UCC 11 and the AMR's 15, the CCM 12 of the illustrated embodiment uses the mSBC 86/35 single board computer in the call collector units 256–258 and in the master central processing unit 260, connected through an Intel Corporation "MULTIBUS" system and using a PL/M 86 language developed by Intel Corporation which is a specific, block structured language. The operation is defined specifically in the listing of Table III and its basic mode of operation is illustrated in the block structure or tasking model charts of FIGS. 28 and 29.

Figure 28:
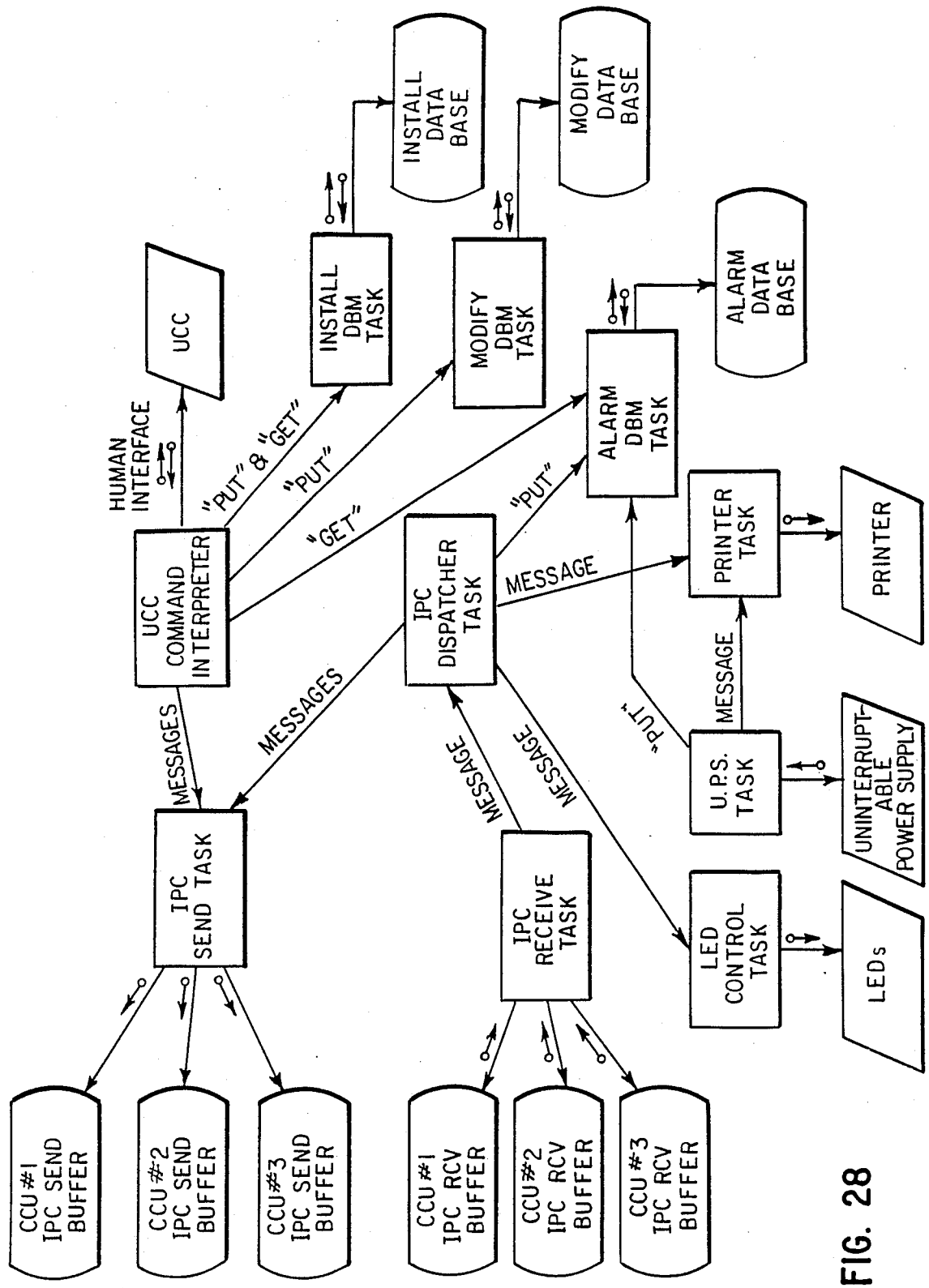
FIG. 28 is a structure chart or tasking model of a master central processing unit of the call collection module shown in FIG. 21.

Commands from the UCC 11 are handled by a UCC command interpreter of the system of the master CPU 260 shown in FIG. 28. The command interpreter sends messages to an Install DBM (Data Base Management) task, a Modify DBM task and an Alarm DBM task and also to an IPC (Inter-Processor Control) task which effects communications with the CCU's 256–258 through buffers which are respectively identified as "CCU #1 IPC Send Buffer", "CCU #2 IPC Send Buffer" and "CCU #3 IPC Send Buffer" in FIG. 28. The system of the master CPU 260 also includes an IPC Dispatcher task which receives messages through an IPC Receive task and through receive buffers for the three CCU's 256–258 and which sends messages through a LED control task, a U.P.S. task, a Printer task and the Alarm DBM task.

Figure 29:
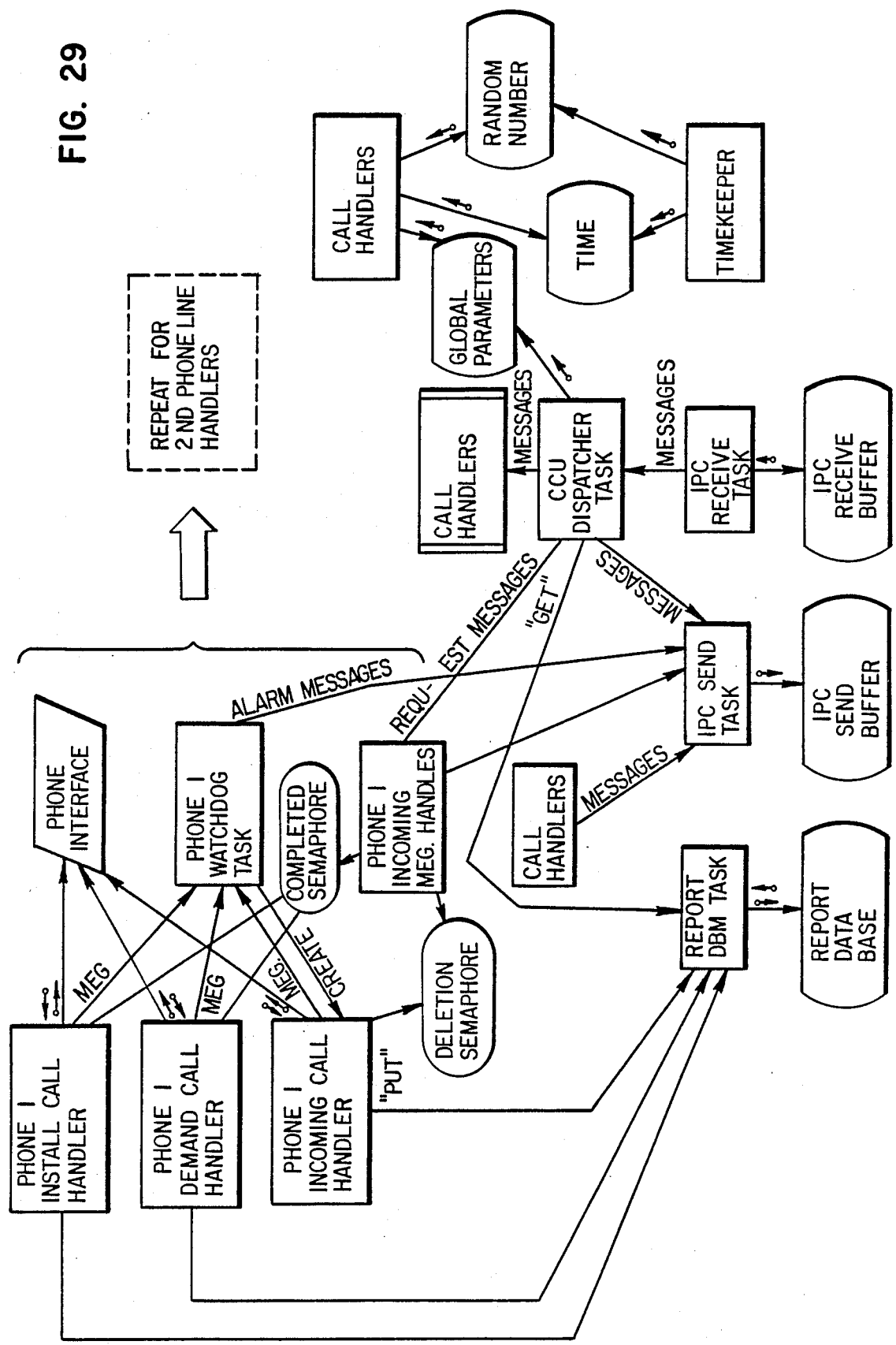
FIG. 29 is a structure flow chart or tasking model for one of three call collection units of the call collection module of FIG. 21.

The tasking model of one of the CCU's 256–258 is shown in FIG. 29. Two telephone lines are connected to each CCU through an interface and each line has an associated Install Call Handler, Demand Call Handler and Incoming Call Handler which "PUT" or send data received from an AMR to a Report Data Base, operating through a Report DBM (Data Base Management) task. Such call handlers may also send messages received from an AMR to an IPC Send Buffer to an IPC Send task, either directly or indirectly through a Watchdog task.

A CCU Dispatcher task receives messages from an IPC Receive Buffer through an IPC Receive task and sends messages to the three call handlers and an Incoming Message Handler for each of the two telephone lines and also to the Report DBM task, the IPC Send task and a Global Parameter base from which the call handlers may obtain data. As also indicated, provision is made for sending time and random number data through the call handlers.

In essence, the system permits operation through the UCC 11 to install and modify a control data base in the memory of the CCM 12, data from that base being ready for transmission from the CCM 12 to an AMR 15 when, for example, an AMR 15 makes a scheduled report. The meter data received by the CCM 12 during a scheduled or other report is stored in a report data base in the RAM memory of the CCM 12, for transmission to the UCC 11 in response to "DUMP" and "N" commands sent from the UCC 11 to the command interpreter of the master CPU 260, shown in FIG. 28.

The CCM 12 also performs data processing operations which allow the data sent from and to AMRs 15 to be in a compressed format, minimizing the duration of transmissions of control and meter data to and from AMRs 15.

Since ordinary voice communication lines are used, it is desirable to use a relatively low baud rate. The illustrated system operates with FSK transmissions at 300 baud and with a standard asynchronous serial format with 8 data bits, one parity bit (even) and one stop bit. In the illustrated system, what may be described as a "PACKED BCD" format is used in transmission of numerical digits from 0 through 9, a 4 bit nibble being used for transmission of each digit. For communications between the CCM and the UCC, the standard ASCII code is used and the required translations are performed in the CCM.

The CCM 12 is also operative to make all required translations between the command formats listed above and the transmission of corresponding data to the AMRs 15 in formats such that the AMR may operate with a minimum amount of RAM and ROM and also a minimum amount of circuitry. The CCM 12 uses high speed processing circuitry and is very fast and efficient in handling all of its functions. Its cost is, of course, very much greater than that of an AMR. However, since its cost is in effect shared by all of the AMRs which may run into the tens of thousands and since the cost of each AMR is reduced, there is a very substantial overall reduction in the cost to the utility and its customers.

A further advantage of the arrangement using the CCM 12 such as disclosed is that it provides a great deal of flexibility with respect to changing modes of operation if required. The operating program for the CCM may be loaded from a disc storage and with an uninterruptable power supply, a high degree of reliability is obtained, with assurance against loss of meter data. It should also be noted that in normal operations, the meter data need only be temporarily stored in the memory of the CCM and with frequent transfers to the UCC, the meter data can be safely stored on the disc, with disc or tape back-ups being made, if desired.

Figure 30:
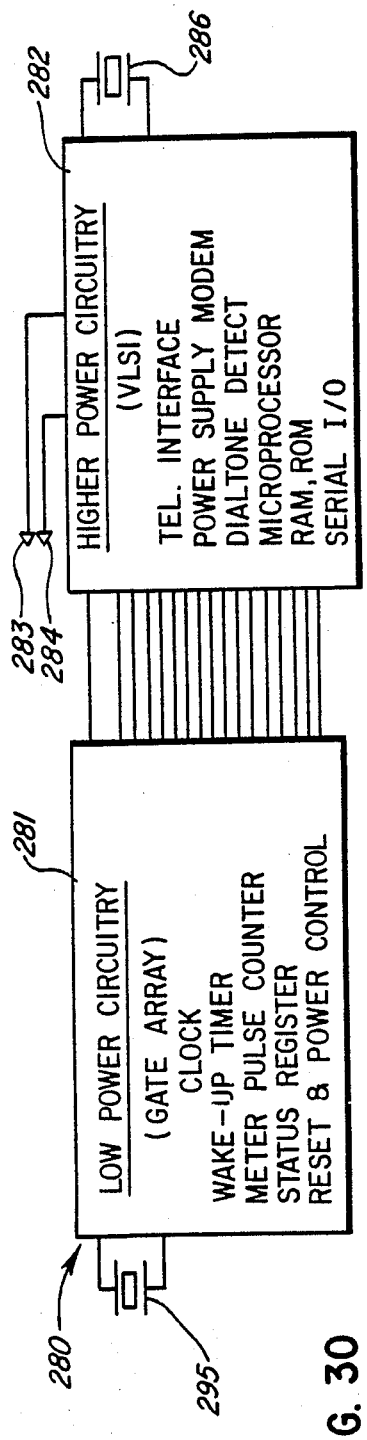
FIG. 30 is a schematic block diagram illustrating a modified automatic meter reader.

Referring to FIG. 30, reference numeral 280 generally designates a modified AMR 15 in which low power consumption circuitry 280 is provided which may include or be in the form of a gate array integrated circuit, as indicated and which includes clock, wake-up timer, meter pulse counter, status register, and reset and power control circuitry corresponding to the circuits 40, 41, 43, 46 and 50 of the AMR 15 of FIGS. 2–12. The AMR 280 also includes higher power consumption circuitry 282 which may be in the form of or include very large scale integrated circuitry, as indicated, and which includes telephone interface and power supply circuits, a modem, a dial tone detect circuit, a low battery detect circuit, and a microprocessor with RAM and serial I/O, a program memory ROM and I/O decode circuit. Also, a non-volatile memory may be included, as indicated, or it may be provided in a separate circuit. The circuit 282 is connected to tip and ring terminals 283 and 284 and separate crystals 285 and 286 are provided for the operation of the clock circuitry of circuitry 281 and for operation of the microprocessing circuitry serial I/O modem circuitry of circuit 282.

The arrangement has the advantage of a substantial reduction of cost and manufacture, in large volumes, and greater reliability as a result of fewer circuit interconnections. The use of separate crystals 285 and 286 has an advantage which is independent of other advantages in that the crystal 285 may be a relatively low frequency crystal such as a 32 KHz, for example, reducing the number of count-down stages in the clock circuitry and thereby reducing power consumption. At the same time, the crystal 286 may be a very high frequency crystal, operative at a frequency of on the order of 11–12 MHz, to permit very fast processing operations and to reduce the "on" time of the processor and thereby reduce average power consumption.

Figure 31:
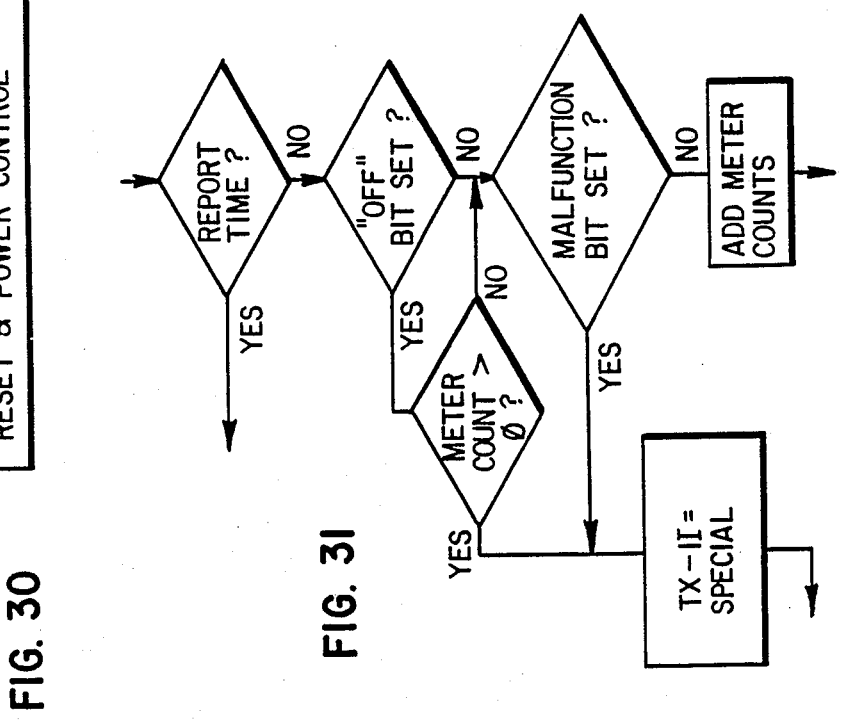
FIG. 31 is a flow chart corresponding to a right-hand portion of the flow chart of FIG. 14 and showing a modified operation.

FIG. 31 corresponds to the right-hand portion of the flow chart of FIG. 14 shows a modified operation. After a time-out of the wake-up timer 41 and after checking to see if it is time for a scheduled report, a test is made to determine whether a "off" bit is set, this bit being a bit in RAM which may be set from the UCC 11 through the CCM 12 when, for example, service to a customer has been discontinued while the AMR 15 remains connected and operative, awaiting resumption of service of the same customer, or start of service to a new customer at the same premises. If the "off" bit is set and a meter count greater than zero is detected, a special report call is initiated to report the condition.

As also shown in FIG. 31, a test may be made to detect whether a mulfunction flag is set and, if so, the special report is initiated to report that condition as well as provide other status information. The malfunction flag may be set in response to conditions such as a freeze condition, a tilt condition of the AMR unit, detectable through a suitable switch which may be connected to an additional input of the status register buffer 194.

Figure 32:
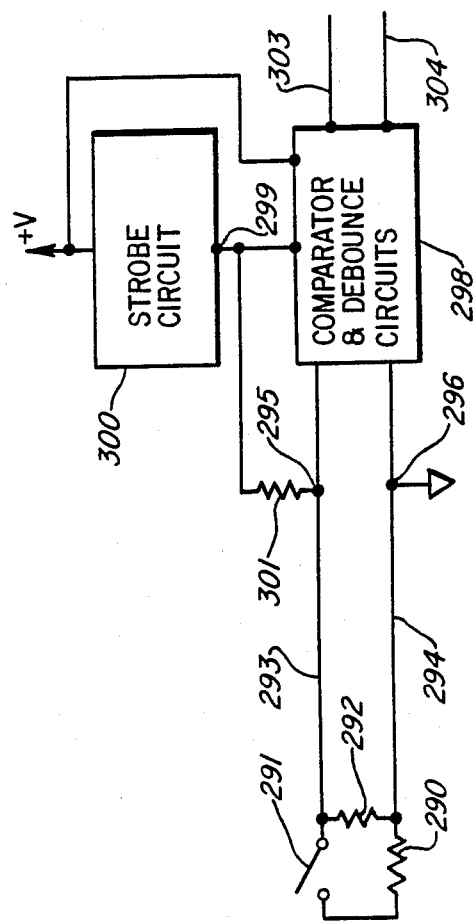
FIG. 32 is a schematic diagram showing an arrangement for detecting open or short conditions of a meter switch.

The malfunction flag may, of course, be set in response to other conditions. FIG. 32 shows an arrangement for detecting one type of malfunction which could present problems, especially in arrangements in which a metering switch is at a distance from an AMR or is otherwise so arranged that there is an exposed connecting wire which might be cut by a customer or which might accidentally become severed so as to be continuously opened or shorted so as to be continuously closed. As shown, a resistor 290 is connected in series with a meter switch 291 and a second resistor 292 is connected in parallel with the series combination of resistor 290 and switch 291. The combination of resistors 290 and 292 and the switch 291 is connected through lead wires 293 and 294 to terminals 295 and 296 of metering circuits of an AMR which includes comparator and de-bounce circuitry 298 supplied with an operating voltage from an output terminal 299 of a strobe circuit 300. Terminal 299 is connected through a resistor 301 to the terminal 295. The comparator and de-bounce circuit 298 has an output terminal 303 which may be connected to a meter pulse accumulator counter and an output terminal 304 which provides a malfunction output indication and which may be connected to a buffer stage of a status register. The strobe circuit 300 operates periodically to briefly apply an operating voltage at terminal 299 so as to develop a certain voltage at terminal 295 which is dependent upon the condition of the switch 291 and the connecting wires 293 and 294. At the same time, comparator circuitry is operated. If the switch 291 is operating properly, certain voltages will be developed at the input of the circuit 298 dependent upon the condition of the switch 291. If, however, the wires 293 and 294 are shorted together, a lower resistance is developed at all times or, if one of the other of the connecting wires 293 or 294 is open, a higher than normal voltage will be developed at the input of the circuit 298. In eiyther case, circuit 298 develops a malfunction indication at the terminal 304. Circuitry 298 also responds to normal closures of the switch 291 to develop de-bounced output pulsees at the terminal 303 for application to a meter pulse accumulator counter. This circuit arrangement minimizes power consumption.

It will be understood that other modifications and variations may be effected without departing from the spirit and scope of the novel concepts of this invention.

TABLE I

```
FILE: WAKE_UP.A51       HEWLETT-PACKARD: 8051 Assembler              Fri, 13 Jun 1986, 15:35

LOCATION OBJECT CODE LINE   SOURCE LINE

1   "8051"
                    2   ;************************************************************************
                    3   ;PROJECT:  BADGER METER COMPANY AUTOMATIC METER READER (AMR)
                    4   ;
                    5   ;PROGRAM NAME:  WAKE_UP
                    6   ;
                    7   ;PROGRAM TITLE:  Reset Interrupt Service
                    8   ;
                    9   ;DOCUMENT REFERENCE: AMR STRUCTURE CHART, AMR FLOWCHART #1 through #1.4
                   10   ;                    Intel Micro_controller Handbook 1986
                   11   ;                    Intel MCS-51 Family of Single Chip Microcomputers User's manual 1981
                   12   ;
                   13   ;FUNCTIONAL DESCRIPTION:
                   14   ;
                   15   ;This module is invoked whenever the Gate Array issues a reset to the
                   16   ;Intel 8031 micro-controller. The Gate Array is responsible for counting
                   17   ;pulses from the Meter, detecting an incoming phone call, detecting
                   18   ;tamper or freeze conditions about the meter, and "waking up" the 8031
                   19   ;micro-controller. "Waking up" the 8031 means that the Gate Array issues
                   20   ;a Reset to the 8031 and supplies operational voltage to it.
                   21   ;
                   22   ;Once invoked, this module performs checks for the type of reset, i.e.
                   23   ;power-on reset, phone alarm reset, tamper alarm reset, or timeout reset.
                   24   ;Power on reset occurs when the AMR is first powered (installed). phone
                   25   ;alarm reset indicates an incoming phone call. Any six second period
                   26   ;of silence after a ring has been detected will cause this reset. The
                   27   ;tamper reset occurs when the AMR is moved (this reset will generate an
                   28   ;immediate phone call to the CCM). The timeout reset is the one that
                   29   ;will most occur. Basically, it an alarm clock for the 8031 to "wakes"
                   30   ;it up every 5 minutes, on the 5 minute mark, unless the scheduled
                   31   ;report time is within the next five minutes, in which case the next
                   32   ;wake up alarm will be set to the time of the scheduled call.
                   33   ;
                   34   ;After the checks and associated processing is completed, the module
                   35   ;checks if any new phone call is coming in, or, if a tamper occurred
                   36   ;while the 8031 was "awake". If these conditions are not present, the
                   37   ;module requests the gate array to put it back in the "sleep" (low power
                   38   ;mode), otherwise, this module is repeated.
                   39   ;
                   40   ;This module is responsible for generating the AMR's output products.
                   41   ;These are the Leak and Tamper and Freeze Statii, the Current Meter
                   42   ;Reading, the 3 Time of Day Usages, and the 3 Peak Rate Amounts.
                   43   ;The communications module is responsible for generating the one other
                   44   ;output product, Number of Attempts to Call In. Normally these products
                   45   ;are transmitted once a month, however, a tamper will cause a report to
                   46   ;be immediately sent to the CCM, and, freezing conditions will cause a
                   47   ;report to be sent during the wake up.
                   48   ;
                   49   ;CALLING SEQUENCE:
                   50   ;
                   51   ;This module gains control by a hardware reset. It will cause the a
                   52   ;time_slice interrupt service routine to be invoked when phone
                   53   ;communications are necessary.
                   54   ;
                   55   ;GLOBAL DATA:
                   56   ;
                   57   ;       TX_ID           transaction identifier, set by this module
```

```
 58 ;                          To indicate whether a phone call from the CCM
 59 ;                          is to be answered, or a scheduled or emergency
 60 ;                          report needs to be sent to the CCM.
 61 ;
 62 ;SUBROUTINES CALLED:
 63 ;
 64 ;       UPDATE_TIME      sets the 24-bit clock to proper value.
 65 ;       ADD_COUNTS       produces output products.
 66 ;       SET_NEXT_ALARM   reloads Gate Array's Timer.
 67 ;       START_TIME_SLICE starts Time Slice Int for communications
 68 ;
 69 ;AUTHOR: Numan C. Doganqun, Software Engineer, Micro Industries Inc.
 70 ;        Copyright 1986 for Badger Meter Company
 71 ;
 73
 74 ;PSEUDOCODE:
 75 ;
 76 ;       DISABLE RESET INTERRUPT                              ;------
 77 ;       DISABLE TIMER AND UART INTERRUPTS                     |
 78 ;       INITIALIZE STACK POINTER                              |
 79 ;       SET UP I/O PORTS TO WAKE UP                           |
 80 ;                                                             |
 81 ;       IF POWER-ON RESET THEN                               ;------|--
 82 ;       |  INITIALIZE RAM                                     | |
 83 ;       |  INITIALIZE LAST_TICKS                              | |
 84 ;       |  INITIALIZE GATE ARRAY                              | |
 85 ;       |                                                     | |
 86 ;       ELSE                                                  | |
 87 ;       |                                                     | |
 88 ;       |  IF PHONE ALARM RESET THEN                         ;-----|-|--
 89 ;       |  |  CLEAR PHONE ALARM                                | | |
 90 ;       |  |  TX_ID=WAIT_CARRIER                                | | |
 91 ;       |  |  CALL START_TIME_SLICE                             | | |
 92 ;       |  |                                                    | | |
 93 ;       |  ELSE                                                  | | |
 94 ;       |  |                                                    | | |
 95 ;       |  |  IF TAMPER ALARM RESET THEN                       ;------|-|-|--
 96 ;       |  |  |  CLEAR TAMPER ALARM                              | | | |
 97 ;       |  |  |  TX_ID=EMERGENCY_REPORT                          | | | |
 98 ;       |  |  |  CALL START_TIME_SLICE                           | | | |
 99 ;       |  |  |                                                  | | | |
100 ;       |  |  ELSE                                                | | | |
101 ;       |  |  |                                                  | | | |
102 ;       |  |  |  IF TIMEOUT RESET THEN                          ;----|-|-|-|--
103 ;       |  |  |  |                                                | | | | |
104 ;       |  |  |  |  CALL UPDATE_TIME                              | | | | |
105 ;       |  |  |  |                                                | | | | |
106 ;       |  |  |  |  IF TIME TO CALL OR FREEZE THEN               ;---|-|-|-|-|--
107 ;       |  |  |  |  |  TX_ID=SCHEDULED_REPORT                      | | | | | |
108 ;       |  |  |  |  |  CALL START_TIME_SLICE                       | | | | | |
109 ;       |  |  |  |  |                                              | | | | | |
110 ;       |  |  |  |  ELSE                                            | | | | | |
111 ;       |  |  |  |  |                                              | | | | | |
112 ;       |  |  |  |  |  CALL ADD_COUNTS                             ;---|-|-|-|-|-|--
113 ;       |  |  |  |  |                                              | | | | | | |
114 ;       |  |  |  |  ENDIF                                           | | | | | |
115 ;       |  |  |  ENDIF                                              | | | | |
116 ;       |  |  ENDIF                                                 | | | |
117 ;       |  ENDIF                                                    | | |
118 ;       ENDIF                                                       | |
119 ;                                                                   | |
120 ;       IF PHONE OR TAMPER DURING WAKE UP THEN                     ;------|-|-|-|-|-|-|--
```

```
              121 ;    |  REPEAT THIS MODULE
              122 ;    ELSE
              123 ;    |  CALL SET_NEXT_ALARM
              124 ;    |  SET I/O BITS TO SLEEP CONDITION
              125 ;    |  REQUEST SLEEP FROM GATE ARRAY
              126 ;    |  PUT THE 8031 TO SLEEP
              127 ;    |  WAIT HERE FOR LOWERED VOLTAGE
              128 ;    ENDIF
              129 ;
              130 ;    WAIT HERE FOR SLEEP
              131 ;
              132 ;=============================
              133                                              ;<-------------------------
              134         CSEG                                 ; setup int vector for reset
    (0000)    135         ORG     0                            ; (see page 2-7 of user's
0000 020016   136         JMP     WAKE_UP                      ;  manual)
              137         CSEG
              138
0000 08       139 PNUM DB 8
0001 09       140      DB 9
0002 05       141      DB 5
0003 07       142      DB 7
0004 02       143      DB 2
0005 08       144      DB 8
0006 03       145      DB 3
              146
0007 00       147 ACCT_NUM DB 00H
0008 00       148          DB 00H
0009 12       149          DB 12H
000A 34       150          DB 34H
              151
000B 01       152 CCM_BOOK DB 01H
000C 02       153          DB 02H
000D 03       154          DB 03H
000E 04       155          DB 04H
000F 05       156          DB 05H
0010 06       157          DB 06H
0011 07       158          DB 07H
              159
0012 00       160 PREV_TOTAL DB 0H
0013 00       161            DB 0H
0014 00       162            DB 0H
0015 00       163            DB 0
              164                                              ;
0016          165 WAKE_UP:                                     ;
0016 C294     166         CLR     SLEEP_RST_INH                ; disable reset int
              167                                              ;
0018 C2AF     168         CLR     EA                           ; disable Timer and UART int
              169                                              ;
001A 758110   170         MOV     SP,#INIT_STACK               ; initialize stack pointer
              171                                              ;
001D 75D000   172         MOV     PSW,#REG_BANK0               ; use reg bank 0
              173                                              ;
0020 759001   174         MOV     P1,#P1_AWAKE                 ; setup of I/O ports after
0023 75B0FF   175         MOV     P3,#P3_AWAKE                 ; wake up (see Intel micro.Hbk
              176                                              ; page 8-8)
              177                                              ;
              178 ;---------------------------------------;
0026          179 IF_POWER_ON:                                 ;<-------------------------
0026 E500     180         MOV     A,RAM_KEY                    ; check key RAM locations for
0028 B45508   181         CJNE    A,#55H,INITRAM               ; 55AAH pattern
002B E501     182         MOV     A,RAM_KEY+1                  ;
002D B4AA03   183         CJNE    A,#0AAH,INITRAM              ;
```

```
0031 020060    184         JMP     IF_PHONE        ;
               185                                 ;
0033           186 INITRAM:                        ;
0033 797F      187         MOV     R0,#7FH         ; loop to fill 128-byte RAM
0035           188 INITRAM1:                       ; with zeroes
0035 7600      189         MOV     @R0,#00H        ;
0037 D8FC      190         DJNZ    R0,INITRAM1     ;
               191                                 ;
0039 750055    192         MOV     RAM_KEY,#055H   ; put 55AAh pattern in key
003C 7501AA    193         MOV     RAM_KEY+1,#0AAH ; locations
               194                                 ;
003F           195 INITLAST_TICKS:                 ;
003F 7500E6    196         MOV     LAST_TICKS,#MIN_5 ;
               197 ;:::::::::::::::::::::::::::::::::
0042 E4        198         CLR     A
0043 900000    199         MOV     DPTR,#PNUM
0046           200 LOOP1:
0046 F8        201         MOV     R0,A
0047 93        202         MOVC    A,@A+DPTR
0048 F5F0      203         MOV     B,A
004A E8        204         MOV     A,R0
               205
004B 120000    206         CALL    WR_EE_DRIVER
               207
004E E8        208         MOV     A,R0
004F 04        209         INC     A
0050 B415F3    210         CJNE    A,#21,LOOP1
               211
               212
               213 ;:::::::::::::::::::::::::::::::::
               214                                 ;
0053           215 INITGATE_ARRAY:                 ;
0053 902000    216         MOV     DPTR,#COUNTS    ; reset the meter counts to 0
0056 7400      217         MOV     A,#0            ;
0058 F0        218         MOVX    @DPTR,A         ;
               219                                 ;
0059 904000    220         MOV     DPTR,#STATUS    ; reset tamper, phone, freeze
005C F0        221         MOVX    @DPTR,A         ; status
               222                                 ;
005D 0200A0    223         JMP     GOTO_BED        ; set alarm for next wake up
               224                                 ;
               225 ;--------------------------------;
0060           226 IF_PHONE:                       ; (----------------------
0060 904000    227         MOV     DPTR,#STATUS    ; check for a phone call coming in
0063 E0        228         MOVX    A,@DPTR         ; indication
0064 5480      229         ANL     A,#PHONE_CALL   ;
0066 600C      230         JZ      IF_TAMPER       ;
               231                                 ;
0068 6480      232         XRL     A,#PHONE_CALL   ; clear phone alarm for gate array
006A F0        233         MOVX    @DPTR,A         ;
               234                                 ;
006B 750080    235         MOV     TX_ID,#WAIT_CARRIER ; set the transaction id to wait
006E 12011F    236         CALL    START_TIME_SLICE ; request 2 sec wait for carrier
0071 0200A0    237         JMP     GOTO_BED        ;
               238                                 ;
               239 ;--------------------------------;
0074           240 IF_TAMPER:                      ; (----------------------
0074 904000    241         MOV     DPTR,#STATUS    ; check for a tamper indication
0077 E0        242         MOVX    A,@DPTR         ;
0078 5440      243         ANL     A,#TAMPER       ;
007A 600C      244         JZ      IF_TIMEOUT      ;
               245                                 ;
007C 6440      246         XRL     A,#TAMPER       ; clear tamper for gate array
```

```
007E F0         247         MOVX    @DPTR,A
                248                                 ;
007F 750040     249         MOV     TX_ID,#EMER_RPT ;
0082 12011F     250         CALL    START_TIME_SLICE ; start communications for
0085 0200A0     251         JMP     GOTO_BED        ; emergency report
                252                                 ;
                253 ;---------------------------------;
0088            254 IF_TIMEOUT:                     ; (----------------------------------
0088 20B315     255         JB      TIMEOUT,GOTO_BED ;
                256                                 ;
008B            257 TIME_TO_CALL_OR_FREEZE:         ; (----------------------------------
                258 ;;;;;;; MOV     A,LAST_TICKS    ; check if number of ticks until
                259 ;;;;;;; CJNE    A,#MIN_5,CALL_CCM ; phone call to CCM have been loaded
                260 ;;;;;;; JMP     ADD_READS       ; in the last SET_ALARM execution
008B 1200C9     261 CALL UPDATE_TIME
008E 1200EB     262 CALL ADD_COUNTS
                263                                 ;
0091            264 CALL_CCM:                       ;
0091 750080     265         MOV     TX_ID,#SCHED_RPT ;
0094 12011F     266         CALL    START_TIME_SLICE ;
0097 0200A0     267         JMP     GOTO_BED        ;
                268                                 ;
009A            269 ADD_READS:                      ; (----------------------------------
009A 1200EB     270         CALL    ADD_COUNTS      ; accumulate running meter counts
009D 0200A0     271         JMP     GOTO_BED        ;
                272                                 ;
                273 ;---------------------------------;
00A0            274 GOTO_BED:                       ; (----------------------------------
                275                                 ;
00A0 904000     276         MOV     DPTR,#STATUS    ; check for a phone call that may
00A3 E0         277         MOVX    A,@DPTR         ; have come in while 8031 was "awake"
00A4 5480       278         ANL     A,#PHONE_CALL   ;
00A6 7008       279         JNZ     STAY_AWAKE      ;
                280                                 ;
00A8 904110     281         MOV     DPTR,#STATUS    ; check for a tamper that may have
00AB E0         282         MOVX    A,@DPTR         ; occurred while "awake"
00AC 5440       283         ANL     A,#TAMPER       ;
00AE 6003       284         JZ      CLOSE_EYES      ;
00B0            285 STAY_AWAKE:                     ;
00B0 020016     286         JMP     WAKE_UP         ;
                287                                 ;
00B3            288 CLOSE_EYES:                     ; (----------------------------------
00B3 130143     289         CALL    SET_NEXT_ALARM  ; set alarm for next wake up
                290                                 ;
00B6 7591C0     291         MOV     P1,#P1_SLEEP    ; set I/O bits and address bits to
00B9 75A000     292         MOV     P2,#P2_SLEEP    ; sleep settings
00BC 75B0FF     293         MOV     P3,#P3_SLEEP    ;
                294                                 ;
00BF D294       295         SETB    SLEEP_RST_INH   ; request sleep and allow reset
                296                                 ;
00C1 E587       297         MOV     A,PCON          ; set status bit to power down 8031
00C3 D2E1       298         SETB    ACC.1           ; (see Intel microcontroller handbook,
00C5 F587       299         MOV     PCON,A          ; page 7-29)
                300                                 ;
                301                                 ; (----------------------------------
00C7 80FE       302         JMP     $               ; wait here until gate array lowers
                303                                 ; voltage for sleep
                304 _____
                305
                306 ;================================================
                307 ;                   LOCAL SUBROUTINES
                308 ;================================================
                309
                310 ;---------------------------------
```

```
311 ;SUBROUTINE NAME: UPDATE_TIME
312 ;
313 ;DOCUMENT REFERENCE: AMR STRUCTURE CHART, AMR FLOWCHART #1.1
314 ;
315 ;FUNCTIONAL DESCRIPTION:
316 ;
317 ;This routine is responsible for updating the time after a
318 ;timeout has occurred. It does this by examining the LAST TICKS
319 ;variable and determining the time as a result of what the variable
320 ;had in it previously (note that the LAST TICKS variable is initialized
321 ;to the normal wakeup time after a power on reset).
322 ;
323 ;CALLING SEQUENCE:
324 ;
325 ;GLOBAL DATA:
326 ;             LAST TICKS    variable that contains
327 ;                           the number of ticks that were
328 ;                           last loaded to the gate array's
329 ;                           wakeup timer
330 ;
331 ;SUBROUTINES CALLED:
332 ;             None
333 ;PSEUDOCODE:
334 ;
335 ;   DIVIDE LAST_TICKS BY TICKS FOR 1 MIN       ]-------
336 ; - ADD QUOTIENT TO MINUTES OF DAY                    |
337 ;                                                     |
338 ;     IF THERE IS A REMAINDER THEN            ]------|--
339 ;     | DIVIDE REM BY TICKS FOR 10 SEC                | |
340 ;     | ADD QUOTIENT*10 TO SECONDS                    | |
341 ;     ENDIF                                           | |
342 ;                                                     | |
343 ;     IF SECONDS = 60 THEN                    ]----|-|--
344 ;     | SECONDS = 0                                  | | |
345 ;     | ADD 1 TO MINUTES                             | | |
346 ;     ENDIF                                          | | |
347 ;                                                    | | |
348 ;     IF MINUTES = 1440 THEN                  ]------|-|-:--
349 ;     | MINUTES = 1                                  | | | |
350 ;     | ADD 1 TO DAY NUMBER                          | | | |
351 ;     ENDIF                                          | | | |
352 ;                                                    | | | |
353 ;     IF DAY NUMBER = 128 THEN                ]----|-|-|-!--
354 ;     | RESET DAY NUMBER TO 0                        | | | | |
355 ;     ENDIF                                          | | | | |
356 ;                                                    | | | | |
357 ;     RETURN                                  ]----|-|-|-|-|--
358 ;                                                   | | | | | |
359 ;---------------------------------;                  | | | | | |
00C9          360 UPDATE_TIME:              ; (------------------  | | | | |
00C9 E500     361      MOV    A,LAST_TICKS  ; determine how long   | | | | |
00CB 75F12E   362      MOV    B,#MIN_1      ; since last sleep     | | | | |
00CE 84       363      DIV    AB            ;                      | | | | |
              364                           ;                      | | | | |
00CF C3       365      CLR    C             ; update the minutes   | | | | |
00D0 2501     366      ADD    A,MINUTES+1   ; accordingly          | | | | |
00D2 F501     367      MOV    MINUTES+1,A   ;                      | | | | |
00D4 E500     368      MOV    A,MINUTES     ;                      | | | | |
00D6 3400     369      ADDC   A,#0          ;                      | | | | |
00D8 F501     370      MOV    MINUTES,A     ;                      | | | | |
              371                           ;                      | | | | |
              372 ;---------------------------;                    | | | | |
00DA          373 CK_REM:                   ; (------------------  | | | |
```

```
00DA E5F0        374        MOV     A,B                 ;
00DC 600C        375        JZ      EXIT_UP             ;
                 376                                    ;
00DE 75F007      377        MOV     B,#SEC_10           ;
00E1 84          378        DIV     AB                  ;
00E2 75F00A      379        MOV     B,#10               ;
00E5 A4          380        MUL     AB                  ;
00E6 2508        381        ADD     A,SECONDS           ;
00E8 F508        382        MOV     SECONDS,A           ;
                 383                                    ;
00EA             384 CK_SECS:                           ; (-------------------- ) | |
00EA             385 CK_MINS:                           ; (-------------------- ) | |
00EA             386 CK_DAYS:                           ; (-------------------- ) |
00EA             387 EXIT_UP:                           ; (--------------------
00EA 22          388        RET
                 389
                 390
                 391 ;-----------------------------------------
                 392 ;SUBROUTINE NAME: ADD_COUNTS
                 393 ;
                 394 ;DOCUMENT REFERENCE: AMR STRUCTURE CHART, AMR FLOWCHART #1.2
                 395 ;
                 396 ;FUNCTIONAL DESCRITION:
                 397 ;
                 398 ;This routine is responsible for detecting leaks, producing
                 399 ;a current meter reading, including time-of-day readings and
                 400 ;peak rate.
                 401 ;
                 402 ;CALLING SEQUENCE:
                 403 ;
                 404 ;GLOBAL DATA:
                 405 ;         TOTAL          3-byte variable that contains
                 406 ;                        running total meter reading
                 407 ;
                 408 ;         LEAK           bit variable that indicates a
                 409 ;                        condition when set
                 410 ;
                 411 ;SUBROUTINES CALLED:
                 412 ;         None
                 413 ;PSEUDOCODE:
                 414 ;
                 415 ;    IF LEAK IS INDICATED THEN                  ]------
                 416 ;        IF ANY PULSES THEN                     |
                 417 ;            CLEAR LEAK TIME COUNTER            |
                 418 ;        ELSE no pulses                         |
                 419 ;            INCREMENT LEAK TIME COUNTER        |
                 420 ;            IF THE LEAK TIME COUNTER=2 HOURS THEN |
                 421 ;                CLEAR LEAK INDICATION          |
                 422 ;            ENDIF                              |
                 423 ;        ENDIF                                  |
                 424 ;    ENDIF                                      |
                 425 ;                                               |
                 426 ;    ADD PULSES TO TOTAL                        ]-----|--
                 427 ;                                                     | |
                 428 ;    IF TOD/PR READINGS NEED TO BE TAKEN THEN   ]-----|-|--
                 429 ;        IF NOT AN EXEMPT DAY                   | | |
                 430 ;            ADD PULSES TO PROPER TOD BIN       | | |
                 431 ;            IF PULSES > PEAK RATE THEN         | | |
                 432 ;                PR = PULSES                    | | |
                 433 ;            ENDIF                              | | |
                 434 ;        ENDIF                                  | | |
                 435 ;    ENDIF                                      | | |
                 436 ;                                               | | |
                 437 ;    CLEAR PULSES                               ]-----|-|-|--
```

```
                    438 ;
                    439 ;      RETURN
                    440 ;
                    441 ;----------------------------;
00EB                442 ADD_COUNTS:                     ; (------------------
00EB 300010         443        JNB    LEAK,ACCUM       ;
                    444 ;----------------------------;
00EE                445 ACCUM:                          ; (------------------
00EE 902000         446        MOV    DPTR,#COUNTS     ; get current counts
00F1 E0             447        MOVX   A,@DPTR          ;
00F2 F8             448        MOV    R0,A             ;
00F3 904000         449        MOV    DPTR,#STATUS     ;
00F6 E0             450        MOVX   A,@DPTR          ;
00F7 5407           451        ANL    A,#UPPER_COUNT   ;
00F9 C8             452        XCH    A,R0             ;
                    453                                 ;
00FA 2502           454        ADD    A,TOTAL+2        ; add to lowest byte of
00FC F502           455        MOV    TOTAL+2,A        ; 3-byte total
                    456                                 ;
00FE E8             457        MOV    A,R0             ; carry has occurred
00FF 3501           458        ADDC   A,TOTAL+1        ; so add 1 to 2nd byte
0101 F501           459        MOV    TOTAL+1,A        ;
0103 5003           460        JNC    CALC_TOD         ;
                    461                                 ;
0105 C3             462        CLR    C                ; and yet another carry
0106 0500           463        INC    TOTAL            ; so add 1 to top byte
                    464                                 ;
0108                465 CALC_TOD:                       ; (----------------------
                    466 ;----------------------------;
0108                467 EXIT_ADD:                       ; (----------------------
0108 902010         468        MOV    DPTR,#COUNTS     ; meter counts to 0
010B 7400           469        MOV    A,#0             ; by writing any value to
010D F0             470        MOVX   @DPTR,A          ; the low order of the
                    471                                 ; counts, the upper 3 bits
                    472                                 ; of the count (in the STATUS)
                    473                                 ; will be cleared automatically
010E 22             474        RET
                    475
                    477 ;---------------------------------------------
                    478 ;SUBROUTINE NAME: START_TIME_SLICE
                    479 ;
                    480 ;DOCUMENT REFERENCE: AMR STRUCTURE CHART, AMR FLOWCHART #1.3
                    481 ;
                    482 ;FUNCTIONAL DESCRITION:
                    483 ;
                    484 ;This subroutine starts the Time Slice interrupts by
                    485 ;which the phone handling procedures are performed.
                    486 ;
                    487 ;CALLING SEQUENCE:
                    488 ;
                    489 ;simply call the module with the TX_ID (transaction identification)
                    490 ;set to the proper function, i.e, wait 2 seconds for a carrier,
                    491 ;start a scheduled report, or start an emergency report. The
                    492 ;time-slice service will reset TX_ID to 0 when the communications
                    493 ;process is completed. At that time the subroutine will return
                    494 ;to the calling block from WAKE_UP.
                    495 ;
                    496 ;GLOBAL DATA:
                    497 ;
                    498 ;    TX_ID
                    499 ;
                    500 ;PSEUDOCODE:
                    501 ;
```

```
                            502 ;    START TIME SLICE INTERRUPT        ]------------------
                            503 ;    INITIALIZE UART                   ]                  |
                            504 ;    ENABLE TIMER, UART & INT1 INTERRUPTS ]               |
                            505 ;    WAIT UNTIL COMMUNICATIONS ENDS    ]                  |
                            506 ;    DISABLE TIMER, UART & INT1        ]                  |
                            507 ;    RETURN                                               |
                            508 ;------------------------------------                     |
010F                        509 START_TIME_SLICE:                ; (------------------
010F C2B9                   510      CLR    PT0                  ; start Time Slice interrupt
0111 E589                   511      MOV    A,TMOD               ; at 10 milliseconds (see page
0113 54F0                   512      ANL    A,#TIMER0_MASK       ; 2-18 of the MCS-8051 User's
0115 4401                   513      ORL    A,#TIMER0_TMOD       ; Manual)
0117 F589                   514      MOV    TMOD,A               ;
0119 758AE0                 515      MOV    TL0,#LOW(TIMER0_ICNT);
011C 758CFB                 516      MOV    TH0,#HIGH(TIMER0_ICNT);
011F D28C                   517      SETB   TR0                  ;
0121 D2A9                   518      SETB   ET0                  ;
                            519
0123                        520 INITUART:                        ;
0123 C2BC                   521      CLR    PS                   ; serial port int priority low
0125 759840                 522      MOV    SCON,#COMINIT        ; UART is initialized to 300
0128 E589                   523      MOV    A,TMOD               ; Baud, 8 data bits, no parity
012A 540F                   524      ANL    A,#TIMER1_MASK       ; using Timer1 as the Baud
012C 4420                   525      ORL    A,#TIMER1_TMOD       ; rate generator
012E F589                   526      MOV    TMOD,A               ;
0130 758DF5                 527      MOV    TH1,#BAUD_RATE       ;
0133 C28A                   528      CLR    IT1                  ; prevent Timer1 Int
0135 D28E                   529      SETB   TR1                  ; turn on Baud rate generator
0137 D2AC                   530      SETB   ES                   ; enable serial port int
                            531                                  ;
0139                        532 ENABLE_INT:                      ;
0139 75A893                 533      MOV    IE,#INT_ENABLE       ; enable Timer0, UART, & INT1
                            534                                  ;
013C                        535 WAIT_FOR_COMM:                   ;
013C E500                   536      MOV    A,TX_ID              ; loop here until the Time Slice
013E 70FC                   537      JNZ    WAIT_FOR_COMM        ; finishes communications
                            538                                  ;
0140 C2AF                   539      CLR    EA                   ; disable ints
                            540                                  ;
0142 22                     541      RET                         ;
                            542                                  ;
                            544 ;------------------------------------------------
                            545 ;SUBROUTINE NAME:  SET_NEXT_ALARM
                            546 ;
                            547 ;DOCUMENT REFERENCE: AMR STRUCTURE CHART, AMR FLOWCHART #1.4
                            548 ;
                            549 ;FUNCTIONAL DESCRIPTION:
                            550 ;
                            551 ;This subroutine sets the gate array's countdown timer
                            552 ;to the proper value (time) for the next reset interrupt
                            553 ;to occur.  The CCM sends a 4-byte variable that contains
                            554 ;the following:
                            555 ;
                            556 ;           byte1    byte2      byte3    byte4
                            557 ;           ------------------------------------
                            558 ;           |next   | number of | 5 min  | phone |
                            559 ;           |ticks  | intervals till     | ticks |
                            560 ;           |       | phone call         |       |
                            561 ;           |_____|_____|_____|_____|
                            562 ;
                            563 ;These 4 bytes control the value that is loaded into the gate
                            564 ;array's wakeup timer.  Whenever a non-zero value in NEXT_TICKS
                            565 ;is present, the value is loaded into the timer and NEXT_TICKS is
```

```
566 ;zeroed. Otherwise, the numbers of intervals are checked for a
567 ;zero condition. If found to be zero, the PHONE_TICKS variable
568 ;is loaded into the timer, otherwise the number of intervals are
569 ;decremented and 5 minutes worth of ticks are loaded into the timer.
570 ;
571 ;CALLING SEQUENCE:
572 ;
573 ;Call the subroutine with no parameters passed to it.
574 ;
575 ;GLOBAL DATA:
576 ;
577 ;PSEUDOCODE:
578 ;    IF NEXT_TICKS () # THEN                              1 ]----
579 ;        LOAD NEXT_TICKS TO WAKEUP TIMER                    |
580 ;        NEXT_TICKS = 0                                     |
581 ;    ELSE                                                   |
582 ;       IF NUMBER OF INTERVALS () 0 THEN                 2 ]----|--
583 ;           DECREMENT NUMBER OF INTERVALS                   | |
584 ;           LOAD 5 MINUTES OF TICKS TO WAKEUP TIMER         | |
585 ;       ELSE                                              3 ]----|-|--
586 ;           LOAD PHONE_TICKS TO WAKEUP TIMER                | | |
587 ;       ENDIF                                               | | |
588 ;    ENDIF                                                  | | |
589 ;                                                           | | |
590 ;    RETURN                                                 | | |
591 ;-------------------------------                            | | |
```

```
0143           592 SET_NEXT_ALARM:                ;(-1----------------------| |
0143 E500      593      MOV    A,NEXT_TICKS       ; check the NEXT_TICKS byte | |
0145 B40013    594      CJNE   A,#0,LOAD_NEXT_TICKS; for 0                    | |
0148 020151    595      JMP    CK_INTERVALS       ;                           | |
               596                                 ;                          | |
014B           597 LOAD_NEXT_TICKS:                ;                          | |
014B 750010    598      MOV    NEXT_TICKS,#0      ;                           | |
014E 020175    599      JMP    LOAD_TIMER         ;                           | |
               600                                 ;                          | |
               601 ;----------------------------- ;                           | |
0151           602 CK_INTERVALS:                   ;(--2----------------------|
0151 E500      603      MOV    A,INTERVALS        ;                            |
0153 B4000D    604      CJNE   A,#0,DEC_INTERVAL  ;                            |
               605                                 ;                          |
0156 E501      606      MOV    A,INTERVALS+1      ;                            |
0158 B40118    607      CJNE   A,#0,DEC_INTERVAL  ;                            |
               608                                 ;                          |
015B E500      609      MOV    A,PHONE_TICKS      ;                            |
015D 7500E6    610      MOV    PHONE_TICKS,#MIN_5 ;                            |
0160 020175    611      JMP    LOAD_TIMER         ;                            |
               612                                 ;                          |
0163           613 DEC_INTERVAL:                   ;                          |
0163 C3        614      CLR    C                  ;                            |
0164 E501      615      MOV    A,INTERVALS+1      ;                            |
0166 9401      616      SUBB   A,#1               ;                            |
0168 F501      617      MOV    INTERVALS+1,A      ;                            |
               618                                 ;                          |
016A E500      619      MOV    A,INTERVALS        ;                            |
016C 9400      620      SUBB   A,#0               ;                            |
016E F500      621      MOV    INTERVALS,A        ;                            |
               622                                 ;                          |
0171 74E6      623      MOV    A,#MIN_5           ;                            |
0172 020175    624      JMP    LOAD_TIMER         ;                            |
               625                                 ;                          |
               626 ;----------------------------- ;                          |
0175           627 LOAD_TIMER:                     ;(--3----------------------
0175 906000    628      MOV    DPTR,#TIMER_TICKS  ; write timer ticks to gate array
```

```
0178 F0      629        MOVX   @DPTR,A              ; timer
             630                                    ;
0179 F501    631        MOV    LAST_TICKS,A         ; set LAST TICKS variable for
             632                                    ; UPDATE_TIME subroutine
             633                                    ;
017B 22      634        RET                         ;
             635                                    ;
             637                                    ;
             638 ;-----------------------------------------------------------
             639 ;                    RAM VARIABLES
             640 ;
             641 ; In order to accommodate the HP64800 Linker all RAM variables are
             642 ; contained in a single source file called RAM. What you will see
             643 ; here are external references to the variables used by the module.
             644 ;
             645 ;-----------------------------------------------------------
             646
             647        EXT    INIT_STACK           ; a pointer to the first RAM position
             648                                    ; after all of the declared RAM variables.
             649
             650        EXT    RAM_KEY              ; first of 2 consecutive locations
             651                                    ; in RAM that are set to a known
             652                                    ; pattern so that it can be determined
             653                                    ; if a power on reset occurred
             654
             655        EXT    TX_ID                ; Transaction Identifier used by
             656                                    ; communications routine to determine
             657                                    ; originate or answer modes of operation
             658
             659        EXT    LAST_TICKS           ; The number of ticks last loaded
             660                                    ; to the gate array's countdown timer
             661
             662        EXT    LEAK                 ; leak indicator, set to 1 on
             663                                    ; powerup and cleared when first 2
             664                                    ; hour period with no counts
             665
             666        EXT    TOTAL                ; 3 byte running total of pulses
             667                                    ; i.e. meter reading
             668
             669        EXT    DAY_NUM,MINUTES,SECONDS
             670        EXT    NEXT_TICKS,INTERVALS,PHONE_TICKS
             671
             672 ;-----------------------------------------------------------
             673 ;                    CONSTANTS
             674 ;-----------------------------------------------------------
             675
             676        INCLUDE CONSTANTS           ; check this file for references
             677
             678 EXT WR_EE_DRIVER
             679
             680        END Errors= 0
LOCATION OBJECT CODE LINE    SOURCE LINE 1 "8051"
             2 ;********************************************************************
             3 ;PROJECT:  BADGER METER COMPANY AUTOMATIC METER READER (AMR)
             4 ;
             5 ;PROGRAM NAME:  UART_DSR
             6 ;
             7 ;PROGRAM TITLE: UART Device Service Routine
             8 ;
```

```
   9 ;DOCUMENT REFERENCE: AMR STRUCTURE CHART, AMR FLOWCHART #3
  10 ;                    Intel Micro_controller Handbook 1986
  11 ;                    Intel MCS-51 Family of Single Chip Microcomputers User's Manual 1981
  12 ;
  13 ;FUNCTIONAL DESCRIPTION:
  14 ;
  15 ;This module handles getting characters to and from the UART
  16 ;
  17 ;
  18 ;CALLING SEQUENCE:
  19 ;
  20 ;
  21 ;GLOBAL DATA:
  22 ;
  23 ;
  24 ;SUBROUTINES CALLED:
  25 ;
  26 ;        None
  27 ;
  28 ;AUTHOR:  Numan G. Bogangun, Software Engineer, Micro Industries Inc.
  29 ;         Copyright 1986 for Badger Meter Company
  30 ;
  32 ;
  33 ;PSEUDOCODE:
  34 ;
  35 ;    SAVE INTERRUPT ENVIRONMENT                       ]-----
  36 ;                                                           |
  37 ;    IF TRANSMIT INT THEN                             ;--------
  38 ;    |  DISABLE RECIEVE INT                               | |
  39 ;    |  GET NEXT ADDRESS TO TRANSMIT                      | |
  40 ;    |  IF END ADDRESS THEN                            ]----|--
  41 ;    |  |  ENABLE RECEIVE INTERRUPT                       | | |
  42 ;    |  ELSE                                           ;----|-|--
  43 ;    |  |  GET CHAR TO TX FROM ADDRESS                   | | | |
  44 ;    |  |  ADD CHAR VALUE TO CHECKSUM                    | | | |
  45 ;    |  |  TRANSMIT CHAR                                 | | | |
  46 ;    |  ENDIF                                            | | | |
  47 ;    |                                                   | | | |
  48 ;    ELSE process char received int                   ]----|-|-|--
  49 ;    |                                                   | | | | |
  50 ;    |                                                   | | | | |
  51 ;    ENDIF                                               | | | | |
  52 ;                                                        | | | | |
  53 ;    RETURN                                              | | | | |
  54 ;=======================================                 | | | | |
  55          CSEG                        ; setup vector for uart | | | |
(0023) 56 .   ORG    23H                  ; int (page 2-7 of User's | | | |
0023 020110   57     JMP    UART          ; manual                  | | | |
              58                          ;                         | | | |
              59     CSEG                 ;                         | | | |
0000          60 UART:                    ; <------------------     | | | |
0000 C0D0     61     PUSH   PSW           ; save int environment    | | | |
0002 C0E0     62     PUSH   ACC           ;                         | | | |
0004 C0F0     63     PUSH   B             ;                         | | | |
0006 C083     64     PUSH   DPH           ;                         | | | |
0008 C082     65     PUSH   DPL           ;                         | | | |
000A 75D000   66     MOV    PSW,#00       ; use REG bank 0          | | | |
              67                          ;                         | | | |
              68 ;---------------------   ;                         | | | |
000D          69 CK_INT_TYPE:             ; <-----------------      | | |
000D 209903   70     JB     TI,TRANSMIT   ;                         | | |
0010 02003E   71     JMP    RECEIVE       ;                         | | |
```

```
                .72                                          ;
                 73 ;--------------------------------        ;
0013             74 TRANSMIT:                                ; transmit int has occurred
0013 C29C        75         CLR    REN                       ;
0015 0500        76         INC    START_ADDR                ; update address to tx from
0017 E500        77         MOV    A,START_ADDR              ;
                 78                                          ;
0019             79 CK_END_ADDR:                             ; (-------------------------
0019 B50007      80         CJNE   A,END_ADDR,GET_CHAR       ;
                 81                                          ;
001C C299        82         CLR    TI                        ; last address has been tx'ed
001E D29C        83         SETB   REN                       ; so enable receive and get out
0020 02006E      84         JMP    EXIT                      ;
                 85                                          ;
0023             86 GET_CHAR:                                ; (-------------------------
0023 FF          87         MOV    R7,A                      ; get the char to tx but
0024 E8          88         MOV    A,R0                      ; preserve R0 because KEEP_TIME
0025 C0E0        89         PUSH   ACC                       ; uses it (this system uses REG
0027 EF          90         MOV    A,R7                      ; bank 0 only)
0028 F8          91         MOV    R0,A                      ;
0029 E6          92         MOV    A,@R0                     ;
002A FF          93         MOV    R7,A                      ;
002B D0E0        94         POP    ACC                       ;
002D F8          95         MOV    R0,A                      ;
                 96                                          ;
002E E501        97         MOV    A,CKSUM                   ;
0030 2F          98         ADD    A,R7                      ; update checksum
0031 F501        99         MOV    CKSUM,A                   ;
0033 EF         100         MOV    A,R7                      ;
                101                                          ;
0034            102 TX_IT:                                   ;
0034 3099FD     103         JNB    TI,$                      ;
0037 C299       104         CLR    TI                        ;
0039 F599       105         MOV    SBUF,A                    ;
003B 02006E     106         JMP    EXIT                      ;
                107                                          ;
                108 ;--------------------------------        ;
003E            109 RECEIVE:                                 ; (-------------------------
003E C298       110         CLR    RI                        ; clear reciever interrupt
                111                                          ;
0040 0500       112         INC    RX_INDEX                  ; point to next buffer position
0042 7400       113         MOV    A,#BUFFER                 ; where char will be placed
0044 2500       114         ADD    A,RX_INDEX                ;
0046 F9         115         MOV    R1,A                      ;
                116                                          ;
0047 E599       117         MOV    A,SBUF                    ; move char into buffer position
0049 FE         118         MOV    R6,A                      ;
004A F7         119         MOV    @R1,A                     ;
                120                                          ;
004B 200012     121         JB     RE_TRANS,CK_END           ; if this is a re-transmission then
                122                                          ; ACK or NAK will not be sent
                123                                          ;
004E E500       124         MOV    A,RX_INDEX                ; check for 1st buffer position where
0050 B4000D     125         CJNE   A,#0,CK_END               ; an ACK or NAK will be found
                126                                          ;
0053            127 CK_ACK:                                  ;
0053 EE         128         MOV    A,R6                      ; restore char to ACC
0054 B40603     129         CJNE   A,#ACK,CK_NAK             ;
0057 02006E     130         JMP    EXIT                      ;
                131                                          ;
005A            132 CK_NAK:                                  ;
005A B46203     133         CJNE   A,#NAK,CK_END             ;
```

```
005D 02006E      134        JMP     EXIT            ;
                 135                                 ;
0060             136 CK_END:                         ;
0060 EE          137        MOV     A,R6             ;
0061 E500        138        MOV     A,RX_INDEX       ;
0063 B50003      139        CJNE    A,NUM_CHAR,SUM_IT ;
0066 02006E      140        JMP     EXIT             ;
                 141                                 ;
0069             142 SUM_IT:                         ;
0069 EE          143        MOV     A,R6             ;
006A 2500        144        ADD     A,RX_CKSUM       ;
006C F500        145        MOV     RX_CKSUM,A       ;
                 146                                 ;
006E             147 EXIT:                           ;
006E D082        148        POP     DPL              ; RESTORE PREVIOUS ISR ENVIRONMENT
0070 D083        149        POP     DPH
0072 D0F1        150        POP     B
0074 D0E0        151        POP     ACC
0076 D0D0        152        POP     PSW
0078 32          153        RETI
                 154
                 155
                 156 ;--------------------------------
                 157        EXT     START_ADDR,END_ADDR,RX_INDEX
                 158        EXT     BUFFER,CKSUM,RX_CKSUM,NUM_CHAR
                 159        EXT     RE_TRANS
                 160
                 161        INCLUDE CONSTANTS
                 162        END

Errors=   0

LOCATION OBJECT CODE LINE    SOURCE LINE

1 "8051"
                 2 ;*****************************************************************
                 3 ;PROJECT:  BADGER METER COMPANY AUTOMATIC METER READER (AMR)
                 4 ;
                 5 ;PROGRAM NAME:  TIME_SLICER
                 6 ;
                 7 ;PROGRAM TITLE: Timer0 Interrupt Service
                 8 ;
                 9 ;DOCUMENT REFERENCE: AMR STRUCTURE CHART, AMR FLOWCHART #2 through #2.2
                10 ;                    Intel Micro_controller Handbook 1986
                11 ;                    Intel MCS-51 Family of Single Chip Microcomputers User's Manual 1981
                12 ;
                13 ;FUNCTIONAL DESCRIPTION:
                14 ;
                15 ;This module is invoked whenever the 8031's internal Timer0 generates an
                16 ;interrupt. Timer0 is initially loaded to interrupt in 10 milliseconds
                17 ;by the START_TIME_SLICE module ( see AMR Flowchart #1.3) which enables
                18 ;the Timer0 interrupt and disables it when communications has been
                19 ;completed, as evidenced by the TX_ID flag, which will be cleared by
                20 ;the PHONE_HANDLER module after the phone call is ended.
                21 ;
                22 ;Once invoked, this module saves the interrupt environment; reloads
                23 ;Timer0 to interrupt in 10 milliseconds; calls the KEEP_TIME module
                24 ;( see AMR Flowchart #2.1 ) to maintain the day number, minute of the
                25 ;day, and seconds of the minute ( see TIME variable in RAM ); calls
                26 ;the PHONE_HANDLER module to process the incoming or outgoing phone call;
                27 ;checks if Timer0 expired while it was calling the modules, and if so,
                28 ;reloads Timer0 to interrupt almost instantly; and finally restores the
```

```
29 ;previous interrupt environment.
30 ;
31 ;CALLING SEQUENCE:
32 ;
33 ;This module gains control by a Timer0 interrupt.
34 ;
35 ;GLOBAL DATA:
36 ;
37 ;        TX_ID            transaction identifier, set by this module
38 ;                         to indicate whether a phone call from the CCM
39 ;                         is to be answered, or a scheduled or emergency
40 ;                         report needs to be sent to the CCM.
41 ;
42 ;SUBROUTINES CALLED:
43 ;
44 ;        KEEP_TIME        maintains the 24-bit clock to proper value.
45 ;        PHONE_HANDLER    device driver for phone.
46 ;
47 ;AUTHOR:  Numan G. Dogangun, Software Engineer, Micro Industries Inc.
48 ;         Copyright 1986 for Badger Meter Company
49 ;
51 ;PSEUDOCODE:
52 ;
53 ;    SAVE INTERRUPT ENVIRONMENT              ]-----
54 ;    RELOAD TIMER0 TO 10 MILLISECONDS           |
55 ;    SELECT PROPER REGISTER BANK                |
56 ;                                               |
57 ;    CALL KEEP_TIME                             |
58 ;    CALL PHONE_HANDLER                         |
59 ;                                               |
60 ;    IF TIMER0 HAS EXPIRED THEN              ]--------
61 ;        LOAD TIMER TO INTERRUPT ALMOST INSTANTLY | |
62 ;    ENDIF                                      | |
63 ;                                               | |
64 ;    RESTORE INTERRUPT ENVIRONMENT           ]-----|-|--
65 ;                                               | | |
66 ;    RETURN                                     | | |
67 ;                                               | | |
68 ;                                               | | |
69 ;=====================================          | | |
70                                    ; (----------- | |
71         CSEG               ; setup vector for timer0 int | |
(000B)  72         ORG    0BH         ; (see page 2-7 of User's    | |
000B 020000 73    JMP    TIMER_SLICER ;  manual)                    | |
74                                    ;                             | |
75         CSEG                       ;                             | |
0000   76 TIMER_SLICER:              ;                             | |
0000 C0D0 77   PUSH   PSW            ; save previous int's         | |
0002 C0E0 78   PUSH   ACC            ; environment                 | |
0004 C0F0 79   PUSH   B              ;                             | |
0006 C083 80   PUSH   DPH            ;                             | |
0008 C082 81   PUSH   DPL            ;                             | |
82                                   ;                             | |
000A 75D000 83 MOV    PSW,#00        ; select reg bank0            | |
84                                   ;                             | |
000D C2AF 85   CLR    EA             ; load timer0 to int again in | |
000F C28C 86   CLR    TR0            ; 10 mS                       | |
0011 74E7 87   MOV    A,#LOW(-TMR_COUNT+7);                        | |
0013 258A 88   ADD    A,TL0          ;                             | |
0015 F58A 89   MOV    TL0,A          ;                             | |
0017 74FB 90   MOV    A,#HIGH(-TMR_COUNT+7);                       | |
0019 358C 91   ADDC   A,TH0          ;                             | |
```

```
001B F58C          92         MOV    TH0,A                   ;                              | |
001D D28C          93         SETB   TR0                     ;                              | |
001F D2AF          94         SETB   EA                      ;                              | |
                   95                                        ;                              | |
                   96 ;;;;;   CALL   KEEP_TIME               ; maintain 24-bit time         | |
0021 12017D        97         CALL   PHONE_HANDLER           ; process communications       | |
                   98                                        ;                              | |
0024               99 WRAP_TEST:                             ; (---------------------------- |
0024 E58C         100         MOV    A,TH0                   ; check if timer0 counted down  |
0026 20E716       101         JB     ACC.7,EXIT_TS           ; to 0 while this module was    |
                  102                                        ; executing                     |
                  103                                        ;                               |
0029 758AEC       104         MOV    TL0,#LOW(-20)           ; set timer0 to int now because |
002C 758CFF       105         MOV    TH0,#HIGH(-20)          ; processing took too much time |
                  106                                        ;                               |
002F              107 EXIT_TS:                               ; (----------------------------
002F D082         108         POP    DPL                     ; retore previous int's
0031 D083         109         POP    DPH                     ; environment
0033 D0F0         110         POP    B                       ;
0035 D0E0         111         POP    ACC                     ;
0037 D0D0         112         POP    PSW                     ;
0039 32           113         RETI                           ;
                  114                                        ;
                  116                                        ;
                  117
                  118 ;***************************************************************************
                  119 ;PROJECT:  BADGER METER COMPANY AUTOMATIC METER READER (AMR)
                  120 ;
                  121 ;PROGRAM NAME: KEEP_TIME
                  122 ;
                  123 ;PROGRAM TITLE: Time keeper
                  124 ;
                  125 ;DOCUMENT REFERENCE: AMR STRUCTURE CHART, AMR FLOWCHART #2.1
                  126 ;                    Intel Micro_controller Handbook 1986
                  127 ;                    Intel MCS-51 Family of Single Chip Microcomputers User's Manual 1981
                  128 ;
                  129 ;FUNCTIONAL DESCRIPTION:
                  130 ;
                  131 ;This module is called by the TIME_SLICER module once every 10 mS.
                  132 ;It processes the clock which has the form:
                  133 ;
                  134 ;      |   Byte 1   |   Byte 2   |   Byte 3   |   Byte 4   |
                  135 ;      |0 1 2 3 4 5 6 7 0 1 2 3 4 5 6 7 0 1 2 3 4 5 6 7 0 1 2 3 4 5 6 7|
                  136 ;      |_|_|_|_|_|_|_|_|_|_|_|_|_|_|_|_|_|_|_|_|_|_|_|_|_|_|_|_|_|_|_|_|
                  137 ;      |_____|_____|_____|
                  138 ;        Day Number        Minute of Day         Sec of Min
                  139 ;          0-127              0-1339                0-59
                  140 ;          7 bits             11 bits               6 bits
                  141 ;
                  142 ;Once invoked, this module increments a call counter. Once this counter
                  143 ;reaches 100, a second has elapsed so the module will update the Seconds
                  144 ;of the Minute and, if necessary, the Minute of the Day and the Day Number.
                  145 ;
                  146 ;CALLING SEQUENCE:
                  147 ;
                  148 ;This module is called by the TIME_SLICER interrupt service routine
                  149 ;every 10 milliseconds.
                  150 ;
                  151 ;GLOBAL DATA:
                  152 ;
                  153 ;      TIME           The address of the start of the 3-byte area
                  154 ;                     shown above.
                  155 ;
```

```
156 ;SUBROUTINES CALLED:
157 ;
158 ;        None
159 ;
160 ;AUTHOR:  Numan G. Dogangun, Software Engineer, Micro Industries Inc.
161 ;         Copyright 1986 for Badger Meter Company
162 ;
164 ;
165 ;PSEUDOCODE:
166 ;
167 ;     ADD 1 TO CALL COUNTER                        ]------
168 ;                                                        |
169 ;     IF CALL COUNTER = 100 THEN                   ]-----|--
170 ;     |  CALL COUNTER = 0                                |  |
171 ;     |  ADD 1 TO SECONDS                                |  |
172 ;     |                                                  |  |
173 ;     |  IF SECONDS = 60 THEN                       ]----|-|--
174 ;     |  |  SECONDS = 0                                  |  | |
175 ;     |  |  ADD 1 TO MINUTES                             |  | |
176 ;     |  |                                               |  | |
177 ;     |  |  IF MINUTES = 1440 THEN                  ]----|-|-|--
178 ;     |  |  |  MINUTES = 0                                | | | |
179 ;     |  |  |  ADD 1 TO DAY NUMBER                        | | | |
180 ;     |  |  |                                             | | | |
181 ;     |  |  |  IF DAY NUMBER = 128 THEN             ]-----|-|-|-|--
182 ;     |  |  |  |  DAY NUMBER = 0                           | | | | |
183 ;     |  |  |  ENDIF                                       | | | | |
184 ;     |  |  ENDIF                                          | | | | |
185 ;     |  ENDIF                                             | | | | |
186 ;     ENDIF                                                | | | | |
187 ;                                                          | | | | |
188 ;============================================              | | | | |
189                                                           | | | | |
190        CSEG                                ;              | | | | |
003A   191 KEEP_TIME:                         ; (-------------| | | | |
003A 0500   192    INC    CALL_CTR            ; update the call counter | | | |
003C E500   193    MOV    A,CALL_CTR          ;                | | | |
194                                           ;                | | | |
195 ;-----------------------------------;                      | | | |
196                                           ; (-------------| | | |
003E B4643B 197    CJNE   A,#100,EXIT_KEEP    ; 100 calls to this module | | |
198                                           ; @ 10mS per call = 1 sec  | | |
0041   199 SEC_ELAPSED:                       ;                  | | |
0041 750000 200    MOV    CALL_CTR,#0         ; reset call counter | | |
201                                           ;                  | | |
0044 0500   202    INC    SECONDS             ; add 1 to seconds | | |
0046 E500   203    MOV    A,SECONDS           ;                  | | |
204                                           ;                  | | |
205 ;-----------------------------------;                        | | |
206                                           ; (---------------| | |
0048 B43C51 207    CJNE   A,#60,EXIT_KEEP     ; has a minute elapsed? | |
208                                           ;                    | |
004B 750000 209    MOV    SECONDS,#0          ; yes, so reset seconds | |
004E 020051 210    JMP    MIN_ELAPSED         ; increment minutes below | |
211                                           ;                    | |
212 ;-----------------------------------;                          | |
0051   213 MIN_ELAPSED:                       ;                    | |
0051 E501 214    MOV    A,MINUTES+1           ; check for minutes rollover | |
0053 C3   215    CLR    C                     ; note: minutes are a 2-byte | |
0054 3401 216    ADDC   A,#1                  ; variable so check for carry | |
0056 5008 217    JNC    NOCARRY               ;                    | |
0058 750100 218    MOV    MINUTES+1,#00       ;                    | |
005B 0500 219    INC    MINUTES               ;                    | |
005D 020062 220    JMP    CKMIN                ;                    | |
```

```
                221
0060            222 NOCARRY:                                    ;                       | |
0060 F501       223         MOV     MINUTES+1,A                 ;                       | |
                224                                             ;                       | |
0062            225 CKMIN:                                      ; (-----------------------|
0062 7800       226         MOV     R0,#MINUTES                 ; check if minutes have reached    |
0064 7901       227         MOV     R1,#MINUTES+1               ; the rollover point, 1440         |
0066 B60513     228         CJNE    @R0,#05H,EXIT_KEEP          ;                                  |
0069 B7A010     229         CJNE    @R1,#0A0H,EXIT_KEEP         ;                                  |
                230                                             ;                                  |
006C 750000     231         MOV     MINUTES,#0                  ; minutes rollover have occurred   |
006F 750100     232         MOV     MINUTES+1,#0                ; so reset minutes and ....        |
                233                                             ;                                  |
0072 0500       234         INC     DAY_NUM                     ; increment relative day number    |
                235                                             ;                                  |
0074 E500       236         MOV     A,DAY_NUM                   ; (--------------------------------
0076 B48003     237         CJNE    A,#128,EXIT_KEEP            ; check if maximum day number has
                238                                             ; been reached and reset day number
0079 750000     239         MOV     DAY_NUM,#0                  ; if so
                240                                             ;
007C            241 EXIT_KEEP:                                  ;
                242                                             ;
007C 22         243         RET                                 ;
                244                                             ;
                245                                             ;
                247 ;**************************************************************************
                248 ;PROJECT:  BADGER METER COMPANY AUTOMATIC METER READER (AMR)
                249 ;
                250 ;PROGRAM NAME:  PHONE_HANDLER
                251 ;
                252 ;PROGRAM TITLE:  Telephone communications processor
                253 ;
                254 ;DOCUMENT REFERENCE: AMR STRUCTURE CHART, AMR FLOWCHART #2.2
                255 ;                    Intel micro_controller Handbook 1986
                256 ;                    Intel MCS-51 Family of Single Chip microcomputers User's Manual 1981
                257 ;
                258 ;FUNCTIONAL DESCRIPTION:
                259 ;
                260 ;This module is called by the TIME_SLICER module once every 10 mS.
                261 ;It processes a phone call in states, i.e. each 10 mS one of the states
                262 ;is executed.
                263 ;
                264 ;Once invoked, this module checks for any delays that one of the states
                265 ;may have requested. The states request a delay by setting one of the
                266 ;delay variables, SLI_DEL, SEC_DEL, or MIN_DEL.
                267 ;
                268 ;CALLING SEQUENCE:
                269 ;
                270 ;This module is called by the TIME_SLICER interrupt service routine.
                271 ;
                272 ;GLOBAL DATA:
                273 ;
                274 ;         TX_ID              transaction identifier, set by this module
                275 ;                            to indicate whether a phone call from the CCM
                276 ;                            is to be answered, or a scheduled or emergency
                277 ;                            report needs to be sent to the CCM.
                278 ;
                279 ;SUBROUTINES CALLED:
                280 ;
                281 ;         UP_NUM             moves the pointer to the telephone number buffer.
                282 ;         CK_TRIES           checks the number of retries.
                283 ;
```

```
284 ;AUTHOR:   Numan G. Dogangun, Software Engineer, Micro Industries Inc.
285 ;          Copyright 1986 for Badger Meter Company
286 ;
288
289 ;PSEUDOCODE:
290 ;
291 ;      IF A DELAY IS REQUESTED BY STATES THEN           ]-------
292 ;      |   COUNTDOWN THE DELAY                              |
293 ;      ELSE                                                 |
294 ;      |   IF ANY STATE FLAG IS SET THEN                 ]------|--
295 ;      |   |   DO CASE                                          | |
296 ;      |   |      TAKE OFF HOOK                       1 ]---|-|--
297 ;      |   |      WAIT DIAL TONE                      2 ]---|-|-|--
298 ;      |   |      DIAL NUMBER                         3 ]---|-|-|-|--
299 ;      |   |      WAIT FOR CARRIER                    4 ]---|-|-|-|-|--
300 ;      |   |      CLEAR SQUELCH                       5 ]---|-|-|-|-|-|--
301 ;      |   |      TALK TO CCM                         6 ]---|-|-|-|-|-|-|--
302 ;      |   |      HANGUP                              7 ]---|-|-|-|-|-|-|-|--
303 ;      |   |      CLEAR TX_ID                         8 ]---|-|-|-|-|-|-|-|-|--
304 ;      |   |   END CASE
305 ;      |   |
306 ;      |   ELSE
307 ;      |   |   IF TX_ID = WAIT CARRIER THEN           ]-------|-|-|-|-|-|-|-|-|-|--
308 ;      |   |   |   REQUEST WAIT CARRIER STATE
309 ;      |   |   ELSE
310 ;      |   |   |   IF TX_ID = SCHEDULED OR EMERGENCY  ]-------|-|-|-|-|-|-|-|-|-|-|--
311 ;      |   |   |   |   REQUEST OFF HOOK STATE
312 ;      |   |   |   ENDIF
313 ;      |   |   ENDIF
314 ;      |   ENDIF
315 ;      ENDIF
316 ;
317 ;      RETURN
318 ;
319 ;
320 ;=====================================
                321         CSEG            ;  (-----------------
007D            322  PHONE_HANDLER:         ;
                323                         ;
007D            324  CKDELAY:               ;
007D A800       325         MOV     R0,SLI_DEL      ; check the delay variables
007F B6000D     326         CJNE    R0,#00,DELAY    ; if any of them contain a
0082 A608       327         MOV     R0,SEC_DEL      ; non_zero value then dec
0084 B60008     328         CJNE    R0,#00,DELAY    ; them every 10 mS until
0087 A800       329         MOV     R0,MIN_DEL      ; they are zero
0089 B60003     330         CJNE    R0,#00,DELAY    ;
008C 0200C4     331         JMP     CK_STATES       ;
                332                         ;
008F            333  DELAY:                 ;
008F 0500       334         INC     SLI_CTR         ;
0091 A600       335         MOV     R0,SLI_DEL      ;
0093 B60003     336         CJNE    R0,#0,DECSLI    ;
0096 02009B     337         JMP     CKSLICTR        ;
0099            338  DECSLI:                ;
0099 1500       339         DEC     SLI_DEL         ;
                340                         ;
009B            341  CKSLICTR:              ;
009B A800       342         MOV     R0,SLI_CTR      ;
009D B66321     343         CJNE    R0,#99,EXDEL    ;
                344                         ;
00A0 750010     345         MOV     SLI_CTR,#00     ;
00A3 0500       346         INC     SEC_CTR         ;
00A5 A800       347         MOV     R0,SEC_DEL      ;
```

```
LOCATION OBJECT CODE LINE     SOURCE LINE
   00A7 B80003    348       CJNE    R0,#00,DECSEC   ;
   00AA 0209AF    349       JMP     CKSECCTR        ;
   00AD           350 DECSEC:                       ;
   00AD 15D0      351       DEC     SEC_DEL         ;
   00AF           352 CKSECCTR:                     ;
   00AF A800      353       MOV     R0,SEC_CTR      ;
   00B1 B83B0D    354       CJNE    R0,#59,EXDEL    ;
   00B4 750010    355       MOV     SEC_CTR,#00     ;
   00B7 A800      356       MOV     R0,MIN_DEL      ;
   00B9 B80013    357       CJNE    R0,#00,DECMIN   ;
   00BC 0200C1    358       JMP     EXDEL           ;
   00BF           359 DECMIN:                       ;
   00BF 15D0      360       DEC     MIN_DEL         ;
                  361                               ;
   00C1           362 EXDEL:                        ;
   00C1 0202EE    363       JMP     EXIT            ;
                  364                               ;
                  365 ;------------------------------;
   00C4           366 CX_STATES:                    ; (---------------------
                  367 ;------------------------------;
   00C4           368 CASE1:                        ; (---------------------
   00C4 30001C    369       JNB     OFF_HOOK_BIT,CASE2 ;
                  370                               ;
   00C7           371 OFF_HOOK:                     ;
   00C7 D295      372       SETB    HOOK_SWITCH     ; take phone off hook
                  373                               ;
   00C9           374 CKTONE:                       ;
   00C9 C200      375       CLR     OFF_HOOK_BIT    ; clear this state's flag
   00CB D200      376       SETB    WAIT_TONE_BIT   ; & set next state's flag
                  377                               ;
   00CD 750002    378       MOV     SEC_DEL,#2      ; set delay to wait 5 sec
   00D0           379 EX_HOOK:                      ; for a dial tone
   00D0 0202EE    380       JMP     EXIT            ;
                  381                               ;
                  382 ;------------------------------;
   00D3           383 CASE2:                        ; (---------------------
   00D3 30004C    384       JNB     WAIT_TONE_BIT,CASE3 ;
                  385                               ;
   00D6           386 WAIT_TONE:                    ;
   00D6 309743    387       JNB     DIAL_TONE_DET,NO_TONE ; if the dial tone was detected
                  388                               ; in 5 sec then clear this state
                  389                               ; flag and set next state's flag
                  390                               ;
   00D9 7501FF    391       MOV     NUMINDEX,#0FFH  ; set up index to phone number
   00DC 7501FF    392       MOV     NUMINDEX+1,#0FFH ; address (the UP_INDEX subrtn
                  393                               ; will use this variable)
                  394                               ;
   00DF D201      395       SETB    LAST_PULSE      ; setup variable for next state
                  396                               ;
                  397 ;;;;;;;;;;;;;;;;;;;;;;;;;;;;;;;;
   00E1 7400      398       MOV     A,#PHONE_NUM_ADDR
   00E3 7900      399       MOV     R1,#BUFFER
   00E5           400 LOOP1:
   00E5 FE        401       MOV     R6,A
   00E6 120011    402       CALL    RD_EE_DRIVER
   00E9 F7        403       MOV     @R1,A
   00EA 09        404       INC     R1
   00EB EE        405       MOV     A,R6
   00EC 04        406       INC     A
   00ED B407F5    407       CJNE    A,#7,LOOP1
                  408
   00F1 750710    409       MOV     BUFFER+7,#0
                  410
```

```
LOCATION OBJECT CODE LINE    SOURCE LINE
                      411 ;;;;;;;;;;;;;;;;;;;;;;;;;;;;;;;
                      412
00F3 7407             413      MOV    A,#ACCT_NUM_ADDR
00F5 7900             414      MOV    R1,#ACCT_BUF
00F7                  415 LOOP2:
00F7 FE               416      MOV    R6,A
00F8 120000           417      CALL   RD_EE_DRIVER
00FB F7               418      MOV    @R1,A
00FC 09               419      INC    R1
00FD EE               420      MOV    A,R6
00FE 04               421      INC    A
00FF B40BF5           422      CJNE   A,#ACCT_NUM_ADDR+4,LOOP2
                      423
                      424 ;;;;;;;;;;;;;;;;;;;;;;;;;;;;;;;
                      425
0102 7408             426      MOV    A,#CCM_BOOK_ADDR
0104 7900             427      MOV    R1,#CCM_BOOK_BUF
0106                  428 LOOP3:
0106 FE               429      MOV    R6,A
0107 120000           430      CALL   RD_EE_DRIVER
010A F7               431      MOV    @R1,A
010B 09               432      INC    R1
010C EE               433      MOV    A,R6
010D 04               434      INC    A
010E B412F5           435      CJNE   A,#CCM_BOOK_ADDR+7,LOOP3
                      436
                      437 ;;;;;;;;;;;;;;;;;;;;;;;;;;;;;;;
                      438                                    ;
0111 D296             439      SETB   SQUELCH                ; turn the squelch on
0113 D295             440      SETB   HOOK_SWITCH            ; take phone off hook
                      441                                    ;
0115 C200             442      CLR    WAIT_TONE_BIT          ; setup state flags for next state
0117 D200             443      SETB   DIAL_BIT               ;
                      444                                    ;
0119 02011F           445      JMP    EXWDT                  ;
                      446                                    ;
011C                  447 NO_TONE:                           ;
                      448 ;;;;;;;;; FILLIN WITH CODE         ; otherwise initiated aborted
                      449 ;;;;;;;;;;;;;;;;;;;;;;;;;;;;;;     ; phone call procedure
011C 02011F           450      JMP    EXWDT                  ;
                      451                                    ;
011F                  452 EXWDT:                             ;
011F 0202EE           453      JMP    EXIT                   ;
                      454                                    ;
                      455 ;-------------------------------;
0122                  456 CASE3:                             ;
0122 200003           457      JB     DIAL_BIT,DIAL_IT       ;
0125 02017E           458      JMP    CASE4                  ;
                      459                                    ;
0128                  460 DIAL_IT:                           ;
0128 300037           461      JNB    LAST_PULSE,MAKEOUT     ;
012B A800             462      MOV    R0,PULSE_CTR           ;
012D B80015           463      CJNE  R0,#0,DIALIT            ;
0130                  464 GET_NUMBER:                        ;
0130 0500             465      INC    NUMINDEX               ; point to the next number to be
0132 7400             466      MOV    A,#BUFFER              ; dialed
0134 2500             467      ADD    A,NUMINDEX             ;
0136 F8               468      MOV    R0,A                   ;
                      469                                    ;
0137 E6               470      MOV    A,@R0                  ; get the number
0138 F8               471      MOV    R0,A                   ;
                      472                                    ;
```

```
LOCATION OBJECT CODE LINE    SOURCE LINE
0139               473 SETUPCTR:               ;
0139 F500          474      MOV   PULSES,A     ; set up the pulse counter (this
013B 750010        475      MOV   PULSE_CTR,#0 ; will be dec'ed until all the
013E E8            476      MOV   A,R0         ; makes and breaks are done
                   477                         ;
013F B80003        478      CJNE  R0,#00,DIALIT; look for end of phone number
                   479                         ;
0142 02016E        480      JMP   DIALED       ; last number dialed so finish up
                   481                         ; otherwise,
0145               482 DIALIT:                 ;
0145 E501          483      MOV   A,PULSE_CTR  ; delay 1 sec between numbers
0147 B5000B        484      CJNE  A,PULSES,PULSEREP ; and set up pulse variables for
014A 750010        485      MOV   PULSE_CTR,#0 ; next number to be dialed.
014D 750001        486      MOV   SEC_DEL,#1   ;
0150 D200          487      SETB  LAST_PULSE   ;
0152 02017B        488      JMP   EX_DIAL      ;
                   489                         ;
0155               490 PULSEREP:               ;
0155 30001A        491      JNB   LAST_PULSE,MAKEOUT ; output break for 60 mS
0158 C295          492      CLR   HOOK_SWITCH  ;
015A C200          493      CLR   LAST_PULSE   ;
015C 750005        494      MOV   SLI_DEL,#5   ;
015F 02017B        495      JMP   EX_DIAL      ;
                   496                         ;
0162               497 MAKEOUT:                ;
0162 D295          498      SETB  HOOK_SWITCH  ; output make for 40 mS
0164 D200          499      SETB  LAST_PULSE   ;
0166 0500          500      INC   PULSE_CTR    ;
0168 750003        501      MOV   SLI_DEL,#3   ;
016B 02017B        502      JMP   EX_DIAL      ;
                   503                         ;
016E               504 DIALED:                 ; at this point all numbers have
016E C200          505      CLR   DIAL_BIT     ; been dialed so set up state flags
0170 D200          506      SETB  WAIT_DC_BIT  ;
                   507                         ;
0172 750001        508      MOV   SEC_DEL,#1   ; request a wait upto 30 sec for
0175 75001E        509      MOV   WAIT_CTR,#30 ; a carrier detect (look at carrier
0178 02017B        510      JMP   EX_DIAL      ; detect once a sec
                   511                         ;
017B               512 EX_DIAL:                ;
017B 0202EE        513      JMP   EXIT         ;
                   514                         ;
                   515 ;---------------------------;
017E               516 CASE4:                  ;
017E 300024        517      JNB   WAIT_DC_BIT,CASE5 ;
                   518                         ;
0181               519 WAIT_DC:                ;
0181 308414        520      JNB   CARRIER_DET,DCD ;
0184 1500          521      DEC   WAIT_CTR     ;
0186 750001        522      MOV   SEC_DEL,#1   ;
0189 A800          523      MOV   R0,WAIT_CTR  ;
018B B80014        524      CJNE  R0,#0,EXWAITC;
                   525                         ;
018E C200          526   CLR  WAIT_DC_BIT
0190 D200          527   SETB HANGUP_BIT
0192 750005        528   MOV  SEC_DEL,#5
                   529 ;;;;; CALL  CXTRIES    ;
0195 0201A2        530      JMP   EXWAITC      ;
                   531                         ;
0198               532 DCD:                    ;
0198 C200          533      CLR   WAIT_DC_BIT  ;
019A D200          534      SETB  CLR_SQUELCH_BIT ;
019C 750002        535      MOV   SEC_DEL,#2   ;
```

```
LOCATION OBJECT CODE LINE     SOURCE LINE
019F 0201A2     536         JMP     EXWAITC         ;
                537                                 ;
01A2            538 EXWAITC:                        ;
01A2 0202EE     539         JMP     EXIT            ;
                540                                 ;
                541 ;--------------------------------;
01A5            542 CASE5:                          ;       (--------------------------------
01A5 300010     543         JNB     CLR_SQUELCH_BIT,CASE6;
                544                                 ;
01A8            545 CLR_SQUELCH:                    ;
01A8 C200       546         CLR     CLR_SQUELCH_BIT ;   clear this state
01AA C296       547         CLR     SQUELCH         ;   unsquelch the modem
01AC 750002     548         MOV     SEC_DEL,#2      ;   request 2 sec billing delay
01AF C29C       549         CLR     REN             ;   stop any chars coming in
01B1 C200       550         CLR     RE_TRANS        ;   reset erroneous transmission ctrl
01B3 D200       551         SETB    TRANSMIT_BIT    ;   set up next state
01B5 0202EE     552         JMP     EXIT            ;
                553                                 ;
                554 ;--------------------------------;
01B8            555 CASE6:                          ;       (--------------------------------
01B8 200003     556         JB      TRANSMIT_BIT,TRANSMIT;
01BB 0201EC     557         JMP     CASE7           ;
                558                                 ;
01BE            559 TRANSMIT:                       ;
01BE C200       560         CLR     TRANSMIT_BIT    ;   setup variables for next state
01C0 D200       561         SETB    WAIT_ACK_BIT    ;
01C2 750005     562         MOV     WAIT_CTR,#5     ;
01C5 750001     563         MOV     SEC_DEL,#1      ;
                564                                 ;   setup variables for transmission
01C8 7800       565         MOV     R0,#BUFFER
01CA 7900       566         MOV     R1,#0
01CC            567 CLR_BUFFER:
01CC 7600       568         MOV     @R0,#0
01CE 09         569         INC     R1
01CF B90DFA     570         CJNE    R1,#RX_REC_LEN,CLR_BUFFER
                571
                572 ;;;;;   MOV     BUFFER,#0       ;   receive buffer to catch CCM mess
01D2 7501FF     573         MOV     RX_INDEX,#0FFH  ;
01D5 750000     574         MOV     CKSUM,#0        ;   checksum per record transmitted
01D8 750010     575         MOV     RX_CKSUM,#0     ;   checksum per record received
01DB 75000D     576         MOV     NUM_CHAR,#RX_REC_LEN ;
01DE 7501FF     577         MOV     START_ADDR,#TX_ID-1 ;   start and end addresses to tx
01E1 750001     578         MOV     END_ADDR,#CKSUM+1   ;   (see UART_DSR)
                579                                 ;
01E4 750001     580         MOV     SEC_DEL,#1      ;
01E7 D299       581         SETB    TI              ;   this starts the transmission; it
                582                                 ;   completed by UART_DSR
01E9 0202EE     583         JMP     EXIT            ;
                584                                 ;
                585 ;--------------------------------;
01EC            586 CASE7:                          ;       (--------------------------------
01EC 200003     587         JB      WAIT_ACK_BIT,WAIT_ACK;
01EF 02024F     588         JMP     CASE8           ;
                589                                 ;
01F2            590 WAIT_ACK:                       ;
01F2 E500       591         MOV     A,BUFFER        ;   message in from CCM?
01F4 6026       592         JZ      CKWAIT          ;   no, check timeout
                593                                 ;
01F6            594 CK_BUFFER:                      ;
01F6 E500       595         MOV     A,BUFFER        ;   yes, check for ACK
01F8 B40612     596         CJNE    A,#ACK,CKNAK    ;
                597                                 ;
```

```
LOCATION OBJECT CODE LINE    SOURCE LINE
01FB C200        598     CLR   RE_TRANS          ;
01FD C201        599     CLR   WAIT_ACK_BIT      ;   CCM ACKed so set next state that checks
01FF D200        600     SETB  WAIT_LF_BIT       ;   the message for checksum then puts it
0201 75001E      601     MOV   WAIT_CTR,#30      ;   away in the proper buffer, or, requests
0204 750001      602     MOV   SEC_DEL,#1        ;   a re-transmission from the CCM
0207 750000      603     MOV   CKSUM,#0          ;
                 604                             ;
020A 02024C      605     JMP   EXWAIT_ACK        ;
                 606                             ;
020D             607 CKNAK:                      ;
020D B4620C      608     CJNE  A,#NAK,CKWAIT     ;   check for NAK
                 609                             ;
0210 20002C      610     JB    RE_TRANS,BAD_TX   ;   and retransmit if so
0213 D200        611     SETB  RE_TRANS          ;
                 612                             ;
0215             613 RETX:                       ;
0215 C200        614     CLR   WAIT_ACK_BIT      ;
0217 D200        615     SETB  TRANSMIT_BIT      ;
                 616                             ;
0219 02024C      617     JMP   EXWAIT_ACK        ;
                 618                             ;
021C             619 CKWAIT:                     ;
021C 1500        620     DEC   WAIT_CTR          ;
021E A800        621     MOV   R0,WAIT_CTR       ;
0220 B80026      622     CJNE  R0,#00,RSTDEL     ;
                 623                             ;
                 624 ;;;;;; CALL  CKTRIES        ;
                 625
0223 750002      626     MOV   BUFFER,#NAK       ;
0226 7500FF      627     MOV   START_ADDR,#BUFFER-1
0229 750011      628     MOV   END_ADDR,#BUFFER+1
022C 750000      629     MOV   RX_CKSUM,#0
022F 7500FF      630     MOV   RX_INDEX,#0FFH
0232 75000D      631     MOV   NUM_CHAR,#RX_REC_LEN
0235 C29C        632     CLR   REN
0237 D299        633     SETB  TI
                 634
                 635 ;;;;; CLR   WAIT_ACK_BIT    ;
                 636 ;;;;; SETB  HANGUP_BIT      ;
0239 750002      637     MOV   SEC_DEL,#2        ;
023C 02024C      638     JMP   EXWAIT_ACK        ;
                 639                             ;
023F             640 BAD_TX:                     ;
                 641 ;;;;;; CALL  CKTRIES        ;
023F C200        642     CLR   WAIT_ACK_BIT      ;
0241 D200        643     SETB  HANGUP_BIT        ;
0243 750002      644     MOV   SEC_DEL,#2        ;
0246 02024C      645     JMP   EXWAIT_ACK        ;
                 646                             ;
0249             647 RSTDEL:                     ;
0249 750001      648     MOV   SEC_DEL,#1        ;
                 649                             ;
024C             650 EXWAIT_ACK:                 ;
024C 02022E      651     JMP   EXIT              ;
                 652                             ;
                 653 ;----------------------------;
024F             654 CASE8:                      ;   (----------------------------
                 655 ;;;; JNB   WAIT_LF_BIT,CASE9
024F 200003      656     JB    WAIT_LF_BIT,WAITLF
0252 020234      657     JMP   CASE9
0255             658 WAITLF:                     ;
```

```
LOCATION OBJECT CODE LINE    SOURCE LINE

0255 E500        659         MOV    A,RX_CKSUM       ; if checksums agree then send ACK and
0257 200016      660         JB     RE_TRANS,CMP4
025A             661  CMP5:
025A B50D2C      662         CJNE   A,BUFFER+13,SENDNAK ; put next time to call away
025D 020263      663         JMP    MOVE_IN
0260             664  CMP4:
0260 B50C26      665         CJNE   A,BUFFER+12,SENDNAK
0263             666  MOVE_IN:                        ;
0263 850800      667         MOV    NEXT_TICKS,BUFFER+8 ;
0266 850910      668         MOV    INTERVALS,BUFFER+9  ;
0269 850A01      669         MOV    INTERVALS+1,BUFFER+10;
026C 850B10      670         MOV    PHONE_TICKS,BUFFER+11;
                 671
026F 750016      672         MOV    BUFFER,#ACK      ;
0272 7500FF      673         MOV    START_ADDR,#BUFFER-1
0275 750011      674         MOV    END_ADDR,#BUFFER+1
0278 750000      675         MOV    RX_CKSUM,#0
027B D299        676         SETB   TI
                 677
027D C201        678         CLR    RE_TRANS
027F C200        679         CLR    WAIT_LF_BIT
0281 D200        680         SETB   HANGUP_BIT
0283 750601      681         MOV    SEC_DEL,#1
0286 0202B1      682         JMP    EXWAITLF
                 683                                  ;
0289             684  SENDNAK:                        ; otherwise send a NAK and hangup
0289 20001E      685         JB     RE_TRANS,BAD_TX1
028C D201        686         SETB   RE_TRANS
                 687
028E 750062      688         MOV    BUFFER,#NAK      ;
0291 7500FF      689         MOV    START_ADDR,#BUFFER-1
0294 750011      690         MOV    END_ADDR,#BUFFER+1
0297 750000      691         MOV    RX_CKSUM,#0
029A 7500FF      692         MOV    RX_INDEX,#0FFH
029D 75000D      693         MOV    NUM_CHAR,#RX_REC_LEN
02A0 C29C        694         CLR    REN
02A2 D299        695         SETB   TI
                 696
02A4 750601      697         MOV    SEC_DEL,#1
02A7 0202B1      698         JMP    EXWAITLF
                 699
02AA             700  BAD_TX1:
02AA C200        701         CLR    WAIT_LF_BIT
02AC D200        702         SETB   HANGUP_BIT
02AE 750602      703         MOV    SEC_DEL,#2
02B1             704  EXWAITLF:                       ;
02B1 0202EE      705         JMP    EXIT             ;
                 706                                  ;
                 707  ;---------------------------;
02B4             708  CASE9:                          ;
02B4 200013      709         JB     HANGUP_BIT,HANGUP ;
02B7 0202D4      710         JMP    CK_ID            ;
02BA             711  HANGUP:                         ;
                 712  ;;;;;;;;;;;;;;;;;;;;;;;;;;;;;;;
                 713  ;; MOV   R1,#0           ;INDEX
                 714  ;; JB    RE_TRANS,BUF0
                 715  ;;;MOV   R1,#BUFFER+1    ;ADDR TO GET FROM
                 716  ;; JMP   FILL
02BA             717  BUF0:
                 718  ;; MOV   R0,#BUFFER      ; DITTO
                 719
```

```
LOCATION OBJECT CODE LINE   SOURCE LINE
  02BA             720 FILL:
                   721 ;; MOV   A,#CCX_BOOK_ADDR
                   722
  02BA             723 LOOPN:
                   724 GLB TEST
  02BA             725 TEST:
  02BA 00          726 NOP
  02BB 00          727 NOP
                   728 ;; MOV   R4,A
                   729 ;; MOV   A,@R0
                   730 ;; MOV   B,A
                   731 ;; MOV   A,R4
                   732 ;; MOV   DPH,R0
                   733 ;; MOV   DPL,R1
                   734
                   735 ;; CALL  WR_EE_DRIVER      ;ACC=ADDR B=DATA
                   736
                   737 GLB TEST1
  02BC             738 TEST1:
  02BC 00          739 NOP
  02BD 00          740 NOP
                   741 ;; MOV   A,R4
                   742 ;; INC   A
                   743 ;; MOV   R0,DPH
                   744 ;; INC   R0
                   745 ;; MOV   R1,DPL
                   746 ;; INC   R1
                   747 ;; CJNE  R1,#7,LOOPN
                   748 ;;;;;;;;;;;;;;;;;;;;;;;;;;;;;;;;;
  02BE 750000      749     MOV   BUFFER,#0
  02C1 C200        750     CLR   HANGUP_BIT      ;
                   751                           ;
  02C3 C2AC        752     CLR   ES              ;
  02C5 C29C        753     CLR   REN             ;
  02C7 D296        754     SETB  SQUELCH         ;
  02C9 C295        755     CLR   HOOK_SWITCH     ;
  02CB 750002      756     MOV   SEC_DEL,#2      ;
  02CE 750010      757     MOV   TX_ID,#COMPLETE ;
  02D1             758 EXHANGUP:                 ;
  02D1 0202EE      759     JMP   EXIT            ;
                   760                           ;
                   761 ;---------------------------;
  02D4             762 CK_ID:                    ; (-------------------------------------
  02D4 E501        763     MOV   A,TX_ID         ;
  02D6 B48005      764     CJNE  A,#WAIT_CARRIER,CK_ID1;
                   765                           ;
                   766 ;;;;;;;;;SETB  HOOK_SWITCH ; take phone off hook
  02D9 D201        767     SETB  OFF_HOOK_BIT    ;
                   768 ;;;;;; MOV   SEC_DEL,#1   ; request a wait upto 30 sec for
                   769 ;;;;;; MOV   WAIT_CTR,#30 ; a carrier detect (look at carrier
                   770 ;;;;;; SETB  WAIT_DC_BIT  ; set up wait for carrier state
  02DB 0202EE      771     JMP   EXIT            ;
                   772                           ;
  02DE             773 CK_ID1:                   ;
  02DE B48005      774     CJNE  A,#SCHED_RPT,CK_ID2 ;
                   775                           ;
  02E1 D200        776     SETB  OFF_HOOK_BIT    ;
  02E3 0202EE      777     JMP   EXIT            ;
                   778                           ;
  02E6             779 CK_ID2:                   ;
  02E6 B44005      780     CJNE  A,#EMER_RPT,EXIT ;
                   781                           ;
```

```
LOCATION OBJECT CODE LINE    SOURCE LINE
  02E9 D200         782         SETB    OFF_HOOK_BIT          ;
  02EB 0202EE       783         JMP     EXIT                  ;
                    784                                       ;
                    785   ;------------------------------;
  02EE              786   EXIT:                               ;
  02EE 22           787         RET                           ;
                    788                                       ;
                    790                                       ;
                    791   ;------------------------------------------------
                    792   ;              RAM VARIABLES
                    793   ;------------------------------------------------
                    794
                    795         EXT     WR_EE_DRIVER,RD_EE_DRIVER
                    796
                    797         EXT     CALL_CTR,DAY_NUM,SECONDS,MINUTES
                    798
                    799         EXT     SLI_CTR,SEC_CTR
                    800
                    801         EXT     TX_ID,ACCT_BUF,TOTAL,START_ADDR,END_ADDR
                    802
                    803         EXT     CCM_BOOK_BUF
                    804
                    805         EXT     SLI_DEL,SEC_DEL,MIN_DEL
                    806
                    807         EXT     OFF_HOOK_BIT,WAIT_TONE_BIT
                    808         EXT     DIAL_BIT,WAIT_DC_BIT,CLR_SQUELCH_BIT
                    809         EXT     TRANSMIT_BIT,WAIT_ACK_BIT,WAIT_LF_BIT,HANGUP_BIT
                    810
                    811         EXT     WAIT_CTR
                    812
                    813         EXT     NUMINDEX
                    814         EXT     PULSES,LAST_PULSE
                    815         EXT     PULSE_CTR
                    816
                    817         EXT     BUFFER,CKSUM
                    818
                    819         EXT     RE_TRANS,NEXT_TICKS,INTERVALS,PHONE_TICKS
                    820
                    821         EXT     RX_INDEX,RX_CKSUM,NUM_CHAR
                    822
                    823   ;------------------------------------------------
                    824   ;              CONSTANTS
                    825   ;------------------------------------------------
                    826
                    827         INCLUDE CONSTANTS
                    828
                    829         END

Errors=  0
```

```
LOCATION OBJECT CODE LINE    SOURCE LINE

1 "8051"
                    2         CSEG
                    3 ;#*****#**##***********************************
                    4 ;*                                              *
                    5 ;* The following are drivers for the GI ER5911 EEPROM: *
                    6 ;*    WR_EE_DRIVER: Writes data to the EEPROM.  *
                    7 ;*    RD_EE_DRIVER: Reads data from EEPROM.     *
                    8 ;*                                              *
                    9 ;#*****#**##***********************************
                   10
                   11         INCLUDE  CONSTANTS
                   12
                   13
     (0019)        14 PROGRAM_EN   EQU    019H    ; PROGRAM ENABLE
     (0001)        15 PROGRAM_DIS  EQU    01H     ; PROGRAM DISABLE
     (0003)        16 READ         EQU    03H     ; READ EEPROM
     (0005)        17 PROGRAM      EQU    05H     ; PROGRAM EEPROM
     (0002)        18 ADDR_DATA    EQU    R2      ; ADDRESS OF DATA
     (0003)        19 DATA         EQU    R3      ; DATA TO BE STORED
                   20
                   21         GLB    WR_EE_DRIVER,RD_EE_DRIVER
                   22         EXT    ROT_CNT,CLK_CNT,GET_CNT
                   23
                   24 ;********************************************
                   25 ;*   MACROS FOR WR_EE_DRIVER AND RD_EE_DRIVER    *
                   26 ;*       CS_TRUE: ENABLES CHIP SELECT.           *
                   27 ;*       CS_FALSE: DISABLES CHIP SELECT.         *
                   28 ;********************************************
                   29
                   30
                   31 CS_TRUE MACRO
                   32         SETB   CHIP_SEL
                   33         MEND
                   34
                   35 CS_FALSE MACRO
                   36         CLR    CHIP_SEL
                   37         MEND
                   38
                   39 ;********************************************
                   40 ;*                                              *
                   41 ;* WR_EE_DRIVER: This module writes to a 1 byte wide *
                   42 ;*               EEPROM at the address in ACC and data in *
                   43 ;*               B, both specified by the calling module. *
                   44 ;*                                              *
                   45 ;* ARGUMENTS:                                   *
                   46 ;*    INPUT                                     *
                   47 ;*    ACC=ADDRESS TO WRITE TO                   *
                   48 ;*    B=DATA TO BE STORED                       *
                   49 ;********************************************
                   50
0001               51 WR_EE_DRIVER:
                   52
0001 FA            53         MOV    ADDR_DATA,A  ; MOVE ADDRESS INTO R2
0001 ABF0          54         MOV    DATA,B       ; MOVE DATA TO BE TRANSFERED TO EEPROM INTO DATA
0003 C292          55         CLR    DATA_CLK     ; INITIALIZE CLOCK LOW
0005 C291          56         CLR    DATA_OUT     ; INITIALIZE DO TO LOW
0007               57         CS_TRUE             ; ENABLE CHIP SELECT
0009 750001        58         MOV    CLK_CNT,#1   ; DO 1 CLOCK PULSE
000C 12009A        59         CALL   CLOCK
                   60
```

```
LOCATION OBJECT CODE LINE    SOURCE LINE
 000F 750115       61        MOV     ROT_CNT,#5       ; SEND PROGRAM ENABLE CODE
 0012 7419         62        MOV     A,#PROGRAM_EN
 0014 120080       63        CALL    SHIFT_BIT
                   64

0017 750117       65        MOV     ROT_CNT,#7       ; SEND 7 ZERO'S AT END OF PROGRAM ENABLE
 001A 7400         66        MOV     A,#00H
 001C 120080       67        CALL    SHIFT_BIT
 001F 1201A4       68        CALL    UNSELECT         ; DIS-ABLES CHIP SELECT FOR REQUIRED AMOUNT OF TIME
                   69                                 ;   (( Required by EEPROM manufacturer ))
                   70

0022 750811       71        MOV     CLK_CNT,#1       ; EXECUTE 1 CLOCK COUNT
 0025 12009A       72        CALL    CLOCK
                   73

0028 750115       74        MOV     ROT_CNT,#5       ; SEND PROGRAM CODE
 002B 7405         75        MOV     A,#PROGRAM
 002D 120080       76        CALL    SHIFT_BIT
                   77

0031 750117       78        MOV     ROT_CNT,#7       ; SEND ADDRESS TO BE PROGRAMMED
 0033 EA           79        MOV     A,ADDR_DATA      ;
 0034 120080       80        CALL    SHIFT_BIT        ;
                   81
                   82

0037 EB           83        MOV     A,DATA           ; MOVE DATA BYTE INTO EEPROM
 0038 750008       84        MOV     ROT_CNT,#8       ;
 003B 120080       85        CALL    SHIFT_BIT        ;
                   86

003E              87 LOOP:                           ; LOOP ON TO TO SIGNAL PROGRAMMING IS FINISHED
 003E 30B2FD       88        JNB     E2_READY,LOOP
                   89

0041 1201A4       90        CALL    UNSELECT         ; DIS-ABLES CHIP SELECT FOR REQUIRED AMOUNT OF TIME
                   91                                 ;   (( Required by EEPROM manufacturer ))
                   92

0044 750115       93        MOV     ROT_CNT,#5       ; DISABLE PROGRAM CODE
 0047 7401         94        MOV     A,#PROGRAM_DIS   ;
 0049 120080       95        CALL    SHIFT_BIT        ;
                   96

004C 750117       97        MOV     ROT_CNT,#7       ; SEND 7 ZERO'S TO SIGNAL END OF COMMAND
 004F 7400         98        MOV     A,#00H
 0051 120080       99        CALL    SHIFT_BIT
                   100

0054              101       CS_FALSE
                   102

0056 22           103       RET
                   104

105 ;***********************************************************
                   106 ;*                                                         *
                   107 ;* RD_EE_DRIVER: This module reads data from the 2 byte    *
                   108 ;* wide EEPROM at the address specified by the MAIN        *
                   109 ;* module. Then passes data back into DPTR.                *
                   110 ;*                                                         *
                   111 ;* ARGUMENTS:                                              *
                   112 ;*      INPUT                    OUTPUT                    *
                   113 ;*   ACC=ADDRESS OF DATA        DPTR=DATA                  *
                   114 ;***********************************************************
                   115
                   116
 0057              117 RD_EE_DRIVER:
                   118
 0057 F8           119       MOV     R0,A             ; MOVE ADDRESS INTO R0
 0058              120       CS_TRUE                  ; ENABLE CHIP SELECT
 005A C291         121       CLR     DATA_OUT         ; SET DO LOW
 005C 750801       122       MOV     CLK_CNT,#1       ; DO 1 CLOCK PULSE
```

```
LOCATION OBJECT CODE LINE    SOURCE LINE
   005F 12009A       123         CALL   CLOCK
                     124
   0062 750115       125         MOV    ROT_CNT,#5        ; SEND READ COMMAND TO EEPROM
   0065 7103         126         MOV    A,#READ           ;
   0067 120080       127         CALL   SHIFT_BIT         ;
                     128
   006A 750107       129         MOV    ROT_CNT,#7        ; SEND ADDRESS OF DATA TO EEPROM
   006D E8           130         MOV    A,R0
   006E 120080       131         CALL   SHIFT_BIT
                     132
   0071              133 GET_BYTE:
   0071 750018       134         MOV    GET_CNT,#8        ; SET COUNT FOR 8 BIT DATA TO BE READ
   0074 750001       135         MOV    CLK_CNT,#1        ; EXTRACT DUMMY BIT
   0077 12009A       136         CALL   CLOCK
                     137
   007A              138 SAVE_DATA:                       ; MOVE DATA FROM EEPROM TO TO ACC.
   007A 12008D       139         CALL   GET_BIT
                     140
   007D              141         CS_FALSE                 ; DIS-ENABLE EEPROM CHIP SELECT
                     142
   007F 22           143         RET
                     144
                     145 ;************************************************************
                     146 ;*                                                          *
                     147 ;*    SHIFT_BIT: ROTATES ACCUMULATOR LEFT INTO CARRY THEN   *
                     148 ;*               PASSES CARRY TO PORT.                      *
                     149 ;*                                                          *
                     150 ;************************************************************
                     151
   0080              152 SHIFT_BIT:
                     153
   0081 13           154         RRC    A                 ; ROTATES ACC. RIGHT INTO CARRY
   0081 9291         155         MOV    DATA_OUT,C        ; MOVES CARRY TO PORT
   0083 750001       156         MOV    CLK_CNT,#1
   0086 12009A       157         CALL   CLOCK             ; WHEN CLOCK PULSE IS HIGH BIT AT PORT IS
                                                          ;   TRANSFERED TO EEPROM
   0089 D500F4       158         DJNZ   ROT_CNT,SHIFT_BIT ; IF ROTATE_CNT = 0 THEN
   008C 22           159         RET
                     160
                     161
                     162 ;************************************************************
                     163 ;*    GET_BIT: Moves bits of data from DATA_OUT then stores  *
                     164 ;*             then them into the ACC.                       *
                     165 ;************************************************************
                     166
   008D              167 GET_BIT:
                     168
   008D A291         169         MOV    C,DATA_IN         ; MOVES CLOCKED BIT INTO CARRY
   008F 13           170         RRC    A                 ; ROTATES CARRY INTO ACC.
   0090 750011       171         MOV    CLK_CNT,#1        ; GET CLOCK PULSE FOR NEXT BIT
   0093 12009A       172         CALL   CLOCK
   0096 D500F4       173         DJNZ   GET_CNT,GET_BIT   ; IF GET_CNT () 0
                     174                                  ;   THEN GET NEXT BIT
   0099 22           175         RET                      ;   ELSE RETURN
                     176                                  ; ENDIF
                     177
                     178 ;************************************************************
                     179 ;*                                                          *
                     180 ;*         CLOCK: CLOCK Emulates clock pulses               *
                     181 ;*                                                          *
                     182 ;************************************************************
```

```
LOCATION OBJECT CODE LINE    SOURCE LINE
                        183
  009A                  184 CLOCK:
  009A D292             185         SETB    DATA_CLK            ; CLOCK PULSE HIGH
  009C 00               186         NOP
  009D 00               187         NOP
  009E C292             188         CLR     DATA_CLK            ; CLOCK PULSE LOW
  00A0 D500F7           189         DJNZ    CLK_CNT,CLOCK       ; IF CLK_CNT () 0
  00A3 22               190         RET                         ;    THEN RETURN
                        191                                     ;    ELSE CALL CLOCK
                        192                                     ; ENDIF
                        193
                        194 ;*****************************************************
                        195 ;*   UNSELECT: UNSELECT a procedure that controls chip select  *
                        196 ;*            after a program instruction.                     *
                        197 ;*****************************************************
                        198
  00A4                  199 UNSELECT:
  00A4                  200         CS_FALSE                    ; DISABLES CHIP SELECT
  00A6 00               201         NOP
  00A7 00               202         NOP
  00A8                  203         CS_TRUE                     ; ENABLE CHIP SELECT
  00AA C291             204         CLR     DATA_OUT            ; INITIALIZE DO TO LOW
  00AC 22               205         RET
                        206
```

Errors= 0

```
LOCATION OBJECT CODE LINE    SOURCE LINE

1  "8051"
                        2  ;*****************************************************
                        3  ;                    RAM DEFINITIONS
                        4  ; This module contains all of the variables for the CLII
                        5  ; software. This includes the bit, internal, and external
                        6  ; data segments. The program files that use the variables
                        7  ; are referenced in the comments field.
                        8  ;*****************************************************
                        9
                        10 ;*****************************************************
                        11 ;                    BIT VARIABLES
                        12 ;*****************************************************
                        13
                        14
                        15         GLB     OFF_HOOK_BIT,WAIT_TONE_BIT,DIAL_BIT
                        16         GLB     WAIT_DC_BIT,CLR_SQUELCH_BIT,TRANSMIT_BIT
                        17         GLB     WAIT_ACK_BIT,WAIT_LF_BIT,HANGUP_BIT
                        18
                        19         GLB     LEAK,RE_TRANS
                        20
                        21.        BSEG                        ;
                        22                                     ;
  (0000)                23         .ORG    00H                 ;
                        24                                     ;
  (0000)                25 OFF_HOOK_BIT     DBIT    1   ;
  (0001)                26 WAIT_TONE_BIT    DBIT    1   ;
  (0002)                27 DIAL_BIT         DBIT    1   ;
  (0003)                28 WAIT_DC_BIT      DBIT    1   ;
  (0004)                29 CLR_SQUELCH_BIT  DBIT    1   ;
  (0005)                30 TRANSMIT_BIT     DBIT    1   ;
  (0006)                31 WAIT_ACK_BIT     DBIT    1   ;
  (0007)                32 WAIT_LF_BIT      DBIT    1   ;
```

```
LOCATION OBJECT CODE LINE     SOURCE LINE
         (0018)   33 HANGUP_BIT      DBIT   1   ;
                  34                                ;
         (0019)   35 LEAK            DBIT   1   ;
         (001A)   36 RE_TRANS        DBIT   1   ;
                  37
                  38 ;***************************************************
                  39 ;               INTERNAL RAM VARIABLES
                  40 ;***************************************************
                  41
                  42      GLB    LAST_TICKS,TX_ID,RAM_KEY
                  43
                  44      GLB    SLI_DEL,SEC_DEL,MIN_DEL,SLI_CTR,SEC_CTR,WAIT_CTR
                  45
                  46      GLB    NUMINDEX,PULSE_CTR,PULSES,LAST_PULSE
                  47
                  48      GLB    ROT_CNT,GET_CNT,CLK_CNT
                  49
                  50      GLB    CCM_BOOK_BUF,FLAGS
                  51
                  52      GLB    ACCT_BUF,DAY_NUM,MINUTES,SECONDS,CALL_CTR
                  53      GLB    NEXT_TICKS,INTERVALS,PHONE_TICKS
                  54
                  55      GLB    TOTAL
                  56
                  57      GLB    BUFFER,CKSUM,RX_CKSUM,START_ADDR,END_ADDR,RX_INDEX
                  58
                  59      GLB    NUM_CHAR
                  60
                  61      DSEG
         (0008)   62      ORG    08H                ;
                  63                                ;
         0000     64 INT_RAM                        ;
                  65                                ;
         (0008)   66 RAM_KEY         DS    2   ;
         (000A)   67 LAST_TICKS      DS    1   ;
                  68                                ;
         (000B)   69 SLI_DEL         DS    1   ;
         (000C)   70 SEC_DEL         DS    1   ;
         (000D)   71 MIN_DEL         DS    1   ;
         (000E)   72 SLI_CTR         DS    1   ;
         (000F)   73 SEC_CTR         DS    1   ;
         (0010)   74 WAIT_CTR        DS    1   ;
                  75                                ;
         (0011)   76 PULSE_CTR       DS    1   ;
         (0012)   77 PULSES          DS    1   ;
         (0013)   78 LAST_PULSE      DS    1   ;
                  79                                ;
         (0014)   80 CALL_CTR        DS    1   ;
                  81                                ;
         (0015)   82 NUMINDEX        DS    1   ;
                  83                                ;
         (0016)   84 RX_INDEX        DS    1   ;
                  85                                ;
         (0017)   86 NUM_CHAR        DS    1   ;
                  87                                ;
         (0018)   88 ROT_CNT         DS    1   ; rotate count for E2
         (0019)   89 GET_CNT         DS    1   ; tells how many data bits you want to tx
         (001A)   90 CLK_CNT         DS    1   ; tells how many clock pulses to send to
                  91                             ; E2
                  92
         (001B)   93 NEXT_TICKS      DS    1   ;
```

```
LOCATION OBJECT CODE LINE    SOURCE LINE
         (001C)     94 INTERVALS    DS    2    ;
         (001E)     95 PHONE_TICKS  DS    1    ;
                    96
                    97
         (0023)     98       ORG    23H            ;
                    99                             ;
                    100                            ;
         (0023)     101 TX_ID       DS    1    ;
         (0024)     102 ACCT_BUF    DS    4    ;
         (0028)     103 CCM_BOOK_BUF DS   7    ;
         (002F)     104 FLAGS       DS    1    ;
         (0030)     105 DAY_NUM     DS    1    ;
         (0031)     106 MINUTES     DS    2    ;
         (0033)     107 SECONDS     DS    1    ;
         (0034)     108 TOTAL       DS    3    ;
         (0037)     109 PREV_TOTAL  DS    3    ;
         (003A)     110 TOD         DS    9    ;
         (0043)     111 PR_DATA     DS    6    ;
         (0049)     112 CKSUM       DS    1    ;
                    113                        ;
         (004A)     114 RX_CKSUM    DS    1    ;
                    115
         (004B)     116 BUFFER      DS    14   ;
                    117
                    118                        ;
         (0059)     119 START_ADDR  DS    1    ;
         (005A)     120 END_ADDR    DS    1    ;
                    121                        ;
                    122
         (0040)     123 INT_RAME    EQU   $    ;
                    124
                    125
                    126 ;*********************************************
                    127 ;              STACK VARIABLES
                    128 ;*********************************************
                    129
                    130      GLB    INIT_STACK
                    131      DSEG                  ;
                    132                            ;
         (005B)     133 ISTACK      DS    1    ;
         (005A)     134 INIT_STACK  EQU   ISTACK-1  ;
                    135
                    136      END

Errors=  0
```

*TABLE II*

```
10 'Copyright 1986 Badger Meter, Inc. - Engineering Division *** Program Name -
access *** Date 04-15-1986
20 'Author D.Wachs       \ - load "access"
30 'Automatic Meter Reading - Access Plus & Flowing 'B'
40 '
50 COMMON PGM$,D2$(),F1$(),T$()
60 '
70 KEY OFF:SCREEN 1:CLS:WIDTH 40:COLOR 9,1
80 '
90 COM(1) ON
100 ON COM(1) GOSUB 120:IF PGM$<>"" THEN GOSUB 120
110 GOTO 150
120 SOUND 500,2:SOUND 100,2:DRAW "BM100,110C1R100D11L100U11"
```

```
130 LOCATE 15,14:PRINT "Incoming Meter Reading!":RETURN
140 '
150 ON TIMER(120) GOSUB 160:GOTO 180
160 S1=1:RETURN
170 '
180 ON ERROR GOTO 190:GOTO 220
190 IF ERR=57 THEN RESUME
200 LOCATE 11,15:PRINT "Error";ERR:STOP
210 '
220 DRAW "BM0,0C1R319D199L319U199BM3,3R313D193L313U193":PAINT (1,1),1
230 DRAW "BM4,176R319BM4,178R319":PAINT (5,177),1
240 DRAW "BM153,0020R195BM155,0018R193":PAINT (154,4),1
250 '
260 '    ACCESS plus
270 '
280 DRAW "BM15,30C3U3R5D3L4U2R3D1L2U4R1D1U2R1U2R1D2U4R1U5L2D3R1U3R4D3L1U2L1D
4R1D4L2R3U2D2R1D2R1D1R1D2R2D3L3U3R2U1D2L1R3D1L3"
290 DRAW "BM34,30H1U15E1R7F1D4L1U4L7D1R6D1L6D14R7E1U4L1D4L6U1R5U1L5"
300 DRAW "BM46,30H1U15E1R7F1D4L1U4L7D1R6D1L6D14R7E1U4L1D4L6U1R5U1L5"
310 DRAW "BM57,30U3R1BU2R1D5L1BU1R9U1L9R1U7R6D1L5D4U13L3D1R2D1L2D1R2D4U7R9D5L1U4
L6D1R5D1L5"
320 DRAW "BM72,30H1U4R1D5R7E1L7U1R7U1L7R7U5H1D5U4L7H1R7L6U5R7D2R1U3L9D5U6R9H1L7"

330 DRAW "BM84,30H1U4R1D5R7E1L7U1R7U1L7R7U5H1D5U4L7H1R7L6U5R7D2R1U3L9D5U6R9H1L7"

340 DRAW "BM15,34R77G1L75"
350 DRAW "BM98,35U2R4D2L3U1R2L1U6R1F1R3E1L4H1R5U6L9U1R9H1L4G1H1L2D2R3D6"
360 DRAW "BM109,32U2R5D2L4U1R3L2U15L2D1R1D1L1"
370 DRAW "BM118,32H1U9L2D1R1D1L1R2D6F2R2E1F1R2U1L7U1R7L2U8L2D1R1D1L1"
380 DRAW "BM129,32H1U2F1D2R4E1L4U1R4U2H1L4H1U3E1R4F1L5D1R5D1"
390 DRAW "BM17,38R117G1L115"
400 CIRCLE (142,15),5:DRAW "BM142,17U4L1R2"
410 '
420 '    Flowing 'B'
430 '
440 DRAW "BM15,49R20D1R2L22D1R22F1L23D1R23F1L24D1R24D1L24D1R24D1L24D1R24F1L3F1R2
D1L1F1R1D1L1F1R1G1R3"
450 DRAW "F1R2L6BL7L19D1R21BR5R29F1R1L31BL4L22D1R23BR3R33F1R1L35BL3L23D1R24BR3R3
5F1L36BL3L24"
460 DRAW "D1R24BR3R37D1L36BL4L24D1R24BR5R36D1L34BL7L24"
470 DRAW "R20F1R4BR6R32D1L12BL2BL3F1R2BR30R10D1L9BL3DL2D1R2BR3R30R9D1L9BL2BL2D1R4B
R25R9"
480 DRAW "D1L11BL2DL7BL6L22D1R22BR4R37D1L37BL3L23D1R23BR3R366L35BL3L23D1R24BR3R
33L1E1L30BL3L24"
490 DRAW "D1R24BR3R33F1R1L33BL4L24D1R24BR6R32F1L31BL6L24"
500 DRAW "BR21F1R3BR6R31D1L11BL27L3F1R2BR29R10D1L9BL29L2D1R2BR29R9D1L9BL2BL2D1R3B
R26R10D1L123L21L6D1R39"
510 DRAW "D1L39D1R39G1L38F1R37G1L36D1R35G1L33F1R30L1G1L26R1F1R21C0"
520 CIRCLE (28,110),5:DRAW "BM19,112U4R1F1G1F1D1"
530 '
540 '    Print Text
550 '
560 LOCATE 7,14:PRINT "Badger Meter, Inc."
570 LOCATE 8,14:PRINT "Utility Products Division"
580 LOCATE 9,14:PRINT "4545 W. Brown Deer Rd."
590 LOCATE 10,14:PRINT "Milwaukee, Wi. 53223"
600 LOCATE 11,14:PRINT "Copyright 1986"
610 LOCATE 12,14:PRINT "Release 2.0"
620 '
630 LOCATE 18,2:PRINT "ACCESS PLUS software is designed to"
640 LOCATE 19,2:PRINT "operate only with ACCESS PLUS hardware"
```

```
650 LOCATE 20,2:PRINT "for automatically reading utility"
660 LOCATE 21,2:PRINT "meters over the telephone lines."
670 LOCATE 24,2:PRINT CHR$(15);CHR$(15);CHR$(15);CHR$(15);CHR$(15);CHR$(16);:LOC
ATE 24,34:PRINT CHR$(17);CHR$(15);CHR$(15);CHR$(15);CHR$(15);CHR$(15);
680 '
690 IF PGM$<>"" THEN GOSUB 120
700 M1$=" Press Any Key To Start!   ::: "
710 TIMER ON
720 LOCATE 24,9:PRINT USING "\                      \";M1$;
730 M1$=M1$+MID$(M1$,1,1):M1$=MID$(M1$,2,30)
740 IF S1=1 THEN 780
750 N$=INKEY$:IF N$<>"" THEN 780
760 LOCATE 2,21:PRINT DATE$;" ";TIME$
770 FOR I=1 TO 500:NEXT I:GOTO 720
780 TIMER OFF
790 SCREEN 0,0,0:WIDTH 80:LOCATE ,,0,0,7
800 CHAIN "ba001"
810 END 10 'Copyright 1985 Badger Meter, Inc. - Engineering Division ::: Program Name -
 aer ::: Date 11-25-1985
20 'Author D.Wachs       \ - load "aer"
30 'Automatic Meter Reading - Start
40 '
50 COMMON PGM$,O2$(),F1$(),T$()
60 DIM O2$(35),F1$(6),T$(44),K$(4)
70 '
80 KEY OFF
90 ON ERROR GOTO 100:GOTO 170
100 IF ERR=24 OR ERR=57 THEN CLS:BEEP:COLOR 12,0:LOCATE 4,7:PRINT "A Device Time
 out or I/O Error has Occured.":LOCATE 5,7:PRINT "Make Sure The Hardware is Corre
ctly Setup, Then Press Enter." ELSE 130
110 N$=INKEY$:IF N$="" THEN 110 ELSE CLS:RESUME
120 '
130 IF ERR=68 THEN CLS:BEEP:COLOR 12,0:LOCATE 4,7:PRINT "This Program Requires T
he Asyncronous Communications Adapter.":GOTO 150
140 CLS:BEEP:COLOR 12,0:LOCATE 4,7:PRINT "Error";ERR
150 CLOSE:COLOR 10,0:END
160 '
170 DATA 66,65,68,71,69,82,32,77,69,84,69,82,32,73,78,67
180 DATA 65,67,67,69,83,83,32,80,76,85,83,32,83,39,83,84
190 DATA 42,77,69,84,69,82,32,82,69,65,68,73,78,71,32,42
200 DATA 67,81,90,89,87,82,73,71,72,84,32,32,49,57,56,54
210 '
220 WIDTH "com1:",255:OPEN "com1:9600,N,8,1,1f" AS #4
230 '
240 LINE INPUT #4,N1$
250 PRINT N1$
260 IF INSTR(N1$,"ONLINE")=0 THEN 240
270 '
280 FOR I=1 TO 16
290 FOR J=1 TO 4:READ K:K$(J)=HEX$(K):NEXT J
300 I$=STR$(I):I$=MID$(I$,2,LEN(I$)-1)
310 PRINT #4,"KEYS INDEX=";I$;" KEY=";K$(1);K$(2);K$(3);K$(4)
320 ON TIMER(5) GOSUB 330:GOTO 340
330 BEEP:COLOR 14,0:LOCATE 25,36:PRINT " : Key Index Error In CCM : ";:TIMER OF
F:S1=1:RETURN
340 TIMER ON:S1=0:N1$=""
350 IF S1<>0 THEN 390
360 IF EOF(4) THEN 350 ELSE N$=INPUT$(LOC(4),#4):N1$=N1$+N$
370 IF INSTR(N1$,CHR$(13))=0 THEN 350
```

```
380 IF INSTR(N1$,"OK")=0 THEN RESTORE:GOTO 280
390 TIMER OFF:S1=0
400 NEXT I
410 '
420 DATA "Customer Name.....?  _____"
430 DATA "Address..........?  _____"
440 DATA "City & State......?  _____"
450 DATA "Zip Code:.........?  _____"
460 DATA "Cust Phone Number:?  _____"
470 DATA "Meter Mfg.........?  _____"
480 DATA "Type Model & Size.?  _____"
490 DATA "Configuration/TC:.?  _"
500 DATA "Meter Serial #....?  _____"
510 DATA "Access + Serial #:?  _____"
520 DATA "Date Installed:...?  __-__-__"
530 DATA "Alarm / Status:...?  _"
540 DATA "Leak Indicator:...?  _"
550 DATA "Call In Attempts:.?  _"
560 DATA "Call In Frequency:?  _"
570 DATA "Call Back Date:...?  __-__-____"
580 DATA "Call Back Time:...?  __:__:_0"
590 DATA "Account Status....?  _"
600 DATA "Prev Mtr Rdng:....?  _____"
610 DATA "Pres Mtr Rdng:....?  _____"
620 DATA "Dt Prev Mtr Rdng:.?  __-__-__"
630 DATA "Dt Pres Mtr Rdng:.?  __-__-__"
640 DATA "Tm Prev Mtr Rdng:.?  __:__:_0"
650 DATA "Tm Pres Mtr Rdng:.?  __:__:_0"
660 DATA "Time of Day Usage.?  _"
670 DATA "Usage Period #1:..?  _____"
680 DATA "Usage Period #2:..?  _____"
690 DATA "Usage Period #3:..?  _____"
700 DATA "Calculated Usage..?  _____"
710 DATA "Peak Rate.........?  _"
720 DATA "Rate Period #1:...?  _____"
730 DATA "Rate Period #2:...?  _____"
740 DATA "Rate Period #3:...?  _____"
750 DATA ""
760 DATA "Access + Password.?  _"
770 DATA "DTM Deletion Code:?  _____"
780 FOR I=1 TO 36:READ O2$(I):NEXT I
790 '
800 DATA "Minutes  "
810 DATA "Hourly   "
820 DATA "Daily    "
830 DATA "Weekly   "
840 DATA "Monthly  "
850 DATA "Quarterly"
860 FOR I=1 TO 6:READ F1$(I):NEXT I
870 '
880 DATA "   10 Gallons    Mtr.Mtd."
890 DATA "  100 Gallons    Mtr.Mtd."
900 DATA " 1000 Gallons    Mtr.Mtd."
910 DATA "10000 Gallons    Mtr.Mtd."
920 DATA "    1 Cubic Ft.  Mtr.Mtd."
930 DATA "   10 Cubic Ft.  Mtr.Mtd."
940 DATA "  100 Cubic Ft.  Mtr.Mtd."
950 DATA " 1000 Cubic Ft.  Mtr.Mtd."
960 DATA "10000 Cubic Ft.  Mtr.Mtd."
970 DATA "  .01 M3         Mtr.Mtd."
980 DATA "  .10 M3         Mtr.Mtd."
```

```
990 DATA "     1 M3        Mtr.Mtd."
1000 DATA "    10 M3        Mtr.Mtd."
1010 DATA "   100 M3        Mtr.Mtd."
1020 DATA "    10 Imp.Gals  Mtr.Mtd."
1030 DATA "   100 Imp.Gals  Mtr.Mtd."
1040 DATA "  1000 Imp.Gals  Mtr.Mtd."
1050 DATA " 10000 Imp.Gals  Mtr.Mtd."
1060 DATA "   100 Gallons   Pulse Gen."
1070 DATA "  1000 Gallons   Pulse Gen."
1080 DATA " 10000 Gallons   Pulse Gen."
1090 DATA "    10 Cubic Ft  Pulse Gen."
1100 DATA "   100 Cubic Ft  Pulse Gen."
1110 DATA "  1000 Cubic Ft  Pulse Gen."
1120 DATA " 10000 Cubic Ft  Pulse Gen."
1130 DATA "   .10 M3        Pulse Gen."
1140 DATA "     1 M3        Pulse Gen."
1150 DATA "    10 M3        Pulse Gen."
1160 DATA "   100 M3        Pulse Gen."
1170 DATA "   100 Imp.Gals  Pulse Gen."
1180 DATA "  1000 Imp.Gals  Pulse Gen."
1190 DATA " 10000 Imp.Gals  Pulse Gen."
1200 DATA "                           "
1210 DATA "Low Battery Alarm          "
1220 DATA "Freeze Alarm               "
1230 DATA "Tilt / Door Tamper         "
1240 DATA "Xmit/Generator Disconnect  "
1250 DATA "Magnetic Tamper            "
1260 DATA "Battery Tamper             "
1270 DATA "Phone Line Disconnect      "
1280 DATA "Unathorized Interrogation  "
1290 DATA "Water Usage Alarm          "
1300 DATA "Security Alarm             "
1310 DATA "Leak Sense                 "
1320 FOR I=1 TO 44:READ T$(I):NEXT I
1330 '
1340 K1$="run "+CHR$(34)+"aar"+CHR$(34)+CHR$(13):KEY 2,K1$:KEY 5,"edit ":K1$="sh
ell "+CHR$(34)+"\attrib ":KEY 6,K1$
1350 K1$="lprint CHR$(12)"+CHR$(13):KEY 7,K1$:K1$="shell"+CHR$(34)+"\mxref"+CHR$
(13):KEY 8,K1$
1360 KEY 1,"list ":KEY 3,"load "+CHR$(34):KEY 4,"save "+CHR$(34):KEY 9,"close "
1370 CHAIN "access"
1380 END 10 'Copyright 1985 Badger Meter, Inc. - Engineering Division *** Program Name -
bm001 *** Date 06-17-1985
20 'Author D.Wachs        \ - load "bm001"
30 'Automatic Meter Reading - Main Menu
40 '
50 COMMON PGM$,O2$(),F1$(),T$()
60 DIM O1$(9):C=9
70 '
80 ON TIMER(120) GOSUB 90:GOTO 110
90 S1=1:RETURN
100 '
110 ON ERROR GOTO 120:GOTO 250
120 IF ERR=57 OR ERR=69 THEN RESUME
130 IF ERR=15 THEN N1$="":RESUME
140 COLOR 23,0:LOCATE 4,7:PRINT "Error";ERR:STOP
150 '
160 DATA "    **    Main Menu    **    "
170 DATA " System Maintenance           "
```

```
160 DATA " Meter Reading                "
170 DATA " CRT Report Generator         "
200 DATA " Printer Report Generator     "
210 DATA " Program Utitities            "
220 DATA " Basic                        "
230 DATA " Return to Pc-DOS             "
240 DATA " Flowing 'B'                  "
250 FOR I=1 TO C:READ O1$(I):NEXT I:N$=" "
260 '
270 COLOR 9,0,9
280 LOCATE 2,1:PRINT STRING$(80,205)
290 LOCATE 4,1:PRINT STRING$(80,205)
300 LOCATE 24,2:PRINT STRING$(19,205);CHR$(203);STRING$(13,205);CHR$(203);STRING
$(29,205);CHR$(203);STRING$(14,205);
310 LOCATE 25,21:PRINT CHR$(186);:LOCATE 25,35:PRINT CHR$(186);:LOCATE 25,65:PRI
NT CHR$(186);
320 COLOR 0,0:LOCATE 3,2,0:PRINT SPACE$(78)
330 COLOR 9,0:LOCATE 1,1:PRINT "BM001 "
340 COLOR 11,0:LOCATE 25,2:PRINT DATE$;" ";TIME$;
350 COLOR 15,0:LOCATE 1,8:PRINT "              *** Access Plus Main Menu **
"
360 COLOR 14,0:LOCATE 3,9:PRINT " Press Any Key To Scan For Desired Line, Press
 ESC or Enter.  "
370 '
380 COLOR 30,0:LOCATE 25,66:PRINT " * Scan Mode *";
390 COLOR 12,0:FOR I=5 TO 23:LOCATE I,1:PRINT SPACE$(80);:NEXT I
400 FOR I=1 TO C
410 IF INSTR(O1$(I),"*")=0 THEN COLOR 11,0 ELSE COLOR 14,1
420 GOSUB 430:GOTO 450
430 LOCATE 8+I,22
440 PRINT O1$(I):RETURN
450 NEXT I
460 '
470 FOR I=1 TO C
480 IF O1$(I)="" THEN 670
490 IF INSTR(O1$(I),"*")<>0 THEN 670
500 COLOR 16,3:GOSUB 430
510 TIMER ON
520 IF S1<>0 THEN I=3:GOTO 560
530 N$=INKEY$:IF N$="" THEN COLOR 11,0:LOCATE 25,2:PRINT DATE$;" ";TIME$;:GOTO 5
20
540 TIMER OFF
550 IF ASC(N$)<>13 AND ASC(N$)<>27 THEN 680
560 COLOR 0,0:LOCATE 3,2:PRINT SPACE$(78)
570 COLOR 0,3:LOCATE 3,22:PRINT O1$(I)
580 ON I GOTO 680,590,600,610,620,630,640,650,660
590 CHAIN "ba001a"
600 CHAIN "ba010"
610 CHAIN "ba001b"
620 CHAIN "ba001c"
630 CHAIN "ba001d"
640 GOSUB 840:NEW
650 GOSUB 840:SYSTEM
660 CHAIN "access"
670 '
680 COLOR 11,0:GOSUB 430
690 IF ASC(N$)<=64 OR ASC(N$)>=123 THEN 780
700 FOR J=I+1 TO C
710 IF O1$(J)="" THEN 730
720 IF N$=MID$(O1$(J),3,1) OR ASC(N$)-32=ASC(MID$(O1$(J),3,1)) THEN I=J-1:GOTO 8
10
```

```
730 NEXT J
740 FOR J=1 TO I
750 IF O1$(J)="" THEN 770
760 IF N$=MID$(O1$(J),3,1) OR ASC(N$)-32=ASC(MID$(O1$(J),3,1)) THEN I=J-1:GOTO 8
10
770 NEXT J
780 IF ASC(N$)=8 OR ASC(N$)=56 OR ASC(N$)=57 THEN I=I-2:IF I<0 THEN I=C-1
790 IF ASC(N$)=49 THEN I=C-1
800 IF ASC(N$)=55 THEN I=1
810 NEXT I
820 GOTO 470
830 '
840 CLOSE #4:COLOR 11,0,9:CLS:KEY ON:LOCATE ,,1,0,7:RETURN
850 END

10 'Copyright 1985 Badger Meter, Inc. - Engineering Division *** Program Name -
bm001a *** Date 01-17-1986
20 'Author D.Wachs       \ - load "bm001a"
30 'Automatic Meter Reading - AMR System Maintenance Menu
40 '
50 COMMON PGM$,O2$(),F1$(),T$()
60 DIM O1$(17):C=17
70 '
80 ON TIMER(120) GOSUB 90:GOTO 110
90 E1=1:RETURN
100 '
110 ON ERROR GOTO 120:GOTO 310
120 IF ERR=57 OR ERR=69 THEN RESUME
130 IF ERR=15 THEN N1$="":RESUME
140 COLOR 25,0:LOCATE 4,7:PRINT "Error";ERR:STOP
150 '
160 DATA "     ** System Maintenance Menu **          "
170 DATA " Customer Account Maintenance                "
180 DATA " Utility Telephone Number                    "
190 DATA " Access Plus Programing & Startup            "
200 DATA " Demand Meter Reading                       ",""
210 DATA "    ** Time of Day & Peak Rate Usage **     "
220 DATA " Time of Day & Peak Rate Exemption Days      "
230 DATA " Time of Day Usage                           "
240 DATA " Peak Rate Usage                            ",""
250 DATA "          **     Main Menu      **          "
260 DATA " Return To Main Menu                         "
270 DATA " Meter Reading                               "
280 DATA " CRT Report Generator                        "
290 DATA " Printer Report Generator                    "
300 DATA " Program Utitities                           "
310 FOR I=1 TO C:READ O1$(I):NEXT I:N$=" "
320 '
330 COLOR 9,0,9
340 LOCATE 2,1:PRINT STRING$(80,205)
350 LOCATE 4,1:PRINT STRING$(80,205)
360 LOCATE 24,2:PRINT STRING$(19,205);CHR$(203);STRING$(13,205);CHR$(203);STRING
$(29,205);CHR$(203);STRING$(14,205);
370 LOCATE 25,21:PRINT CHR$(186);:LOCATE 25,35:PRINT CHR$(186);:LOCATE 25,65:PRI
NT CHR$(186);
380 COLOR 0,0:LOCATE 3,2,0:PRINT SPACE$(78)
390 COLOR 9,0:LOCATE 1,1:PRINT "BM001A "
400 COLOR 11,0:LOCATE 25,2:PRINT DATE$;" ";TIME$;
410 COLOR 15,0:LOCATE 1,8:PRINT "         *** Access Plus System Maintenance
Menu ***        "
420 COLOR 14,0:LOCATE 3,9:PRINT " Press Any Key To Scan For Desired Line. Press
ESC or Enter. "
```

```
430 '
440 COLOR 30,0:LOCATE 25,66:PRINT " * Scan Mode *";
450 COLOR 12,0:FOR I=5 TO 23:LOCATE I,1:PRINT SPACE$(80);:NEXT I
460 FOR I=1 TO C
470 IF INSTR(O1$(I),"*")=0 THEN COLOR 11,0 ELSE COLOR 14,1
480 GOSUB 490:GOTO 510
490 LOCATE 5+I,19
500 PRINT O1$(I):RETURN
510 NEXT I
520 '
530 FOR I=1 TO C
540 IF O1$(I)="" THEN 790
550 IF INSTR(O1$(I),"*")<>0 THEN 790
560 COLOR 16,3:GOSUB 490
570 TIMER ON
580 IF S1<>0 THEN I=14:GOTO 620
590 N$=INKEY$:IF N$="" THEN COLOR 11,0:LOCATE 25,2:PRINT DATE$;" ";TIME$;:GOTO 580
600 TIMER OFF
610 IF ASC(N$)<>13 AND ASC(N$)<>27 THEN 780
620 COLOR 0,0:LOCATE 3,2:PRINT SPACE$(78)
630 COLOR 0,3:LOCATE 3,19:PRINT O1$(I)
640 ON I GOTO 780,650,660,670,680,780,780,690,700,710,780,780,720,730,740,750,760
650 CHAIN "ba005"
660 CHAIN "ba002"
670 CHAIN "ba016"
680 CHAIN "ba017"
690 CHAIN "ba004"
700 CHAIN "ba011"
710 CHAIN "ba012"
720 CHAIN "ba001"
730 CHAIN "ba018"
740 CHAIN "ba001b"
750 CHAIN "ba001c"
760 CHAIN "ba001d"
770 '
780 COLOR 11,0:GOSUB 490
790 IF ASC(N$)<=64 OR ASC(N$)>=123 THEN 880
800 FOR J=I+1 TO C
810 IF O1$(J)="" THEN 830
820 IF N$=MID$(O1$(J),3,1) OR ASC(N$)-32=ASC(MID$(O1$(J),3,1)) THEN I=J-1:GOTO 910
830 NEXT J
840 FOR J=1 TO I
850 IF O1$(J)="" THEN 870
860 IF N$=MID$(O1$(J),3,1) OR ASC(N$)-32=ASC(MID$(O1$(J),3,1)) THEN I=J-1:GOTO 910
870 NEXT J
880 IF ASC(N$)=8 OR ASC(N$)=56 OR ASC(N$)=57 THEN I=I-2:IF I<0 THEN I=C-1
890 IF ASC(N$)=49 THEN I=C-1
900 IF ASC(N$)=55 THEN I=1
910 NEXT I
920 GOTO 530
930 '
940 END 10 'Copyright 1985 Badger Meter, Inc. - Engineering Division * Program Name - ba001b * Date 01-17-1986
20 'Author D.Wachs     \ - load "ba001b"
30 'Automatic Meter Reading - CRT Report Generator Menu
40 '
```

```
50 COMMON FGM$,O2$(),F1$(),T$()
60 DIM O1$(17):C=17
70 '
80 ON TIMER(120) GOSUB 90:GOTO 110
90 S1=1:RETURN
100 '
110 ON ERROR GOTO 120:GOTO 320
120 IF ERR=57 OR ERR=69 THEN RESUME
130 IF ERR=15 THEN N1$="":RESUME
140 COLOR 25,0:LOCATE 4,7:PRINT "Error";ERR:STOP
150 '
160 DATA "    ** CRT Report Generator   **      "
170 DATA " Individual Customer Account           "
180 DATA " Scan All Customer Accounts            "
190 DATA " Scan Key Fields - Customer Accounts   "
200 DATA " Date & Time Management Percent of Load "
210 DATA " Delinquent Call Backs                 "
220 DATA " Utility Telephone Number              "
230 DATA " Time of Day & Peak Rate Exemption Days "
240 DATA " Time of Day Usage                     "
250 DATA " Peak Rate Usage                       ",""
260 DATA "         **      Main Menu       **    "
270 DATA " Return To Main Menu                   "
280 DATA " Meter Reading                         "
290 DATA " System Maintenance                    "
300 DATA " Printer Report Generator              "
310 DATA " Program Utilities
320 FOR I=1 TO C:READ O1$(I):NEXT I:N$=" "
330 '
340 COLOR 9,0,9
350 LOCATE 2,1:PRINT STRING$(80,205)
360 LOCATE 4,1:PRINT STRING$(80,205)
370 LOCATE 24,2:PRINT STRING$(19,205);CHR$(203);STRING$(13,205);CHR$(203);STRING
$(29,205);CHR$(203);STRING$(14,205);
380 LOCATE 25,21:PRINT CHR$(186);:LOCATE 25,35:PRINT CHR$(186);:LOCATE 25,65:PRI
NT CHR$(186);
390 COLOR 0,0:LOCATE 3,2,0:PRINT SPACE$(78)
400 COLOR 9,0:LOCATE 1,1:PRINT "SM001B "
410 COLOR 11,0:LOCATE 25,2:PRINT DATE$;" ";TIME$;
420 COLOR 15,0:LOCATE 1,6:PRINT "           *** Access Plus CRT Report Generato
r ***            "
430 COLOR 14,0:LOCATE 3,9:PRINT " Press Any Key To Scan For Desired Line, Press
 ESC or Enter. "
440 '
450 COLOR 30,0:LOCATE 25,66:PRINT " * Scan Mode *";
460 COLOR 12,0:FOR I=5 TO 23:LOCATE I,1:PRINT SPACE$(80);:NEXT I
470 FOR I=1 TO C
480 IF INSTR(O1$(I),"*")=0 THEN COLOR 11,0 ELSE COLOR 14,1
490 GOSUB 500:GOTO 520
500 LOCATE 5+I,19
510 PRINT O1$(I):RETURN
520 NEXT I
530 '
540 FOR I=1 TO C
550 IF O1$(I)="" THEN 820
560 IF INSTR(O1$(I),"*")<>0 THEN 820
570 COLOR 16,3:GOSUB 500
580 TIMER ON
590 IF S1<>0 THEN I=14:GOTO 630
600 N$=INKEY$:IF N$="" THEN COLOR 11,0:LOCATE 25,2:PRINT DATE$;" ";TIME$;:GOTO 5
90
```

```
610 TIMER OFF
620 IF ASC(N$)<>13 AND ASC(N$)<>27 THEN 610
630 COLOR 0,0:LOCATE 3,2:PRINT SPACE$(78)
640 COLOR 0,3:LOCATE 3,19:PRINT O1$(I)
650 ON I GOTO 810,660,670,680,690,700,710,720,730,740,810,810,750,760,770,780,79
0
660 CHAIN "ba007"
670 CHAIN "ba007a"
680 CHAIN "ba009"
690 CHAIN "ba016b"
700 CHAIN "ba020"
710 CHAIN "ba002a"
720 CHAIN "ba004a"
730 CHAIN "ba011a"
740 CHAIN "ba012a"
750 CHAIN "ba001"
760 CHAIN "ba018"
770 CHAIN "ba001a"
780 CHAIN "ba001c"
790 CHAIN "ba001d"
800 '
810 COLOR 11,0:GOSUB 500
820 IF ASC(N$)<=64 OR ASC(N$)>=123 THEN 910
830 FOR J=I+1 TO C
840 IF O1$(J)="" THEN 860
850 IF N$=MID$(O1$(J),3,1) OR ASC(N$)-32=ASC(MID$(O1$(J),3,1)) THEN I=J-1:GOTO 9
40
860 NEXT J
870 FOR J=1 TO I
880 IF O1$(J)="" THEN 900
890 IF N$=MID$(O1$(J),3,1) OR ASC(N$)-32=ASC(MID$(O1$(J),3,1)) THEN I=J-1:GOTO 9
40
900 NEXT J
910 IF ASC(N$)=8 OR ASC(N$)=56 OR ASC(N$)=57 THEN I=I-2:IF I<0 THEN I=C-1
920 IF ASC(N$)=49 THEN I=C-1
930 IF ASC(N$)=55 THEN I=1
940 NEXT I
950 GOTO 540
960 '
970 END
10 'Copyright 1985 Badger Meter, Inc. - Engineering Division *** Program Name -
ba001c *** Date 01-17-1986
20 'Author D.Wachs        \ - load "ba001c"
30 'Automatic Meter Reading - Printer Report Generator Menu
40 '
50 COMMON PGM$,O2$(),F1$(),T$()
60 DIM O1$(19):C=19
70 '
80 ON TIMER(120) GOSUB 90:GOTO 110
90 S1=1:RETURN
100 '
110 ON ERROR GOTO 120:GOTO 350
120 IF ERR=57 OR ERR=69 THEN RESUME
130 IF ERR=15 THEN N1$="":RESUME
140 COLOR 28,0:LOCATE 4,7:PRINT "Error";ERR:STOP
150 '
160 DATA "    ** Printer Report Generator **       "
170 DATA " Individual Customer Account              "
180 DATA " All Customer Accounts                    "
190 DATA " Scan Key Fields - Customer Accounts      "
200 DATA " Sort Key Fields - Customer Accounts      "
```

```
210 DATA " Call Back Date & Time Management        "
220 DATA " Call Back Date & Time Management Sort   "
230 DATA " Delinquent Call Backs                   "
240 DATA " Alarm / Status & Leak Indicator Sort    "
250 DATA " Utility Telephone Number                "
260 DATA " Time of Day & Peak Rate Exemption Days  "
270 DATA " Time of Day Usage                       "
280 DATA " Peak Rate Usage                         "
290 DATA "        **   Main Menu    **             "
300 DATA " Return To Main Menu                     "
310 DATA " Meter Reading                           "
320 DATA " System Maintenance                      "
330 DATA " CRT Report Generator                    "
340 DATA " Program Utilities                       "
350 FOR I=1 TO C:READ O1$(I)::NEXT I:N$=" "
360 '
370 COLOR 9,0,9
380 LOCATE 2,1:PRINT STRING$(80,205)
390 LOCATE 4,1:PRINT STRING$(80,205)
400 LOCATE 24,2:PRINT STRING$(19,205);CHR$(203);STRING$(13,205);CHR$(203);STRING$(29,205);CHR$(203);STRING$(14,205);
410 LOCATE 25,21:PRINT CHR$(186);:LOCATE 25,35:PRINT CHR$(186);:LOCATE 25,65:PRINT CHR$(186);
420 COLOR 0,0:LOCATE 3,2,0:PRINT SPACE$(78)
430 COLOR 9,0:LOCATE 1,1:PRINT "BM001C "
440 COLOR 11,0:LOCATE 25,2:PRINT DATE$;" ";TIME$;
450 COLOR 15,0:LOCATE 1,8:PRINT "         *** Access Plus Printer Report Generator ***"
460 COLOR 14,0:LOCATE 3,9:PRINT " Press Any Key To Scan For Desired Line, Press ESC or Enter. "
470 '
480 COLOR 30,0:LOCATE 25,66:PRINT " * Scan Mode *";
490 COLOR 12,0:FOR I=5 TO 23:LOCATE I,1:PRINT SPACE$(80);:NEXT I
500 FOR I=1 TO C
510 IF INSTR(O1$(I),"*")=0 THEN COLOR 11,0 ELSE COLOR 14,1
520 GOSUB 530:GOTO 550
530 LOCATE 4+I,1:
540 PRINT O1$(I):RETURN
550 NEXT I
560 '
570 FOR I=1 TO C
580 IF O1$(I)="" THEN 880
590 IF INSTR(O1$(I),"*")<>0 THEN 880
600 COLOR 16,3:GOSUB 530
610 TIMER ON
620 IF S1<>0 THEN I=16:GOTO 660
630 N$=INKEY$:IF N$="" THEN COLOR 11,0:LOCATE 25,2:PRINT DATE$;" ";TIME$;:GOTO 620
640 TIMER OFF
650 IF ASC(N$)<>13 AND ASC(N$)<>27 THEN 870
660 COLOR 0,0:LOCATE 3,2:PRINT SPACE$(78)
670 COLOR 0,3:LOCATE 3,19:PRINT O1$(I)
680 ON I GOTO 870,690,700,710,720,730,740,750,760,770,780,790,800,870,810,820,830,840,850
690 CHAIN "bm009"
700 CHAIN "bm008a"
710 CHAIN "bm010"
720 CHAIN "bm019"
730 CHAIN "bm016a"
740 CHAIN "bm014"
750 CHAIN "bm020a"
```

```
760 CHAIN "ba014a"
770 CHAIN "ba002b"
780 CHAIN "ba004b"
790 CHAIN "ba011b"
800 CHAIN "ba012b"
810 CHAIN "ba001"
820 CHAIN "ba018"
830 CHAIN "ba001a"
840 CHAIN "ba001b"
850 CHAIN "ba001d"
860 '
870 COLOR 11,0:GOSUB 530
880 IF ASC(N$)<=64 OR ASC(N$)>=123 THEN 970
890 FOR J=I+1 TO C
900 IF O1$(J)="" THEN 920
910 IF N$=MID$(O1$(J),3,1) OR ASC(N$)-32=ASC(MID$(O1$(J),3,1)) THEN I=J-1:GOTO 1
000
920 NEXT J
930 FOR J=1 TO I
940 IF O1$(J)="" THEN 960
950 IF N$=MID$(O1$(J),3,1) OR ASC(N$)-32=ASC(MID$(O1$(J),3,1)) THEN I=J-1:GOTO 1
000
960 NEXT J
970 IF ASC(N$)=8 OR ASC(N$)=56 OR ASC(N$)=57 THEN I=I-2:IF I<0 THEN I=C-1
980 IF ASC(N$)=49 THEN I=C-1
990 IF ASC(N$)=55 THEN I=1
1000 NEXT I
1010 GOTO 570
1020 '
1030 END
10 'Copyright 1985 Badger Meter, Inc. - Engineering Division *** Program Name -
ba001d *** Date 01-17-1986
20 'Author D.Wachs      \ - load "ba001d"
30 'Automatic Meter Reading - Program Utilities Menu
40 '
50 COMMON PGM$,O2$(),F1$(),T$()
60 DIM O1$(16):C=16
70 '
80 ON TIMER(120) GOSUB 90:GOTO 110
90 S!=1:RETURN
100 '
110 ON ERROR GOTO 120:GOTO 310
120 IF ERR=57 OR ERR=69 THEN RESUME
130 IF ERR=15 THEN N1$="":RESUME
140 COLOR 28,0:LOCATE 4,7:PRINT "Error";ERR:STOP
150 '
160 DATA "      **  Program Utilities    **        "
170 DATA " Printer Setup For PGM Listings          "
180 DATA " Set Date & Time                         "
190 DATA " Qic - 60 Tape Backup Utility            "
200 DATA " Pc to Mainframe Customer Account Transfer "
210 DATA " Mainframe to Pc Customer Account Transfer "
220 DATA " Call Collection Module Diagnostics      "
230 DATA " Crosstalk XVI                           "
240 DATA " IBM Videotex                            ",""
250 DATA "      **     Main Menu     **            "
260 DATA " Return To Main Menu                     "
270 DATA " Meter Reading                           "
280 DATA " System Maintenance                      "
290 DATA " CRT Report Generator                    "
300 DATA " Printer Report Generator                "
```

```
310 FOR I=1 TO C:READ O1$(I):NEXT I:N$=" "
320 '
330 COLOR 9,0,9
340 LOCATE 2,1:PRINT STRING$(80,205)
350 LOCATE 4,1:PRINT STRING$(80,205)
360 LOCATE 24,2:PRINT STRING$(19,205);CHR$(203);STRING$(13,205);CHR$(203);STRING
$(29,205);CHR$(203);STRING$(14,205);
370 LOCATE 25,21:PRINT CHR$(186);:LOCATE 25,35:PRINT CHR$(186);:LOCATE 25,65:PRI
NT CHR$(186);
380 COLOR 0,0:LOCATE 3,2,0:PRINT SPACE$(78)
390 COLOR 9,0:LOCATE 1,1:PRINT "BM001 "
400 COLOR 11,0:LOCATE 25,2:PRINT DATE$;" ";TIME$;
410 COLOR 15,2:LOCATE 1,8:PRINT "          *** Access Plus Program Utilities Me
nu ***               "
420 COLOR 14,0:LOCATE 3,9:PRINT " Press Any Key To Scan For Desired Line, Press
 ESC or Enter. "
430 '
440 COLOR 30,0:LOCATE 25,66:PRINT " * Scan Mode *";
450 COLOR 12,0:FOR I=5 TO 23:LOCATE I,1:PRINT SPACE$(80);:NEXT I
460 FOR I=1 TO C
470 IF INSTR(O1$(I),"*")=0 THEN COLOR 11,0 ELSE COLOR 14,1
480 GOSUB 490:GOTO 510
490 LOCATE 5+I,19
500 PRINT O1$(I):RETURN
510 NEXT I
520 '
530 FOR I=1 TO C
540 IF O1$(I)="" THEN 800
550 IF INSTR(O1$(I),"*")<>0 THEN 800
560 COLOR 16,3:GOSUB 490
570 TIMER ON
580 IF S1<>0 THEN I=13:GOTO 620
590 N$=INKEY$:IF N$="" THEN COLOR 11,0:LOCATE 25,2:PRINT DATE$;" ";TIME$;:GOTO 5
90
600 TIMER OFF
610 IF ASC(N$)<>13 AND ASC(N$)<>27 THEN 790
620 COLOR 0,0:LOCATE 3,2:PRINT SPACE$(78)
630 COLOR 0,3:LOCATE 3,19:PRINT O1$(I)
640 ON I GOTO 790,650,660,670,680,690,700,710,720,770,790,730,740,750,760,770
650 CHAIN "lprint"
660 CHAIN "ba003"
670 OPEN "R",#1,"tape.dat",1:CLOSE #1,#4:SYSTEM
680 CHAIN "ba015"
690 CHAIN "ba015a"
700 CHAIN "ba015d"
710 OPEN "R",#1,"xtalk.dat",1:CLOSE #1,#4:SYSTEM
720 OPEN "R",#1,"video.dat",1:CLOSE #1,#4:SYSTEM
730 CHAIN "ba001"
740 CHAIN "ba018"
750 CHAIN "ba001a"
760 CHAIN "ba001b"
770 CHAIN "ba001c"
780 '
790 COLOR 11,0:GOSUB 490
800 IF ASC(N$)<=64 OR ASC(N$)>=123 THEN 890
810 FOR J=I+1 TO C
820 IF O1$(J)="" THEN 840
830 IF N$=MID$(O1$(J),3,1) OR ASC(N$)-32=ASC(MID$(O1$(J),3,1)) THEN I=J-1:GOTO 9
20
840 NEXT J
850 FOR J=1 TO I
```

```
860 IF O1$(J)="" THEN 880
870 IF N$=MID$(O1$(J),3,1) OR ASC(N$)-32=ASC(MID$(O1$(J),3,1)) THEN I=J-1:GOTO 9
20
880 NEXT J
890 IF ASC(N$)=8 OR ASC(N$)=56 OR ASC(N$)=57 THEN I=I-2:IF I<0 THEN I=C-1
900 IF ASC(N$)=49 THEN I=C-1
910 IF ASC(N$)=55 THEN I=1
920 NEXT I
930 GOTO 530
940 '
950 '
960 END
10 'Copyright 1985 Badger Meter, Inc. - Engineering Division *** Program Name -
bm002 *** Date 07-11-1985
20 'Author D.Wachs         \ - load "bm002"
30 'Automatic Meter Reading - Utility AMR Telephone Number Setup
40 '
50 COMMON PGM$,O2$(),F1$(),T$()
60 DIM P3$(4),O3$(4),B$(4)
70 '
80 ON TIMER(620) GOSUB 90:GOTO 110
90 S1=1:RETURN
100 '
110 OPEN "R",#1,"uphone.dat",11:FIELD #1,11 AS F1$
120 '
130 DATA "Utility Telephone Number:...............? _____"
140 DATA "# of Phone Lines In Rotor System:.......? _"
150 DATA "# of Phone Lines - Daily & Weekly:......? _"
160 DATA "# of Phone Lines - Monthly & Quarterly:.? _"
170 FOR I=1 TO 4:READ P3$(I):NEXT I
180 '
190 COLOR 9,0:LOCATE 1,1:PRINT "BM002 "
200 COLOR 11,0:LOCATE 25,2:PRINT DATE$;" ";TIME$:
210 COLOR 15,0:LOCATE 1,8:PRINT "       *** Access Plus Utility Telephone Numbe
r Setup ***                  "
220 COLOR 14,0:LOCATE 3,2:PRINT "          Scan To Desired Line. Press Enter T
o Edit. Esc To End.    "
230 '
240 COLOR 12,0:FOR I=5 TO 23:LOCATE I,1:PRINT SPACE$(80);:NEXT I
250 COLOR 3,0
260 LOCATE 8,10:PRINT CHR$(213);STRING$(58,205);CHR$(184)
270 FOR Z=9 TO 18:LOCATE Z,10:PRINT CHR$(179):LOCATE Z,69:PRINT CHR$(179):NEXT Z
280 LOCATE 18,10:PRINT CHR$(212);STRING$(58,205);CHR$(190)
290 FOR J=1 TO 4
300 GET #1,J:O3$(J)=F1$
310 IF J>1 THEN 330
320 IF O3$(J)="" OR O3$(J)=STRING$(11,32) OR O3$(J)=STRING$(11,0) THEN O3$(J)=ST
RING$(11,95):GOTO 340
330 IF O3$(J)="" OR O3$(J)=STRING$(11,32) OR O3$(J)=STRING$(11,0) THEN O3$(J)=ST
RING$(1,95)
340 NEXT J
350 COLOR 11,0:FOR J=1 TO 4:LOCATE 8+J*2,14:PRINT P3$(J):COLOR 11,0:LOCATE 8+J*2
,56:PRINT O3$(J):NEXT J
360 '
370 '    Scan Mode
380 '
390 FOR J=1 TO 4
400 COLOR 30,0:LOCATE 25,66:PRINT " * Scan Mode *";
410 COLOR 16,3:LOCATE 8+J*2,14:PRINT MID$(P3$(J),1,41)
420 TIMER ON
```

```
970 PRINT #4,"PARAM PHONE=";O3$(1)
980 ON TIMER(5) GOSUB 990:GOTO 1000
990 BEEP:COLOR 14,0:LOCATE 25,36:PRINT "   * Phone Error In CCM *   ";:TIMER OFF:S1=1:RETURN
1000 TIMER ON:S1=0:N1$=""
1010 IF S1<>0 THEN 1050
1020 IF EOF(4) THEN 1010 ELSE N$=INPUT$(LOC(4),#4):N1$=N1$+N$
1030 IF INSTR(N1$,CHR$(13))=0 THEN 1010
1040 IF INSTR(N1$,"OK")=0 THEN GOSUB 990
1050 TIMER OFF:S1=0
1060 '
1070 '    Clear Date & Time Management
1080 '
1090 IF S2=0 THEN 1140
1100 OPEN "R",#2,"dta1.dat",8:FIELD #2,8 AS DA$
1110 LSET DA$=STRING$(7,"-")+"Y"
1120 FOR I=2161 TO 2162:PUT #2,I:NEXT I:CLOSE #2
1130 '
1140 IF S3=0 THEN 1190
1150 OPEN "R",#2,"dta2.dat",29:FIELD #2,29 AS DA$
1160 LSET DA$=STRING$(28,"-")+"Y"
1170 FOR I=2161 TO 2162:PUT #2,I:NEXT I:CLOSE #2
1180 '
1190 COLOR 0,0:CHAIN "bm001a"
1200 END
10 'Copyright 1985 Badger Meter, Inc. - Engineering Division *** Program Name - bm002a *** Date 12-05-1985
20 'Author D.Wachs      \ - load "bm002a"
30 'Automatic Meter Reading - Utility AMR Telephone Number Setup Print - CRT
40 '
50 COMMON F5M$,O2$(),F1$(),T$()
60 DIM P3$(4),O3$(4),B$(4)
70 '
80 ON TIMER(600) GOSUB 90:GOTO 110
90 S1=1:RETURN
100 '
110 OPEN "R",#1,"uphone.dat",11:FIELD #1,11 AS P1$
120 '
130 DATA "Utility Telephone Number:..............? _____"
140 DATA "# of Phone Lines In Rotor System:.......? _"
150 DATA "# of Phone Lines - Daily & Weekly:......? _"
160 DATA "# of Phone Lines - Monthly & Quarterly:.? _"
170 FOR I=1 TO 4:READ P3$(I):NEXT I
180 '
190 COLOR 9,0:LOCATE 1,1:PRINT "BM002A"
200 COLOR 11,0:LOCATE 25,2:PRINT DATE$;" ";TIME$;
210 COLOR 15,0:LOCATE 1,8:PRINT "        *** Access Plus Utility Telephone Number ***  "
220 COLOR 14,0:LOCATE 3,2:PRINT "                              Press Esc To End  "
230 '
240 COLOR 12,0:FOR I=5 TO 23:LOCATE I,1:PRINT SPACE$(80);:NEXT I
250 COLOR 3,0
260 LOCATE 8,10:PRINT CHR$(213);STRING$(58,205);CHR$(184)
270 FOR Z=9 TO 18:LOCATE Z,10:PRINT CHR$(179):LOCATE Z,69:PRINT CHR$(179):NEXT Z
280 LOCATE 18,10:PRINT CHR$(212);STRING$(58,205);CHR$(190)
290 FOR J=1 TO 4
300 GET #1,J:O3$(J)=P1$:IF O3$(J)="" OR O3$(J)=STRING$(11,32) OR O3$(J)=STRING$(11,0) THEN O3$(J)=STRING$(11,95)
310 COLOR 11,0:LOCATE 8+J*2,14:PRINT P3$(J):COLOR 11,0:LOCATE 8+J*2,56:PRINT O3$
```

```
430 IF S1<>0 THEN 960
440 N$=INKEY$:IF N$="" THEN COLOR 11,0:LOCATE 25,2:PRINT DATE$;" ";TIME$;:GOTO 4
30
450 TIMER OFF
460 IF ASC(N$)=27 THEN 930
470 IF ASC(N$)=13 THEN GOSUB 640:GOTO 590
480 COLOR 11,0:LOCATE 8+J*2,14:PRINT MID$(P3$(J),1,41)
490 IF ASC(N$)<=64 OR ASC(N$)=123 THEN 560
500 FOR K=J+1 TO 2
510 IF N$=MID$(P3$(K),1,1) OR ASC(N$)-32=ASC(MID$(P3$(K),1,1)) THEN J=K-1:GOTO 5
90
520 NEXT K
530 FOR K=1 TO J
540 IF N$=MID$(P3$(K),1,1) OR ASC(N$)-32=ASC(MID$(P3$(K),1,1)) THEN J=K-1:GOTO 5
90
550 NEXT K
560 IF ASC(N$)=9 OR ASC(N$)=56 OR ASC(N$)=57 THEN J=J-2:IF J<0 THEN J=3
570 IF ASC(N$)=49 THEN J=3
580 IF ASC(N$)=55 THEN J=0
590 NEXT J
600 GOTO 390
610 '
620 '    Edit Mode
630 '
640 COLOR 26,0:LOCATE 25,66:PRINT " * Edit Mode *";
650 X=LEN(P3$(J)):Y=INSTR(P3$(J),CHR$(95)):Z=X-Y+1
660 Y=INSTR(P3$(J),CHR$(56))
670 COLOR 10,0:LOCATE 8+J*2,14:PRINT MID$(P3$(J),1,41);MID$(P3$(J),42,Z+1)
680 IF MID$(P3$(J),43+C,1)<>"_" AND MID$(P3$(J),43+C,1)<>"" THEN N$=MID$(P3$(J),
43+C,1):GOTO 820
690 LOCATE 8+J*2,56-C,1,0,7
700 N$=INKEY$:IF N$="" THEN 700
710 IF ASC(N$)=13 OR ASC(N$)=27 THEN 850
720 IF ASC(N$)<>8 THEN 770
730 IF C=0 THEN 700
740 C=C-1:IF C<0 THEN C=0 ELSE N1$=MID$(N1$,1,C)
750 IF MID$(P3$(J),43+C,1)<>"_" AND MID$(P3$(J),43+C,1)<>"" THEN C=C-1:IF C<0 TH
EN C=0 ELSE N1$=MID$(N1$,1,C)
760 GOTO 630
770 IF ASC(N$)<32 OR ASC(N$)>126 THEN BEEP:GOTO 700
780 IF LEN(N1$)=Z THEN BEEP:GOTO 690
790 IF Y=0 THEN 820
800 IF N$=" " OR N$="." THEN 820
810 IF ASC(N$)<48 OR ASC(N$)>57 THEN BEEP:GOTO 830
820 N1$=MID$(N1$,1,C)+N$:C=C+1
830 COLOR 10,0:LOCATE 8+J*2,56,0:PRINT N1$;MID$(P3$(J),43+C,Z-C)
840 GOTO 660
850 IF N1$="" THEN 890
860 D3$(J)=N1$+STRING$(Z-LEN(N1$)," ")
870 IF J=3 THEN S2=1
880 IF J=4 THEN S3=1
890 COLOR 11,0:LOCATE 8+J*2,14,0:PRINT P3$(J):LOCATE 8+J*2,56:PRINT-D3$(J)
900 N1$="":C=0
910 RETURN
920 '
930 IF VAL(D3$(2))=VAL(D3$(3))+VAL(D3$(4)) THEN 940 ELSE BEEP:COLOR 14,4:LOCATE
6,24:PRINT " Error In Phone Line Allocation! ":COLOR 11,0:FOR J=1 TO 4:LOCATE 8+
J*2,14:PRINT MID$(P3$(J),1,41):NEXT J:GOTO 390
940 COLOR 0,0:LOCATE 6,24:PRINT STRING$(33,32)
950 FOR I=1 TO 4:LSET F1$=D3$(I):PUT #1,1:NEXT I:CLOSE #1
960 '
```

```
(J)
320 NEXT J:CLOSE #1
330 '
340 TIMER ON
350 IF S1<>0 THEN 390
360 N$=INKEY$:IF N$="" THEN COLOR 11,0:LOCATE 25,2:PRINT DATE$;" ";TIME$;:GOTO 350
370 TIMER OFF
380 IF ASC(N$)=27 THEN 400 ELSE 350
390 '
400 COLOR 0,0:CHAIN "ba001b"
410 END
10 'Copyright 1985 Badger Meter, Inc. - Engineering Division *** Program Name -
ba002b *** Date 12-05-1985
20 'Author D.Wachs        \ - load "ba002b"
30 'Automatic Meter Reading - Utility AMR Telephone Number Setup Print - Printer
40 '
50 COMMON PGM$,D2$(),F1$(),T$()
60 DIM P3$(4),O3$(4),B$(4)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 5,19:PRINT "   ** Please Turn Li
ne Printer On. **    ":IF S1<>0 THEN 440 ELSE RESUME
140 IF ERR=27 THEN COLOR 30,4:LOCATE 5,19:PRINT "    *** Out of Paper On Line Pri
nter. ***   ":IF S1<>0 THEN 440 ELSE RESUME
150 COLOR 29,0:LOCATE 5,7:PRINT "Error";ERR:STOP
160 '
170 WIDTH "LPT1:",80
180 '
190 OPEN "R",#1,"uphone.dat",11:FIELD #1,11 AS P1$
200 '
210 DATA "Utility Telephone Number:...............?       "
220 DATA "# of Phone Lines In Rotor System:.......?  "
230 DATA "# of Phone Lines - Daily & Weekly:......?  "
240 DATA "# of Phone Lines - Monthly & Quarterly:.?  "
250 FOR I=1 TO 4:READ P3$(I):NEXT I
260 COLOR 9,0:LOCATE 1,1:PRINT "BM002B"
270 '
280 '     Print Line Printer
290 '
300 LPRINT CHR$(18);CHR$(27);CHR$(65);CHR$(12);CHR$(27);CHR$(50)
310 LPRINT CHR$(12);"BM002B";CHR$(14);TAB(17);"Access Plus"
320 LPRINT TAB(23);"Copyright 1986 Badger Meter, Inc."
330 LPRINT TAB(27);"Utility Products Division"
340 LPRINT TAB(27);"as of ";DATE$;" ";TIME$;CHR$(10)
350 LPRINT CHR$(14);TAB(7);"Utility AMR Telephone Number";CHR$(10)
360 LPRINT STRING$(79,240);CHR$(10)
370 '
380 FOR J=1 TO 4
390 GET #1,J:O3$(J)=P1$
400 LPRINT TAB(14);MID$(P3$(J),1,40);" ";O3$(J);CHR$(10)
410 NEXT J
420 LPRINT TAB(27);"<<<< End of Report >>>>"
430 '
440 CLOSE #1:COLOR 0,0:CHAIN "ba001c"
450 END
```

```
10 'Copyright 1985 Badger Meter, Inc. - Engineering Division *** Program Name -
bm003 *** Date 04-23-1986
20 'Author D.Wachs       \ - load "bm003"
30 'Automatic Meter Reading - Set Date & Time
40 '
50 COMMON P6M$,O2$(),F1$(),T$()
60 DIM P3$(2),O3$(2)
70 '
80 ON ERROR GOTO 90:GOTO 130
90 IF ERR=5 AND J=1 THEN BEEP:COLOR 14,4:LOCATE 10,33:PRINT " Invalid Date ":RES
UME 960
100 IF ERR=5 AND J=2 THEN BEEP:COLOR 14,4:LOCATE 10,33:PRINT " Invalid Time ":RE
SUME 960
110 COLOR 28,0:LOCATE 5,7:PRINT "Error";ERR:STOP
120 '
130 DATA "Date:....? __-__-____"
140 DATA "Time:....? __:__:__"
150 FOR I=1 TO 2:READ P3$(I):NEXT I
160 '
170 COLOR 5,0:LOCATE 1,1:PRINT "BM003 "
180 COLOR 11,0:LOCATE 25,2:PRINT DATE$;" ";TIME$;
190 COLOR 15,0:LOCATE 1,9:PRINT "              *** Access Plus Set Date & Time
    *** "
200 COLOR 14,0:LOCATE 3,2:PRINT "           Scan To Desired Line, Press Enter T
o Edit, Esc To End."
210 '
220 COLOR 12,0:FOR I=5 TO 23:LOCATE I,1:PRINT SPACE$(80);:NEXT I
230 COLOR 3,0
240 LOCATE 11,26:PRINT CHR$(213);STRING$(24,205);CHR$(184)
250 FOR Z=12 TO 15:LOCATE Z,26:PRINT CHR$(179):LOCATE Z,51:PRINT CHR$(179):NEXT
Z
260 LOCATE 15,26:PRINT CHR$(212);STRING$(24,205);CHR$(190)
270 O3$(1)=DATE$:O3$(2)=TIME$
280 COLOR 11,0:FOR J=1 TO 2:LOCATE 10+J*2,29:PRINT MID$(P3$(J),1,11):COLOR 11,0:
LOCATE 10+J*2,40:PRINT O3$(J):NEXT J
290 '
300 PRINT #4,"GETTIME"
310 ON TIMER(5) GOSUB 320:GOTO 330
320 BEEP:COLOR 14,0:LOCATE 25,35:PRINT "   * Gettime Error In CCM * ";:TIMER OF
F:S1=1:RETURN
330 TIMER ON:S1=0:N1$=""
340 IF S1<>0 THEN 370
350 IF EOF(4) THEN 340 ELSE N$=INPUT$(LOC(4),#4):N1$=N1$+N$
360 IF INSTR(N1$,CHR$(13))=0 THEN 340
370 TIMER OFF:S1=0:COLOR 14,0:LOCATE 8,13:PRINT "CCM Date:......";MID$(N1$,1,10
):LOCATE 8,40:PRINT "CCM Time:......";MID$(N1$,12,8)
380 '
390 '   Scan Mode
400 '
410 ON TIMER(600) GOSUB 420:GOTO 430
420 S1=1:RETURN
430 FOR J=1 TO 2
440 COLOR 28,0:LOCATE 25,66:PRINT " * Scan Mode *";
450 COLOR 15,0:LOCATE 10+J*2,29:PRINT MID$(P3$(J),1,10)
460 TIMER ON
470 IF S1<>0 THEN 1050
480 N$=INKEY$:IF N$="" THEN COLOR 11,0:LOCATE 25,2:PRINT DATE$;" ";TIME$;:GOTO 4
70
490 TIMER OFF
500 IF ASC(N$)=27 THEN 980
510 IF ASC(N$)=13 THEN GOSUB 660:GOTO 630
520 COLOR 11,0:LOCATE 10+J*2,29:PRINT MID$(P3$(J),1,10)
```

```
590 COLOR 11,0:LOCATE 10+I,27:PRINT O1$(I)
600 FOR J=1 TO 4
610 IF N$=MID$(O1$(J),4,1) OR ASC(N$)-32=ASC(MID$(O1$(J),4,1)) THEN I=J:GOTO 560
620 NEXT J
630 IF ASC(N$)=5 OR ASC(N$)=56 OR ASC(N$)=57 THEN I=I-2:IF I<0 THEN I=3
640 IF ASC(N$)=49 THEN I=0
650 IF ASC(N$)=55 THEN I=0
660 NEXT I
670 GOTO 480
680 '
690 '    Enter Exemption Year
700 '
710 COLOR 11,0:FOR I=11 TO 17:LOCATE I,27:PRINT SPACE$(30):NEXT I
720 COLOR 26,0:LOCATE 25,56:PRINT " * Edit Mode *";
730 COLOR 10,0:LOCATE 3,34:PRINT "Enter Exemption Year? ";:N1$="":C=0
740 LOCATE 3,56-C,1,0,7
750 N$=INKEY$:IF N$="" THEN 750
760 IF ASC(N$)=13 OR ASC(N$)=27 THEN C1=VAL(N1$):N1$="":C=0:GOTO 830
770 IF ASC(N$)=5 AND C=0 THEN 750
780 IF ASC(N$)=8 THEN LOCATE 3,POS(0)-1:PRINT " ":C=C-1:IF C<0 THEN C=0 ELSE N1$
=MID$(N1$,1,C):GOTO 820
790 IF ASC(N$)<48 OR ASC(N$)>57 THEN BEEP:GOTO 750
800 IF LEN(N1$)>3 THEN BEEP:GOTO 750
810 N1$=MID$(N1$,1,C)+N$:C=C+1
820 COLOR 12,0:LOCATE 3,56,0:PRINT N1$:GOTO 740
830 LOCATE ,,0
840 IF C1=0 THEN 440
850 IF C1>=1985 AND C1<=2100 THEN 940
860 COLOR 14,4:LOCATE 3,34:BEEP:PRINT " Error Invalid Exemption Year 1985-2100 O
nly"
870 GOSUB 890:GOTO 730
880 '
890 FOR J=1 TO 5000:NEXT J:COLOR 10,0:LOCATE 3,34:PRINT SPACE$(46)
900 RETURN
910 '
920 '    Read Disk File & Check Account Number
930 '
940 GET #3,C1-1984
950 IF ASC(MID$(B$,1,1))=89 AND I=1 THEN COLOR 14,4:LOCATE 3,34:BEEP:PRINT " Err
or Exemption Year All Ready On File! ":GOSUB 890:GOTO 730
960 IF ASC(MID$(B$,1,1))<>89 AND I>1 THEN COLOR 14,4:LOCATE 3,34:BEEP:PRINT " E
rror Exemption Year Not On File! ":GOSUB 890:GOTO 730
970 ON I GOTO 1030,960,990
980 K=0:FOR J=1 TO 216 STEP 18:K=K+1:O3$(K)=MID$(B$,J+1,17):NEXT J:GOTO 1030
990 LSET B$=CHR$(18):GOTO 1770
1000 '
1010 '    Add & Change
1020 '
1030 COLOR 14,0:LOCATE 3,2:PRINT "           Scan To Desired Line. Press Enter
To Edit, Esc To End."
1040 COLOR 14,1:LOCATE 6,28:PRINT USING " Exemption Year ---- #### ";C1
1050 LOCATE 8,11:PRINT "      Month            Days         "
1060 FOR J=1 TO 12
1070 COLOR 11,0
1080 X=INSTR(O3$(J),"*"):IF X<>0 THEN COLOR 14,1
1090 LOCATE 8+J,22:PRINT M$(J):LOCATE 8+J,42:PRINT O3$(J):S2(I)=0
1100 NEXT J
1110 IF C1/4=INT(C1/4) THEN MO(2)=26 ELSE MO(2)=29
1120 '
1130 '    Scan Mode
1140 '
1150 FOR J=1 TO 12
```

```
530 IF ASC(N$)<=64 OR ASC(N$)=123 THEN 600
540 FOR K=J+1 TO 2
550 IF N$=MID$(P3$(K),1,1) OR ASC(N$)-32=ASC(MID$(P3$(K),1,1)) THEN J=K-1:GOTO 6
30
560 NEXT K
570 FOR K=1 TO J
580 IF N$=MID$(P3$(K),1,1) OR ASC(N$)-32=ASC(MID$(P3$(K),1,1)) THEN J=K-1:GOTO 6
30
590 NEXT K
600 IF ASC(N$)=5 OR ASC(N$)=56 OR ASC(N$)=57 THEN J=J-2:IF J<0 THEN J=3
610 IF ASC(N$)=49 THEN J=3
620 IF ASC(N$)=55 THEN J=0
630 NEXT J
640 GOTO 430
650 '
660 '    Edit Mode
670 '
680 COLOR 12,0:LOCATE 10,33:PRINT STRING$(14,32):COLOR 26,0:LOCATE 25,66:PRINT "
 * Edit Mode *";
690 X=LEN(P3$(J)):Y=INSTR(P3$(J),CHR$(95)):Z=X-Y+1
700 Y=INSTR(P3$(J),CHR$(58))
710 COLOR 10,0:LOCATE 10+J*2,29:PRINT MID$(P3$(J),1,10);MID$(P3$(J),11,Z+1)
720 IF MID$(P3$(J),12+C,1)<>"_" AND MID$(P3$(J),12+C,1)<>" " THEN N$=MID$(P3$(J),
12+C,1):GOTO 860
730 LOCATE 10+J*2,40+C,1,0,7
740 N$=INKEY$:IF N$="" THEN 740
750 IF ASC(N$)=13 OR ASC(N$)=27 THEN 890
760 IF ASC(N$)<>8 THEN 810
770 IF C=0 THEN 740
780 C=C-1:IF C<0 THEN C=0 ELSE N1$=MID$(N1$,1,C)
790 IF MID$(P3$(J),12+C,1)<>"_" AND MID$(P3$(J),12+C,1)<>" " THEN C=C-1:IF C<0 TH
EN C=0 ELSE N1$=MID$(N1$,1,C)
800 GOTO 870
810 IF ASC(N$)<32 OR ASC(N$)>126 THEN BEEP:GOTO 740
820 IF LEN(N1$)=Z THEN BEEP:GOTO 700
830 IF Y=0 THEN 860
840 IF N$="." OR N$="," THEN 860
850 IF ASC(N$)<48 OR ASC(N$)>57 THEN BEEP:GOTO 870
860 N1$=MID$(N1$,1,C)+N$:C=C+1
870 COLOR 10,2:LOCATE 10+J*2,40,0:PRINT N1$;MID$(P3$(J),12+C,Z-C)
880 GOTO 730
890 IF N1$="" THEN 930
920 D3$(J)=N1$+STRING$(Z-LEN(N1$)," ")
910 IF J=3 THEN S0=1
920 IF J=4 THEN S0=1
930 COLOR 11,0:LOCATE 10+J*2,29,0:PRINT P3$(J):LOCATE 12+J*2,40:PRINT D3$(J)
940 N1$="":C=0
950 IF J=1 THEN DATE$=D3$(J) ELSE TIME$=D3$(J)
960 RETURN
970 '
980 PRINT #4,"SETTIME DATE=";DATE$;",TIME=";TIME$
990 ON TIMER 5) GOSUB 1000:GOTO 1010
1000 BEEP:COLOR 14,0:LOCATE 25,36:PRINT "  * Settime Error in COM 1 *";:TIMER O
FF:S1=1:RETURN
1010 TIMER ON:S1=0:N1$=""
1020 IF S1<>0 THEN 1060
1030 IF EOF(4) THEN 1020 ELSE N$=INPUT$(LOC(4),#4):N1$=N1$+N$
1040 IF INSTR(N1$,CHR$(13))=0 THEN 1030
1050 IF INSTR(N1$,"OK")=0 THEN GOSUB 1000
1060 TIMER OFF:S1=0
1070 '
1080 COLOR 2,0:CHAIN "b:001c"
1090 END
```

```
10 ' Copyright 1985 Badger Meter, Inc. - Engineering Division *** Program Name -
SM004 *** Date 10-09-1985
20 'Author D.Wacre         ' - load "sm004"
30 'Automatic Meter Reading - Time of Day & Peak Rate Exemption Days
40 '
50 COMMON FE4$,CC$(),F1$(),T$()
60 DIM D1$(4),CO$(12),M$(12),MD(12),S2(12),L(20),R(20)
70 '
80 OPEN "R",#1,"recnbr.dat",4:FIELD #1,4 AS I1$
90 OPEN "R",#2,"eindex.dat",4:FIELD #2,4 AS I2$
100 OPEN "R",#3,"exep.dat",216:FIELD #3,216 AS B$
110 '
120 DATA "January:..........? __ __ __ __ __ __"
130 DATA "February:.........? __ __ __ __ __ __"
140 DATA "March:............? __ __ __ __ __ __"
150 DATA "April:............? __ __ __ __ __ __"
160 DATA "May:..............? __ __ __ __ __ __"
170 DATA "June:.............? __ __ __ __ __ __"
180 DATA "July:.............? __ __ __ __ __ __"
190 DATA "August:...........? __ __ __ __ __ __"
200 DATA "September:........? __ __ __ __ __ __"
210 DATA "October:..........? __ __ __ __ __ __"
220 DATA "November:.........? __ __ __ __ __ __"
230 DATA "December:.........? __ __ __ __ __ __"
240 FOR I=1 TO 12:READ M$(I):NEXT I
250 '
260 DATA 31,29,31,30,31,30,31,31,30,31,30,31
270 FOR I=1 TO 12:READ MD(I):NEXT I
280 '
290 DATA " * Add Exemption Year    * "
300 DATA " * Change Exemption Year * "
310 DATA " * Delete Exemption Year * "
320 DATA " * End - Use Esc Key     * "
330 FOR I=1 TO 4:READ D1$(I):NEXT I
340 '
350 COLOR 9,0:LOCATE 1,1:PRINT "SM004 "
360 COLOR 11,0:LOCATE 25,2:PRINT DATE$;" ";TIME$;
370 COLOR 15,0:LOCATE 1,8:PRINT " *** Access Plus Time of Day & Peak Rate Exem
ption Days ***
380 ON TIMER(600) GOSUB 390:GOTO 430
390 S1=1:RETURN
400 '
410 '    Scan - Add, Change & Delete
420 '
430 COLOR 11,0:FOR I=5 TO 23:LOCATE I,1:PRINT SPACE$(80);:NEXT I:S1=0
440 LOCATE 3,2:PRINT SPACE$(78)
450 COLOR 30,0:LOCATE 25,66:PRINT " * Scan Mode *";
460 COLOR 14,0:LOCATE 3,10:PRINT " Press Any Key To Scan For Desired Line, Press
 Enter, "
470 COLOR 11,0:FOR I=1 TO 4:LOCATE 10+I,27:PRINT D1$(I):NEXT I
480 FOR I=1 TO 4
490 COLOR 16,3:LOCATE 10+I,27:PRINT D1$(I)
500 TIMER ON
510 IF S1=1 THEN I=4:GOTO 560
520 N$=INKEY$:IF N$="" THEN COLOR 11,0:LOCATE 25,2:PRINT DATE$;" ";TIME$;:GOTO 5
10
530 TIMER OFF
540 IF ASC(N$)=27 THEN I=4:GOTO 560
550 IF ASC(N$)<>13 THEN 570
560 COLOR 11,0:LOCATE 3,2:PRINT SPACE$(78)
570 COLOR 0,3:LOCATE 3,2:PRINT D1$(I):COLOR 0,0
580 ON I GOTO 710,710,710,2300
```

```
1160 X=INSTR(D2$(J),"*"):IF X<>0 THEN 1230
1170 COLOR 30,0:LOCATE 25,66:PRINT " * Scan Mode *";
1180 COLOR 16,3:LOCATE 8+J,22:PRINT MID$(M$(J),1,19)
1190 N$=INKEY$:IF N$="" THEN COLOR 11,0:LOCATE 25,2:PRINT DATE$;" ";TIME$;:GOTO
1190
1200 IF ASC(N$)=13 THEN GOSUB 1380:GOTO 1330
1210 COLOR 11,0:LOCATE 8+J,22:PRINT MID$(M$(J),1,19)
1220 IF ASC(N$)=27 THEN 1710
1230 IF ASC(N$)<=64 OR ASC(N$)>=123 THEN 1300
1240 FOR K=J+1 TO 12
1250 IF N$=MID$(M$(K),1,1) OR ASC(N$)-32=ASC(MID$(M$(K),1,1)) THEN J=K-1:GOTO 13
30
1260 NEXT K
1270 FOR K=1 TO J
1280 IF N$=MID$(M$(K),1,1) OR ASC(N$)-32=ASC(MID$(M$(K),1,1)) THEN J=K-1:GOTO 13
30
1290 NEXT K
1300 IF ASC(N$)=8 OR ASC(N$)=56 OR ASC(N$)=57 THEN J=J-2:IF J<0 THEN J=11
1310 IF ASC(N$)=49 THEN J=11
1320 IF ASC(N$)=55 THEN J=0
1330 NEXT J
1340 GOTO 1150
1350 '
1360 '   Edit Mode
1370 '
1380 COLOR 26,0:LOCATE 25,66:PRINT " * Edit Mode *";
1390 X=LEN(M$(J)):Y=INSTR(M$(J),CHR$(95)):Z=X-Y+1
1400 Y=INSTR(M$(J),CHR$(58))
1410 COLOR 10,0:LOCATE 8+J,22:PRINT MID$(M$(J),1,19);MID$(M$(J),20,Z-1);SPACE$(1
5);S2(J)=0
1420 IF MID$(M$(J),21+C,1)<>"_" AND MID$(M$(J),21+C,1)<>"" THEN N$=MID$(M$(J),21
+C,1):GOTO 1560
1430 LOCATE 8+J,42+C,1,0,7
1440 N$=INKEY$:IF N$="" THEN 1440
1450 IF ASC(N$)=13 OR ASC(N$)=27 THEN 1590
1460 IF ASC(N$)<>8 THEN 1510
1470 IF C=0 THEN 1440
1480 C=C-1:IF C<0 THEN C=0 ELSE N1$=MID$(N1$,1,C)
1490 IF MID$(M$(J),21+C,1)<>"_" AND MID$(M$(J),21+C,1)<>"" THEN C=C-1:IF C<0 THE
N C=0 ELSE N1$=MID$(N1$,1,C)
1500 GOTO 1570
1510 IF ASC(N$)<32 OR ASC(N$)>126 THEN BEEP:GOTO 1440
1520 IF LEN(N1$)>=Z THEN BEEP:GOTO 1440
1530 IF Y=0 THEN 1560
1540 IF N$=" " OR N$="," THEN 1560
1550 IF ASC(N$)<49 OR ASC(N$)>57 THEN BEEP:GOTO 1440
1560 N1$=MID$(N1$,1,C)+N$:C=C+1
1570 COLOR 10,0:LOCATE 8+J,42,0:PRINT N1$;MID$(M$(J),21+C,Z-C)
1580 GOTO 1420
1590 IF N1$<>"" THEN D3$(J)=N1$+STRING$(Z-LEN(N1$)," ")
1600 GOSUB 2350
1610 COLOR 11,0:LOCATE 8+J,22,0:PRINT M$(J):LOCATE 8+J,42:PRINT D3$(J)
1620 FOR K=1 TO 18 STEP 3
1630 IF VAL(MID$(D3$(J),K,2))=0 THEN 1650
1640 IF VAL(MID$(D3$(J),K,2))>MO(J) THEN BEEP:COLOR 14,4:LOCATE 8+J,41+K:PRINT M
ID$(D3$(J),K,2):LOCATE 8+J,60:PRINT " Invalid Date ":S2(J)=1
1650 NEXT K
1660 N1$="":C=0
1670 RETURN
1680 '
1690 '   Write Disk Record
1700 '
1710 FOR J=1 TO 12
```

```
1720 IF S2(J)=1 THEN BEEP:GOTO 1150
1730 NEXT J
1740 O3$=SPACE$(216):MID$(O3$,1,1)=CHR$(89)
1750 K=0:FOR J=1 TO 216 STEP 18:K=K+1:MID$(O3$,J+1,17)=O3$(K):O3$(K)="":NEXT J
1760 LSET R$=O3$
1770 PUT #3,C1-1984
1780 ON I GOTO 1820,1880,2050
1790 '
1800 '    Write Disk Index.
1810 '
1820 GET #1,1:I1=CVI(I1$)
1830 LSET I2$=MKI$(C1)
1840 I1=I1+1:PUT #2,I1
1850 LSET I1$=MKI$(I1)
1860 PUT #1,1
1870 '
1880 C1$=STR$(C1):C1$=MID$(C1$,2,LEN(C1$)-1)
1890 FOR J=2 TO 216 STEP 3
1900 IF MID$(O3$,J,2)="  " THEN MID$(O3$,J,2)="00"
1910 NEXT J
1920 PRINT #4,"EXEMPTIONS YEAR=";C1$;" ";MID$(O3$,2,216)
1930 ON TIMER(5) GOSUB 1940:GOTO 1950
1940 BEEP:COLOR 14,0:LOCATE 25,36:PRINT " * Exemption Error In CCM * ";:TIMER O
FF:S1=1:RETURN
1950 TIMER ON:S1=0:N1$=""
1960 IF S1<>0 THEN 2000
1970 IF EOF(4) THEN 1960 ELSE N$=INPUT$(LOC(4),#4):N1$=N1$+N$
1980 IF INSTR(N1$,CHR$(13))=0 THEN 1960
1990 IF INSTR(N1$,"OK")=0 THEN GOSUB 1940
2000 TIMER OFF:S1=0
2010 GOTO 380
2020 '
2030 '    Delete
2040 '
2050 COLOR 0,2:LOCATE 10,24:PRINT " Exemption Year";C1;"Deleted "
2060 GET #1,1:I1=CVI(I1$)
2070 FOR J=1 TO I1
2080 GET #2,J:I2=CVI(I2$)
2090 IF I2<>C1 THEN 2130
2100 LSET I2$=MKI$(0)
2110 PUT #2,J
2120 GOTO 430
2130 NEXT J
2140 GOTO 430
2150 '
2160 '    Delete '0' From Index
2170 '
2180 I3=I1
2190 FOR I=1 TO I1
2200 GET #2,I:I2=CVI(I2$)
2210 IF I2=0 THEN I3=I3-1 ELSE GOTO 2230
2220 NEXT I
2230 IF I3=I1 THEN 2300
2240 J=I1-I3+1:K=1
2250 FOR I=J TO I1:GET #2,I:PUT #2,K:K=K+1:NEXT I
2260 LSET I1$=MKI$(I3):PUT #1,1
2270 '
2280 '    Close Files
2290 '
2300 CLOSE #1,#2,#3
2310 CHAIN "ba001a"
2320 '
2330 '    Sort
```

```
2340 '
2350 FOR K=1 TO 6:A(K)=0:NEXT K
2360 L=0:FOR K=1 TO 18 STEP 3:L=L+1:A(L)=VAL(MID$(D3$(J),K,2)):MID$(D3$(J),K,2)=
"  ":NEXT K
2370 S3=1
2380 L(1)=1
2390 R(1)=6
2400 L1=L(S3)
2410 R1=R(S3)
2420 S3=S3-1
2430 L2=L1
2440 R2=R1
2450 X=A(INT((L1+R1)/2))
2460 IF A(L2)>=X THEN 2490
2470 L2=L2+1
2480 GOTO 2460
2490 IF X>=A(R2) THEN 2520
2500 R2=R2-1
2510 GOTO 2490
2520 IF L2>R2 THEN 2560
2530 T=A(L2):A(L2)=A(R2):A(R2)=T
2540 L2=L2+1
2550 R2=R2-1
2560 IF L2<=R2 THEN 2460
2570 IF L2>=R1 THEN 2610
2580 S3=S3+1
2590 L(S3)=L2
2600 R(S3)=R1
2610 R1=R2
2620 IF L1<R1 THEN 2430
2630 IF S3>0 THEN 2400
2640 L=1:S$=""
2650 FOR K=1 TO 6
2660 T$=STR$(A(K))
2670 IF T$=S$ THEN 2710 ELSE S$=T$
2680 IF VAL(T$)=0 THEN 2710
2690 IF LEN(T$)=2 THEN MID$(T$,1,1)="0":T$=" "+T$
2700 MID$(D3$(J),L,2)=MID$(T$,2,2):L=L+3
2710 NEXT K
2720 RETURN
2730 END

10 'Copyright 1985 Badger Meter, Inc. - Engineering Division *** Program Name -
bm004a *** Date 12-09-1985
20 'Author D.Wachs          \ - load "bm004a"
30 'Automatic Meter Reading - Time of Day & Peak Rate Exemption Days Print - CRT 40 '
50 COMMON PGM$,D2$(),F1$(),T$()
60 DIM D1$(4),D3$(12),M$(12)
70 '
80 ON TIMER(600) GOSUB 90:GOTO 110
90 S1=1:RETURN
100 '
110 OPEN "R",#3,"exep.dat",216:FIELD #3,216 AS B$
120 '
130 DATA "January:..........? __ __ __ __ __ __"
140 DATA "February:.........? __ __ __ __ __ __"
150 DATA "March:............? __ __ __ __ __ __"
160 DATA "April:............? __ __ __ __ __ __"
170 DATA "May:..............? __ __ __ __ __ __"
```

```
180 DATA "June:............?  __ __ __ __ __ __"
190 DATA "July:............?  __ __ __ __ __ __"
200 DATA "August:..........?  __ __ __ __ __ __"
210 DATA "September:.......?  __ __ __ __ __ __"
220 DATA "October:..........?  __ __ __ __ __ __"
230 DATA "November:.........?  __ __ __ __ __ __"
240 DATA "December:.........?  __ __ __ __ __ __"
250 FOR I=1 TO 12:READ M$(I):NEXT I
260 '
270 '
280 COLOR 9,0:LOCATE 1,1:PRINT "BM004A"
290 COLOR 11,0:LOCATE 25,2:PRINT DATE$;" ";TIME$;
300 COLOR 15,0:LOCATE 1,8:PRINT "   *** Access Plus Time of Day & Peak Rate Exemption Days ***        "
310 COLOR 12,0:FOR I=5 TO 23:LOCATE I,1:PRINT SPACE$(80);:NEXT I
320 '
330 '    Enter Exemption Year
340 '
350 COLOR 26,0:LOCATE 25,66:PRINT " * Edit Mode *";
360 COLOR 14,0:LOCATE 3,4:PRINT " To End Press Enter.         "
370 COLOR 10,0:LOCATE 3,52:PRINT SPACE$(19)
380 COLOR 10,0:LOCATE 3,30:PRINT "Enter Exemption Year? ";:N1$="":C=0
390 LOCATE 3,52+C,1,0,7
400 TIMER ON
410 IF S1<>0 THEN 740
420 N$=INKEY$:IF N$="" THEN 410
430 TIMER OFF
440 IF ASC(N$)=13 OR ASC(N$)=27 THEN C1=VAL(N1$):N1$="":C=0:GOTO 510
450 IF ASC(N$)=8 AND C=0 THEN 420
460 IF ASC(N$)=8 THEN LOCATE 3,POS(0)-1:PRINT " ":C=C-1:IF C<0 THEN C=0 ELSE N1$=MID$(N1$,1,C):GOTO 500
470 IF ASC(N$)<48 OR ASC(N$)>57 THEN BEEP:GOTO 420
480 IF LEN(N1$)>3 THEN BEEP:GOTO 420
490 N1$=MID$(N1$,1,C)+N$:C=C+1
500 COLOR 10,0:LOCATE 3,52,0:PRINT N1$:GOTO 390
510 LOCATE ,,0
520 IF C1=0 THEN 740
530 IF C1>=1985 AND C1<=2100 THEN 620
540 COLOR 14,4:LOCATE 3,30:BEEP:PRINT " Error Invalid Exemption Year 1985-2100 Only!! "
550 GOSUB 570:GOTO 380
560 '
570 FOR J=1 TO 2500:NEXT J:COLOR 10,0:LOCATE 3,30:PRINT SPACE$(50)
580 RETURN
590 '
600 '    Read Disk File & Check Exemption Year
610 '
620 GET #3,C1-1984
630 IF ASC(MID$(B$,1,1))<>89 AND I>1 THEN COLOR 14,4:LOCATE 3,30:BEEP:PRINT " Error Exemption Year Not On File! ":GOSUB 570:GOTO 380
640 K=0:FOR J=1 TO 216 STEP 18:K=K+1:O3$(K)=MID$(B$,J+1,17):NEXT J
650 COLOR 14,1:LOCATE 6,29:PRINT USING " Exemption Year ---- #### ";C1
660 LOCATE 8,22:PRINT "      Month          Days       "
670 FOR J=1 TO 12
680 COLOR 11,0
690 X=INSTR(O2$(J),"X"):IF X<>0 THEN COLOR 14,1
700 LOCATE 8+J,22:PRINT MID$(M$(J),1,18):LOCATE 8+J,42:PRINT O3$(J)
710 NEXT J
720 COLOR 11,0:LOCATE 25,2:PRINT DATE$;" ";TIME$;:GOTO 370
730 '
740 CLOSE #3
750 CHAIN "bm001b"
760 END
```

```
10 'Copyright 1985 Badger Meter, Inc. - Engineering Division *** Program Name -
bm004b *** Date 06-17-1985
20 'Author D.Wachs         \ - load "bm004b"
30 'Automatic Meter Reading - Print All Time of Day & Peak Rate Exemption Days O
n Printer
40 '
50 COMMON PGM$,O2$(),F1$(),T$()
60 DIM CT$(12),M$(12)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 5,19:PRINT "    ** Please Turn Li
ne Printer On. **     ":IF S1<>0 THEN 690 ELSE RESUME
140 IF ERR=27 THEN COLOR 30,4:LOCATE 5,19:PRINT "    *** Out of Paper On Line Pri
nter. ***    ":IF S1<>0 THEN 690 ELSE RESUME
150 COLOR 29,0:LOCATE 5,7:PRINT "Error";ERR:STOP
160 '
170 WIDTH "LPT1:",80
180 '
190 OPEN "R",#1,"ecntr.dat",4:FIELD #1,4 AS I1$:GET #1,1:I1=CVI(I1$):CLOSE #1
200 OPEN "R",#2,"eindex.dat",4:FIELD #2,4 AS I2$
210 OPEN "R",#3,"exep.dat",216:FIELD #3,216 AS B$
220 '
230 DATA "January:..........? __ __ __ __ __ __"
240 DATA "February:.........? __ __ __ __ __ __"
250 DATA "March:............? __ __ __ __ __ __"
260 DATA "April:............? __ __ __ __ __ __"
270 DATA "May:..............? __ __ __ __ __ __"
280 DATA "June:.............? __ __ __ __ __ __"
290 DATA "July:.............? __ __ __ __ __ __"
300 DATA "August:...........? __ __ __ __ __ __"
310 DATA "September:........? __ __ __ __ __ __"
320 DATA "October:..........? __ __ __ __ __ __"
330 DATA "November:.........? __ __ __ __ __ __"
340 DATA "December:.........? __ __ __ __ __ __"
350 FOR I=1 TO 12:READ M$(I):NEXT I
360 '
370 COLOR 9,0:LOCATE 1,1:PRINT "BM004B"
380 COLOR 11,0:LOCATE 25,2:PRINT DATE$;" ";TIME$;
390 '
400 LPRINT CHR$(18);CHR$(27);CHR$(65);CHR$(11);CHR$(27);CHR$(50):TIMER OFF:S2=0
410 C1=5:GOTO 530
420 '
430 P1=P1+1
440 LPRINT CHR$(12);"BM004B";CHR$(14);TAB(17);"Access Plus";CHR$(20);TAB(49);"Pa
ge"P1
450 LPRINT TAB(23);"Copyright 1986 Badger Meter, Inc."
460 LPRINT TAB(27);"Utility Products Division"
470 LPRINT TAB(27);"as of ";DATE$;" ";TIME$;CHR$(10)
480 LPRINT CHR$(14);TAB(2);"Time of Day & Peak Rate Exemption Days";CHR$(10)
490 LPRINT STRING$(79,240)
500 C1=0
510 RETURN
520 '
530 FOR I=1 TO I1
540 GET #2,I:I2=CVI(I2$)
550 IF I2=0 THEN 670
560 GET #3,I2-1984
570 K=0:FOR J=1 TO 216 STEP 18:K=K+1:O3$(K)=MID$(B$,J+1,17):NEXT J
```

```
580 IF C1>=4 THEN GOSUB 430
590 LPRINT CHR$(27);CHR$(69);TAB(30);"Exemption Year ----";I2
600 LPRINT TAB(30);"Month";TAB(47);"Days";CHR$(27);CHR$(70)
610 FOR J=1 TO 12
620 LPRINT TAB(22);MID$(M$(J),1,18);TAB(41);O3$(J)
630 NEXT J:LPRINT
640 C1=C1+1
650 N$=INKEY$:IF N$="" THEN 670
660 IF ASC(N$)=27 THEN 690
670 NEXT I
680 LPRINT TAB(27);"<<<< End of Report >>>>"
690 CLOSE #1,#2,#3
700 CHAIN "bm001c"
710 END 10 'Copyright 1985 Badger Meter, Inc. - Engineering Division * Program Name - bm005 * Date 06-19-1985
20 'Author D.Wachs      \ - load "bm005"
30 'Automatic Meter Reading - Customer Data File Maintenance
40 '
50 COMMON PGM$,O2$(),F1$(),T$()
60 DIM O1$(8),O3$(36),B$(36),D$(36)
70 '
80 OPEN "R",#1,"pru.dat",5:FIELD #1,5 AS T2$:GET #1,7:T3$=T2$:CLOSE #1:T3=VAL(T3$)
90 IF T3=0 THEN T3$=""
100 IF T3>=5 AND T3<=59 THEN T3$="/Min"
110 IF T3=60 THEN T3$="/Hr"
120 '
130 OPEN "R",#3,"amrd.dat",304
140 GOSUB 230:GET #3,1:Z1=0:Z2=0
150 IF ASC(F$)=89 THEN FOR I=1 TO 36:D$(I)=B$(I):NEXT I:GOTO 180
160 FOR I=1 TO 36:X=LEN(O2$(I)):Y=INSTR(O2$(I),CHR$(95)):Z=X-Y+1:D$(I)=MID$(O2$(I),Z1,Z):NEXT I
170 '
180 CLOSE #3
190 OPEN "R",#1,"cntr.dat",8:FIELD #1,8 AS I1$
200 OPEN "R",#2,"index.dat",8:FIELD #2,8 AS I2$
210 OPEN "R",#3,"amr1.dat",304:GOSUB 230:GOTO 390
220 '
230 FIELD #3,1 AS F$:Z1=1
240 FOR J=1 TO 36
250 X=LEN(O2$(J)):Y=INSTR(O2$(J),CHR$(95)):Z=X-Y+1
260 IF X=Z-1 THEN 290
270 FIELD #3,Z1 AS DUMMY$,Z2 AS DUMMY$,Z AS B$(J)
280 IF Z1+Z<255 THEN Z1=Z1+Z ELSE Z2=Z2+Z
290 NEXT J:RETURN
300 '
310 DATA " * Add Account            * "
320 DATA " * Change Account         * "
330 DATA " * Delete Account         * "
340 DATA " * Fields - Default       * "
350 DATA " * Sort By Account Number * "
360 DATA " * Programing & Startup   * "
370 DATA " * Meter Reading          * "
380 DATA " * End - Use Esc Key      * "
390 FOR I=1 TO 8:READ O1$(I):NEXT I
400 '
410 COLOR 9,0:LOCATE 1,1:PRINT "BM005 "
420 COLOR 11,0:LOCATE 25,2:PRINT DATE$;" ";TIME$;
430 COLOR 15,0:LOCATE 1,8:PRINT "       *** Access Plus Customer Account Maintenance ***"
```

```
440 '
450 '    Scan - Add, Change & Delete
460 '
470 COLOR 12,0:FOR I=5 TO 23:LOCATE I,1:PRINT SPACE$(80);:NEXT I
480 LOCATE 3,2:PRINT SPACE$(78)
490 COLOR 30,0:LOCATE 25,66:PRINT " * Scan Mode *";
500 COLOR 14,0:LOCATE 3,13:PRINT " Press Any Key To Scan For Desired Line, Press Enter. "
510 COLOR 11,0:FOR I=1 TO 8:LOCATE 9+I,25:PRINT O1$(I):NEXT I
520 ON TIMER (600) GOSUB 530:GOTO 540
530 S1=1:RETURN
540 FOR I=1 TO 8
550 COLOR 16,3:LOCATE 9+I,25:PRINT O1$(I)
560 TIMER ON
570 IF S1<>0 THEN I=8:GOTO 620
580 N$=INKEY$:IF N$="" THEN COLOR 11,0:LOCATE 25,2:PRINT DATE$;" ";TIME$;:GOTO 570
590 TIMER OFF
600 IF ASC(N$)=27 THEN I=8:GOTO 620
610 IF ASC(N$)<>13 THEN 650
620 COLOR 10,0:LOCATE 3,2:PRINT SPACE$(79)
630 COLOR 0,3:LOCATE 3,2:PRINT O1$(I):COLOR 0,0
640 ON I GOTO 770,770,770,3210,3210,3210,3210,3210
650 COLOR 11,0:LOCATE 9+I,25:PRINT O1$(I)
660 FOR J=1 TO 8
670 IF N$=MID$(O1$(J),4,1) OR ASC(N$)-32=ASC(MID$(O1$(J),4,1)) THEN I=J:GOTO 620
680 NEXT J
690 IF ASC(N$)=8 OR ASC(N$)=56 OR ASC(N$)=57 THEN I=I-2:IF I<0 THEN I=7
700 IF ASC(N$)=49 THEN I=7
710 IF ASC(N$)=55 THEN I=0
720 NEXT I
730 GOTO 540
740 '
750 '    Enter Account Number
760 '
770 COLOR 12,0:FOR Z=10 TO 17:LOCATE Z,25:PRINT SPACE$(30):NEXT Z
780 COLOR 26,0:LOCATE 25,66:PRINT " * Edit Mode *";
790 COLOR 10,0:LOCATE 3,34:PRINT "Enter Customer Account Number? ";:N1$="":C=0
800 LOCATE 3,65+C,1,0,7
810 N$=INKEY$:IF N$="" THEN 810
820 IF ASC(N$)=13 OR ASC(N$)=27 THEN C1=VAL(N1$):N1$="":C=0:GOTO 890
830 IF ASC(N$)=8 AND C=0 THEN 810
840 IF ASC(N$)=8 THEN LOCATE 3,POS(0)-1:PRINT " ":C=C-1:IF C<0 THEN C=0 ELSE N1$=MID$(N1$,1,C):GOTO 800
850 IF ASC(N$)<48 OR ASC(N$)>57 THEN BEEP:GOTO 810
860 IF LEN(N1$)>4 THEN BEEP:GOTO 810
870 N1$=MID$(N1$,1,C)+N$:C=C+1
880 COLOR 10,0:LOCATE 3,65,0:PRINT N1$:GOTO 800
890 LOCATE ,,0
900 IF C1=0 THEN 480
910 IF C1>=1 AND C1<=75000! THEN 1000
920 COLOR 14,4:LOCATE 3,34:BEEP:PRINT " Error Invalid Account Number 1-75000 Only!!! "
930 GOSUB 950:GOTO 790
940 '
950 FOR J=1 TO 5000:NEXT J:COLOR 10,0:LOCATE 3,34:PRINT SPACE$(46)
960 RETURN
970 '
980 '    Read Disk File & Check Account Number
990 '
```

```
1000 SET #3,C1
1010 IF ASC(F$)=89 AND I=1 THEN COLOR 14,4:LOCATE 3,34:BEEP:PRINT " Error Accoun
t Number All Ready On File! ":GOSUB 950:GOTO 790
1020 IF ASC(F$)<>89 AND I>1 THEN COLOR 14,4:LOCATE 3,34:BEEP:PRINT " Error Acco
unt Number Not On File! ":GOSUB 950:GOTO 790
1030 ON I GOTO 1040,1050,1060
1040 FOR J=1 TO 36:O3$(J)=D$(J):NEXT J:L2=VAL(O3$(15)):O3$(15)=F1$(VAL(O3$(15)))
:L1=VAL(O3$(8)):O3$(8)=T$(VAL(O3$(8))):O3$(12)=T$(VAL(O3$(12))+33):O3$(13)=T$(VA
L(O3$(13))+33):GOTO 1100
1050 FOR J=1 TO 36:O3$(J)=B$(J):NEXT J:L2=VAL(O3$(15)):O3$(15)=F1$(VAL(O3$(15)))
:L1=VAL(O3$(8)):O3$(8)=T$(VAL(O3$(8))):O3$(12)=T$(VAL(O3$(12))+33):O3$(13)=T$(VA
L(O3$(13))+33):GOTO 1100
1060 D$=S$+36:LSET F$=CHR$(0):FOR J=1 TO 36:LSET B$(J)="":NEXT J:GOTO 2660
1070 '
1080 '    Add & Change
1090 '
1100 COLOR 14,0:LOCATE 3,2:PRINT "        Scan To Desired Line. Press Enter
To Edit, Esc To End.      "
1110 COLOR 14,1:LOCATE 6,25:PRINT USING " Customer Account Number ---- ##,### ";
C1
1120 FOR J=1 TO 33
1130 COLOR 11,0
1140 X=INSTR(O2$(J),"*"):IF X<>0 THEN COLOR 14,1
1150 IF J<=17 THEN LOCATE 6+J,2:PRINT MID$(O2$(J),1,19):LOCATE 6+J,22:PRINT O3$(
J)
1160 IF J>=18 THEN LOCATE J-11,49:PRINT MID$(O2$(J),1,19):LOCATE J-11,69:PRINT O
3$(J)
1170 NEXT J
1180 IF O3$(30)="On " THEN COLOR 14,0:FOR J=20 TO 22:LOCATE J,75:PRINT T3$:NEXT
J
1190 '
1200 '    Scan Mode
1210 '
1220 FOR J=1 TO 33
1230 X=INSTR(O2$(J),"*"):IF X<>0 THEN 1320
1240 COLOR 30,0:LOCATE 25,66:PRINT " * Scan Mode *";
1250 IF J<=17 THEN COLOR 16,3:LOCATE 6+J,2:PRINT MID$(O2$(J),1,19)
1260 IF J>=18 THEN COLOR 16,3:LOCATE J-11,49:PRINT MID$(O2$(J),1,19)
1270 N$=INKEY$:IF N$="" THEN COLOR 11,0:LOCATE 25,2:PRINT DATE$;" ";TIME$;:GOTO
1270
1280 IF ASC(N$)=27 THEN 2390
1290 IF ASC(N$)=13 THEN GOSUB 1470:GOTO 1420
1300 IF J<=17 THEN COLOR 11,0:LOCATE 6+J,2:PRINT MID$(O2$(J),1,19)
1310 IF J>=18 THEN COLOR 11,0:LOCATE J-11,49:PRINT MID$(O2$(J),1,19)
1320 IF ASC(N$)<=64 OR ASC(N$)>=123 THEN 1390
1330 FOR K=J+1 TO 33
1340 IF N$=MID$(O2$(K),1,1) OR ASC(N$)-32=ASC(MID$(O2$(K),1,1)) THEN J=K-1:GOTO
1420
1350 NEXT K
1360 FOR K=1 TO J
1370 IF N$=MID$(O2$(K),1,1) OR ASC(N$)-32=ASC(MID$(O2$(K),1,1)) THEN J=K-1:GOTO
1420
1380 NEXT K
1390 IF ASC(N$)=8 OR ASC(N$)=56 OR ASC(N$)=57 THEN J=J-2:IF J<0 THEN J=32
1400 IF ASC(N$)=49 THEN J=32
1410 IF ASC(N$)=55 THEN J=0
1420 NEXT J
1430 GOTO 1220
1440 '
1450 '    Edit Mode
1460 '
```

```
1470 IF J=15 AND VAL(O3$(36))<>0 THEN 2030
1480 IF J=16 AND VAL(O3$(36))<>0 THEN 2030
1490 IF J=17 AND VAL(O3$(36))<>0 THEN 2030
1500 IF J<>18 AND J<>25 AND J<>30 THEN 1560
1510 IF O3$(J)="Off" THEN O3$(J)="On ":GOTO 1530
1520 IF O3$(J)="On " THEN O3$(J)="Off"
1530 T4$="     ":IF O3$(30)="On " THEN T4$=T3$
1540 COLOR 14,0:FOR K=20 TO 22:LOCATE K,75:PRINT T4$:NEXT K
1550 GOTO 2030
1560 COLOR 26,0:LOCATE 25,66:PRINT " * Edit Mode *";
1570 X=LEN(O2$(J)):Y=INSTR(O2$(J),CHR$(95)):Z=X-Y+1
1580 Y=INSTR(O2$(J),CHR$(58))
1590 IF J<=17 THEN COLOR 10,0:LOCATE 6+J,2:PRINT MID$(O2$(J),1,19);MID$(O2$(J),20,Z+1)
1600 IF J>=18 THEN COLOR 10,0:LOCATE J-11,49:PRINT MID$(O2$(J),1,19);MID$(O2$(J),20,Z+1)
1610 IF J=12 THEN 2290
1620 IF J=13 THEN 2290
1630 IF J=15 THEN 2080
1640 IF J=8 THEN 2180
1650 IF MID$(O2$(J),21+C,1)<>"_" AND MID$(O2$(J),21+C,1)<>" " THEN N$=MID$(O2$(J),21+C,1):GOTO 1980
1660 IF J<=17 THEN LOCATE 6+J,22+C,1,0,7
1670 IF J>=18 THEN LOCATE J-11,69+C,1,0,7
1680 N$=INKEY$:IF N$="" THEN 1680
1690 IF ASC(N$)=13 OR ASC(N$)=27 THEN 2020
1700 IF ASC(N$)<>8 THEN 1750
1710 IF C=0 THEN 1680
1720 C=C-1:IF C<0 THEN C=0 ELSE N1$=MID$(N1$,1,C)
1730 IF MID$(O2$(J),21+C,1)<>"_" AND MID$(O2$(J),21+C,1)<>" " THEN C=C-1:IF C<0 THEN C=0 ELSE N1$=MID$(N1$,1,C)
1740 GOTO 1990
1750 IF ASC(N$)<32 OR ASC(N$)>126 THEN BEEP:GOTO 1680
1760 IF LEN(N1$)>=Z THEN BEEP:GOTO 1680
1770 IF INSTR(O2$(J),"Time")=0 AND INSTR(O2$(J),"Tm")=0 THEN 1850
1780 X=VAL(N$)
1790 IF C+1=1 AND X<>0 AND X<>2 THEN BEEP:GOTO 1680
1800 IF C+1=2 AND X>7 THEN BEEP:GOTO 1680
1810 IF C+1=4 AND X>5 THEN BEEP:GOTO 1680
1820 IF C+1=7 AND X<>0 AND X<>2 AND X<>4 THEN BEEP:GOTO 1680
1830 IF C+1=8 AND X>0 THEN BEEP:GOTO 1680
1840 IF C+1=2 AND MID$(N1$,1,1)="2" AND X>3 THEN BEEP:GOTO 1680
1850 IF INSTR(O2$(J),"Date")=0 AND INSTR(O2$(J),"Dt")=0 THEN 1950
1860 X=VAL(N$)
1870 IF C+1=1 AND X>1 THEN BEEP:GOTO 1680
1880 IF C+1=4 AND X>3 THEN BEEP:GOTO 1680
1890 IF C+1=6 AND X<1 THEN BEEP:GOTO 1680
1900 IF C+1=2 AND MID$(N1$,1,1)="0" AND X=0 THEN BEEP:GOTO 1680
1910 IF C+1=2 AND MID$(N1$,1,1)="1" AND X>2 THEN BEEP:GOTO 1680
1920 IF C+1=4 AND MID$(N1$,1,2)="02" AND X>2 THEN BEEP:GOTO 1680
1930 IF C+1=5 AND MID$(N1$,4,1)="3" AND X>1 THEN BEEP:GOTO 1680
1940 IF C+1=5 AND MID$(N1$,4,1)="0" AND X=0 THEN BEEP:GOTO 1680
1950 IF Y=0 THEN 1960
1960 IF N$=" " OR N$="," THEN 1980
1970 IF ASC(N$)<48 OR ASC(N$)>57 THEN BEEP:GOTO 1680
1980 N1$=MID$(N1$,1,C)+N$:C=C+1
1990 IF J<=17 THEN COLOR 10,0:LOCATE 6+J,22,0:PRINT N1$;MID$(O2$(J),21+C,Z-C)
2000 IF J>=18 THEN COLOR 10,0:LOCATE J-11,69,0:PRINT N1$;MID$(O2$(J),21+C,Z-C)
2010 GOTO 1650
2020 IF N1$<>"" THEN O3$(J)=N1$+STRING$(Z-LEN(N1$)," ")
2030 IF J<=17 THEN COLOR 11,0:LOCATE 6+J,2,0:PRINT O2$(J):LOCATE 6+J,22:PRINT O3$(J)
```

```
2240 IF J>=18 THEN COLOR 11,0:LOCATE J-11,49,0:PRINT O2$(J):LOCATE J-11,69:PRINT
 O3$(J)
2250 N1$="":C=0
2260 RETURN
2270 '
2280 COLOR 14,0:LOCATE 20,34:PRINT "Press Any":LOCATE 21,35:PRINT "Key For":LOCA
TE 22,34:PRINT "Selection"
2290 COLOR 10,0:LOCATE 6+J,22:PRINT O3$(J)
2100 FOR K=L2 TO 6
2110 COLOR 10,0:LOCATE 6+J,22:PRINT F1$(K):O3$(J)=F1$(K)
2120 N$=INKEY$:IF N$="" THEN 2120
2130 IF ASC(N$)=13 OR ASC(N$)=27 THEN L2=K:LOCATE 20,34:PRINT SPACE$(9):LOCATE 2
1,35:PRINT SPACE$(7):LOCATE 22,34:PRINT SPACE$(9):GOTO 2030
2140 IF ASC(N$)=8 OR ASC(N$)=57 THEN K=K-2:IF K<0 THEN K=5
2150 NEXT K:L2=1
2160 GOTO 2100
2170 '
2180 COLOR 14,0:LOCATE 15,38:PRINT "Press Any":LOCATE 16,39:PRINT "Key For":LOCA
TE 17,38:PRINT "Selection"
2190 COLOR 10,0:LOCATE 6+J,22:PRINT O3$(J)
2200 FOR K=L1 TO 32
2210 IF K/10 THEN COLOR 15,0 ELSE COLOR 10,0
2220 LOCATE 6+J,22:PRINT T$(K):O3$(J)=T$(K)
2230 N$=INKEY$:IF N$="" THEN 2230
2240 IF ASC(N$)=13 OR ASC(N$)=27 THEN L1=K:LOCATE 15,38:PRINT SPACE$(9):LOCATE 1
6,39:PRINT SPACE$(7):LOCATE 17,38:PRINT SPACE$(9):GOTO 2030
2250 IF ASC(N$)=8 OR ASC(N$)=56 OR ASC(N$)=57 THEN K=K-2:IF K<0 THEN K=31
2260 NEXT K:L1=1
2270 GOTO 2200
2280 '
2290 COLOR 14,0:LOCATE 15,38:PRINT "Press Any":LOCATE 16,39:PRINT "Key For":LOCA
TE 17,38:PRINT "Selection"
2300 COLOR 10,0:LOCATE 6+J,22:PRINT O3$(J)
2310 FOR K=33 TO 44
2320 LOCATE 6+J,22:PRINT T$(K):O3$(J)=T$(K):N1$=T$(K)
2330 N$=INKEY$:IF N$="" THEN 2330
2340 IF ASC(N$)=13 OR ASC(N$)=27 THEN LOCATE 15,38:PRINT SPACE$(9):LOCATE 16,39:
PRINT SPACE$(7):LOCATE 17,38:PRINT SPACE$(9):GOTO 2030
2350 IF ASC(N$)=8 OR ASC(N$)=56 OR ASC(N$)=57 THEN K=K-2:IF K<32 THEN K=43
2360 NEXT K
2370 GOTO 2290
2380 '
2390 ON I GOTO 2600,2400
2400 IF VAL(O3$(36))=0 THEN 2600
2410 C1$=STR$(C1):C1$=MID$(C1$,2,LEN(C1$)-1)
2420 PH$=O3$(5):MT$=O3$(18):TD$=O3$(25):PR$=O3$(38)
2430 IF INSTR(PH$," ")-1<=0 THEN 2440 ELSE PH$=MID$(PH$,1,INSTR(PH$," ")-1)
2440 IF INSTR(MT$," ")-1<=0 THEN 2450 ELSE MT$=MID$(MT$,1,INSTR(MT$," ")-1)
2450 IF INSTR(TD$," ")-1<=0 THEN 2460 ELSE TD$=MID$(TD$,1,INSTR(TD$," ")-1)
2460 IF INSTR(PR$," ")-1<=0 THEN 2470 ELSE PR$=MID$(PR$,1,INSTR(PR$," ")-1)
2470 PRINT #4,"MODIFY ACCT=";C1$;" METER=";MT$;" TOD=";TD$;" PR=";PR$
2480 '
2490 ON TIMER(5) GOSUB 2500:GOTO 2510
2500 BEEP:COLOR 14,0:LOCATE 25,36:PRINT "  * Modify Error In CCM *  ";:TIMER O
FF:S1=1:RETURN
2510 TIMER ON:S1=0:N1$=""
2520 IF S1<>0 THEN 2560
2530 IF EOF(4) THEN 2520 ELSE N$=INPUT$(LOC(4),#4):N1$=N1$+N$
2540 IF INSTR(N1$,CHR$(13))=0 THEN 2520
2550 IF INSTR(N1$,"OK")=0 THEN GOSUB 2500
2560 TIMER OFF:S1=0
```

```
2570 '
2580 '    Write Disk Record
2590 '
2600 LSET F$=CHR$(89)
2610 FOR J=1 TO 6:IF O3$(15)=F$(J) THEN O3$(15)=MID$(STR$(J),2,1) ELSE NEXT J
2620 FOR J=1 TO 32:IF O3$(8)=T$(J) THEN O3$(8)=MID$(STR$(J),2,2) ELSE NEXT J
2630 FOR J=33 TO 44:IF O3$(12)=T$(J) THEN O3$(12)=MID$(STR$(J-33),2,2) ELSE NEXT
     J
2640 FOR J=33 TO 44:IF O3$(13)=T$(J) THEN O3$(13)=MID$(STR$(J-33),2,2) ELSE NEXT
     J
2650 FOR J=1 TO 36:LSET B$(J)=O3$(J):O3$(J)="":NEXT J
2660 PUT #3,C1
2670 ON I GOTO 2710,470,2900
2680 '
2690 '    Write Disk Index
2700 '
2710 GET #1,1:I1=CVS(I1$)
2720 LSET I2$=MKS$(C1)
2730 I1=I1+1:PUT #2,I1
2740 LSET I1$=MKS$(I1)
2750 PUT #1,1
2760 GOTO 470
2770 '
2780 '    Delete
2790 '
2900 COLOR 2,2:LOCATE 10,20:PRINT " Customer Account Number";C1;"Deleted "
2910 GET #1,1:I1=CVS(I1$)
2920 FOR J=1 TO I1
2930 GET #2,J:I2=CVS(I2$)
2940 IF I2<>C1 THEN 2880
2950 LSET I2$=MKS$(0)
2960 PUT #2,J
2970 GOTO 2900
2980 NEXT J
2890 '
2900 IF VAL(DC$)=0 THEN 470
2910 DC=VAL(MID$(DC$,9,1)):S1=VAL(MID$(DC$,1,4)):S2=VAL(MID$(DC$,5,2)):S3=VAL(MI
D$(DC$,7,2))
2920 ON DC GOTO 2930,3060
2930 OPEN "R",#5,"dta1.dat",8:FIELD #5,8 AS DA$
2940 GET #5,S1:DY$=DA$
2950 FOR K=S2 TO 7 STEP S3
2960 V=VAL(MID$(DY$,K,1))
2970 V=V-1:IF V<=0 THEN MID$(DY$,K,1)="-":GOTO 2990
2980 MID$(DY$,K,1)=MID$(STR$(V),2,1)
2990 NEXT K:LSET DA$=DY$:PUT #5,S1
3000 FOR I=2161 TO 2162
3010 GET #5,I:DY$=DA$
3020 FOR K=S2 TO 7 STEP S3:MID$(DY$,K,1)="-":NEXT K
3030 LSET DA$=DY$:PUT #5,I
3040 NEXT I:CLOSE #5:S1=0:GOTO 470
3050 '
3060 OPEN "R",#5,"dta2.dat",29:FIELD #5,29 AS DA$
3070 GET #5,S1:DY$=DA$
3080 FOR K=S2 TO 28 STEP S3
3090 V=VAL(MID$(DY$,K,1))
3100 V=V-1:IF V<=0 THEN MID$(DY$,K,1)="-":GOTO 3120
3110 MID$(DY$,K,1)=MID$(STR$(V),2,1)
3120 NEXT K:LSET DA$=DY$:PUT #5,S1
3130 FOR I=2161 TO 2162
3140 GET #5,I:DY$=DA$
```

```
3150 FOR K=S2 TO 28 STEP S3:MID$(DY$,K,1)="-":NEXT K
3160 LSET DA$=DY$:PUT #5,I
3170 NEXT I:CLOSE #5:S1=0:GOTO 470
3180 '
3190 '     Close Files
3200 '
3210 CLOSE #1,#2,#3
3220 ON I GOTO 650,650,650,3230,3240,3250,3260,3270
3230 CHAIN "bm005d"
3240 CHAIN "bm005s"
3250 CHAIN "bm016"
3260 CHAIN "bm018"
3270 CHAIN "bm001a"
3280 END 10 'Copyright 1986 Badger Meter, Inc. - Engineering Division *** Program Name -
bm005o *** Date 04-02-1986
20 'Author D.Wachs       \ - load "bm005d"
30 'Automatic Meter Reading - Default Fields, Customer Accounts
40 '
50 COMMON PGM$,O2$(),F1$(),T$()
60 DIM O3$(36),B$(36)
70 '
80 ON TIMER(600) GOSUB 90:GOTO 110
90 S1=1:RETURN
100 '
110 OPEN "R",#1,"pru.dat",5:FIELD #1,5 AS T2$:GET #1,7:T3$=T2$:CLOSE #1:T3=VAL(T
3$)
120 IF T3=0 THEN T3$=""
130 IF T3>=5 AND T3<=59 THEN T3$="/Min"
140 IF T3=60 THEN T3$="/Hr"
150 '
160 OPEN "R",#3,"amrd.dat",304
170 FIELD #3,1 AS F$:Z1=1
180 FOR J=1 TO 36
190 X=LEN(O2$(J)):Y=INSTR(O2$(J),CHR$(95)):Z=X-Y+1
200 IF X=Z-1 THEN 230
210 FIELD #3,Z1 AS DUMMY$,Z2 AS DUMMY$,Z AS B$(J)
220 IF Z1+Z<255 THEN Z1=Z1+Z ELSE Z2=Z2+Z
230 NEXT J
240 GET #3,1:IF ASC(F$)<>89 THEN L1=1:O3$(8)=T$(1):L2=5:O3$(15)=F1$(5):O3$(16)="
On ":O3$(25)="0##":O3$(30)="0##":GOTO 270
250 FOR J=1 TO 36:O3$(J)=B$(J):NEXT J:L2=VAL(O3$(15)):O3$(15)=F1$(VAL(O3$(15)));
L1=VAL(O3$(8)):O3$(8)=T$(VAL(O3$(8)))
260 '
270 GOSUB 290:GOTO 340
280 '
290 COLOR 9,0:LOCATE 1,1:PRINT "BM005D"
300 COLOR 11,0:LOCATE 25,2:PRINT DATE$;" ";TIME$;
310 COLOR 15,0:LOCATE 1,8:PRINT "       *** Access Plus Default Fields - Custome
r Accounts ***        - "
320 COLOR 12,0:LOCATE 3,2:PRINT SPACE$(78)
330 RETURN
340 COLOR 12,0:FOR I=5 TO 23:LOCATE I,1:PRINT SPACE$(80);:NEXT I
350 COLOR 14,0:LOCATE 3,2:PRINT "         Scan To Desired Line, Press Enter T
o Edit, Esc To End.       "
360 FOR J=1 TO 33
370 COLOR 11,0
380 X=INSTR(O2$(J),"*"):IF X<>0 THEN COLOR 14,1
390 IF J<=17 THEN LOCATE 6+J,2:PRINT O2$(J):LOCATE 6+J,22:PRINT O3$(J)
400 IF J>=18 THEN LOCATE J-11,49:PRINT O2$(J):LOCATE J-11,69:PRINT O3$(J)
```

```
410 NEXT J
420 IF O3$(30)="On " THEN COLOR 14,0:FOR J=20 TO 22:LOCATE J,75:PRINT T3$:NEXT J

430 '
440 '     Scan Mode
450 '
460 FOR J=1 TO 33
470 X=INSTR(O2$(J),"1"):IF X<>0 THEN 590
480 COLOR 30,0:LOCATE 25,66:PRINT " * Scan Mode *";
490 IF J<=17 THEN COLOR 16,3:LOCATE 6+J,2:PRINT MID$(O2$(J),1,19)
500 IF J>=18 THEN COLOR 16,3:LOCATE J-11,49:PRINT MID$(O2$(J),1,19)
510 TIMER ON
520 IF E1<>0 THEN 1620
530 N$=INKEY$:IF N$="" THEN COLOR 11,2:LOCATE 25,2:PRINT DATE$;" ";TIME$;:GOTO 5
20
540 TIMER OFF
550 IF ASC(N$)=27 THEN 1570
560 IF ASC(N$)=13 THEN GOSUB 740:GOTO 690
570 IF J<=17 THEN COLOR 11,0:LOCATE 6+J,2:PRINT MID$(O2$(J),1,19)
580 IF J>=18 THEN COLOR 11,0:LOCATE J-11,49:PRINT MID$(O2$(J),1,19)
590 IF ASC(N$)<=64 OR ASC(N$)>=123 THEN 660
600 FOR K=J+1 TO 33
610 IF N$=MID$(O2$(K),1,1) OR ASC(N$)-32=ASC(MID$(O2$(K),1,1)) THEN J=K-1:GOTO 6
90
620 NEXT K
630 FOR K=1 TO J
640 IF N$=MID$(O2$(K),1,1) OR ASC(N$)-32=ASC(MID$(O2$(K),1,1)) THEN J=K-1:GOTO 6
90
650 NEXT K
660 IF ASC(N$)=8 OR ASC(N$)=56 OR ASC(N$)=57 THEN J=J-2:IF J<0 THEN J=32
670 IF ASC(N$)=49 THEN J=32
680 IF ASC(N$)=55 THEN J=0
690 NEXT J
700 GOTO 460
710 '
720 '     Edit Mode
730 '
740 IF J<>18 AND J<>25 AND J<>30 THEN 800
750 IF O3$(J)="Off" THEN O3$(J)="On ":GOTO 770
760 IF O3$(J)="On " THEN O3$(J)="Off"
770 T4$="        ":IF O3$(30)="On " THEN T4$=T3$
780 COLOR 14,0:FOR K=20 TO 22:LOCATE K,75:PRINT T4$:NEXT K
790 GOTO 1250
800 COLOR 26,0:LOCATE 25,66:PRINT " * Edit Mode *";
810 X=LEN(O2$(J)):Y=INSTR(O2$(J),CHR$(95)):Z=X-Y+1
820 Y=INSTR(O2$(J),CHR$(58))
830 IF J<=17 THEN COLOR 10,0:LOCATE 6+J,2:PRINT MID$(O2$(J),1,19);MID$(O2$(J),20
,Z+1)
840 IF J>=18 THEN COLOR 10,0:LOCATE J-11,49:PRINT MID$(O2$(J),1,19);MID$(O2$(J),
20,Z+1)
850 IF J=15 THEN 1320
860 IF J=8 THEN 1400
870 IF MID$(O2$(J),21+C,1)<>"_" AND MID$(O2$(J),21+C,1)<>"" THEN N$=MID$(O2$(J),
21+C,1):GOTO 1200
880 IF J<=17 THEN LOCATE 6+J,22+C,1,0,7
890 IF J>=18 THEN LOCATE J-11,69+C,1,0,7
900 N$=INKEY$:IF N$="" THEN 900
910 IF ASC(N$)=13 OR ASC(N$)=27 THEN 1240
920 IF ASC(N$)<>8 THEN 970
930 IF C=0 THEN 900
940 C=C-1:IF Z<0 THEN C=0 ELSE N1$=MID$(N1$,1,C)
```

```
950 IF MID$(O2$(J),21+C,1)<>"_" AND MID$(O2$(J),21+C,1)<>"" THEN C=C-1:IF C<0 TH
EN C=0 ELSE N1$=MID$(N1$,1,C)
960 GOTO 1210
970 IF ASC(N$)<32 OR ASC(N$)>126 THEN BEEP:GOTO 900
980 IF LEN(N1$)>=Z THEN BEEP:GOTO 900
990 IF INSTR(O2$(J),"Time")=0 AND INSTR(O2$(J),"Ts")=0 THEN 1070
1000 X=VAL(N$)
1010 IF C+1=1 AND X<>0 AND X<>2 THEN BEEP:GOTO 900
1020 IF C+1=2 AND X>7 THEN BEEP:GOTO 900
1030 IF C+1=4 AND X>5 THEN BEEP:GOTO 900
1040 IF C+1=7 AND X<>0 AND X<>2 AND X<>4 THEN BEEP:GOTO 900
1050 IF C+1=3 AND X>0 THEN BEEP:GOTO 900
1060 IF C+1=2 AND MID$(N1$,1,1)="2" AND X>3 THEN BEEP:GOTO 900
1070 IF INSTR(O2$(J),"Date")=0 AND INSTR(O2$(J),"Dt")=0 THEN 1170
1080 X=VAL(N$)
1090 IF C+1=1 AND X>1 THEN BEEP:GOTO 900
1100 IF C+1=4 AND X>3 THEN BEEP:GOTO 900
1110 IF C+1=6 AND X<1 THEN BEEP:GOTO 900
1120 IF C+1=2 AND MID$(N1$,1,1)="0" AND X=0 THEN BEEP:GOTO 900
1130 IF C+1=2 AND MID$(N1$,1,1)="1" AND X>2 THEN BEEP:GOTO 900
1140 IF C+1=4 AND MID$(N1$,1,2)="02" AND X>2 THEN BEEP:GOTO 900
1150 IF C+1=5 AND MID$(N1$,4,1)="2" AND X>1 THEN BEEP:GOTO 900
1160 IF C+1=5 AND MID$(N1$,4,1)="0" AND X=0 THEN BEEP:GOTO 900
1170 IF Y=0 THEN 1200
1180 IF N$=" " OR N$="," THEN 1200
1190 IF ASC(N$)<48 OR ASC(N$)>57 THEN BEEP:GOTO 900
1200 N1$=MID$(N1$,1,C)+N$:C=C+1
1210 IF J<=17 THEN COLOR 10,0:LOCATE 6+J,22,0:PRINT N1$;MID$(O2$(J),21+C,Z-C)
1220 IF J>=18 THEN COLOR 10,0:LOCATE J-11,69,0:PRINT N1$;MID$(O2$(J),21+C,Z-C)
1230 GOTO 870
1240 IF N1$<>"" THEN O3$(J)=N1$+STRING$(Z-LEN(N1$)," ")
1250 IF J<=17 THEN COLOR 11,0:LOCATE 6+J,2,0:PRINT O2$(J):LOCATE 6+J,22:PRINT O3
$(J)
1260 IF J>=18 THEN COLOR 11,0:LOCATE J-11,49,0:PRINT O2$(J):LOCATE J-11,69:PRINT
 O3$(J)
1270 N1$="":C=0
1280 RETURN
1290 '
1300 COLOR 14,0:LOCATE 20,34:PRINT "Press Any":LOCATE 21,35:PRINT "Key For":LOCA
TE 22,34:PRINT "Selection"
1310 COLOR 10,0:LOCATE 6+J,22:PRINT O3$(J)
1320 FOR K=L2 TO 6
1330 COLOR 10,0:LOCATE 6+J,22:PRINT F1$(K):O3$(J)=F1$(K):N1$=F1$(K)
1340 N$=INKEY$:IF N$="" THEN 1340
1350 IF ASC(N$)=13 OR ASC(N$)=27 THEN L2=K:LOCATE 20,34:PRINT SPACE$(9):LOCATE 2
1,35:PRINT SPACE$(7):LOCATE 22,34:PRINT SPACE$(9):GOTO 1250
1360 IF ASC(N$)=8 OR ASC(N$)=56 OR ASC(N$)=57 THEN K=K-2:IF K<0 THEN K=5
1370 NEXT K:L2=1
1380 GOTO 1320
1390 '
1400 COLOR 14,0:LOCATE 15,38:PRINT "Press Any":LOCATE 16,39:PRINT "Key For":LOCA
TE 17,38:PRINT "Selection"
1410 COLOR 10,0:LOCATE 6+J,22:PRINT O3$(J)
1420 FOR K=L1 TO 32
1430 IF K>18 THEN COLOR 15,0 ELSE COLOR 10,0
1440 LOCATE 6+J,22:PRINT T$(K):O3$(J)=T$(K):N1$=T$(K)
1450 N$=INKEY$:IF N$="" THEN 1450
1460 IF ASC(N$)=13 OR ASC(N$)=27 THEN L1=K:LOCATE 15,38:PRINT SPACE$(9):LOCATE 1
6,39:PRINT SPACE$(7):LOCATE 17,38:PRINT SPACE$(9):GOTO 1250
1470 IF ASC(N$)=8 OR ASC(N$)=56 OR ASC(N$)=57 THEN K=K-2:IF K<0 THEN K=31
1480 NEXT K:L1=1
```

```
1490 GOTO 1420
1500 '
1510 '    Write Disk Record
1520 '
1530 LSET F$=CHR$(89)
1540 FOR J=1 TO 6:IF O3$(15)=F1$(J) THEN O3$(15)=MID$(STR$(J),2,1) ELSE NEXT J
1550 FOR J=1 TO 32:IF O3$(9)=T$(J) THEN O3$(8)=MID$(STR$(J),2,2) ELSE NEXT J
1560 FOR J=1 TO 36
1570 X=LEN(O2$(J)):Y=INSTR(O2$(J),CHR$(95)):Z=X-Y+1
1580 IF O3$(J)="" OR O3$(J)=STRING$(Z,32) OR O3$(J)=STRING$(Z,0) THEN O3$(J)=MID
$(O2$(J),Z1,Z)
1590 NEXT J
1600 FOR J=1 TO 36:LSET B$(J)=O3$(J):O3$(J)="":NEXT J
1610 PUT #3,1
1620 CLOSE #3:CHAIN "bm005"
1630 END 10 'Copyright 1985 Badger Meter, Inc. - Engineering Division *** Program Name -
bm005s *** Date 06-19-1985
20 'Author D.Wachs       \ - load "bm005s"
30 'Automatic Meter Reading - Customer Data File Maintenance - Sort
40 '
50 COMMON PGM$,O2$(),F1$(),T$()
60 DIM L(100),R(100)
70 '
80 COLOR 9,0:LOCATE 1,1:PRINT "BM005S":COLOR 30,0:LOCATE 25,66:PRINT " * Scan Mo
de *";
90 COLOR 11,0:LOCATE 25,2:PRINT DATE$;" ";TIME$;
100 COLOR 15,0:LOCATE 1,8:PRINT "                   *** Access Plus Sort   ***
"
110 COLOR 14,0:LOCATE 3,2:PRINT "          Sorting Customer Account Index
, Please Wait        "
120 COLOR 12,0:FOR I=5 TO 23:LOCATE I,1:PRINT SPACE$(80);:NEXT I
130 '
140 OPEN "R",#1,"cntr.dat",8:FIELD #1,8 AS I1$:GET #1,1:I1=CVS(I1$)
150 '
160 COLOR 14,0:LOCATE 10,22:PRINT USING " Account Number Total = ###,###";I1
170 COLOR 12,0:LOCATE 12,19:PRINT " *** To Abort Sort Press Esc Key *** "
180 COLOR 14,0:LOCATE 14,23:PRINT "Comparisons Executed = "
190 LOCATE 16,23:PRINT "Switches Executed = "
200 '
210 IF I1=0 THEN 750
220 OPEN "R",#2,"index.dat",8:FIELD #2,8 AS I2$
230 '
240 '    Sort
250 '
260 S1=1
270 L(1)=1
280 R(1)=I1
290 L1=L(S1)
300 R1=R(S1)
310 S1=S1-1
320 L2=L1
330 R2=R1
340 GET #2,INT((L1+R1)/2):X=CVS(I2$)
350 C=C+1:COLOR 14,0:LOCATE 14,46:PRINT USING "###,###";C
360 N$=INKEY$:IF N$="" THEN 380
370 IF ASC(N$)=27 THEN 750
380 GET #2,L2:Y=CVS(I2$)
390 IF Y>=X THEN 420
400 L2=L2+1
410 GOTO 380
```

```
420 C=C+1:COLOR 14,0:LOCATE 14,46:PRINT USING "###,###";C
430 N$=INKEY$:IF N$="" THEN 450
440 IF ASC(N$)=27 THEN 750
450 GET #2,R2:Z=CVS(I2$)
460 IF X>=Z THEN 490
470 R2=R2-1
480 GOTO 420
490 IF L2>R2 THEN 550
500 S2=S2+1:COLOR 14,0:LOCATE 16,44:PRINT USING "###,###";S2
510 LSET I2$=MKS$(Y):PUT #2,R2
520 LSET I2$=MKS$(Z):PUT #2,L2
530 L2=L2+1
540 R2=R2-1
550 IF L2>=R2 THEN 250
560 IF L2>=R1 THEN 600
570 S1=S1-1
580 L(S1)=L2
590 R(S1)=R1
600 R1=R2
610 IF L1<R1 THEN 320
620 IF S1>0 THEN 290
630 '
640 '     Delete '0' From Index
650 '
660 I3=I1
670 FOR I=1 TO I1
680 GET #2,I:I2=CVS(I2$)
690 IF I2=0 THEN I3=I3-1 ELSE GOTO 710
700 NEXT I
710 IF I3=I1 THEN 750
720 J=I1-I3+1:K=1
730 FOR I=J TO I1:GET #2,I:PUT #2,K:K=K+1:NEXT I
740 LSET I1$=MKS$(I3):PUT #1,1
750 CLOSE #1,#2
760 CHAIN "ba005"
770 END 10 'Copyright 1985 Badger Meter, Inc. - Engineering Division * Program Name - ba007 * Date 06-17-1985
20 'Author D.Wachs       \ - load "ba007"
30 'Automatic Meter Reading - Customer Data File Print - CRT
40 '
50 COMMON PGM$,O2$(),F1$(),T$()
60 DIM O3$(36),B$(36)
70 '
80 ON TIMER(600) GOSUB 90:GOTO 110
90 S1=1:RETURN
100 '
110 OPEN "R",#1,"pru.dat",5:FIELD #1,5 AS T2$:GET #1,7:T3$=T2$:CLOSE #1:T3=VAL(T3$)
120 IF T3=0 THEN T3$=""
130 IF T3>=5 AND T3<=59 THEN T3$="/Min"
140 IF T3=60 THEN T3$="/Hr"
150 '
160 OPEN "R",#3,"aarl.dat",304
170 FIELD #3,1 AS F$:Z1=1
180 FOR J=1 TO 36
190 X=LEN(O2$(J)):Y=INSTR(O2$(J),CHR$(95)):Z=X-Y+1
200 IF Y=Z-1 THEN 230
210 FIELD #3,Z1 AS DUMMY$,Z2 AS DUMMY$,Z AS B$(J)
220 IF Z1+Z<255 THEN Z1=Z1+Z ELSE Z2=Z2+Z
```

```
230 NEXT J
240 '
250 COLOR 9,0:LOCATE 1,1:PRINT "BM007 "
260 COLOR 11,0:LOCATE 25,2:PRINT DATE$;" ";TIME$;
270 COLOR 15,0:LOCATE 1,8:PRINT "  *** Access Plus Individual Customer Account D
isplay - CRT ***       "
280 COLOR 12,0:FOR I=5 TO 23:LOCATE I,1:PRINT SPACE$(80);:NEXT I
290 '
300 '     Enter Account Number
310 '
320 COLOR 26,0:LOCATE 25,66:PRINT " * Edit Mode *";
330 COLOR 14,0:LOCATE 3,4:PRINT " To End Press Enter.        "
340 COLOR 10,0:LOCATE 3,61:PRINT SPACE$(19)
350 COLOR 10,0:LOCATE 3,30:PRINT "Enter Customer Account Number? ";:N1$="":C=0
360 LOCATE 3,61+C,1,0,7
370 TIMER ON
380 IF S1<>0 THEN 730
390 N$=INKEY$:IF N$="" THEN 380
400 TIMER OFF
410 IF ASC(N$)=13 OR ASC(N$)=27 THEN C1=VAL(N1$):GOTO 480
420 IF ASC(N$)=8 AND C=0 THEN 390
430 IF ASC(N$)=8 THEN LOCATE 3,POS(0)-1:PRINT " ";:C=C-1:IF C<0 THEN C=0 ELSE N1
$=MID$(N1$,1,C):GOTO 470
440 IF ASC(N$)<48 OR ASC(N$)>57 THEN BEEP:GOTO 390
450 IF LEN(N1$)>4 THEN BEEP:GOTO 390
460 N1$=MID$(N1$,1,C)+N$:C=C+1
470 COLOR 10,0:LOCATE 3,61,0:PRINT N1$:GOTO 360
480 LOCATE ,,0
490 IF C1=0 THEN 730
500 IF C1>=1 AND C1<=75000! THEN 590
510 COLOR 14,4:LOCATE 3,30:BEEP:PRINT " Error Invalid Account Number 1-75000 Onl
y!!! "
520 GOSUB 540:GOTO 350
530 '
540 FOR J=1 TO 5000:NEXT J:COLOR 10,0:LOCATE 3,30:PRINT SPACE$(50)
550 RETURN
560 '
570 '     Read Disk File & Check Account Number
580 '
590 .
600 . ASC(F$)<>89 THEN COLOR 14,4:LOCATE 3,30:BEEP:PRINT "  Error Account Numbe
r Not On File!  ":GOSUB 540:GOTO 350
610 FOR J=1 TO 36:O3$(J)=B$(J):NEXT J:O3$(15)=F$(VAL(O3$(15))):O3$(8)=T$(VAL(O3
$(8))):O3$(12)=T$(VAL(O3$(12))+33):O3$(13)=T$(VAL(O3$(13))+33)
620 COLOR 14,1:LOCATE 6,25:PRINT USING " Customer Account Number ---- ##,### ";C
1
630 FOR J=1 TO 33
640 COLOR 11,0
650 X=INSTR(O2$(J),"*"):IF X>0 THEN COLOR 14,1
660 IF J<=17 THEN LOCATE 6+J,2:PRINT MID$(O2$(J),1,18):LOCATE 6+J,22:PRINT O3$(J
)
670 IF J>=18 THEN LOCATE J-11,49:PRINT MID$(O2$(J),1,18):LOCATE J-11,69:PRINT O3
$(J
680 NEXT J
690 T4$="      ":IF O3$(30)="On " THEN T4$=T3$
700 COLOR 14,0:FOR J=20 TO 22:LOCATE J,75:PRINT T4$:NEXT J
710 COLOR 11,0:LOCATE 25,2:PRINT DATE$;" ";TIME$;:GOTO 340
720 '
730 CLOSE #3
740 CHAIN "bm001b"
750 END
```

```
10 'Copyright 1985 Badger Meter, Inc. - Engineering Division *** Program Name -
bm007a *** Date 06-17-1985
20 'Author D.Wachs      \ - load "bm007a"
30 'Automatic Meter Reading - Scan Customer Accounts On CRT
40 '
50 COMMON PGM$,O2$(),F1$(),T$()
60 DIM O3$(36),B$(36)
70 '
80 ON TIMER(600) GOSUB 90:GOTO 110
90 S1=1:RETURN
100 '
110 OPEN "R",#1,"pru.dat",5:FIELD #1,5 AS T2$:GET #1,7:T3$=T2$:CLOSE #1:T3=VAL(T
3$)
120 IF T3=0 THEN T3$=""
130 IF T3>=5 AND T3<=59 THEN T3$="/Min"
140 IF T3=60 THEN T3$="/Hr"
150 '
160 OPEN "R",#1,"cntr.dat",8:FIELD #1,8 AS I1$:GET #1,1:I1=CVS(I1$):CLOSE #1
170 OPEN "R",#2,"index.dat",8:FIELD #2,8 AS I2$
180 OPEN "R",#3,"amr1.dat",304
190 FIELD #3,1 AS F$:Z1=1
200 FOR J=1 TO 36
210 X=LEN(O2$(J)):Y=INSTR(O2$(J),CHR$(95)):Z=X-Y+1
220 IF X=Z-1 THEN 250
230 FIELD #3,Z1 AS DUMMY$,Z2 AS DUMMY$,Z AS B$(J)
240 IF Z1+Z<255 THEN Z1=Z1+Z ELSE Z2=Z2+Z
250 NEXT J
260 '
270 COLOR 9,0:LOCATE 1,1:PRINT "BM007A"
280 COLOR 11,0:LOCATE 25,2:PRINT DATE$;" ";TIME$;
290 COLOR 15,0:LOCATE 1,8:PRINT "    *** Access Plus Scan All Customer Account
s On CRT ***"
300 COLOR 30,0:LOCATE 25,66:PRINT " * Scan Mode *";
310 COLOR 14,0:LOCATE 3,2:PRINT "                    Press Any Key To Scan. Es
c To End."
320 COLOR 12,0:FOR I=5 TO 23:LOCATE I,1:PRINT SPACE$(80);:NEXT I
330 IF I1=0 THEN 600
340 '
350 N$=CHR$(32)
360 FOR I=1 TO I1
370 GET #2,I:I2=CVS(I2$)
380 IF I2=0 THEN 540
390 GET #3,I2
400 FOR J=1 TO 36:O3$(J)=B$(J):NEXT J:O3$(15)=F1$(VAL(O3$(15))):O3$(8)=T$(VAL(O3
$(8))):O3$(12)=T$(VAL(O3$(12))+33):O3$(13)=T$(VAL(O3$(13))+33)
410 COLOR 14,1:LOCATE 6,25:PRINT USING " Customer Account Number ---- ##,### ";I
2
420 FOR J=1 TO 33
430 COLOR 11,0
440 X=INSTR(O2$(J),"*"):IF X<>0 THEN COLOR 14,1
450 IF J<=17 THEN LOCATE 6+J,2:PRINT MID$(O2$(J),1,18):LOCATE 6+J,22:PRINT O3$(J
)
460 IF J>=18 THEN LOCATE J-11,49:PRINT MID$(O2$(J),1,18):LOCATE J-11,69:PRINT O3
$(J)
470 NEXT J
480 T4$="     ":IF O3$(30)="On " THEN T4$=T3$
490 COLOR 14,0:FOR J=20 TO 22:LOCATE J,75:PRINT T4$:NEXT J
500 TIMER ON
510 IF S1<>2 THEN 600
520 N$=INKEY$:IF N$="" THEN COLOR 11,0:LOCATE 25,2:PRINT DATE$;" ";TIME$;:GOTO 5
10
530 TIMER OFF
```

```
540 IF ASC(N$)=8 OR ASC(N$)=56 OR ASC(N$)=57 THEN I=I-2:IF I<0 THEN I=I1-1 ELSE
GOTO 550
550 IF ASC(N$)=27 THEN 600
560 IF ASC(N$)=49 THEN I=I1-1
570 IF ASC(N$)=55 THEN I=0
580 NEXT I
590 GOTO 360
600 CLOSE #1,#2,#3
610 CHAIN "bm001b"
620 END

10 'Copyright 1985 Badger Meter, Inc. - Engineering Division *** Program Name -
bm008 *** Date 06-17-1985
20 'Author D.Wachs        \ - load "bm008"
30 'Automatic Meter Reading - Print Individual Customer Account On Printer
40 '
50 COMMON PGM$,O2$(),F1$(),T$()
60 DIM O3$(36),B$(36)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 3,30:PRINT " *** Please Turn Line
 Printer On. *** ":IF S1<>0 THEN 1000 ELSE RESUME
140 IF ERR=27 THEN COLOR 30,4:LOCATE 3,30:PRINT " *** Out of Paper On Line Print
er. *** ":IF S1<>0 THEN 1000 ELSE RESUME
150 COLOR 28,0:LOCATE 5,7:PRINT "Error";ERR:STOP
160 '
170 WIDTH "LPT1:",80
180 '
190 OPEN "R",#1,"pru.dat",5:FIELD #1,5 AS T2$:GET #1,7:T3$=T2$:CLOSE #1:T3=VAL(T
3$)
200 IF T3=0 THEN T3$=""
210 IF T3>=5 AND T3<=59 THEN T3$="/Min"
220 IF T3=60 THEN T3$="/Hr"
230 '
240 OPEN "R",#3,"amr1.dat",304
250 FIELD #3,1 AS F$:Z1=1
260 FOR J=1 TO 36
270 X=LEN(O2$(J)):Y=INSTR(O2$(J),CHR$(95)):Z=X-Y+1
280 IF X=Z-1 THEN 310
290 FIELD #3,Z1 AS DUMMY$,Z2 AS DUMMY$,Z AS B$(J)
300 IF Z1+Z<255 THEN Z1=Z1+Z ELSE Z2=Z2+Z
310 NEXT J
320 '
330 COLOR 9,0:LOCATE 1,1:PRINT "BM008 "
340 COLOR 11,0:LOCATE 25,2:PRINT DATE$;" ";TIME$;
350 COLOR 15,0:LOCATE 1,8:PRINT "  *** Access Plus Print Individual Customer Acc
ount - Printer ***        "
360 COLOR 12,0:FOR I=5 TO 23:LOCATE I,1:PRINT SPACE$(80);:NEXT I
370 '
380 '    Enter Account Number
390 '
400 COLOR 26,0:LOCATE 25,66:PRINT " * Edit Mode *";
410 COLOR 14,0:LOCATE 3,4:PRINT " To End Press Enter.        "
420 COLOR 12,0:LOCATE 3,61:PRINT SPACE$(19)
430 COLOR 12,0:LOCATE 3,30:PRINT "Enter Customer Account Number? ";:N1$="":C=0
440 LOCATE 3,61+C,1,0,7
450 TIMER ON
460 IF S1<>0 THEN 1000
```

```
470 N$=INKEY$:IF N$="" THEN 460
480 TIMER OFF
490 IF ASC(N$)=13 OR ASC(N$)=27 THEN C1=VAL(N1$):GOTO 560
500 IF ASC(N$)=8 AND C=0 THEN 470
510 IF ASC(N$)=8 THEN LOCATE 3,POS(0)-1:PRINT " ";C=C-1:IF C<0 THEN C=0 ELSE N1$
=MID$(N1$,1,C):GOTO 550
520 IF ASC(N$)<48 OR ASC(N$)>57 THEN BEEP:GOTO 450
530 IF LEN(N1$)>4 THEN BEEP:GOTO 450
540 N1$=MID$(N1$,1,C)+N$:C=C+1
550 COLOR 10,0:LOCATE 3,61,2:PRINT N1$:GOTO 440
560 LOCATE ,,0
570 IF C1=0 THEN 1000
580 IF C1>=1 AND C1<=75000! THEN 670
590 COLOR 14,4:LOCATE 3,30:BEEP:PRINT " Error Invalid Account Number 1-75000 Onl
y!!! "
600 GOSUB 620:GOTO 430
610 '
620 FOR J=1 TO 5000:NEXT J:COLOR 10,0:LOCATE 3,30:PRINT SPACE$(50)
630 RETURN
640 '
650 '     Read Disk File & Check Account Number
660 '
670 GET #3,C1
680 IF ASC(F$)<>89 THEN COLOR 14,4:LOCATE 3,30:BEEP:PRINT " Error Account Numbe
r Not On File! ":GOSUB 620:GOTO 430
690 FOR J=1 TO 36:O3$(J)=B$(J):NEXT J:O3$(15)=F1$(VAL(O3$(15))):O3$(8)=T$(VAL(O3
$(8))):O3$(12)=T$(VAL(O3$(12))+33):O3$(13)=T$(VAL(O3$(13))+33)
700 '
710 '     Print CRT
720 '
730 COLOR 14,1:LOCATE 6,25:PRINT USING " Customer Account Number ---- ##,### ";C
1
740 FOR J=1 TO 33
750 COLOR 11,0
760 X=INSTR(O2$(J),"*"):IF X<>0 THEN COLOR 14,1
770 IF J<=17 THEN LOCATE 6+J,2:PRINT MID$(O2$(J),1,18):LOCATE 6+J,22:PRINT O3$(J
)
780 IF J>=18 THEN LOCATE J-11,49:PRINT MID$(O2$(J),1,18):LOCATE J-11,69:PRINT O3
$(J)
790 NEXT J
800 T4$="       ":IF O3$(30)="On " THEN T4$=T3$
810 COLOR 14,0:FOR J=20 TO 22:LOCATE J,75:PRINT T4$:NEXT J
820 COLOR 11,0:LOCATE 25,2:PRINT DATE$;" ";TIME$;
830 '
840 '     Print Line Printer
850 '
860 LPRINT CHR$(18);CHR$(27);CHR$(65);CHR$(12);CHR$(27);CHR$(50)
870 LPRINT CHR$(12);"BM000";CHR$(14);TAB(17);"Access Plus"
880 LPRINT TAB(23);"Copyright 1986 Badger Meter, Inc."
890 LPRINT TAB(27);"Utility Products Division"
900 LPRINT TAB(27);"as of ";DATE$;" ";TIME$;CHR$(10)
910 LPRINT CHR$(14);TAB(8);"Individual Customer Account";CHR$(10)
920 LPRINT STRING$(79,240)
930 LPRINT CHR$(27);CHR$(69);TAB(30);"Customer Account Number ----";C1;CHR$(27);
CHR$(70)
940 FOR J=1 TO 17
950 LPRINT TAB(2);MID$(O2$(J),1,18);TAB(21);O3$(J);TAB(48);MID$(O2$(J+17),1,18);
TAB(67);O3$(J+17);
960 IF J>=14 AND J<=16 THEN LPRINT " ";T4$
970 NEXT J
980 LPRINT TAB(27);"<<<< End of Report >>>>"
```

```
990 GOTO 420
1000 CLOSE #3
1010 CHAIN "b008c"
1020 END

10 'Copyright 1985 Badger Meter, Inc. - Engineering Division *** Program Name -
b008a *** Date 06-17-1985
20 'Author D.Wachs        \ - load "b008a"
30 'Automatic Meter Reading - Print All Customer Accounts On Printer
40 '
50 COMMON PG#$,O2$(),F1$(),T$()
60 DIM O3$(36),B$(36)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 5,19:PRINT "   ** Please Turn Li
ne Printer On. **    ":IF S1<>0 THEN 670 ELSE RESUME
140 IF ERR=27 THEN COLOR 30,4:LOCATE 5,19:PRINT "   *** Out of Paper On Line Pri
nter. ***    ":IF S1<>0 THEN 670 ELSE RESUME
150 COLOR 28,0:LOCATE 5,7:PRINT "Error";ERR:STOP
160 '
170 WIDTH "LPT1:",80
180 OPEN "R",#1,"pru.dat",5:FIELD #1,5 AS T2$:GET #1,7:T3$=T2$:CLOSE #1:T3=VAL(T
3$)
190 IF T3=0 THEN T3$=""
200 IF T3>=5 AND T3<=59 THEN T3$="/Min"
210 IF T3=60 THEN T3$="/Hr"
220 '
230 OPEN "R",#1,"cntr.dat",8:FIELD #1,8 AS I1$:GET #1,1:I1=CVS(I1$):CLOSE #1
240 OPEN "R",#2,"index.dat",8:FIELD #2,8 AS I2$
250 OPEN "R",#3,"aar1.dat",304
260 FIELD #3,1 AS F$:Z1=1
270 FOR J=1 TO 36
280 X=LEN(O2$(J)):Y=INSTR(O2$(J),CHR$(95)):Z=X-Y+1
290 IF X=Z-1 THEN 320
300 FIELD #3,Z1 AS DUMMY$,Z2 AS DUMMY$,Z AS B$(J)
310 IF Z1+Z<255 THEN Z1=Z1+Z ELSE Z2=Z2+Z
320 NEXT J
330 '
340 COLOR 9,0:LOCATE 1,1:PRINT "BM008A"
350 COLOR 11,0:LOCATE 25,2:PRINT DATE$;" ";TIME$;
360 '
370 LPRINT CHR$(15);CHR$(27);CHR$(65);CHR$(12);CHR$(27);CHR$(50):TIMER OFF:S2=0
380 C1=4:GOTO 500
390 '
400 P1=P1+1
410 LPRINT CHR$(12);"BM008A";CHR$(14);TAB(17);"Access Plus";CHR$(20);TAB(49);"Pa
ge";P1
420 LPRINT TAB(23);"Copyright 1986 Badger Meter, Inc."
430 LPRINT TAB(27);"Utility Products Division"
440 LPRINT TAB(27);"as of ";DATE$;" ";TIME$;CHR$(10)
450 LPRINT CHR$(14);TAB(12);"Customer Accounts"
460 LPRINT STRING$(79,240)
470 C1=0
480 RETURN
490 '
500 FOR I=1 TO I1
510 GET #2,I:I2=CVS(I2$)
```

```
520 IF I2=0 THEN 650
530 GET #3,I2
540 FOR J=1 TO 36:O3$(J)=B$(J):NEXT J:O3$(15)=F1$(VAL(O3$(15))):O3$(8)=T$(VAL(O3
$(8))):O3$(12)=T$(VAL(O3$(12))+33):O3$(13)=T$(VAL(O3$(13))+33)
550 IF C1=5 THEN GOSUB 400
560 LPRINT CHR$(27);CHR$(69);TAB(30);"Customer Account Number ----";I2;CHR$(27);
CHR$(70)
570 '            17
580 PRINT TAB(2);MID$(O2$(J),1,16);TAB(21);O3$(J);TAB(49);MID$(O2$(J+17),1,13);
TAB(67);O3$(J+17);
590 T4$="      ":IF O3$(30)="On " THEN T4$=+T3$
600 IF J>=14 AND J<=16 THEN LPRINT " ";T4$
610 NEXT J:LPRINT
620 C1=C1+1
630 N$=INKEY$:IF N$="" THEN 650
640 IF ASC(N$)=27 THEN 670
650 NEXT I
660 LPRINT TAB(27);"<<<< End of Report >>>>"
670 CLOSE #1,#2,#3
680 CHAIN "bm001c"
690 END 10 'Copyright 1985 Badger Meter, Inc. - Engineering Division *** Program Name -
bm009 *** Date 06-19-1985
20 'Author D.Wachs       \ - load "bm009"
30 'Automatic Meter Reading - Scan Key Fields, Customer Accounts On CRT
40 '
50 COMMON PGM$,O2$(),F1$(),T$()
60 DIM O3$(36),O4$(36),B$(36)
70 '
80 ON TIMER(600) GOSUB 90:GOTO 110
90 S1=1:RETURN
100 '
110 OPEN "R",#1,"pru.dat",5:FIELD #1,5 AS T2$:GET #1,7:T3$=T2$:CLOSE #1:T3=VAL(T
3$)
120 IF T3=0 THEN T3$=""
130 IF T3>=5 AND T3<=59 THEN T3$="/Min"
140 IF T3=60 THEN T3$="/Hr"
150 '
160 OPEN "R",#1,"cntr.dat",8:FIELD #1,8 AS I1$:GET #1,1:I1=CVS(I1$):CLOSE #1
170 OPEN "R",#2,"index.dat",8:FIELD #2,8 AS I2$
180 OPEN "R",#3,"amr1.dat",304
190 FIELD #3,1 AS F$:Z1=1
200 FOR J=1 TO 36
210 X=LEN(O2$(J)):Y=INSTR(O2$(J),CHR$(95)):Z=X-Y+1
220 IF X=Z-1 THEN 250
230 FIELD #3,Z1 AS DUMMY$,Z2 AS DUMMY$,Z AS B$(J)
240 IF Z1+Z<255 THEN Z1=Z1+Z ELSE Z2=Z2+Z
250 NEXT J
260 '
270 GOSUB 290:GOTO 340
280 '
290 COLOR 9,0:LOCATE 1,1:PRINT "BM009 "
300 COLOR 11,0:LOCATE 25,2:PRINT DATE$;" ";TIME$;
310 COLOR 15,0:LOCATE 1,8:PRINT " *** Access Plus Scan Key Fields - Customer Ac
counts On CRT ***       "
320 COLOR 12,0:LOCATE 3,2:PRINT SPACE$(78)
330 RETURN
340 COLOR 12,0:FOR I=5 TO 23:LOCATE I,1:PRINT SPACE$(80);:NEXT I
350 COLOR 14,0:LOCATE 3,2:PRINT "         Scan To Desired Line, Press Enter T
o Edit, Esc To End.      "
360 FOR J=1 TO 33
```

```
370 COLOR 11,0
380 X=INSTR(O2$(J),"$"):IF X<>0 THEN COLOR 14,1
390 IF J<=17 THEN LOCATE 6+J,2:PRINT O2$(J):LOCATE 6+J,22:PRINT O3$(J)
400 IF J>=18 THEN LOCATE J-11,49:PRINT O2$(J):LOCATE J-11,69:PRINT O3$(J)
410 NEXT J
420 '
430 '    Scan Mode
440 '
450 FOR J=1 TO 33
460 X=INSTR(O2$(J),"$"):IF X<>0 THEN 580
470 COLOR 30,0:LOCATE 25,66:PRINT " $ Scan Mode $";
480 IF J<=17 THEN COLOR 16,3:LOCATE 6+J,2:PRINT MID$(O2$(J),1,19)
490 IF J>=18 THEN COLOR 16,3:LOCATE J-11,49:PRINT MID$(O2$(J),1,19)
500 TIMER ON
510 IF S1<>0 THEN 2040
520 N$=INKEY$:IF N$="" THEN COLOR 11,0:LOCATE 25,2:PRINT DATE$;" ";TIME$;:GOTO 5
10
530 TIMER OFF
540 IF ASC(N$)=27 THEN 1580
550 IF ASC(N$)=13 THEN GOSUB 730:GOTO 680
560 IF J<=17 THEN COLOR 11,0:LOCATE 6+J,2:PRINT MID$(O2$(J),1,19)
570 IF J>=18 THEN COLOR 11,0:LOCATE J-11,49:PRINT MID$(O2$(J),1,19)
580 IF ASC(N$)<=64 OR ASC(N$)>=123 THEN 650
590 FOR K=J+1 TO 33
600 IF N$=MID$(O2$(K),1,1) OR ASC(N$)-32=ASC(MID$(O2$(K),1,1)) THEN J=K-1:GOTO 6
80
610 NEXT K
620 FOR K=1 TO J
630 IF N$=MID$(O2$(K),1,1) OR ASC(N$)-32=ASC(MID$(O2$(K),1,1)) THEN J=K-1:GOTO 6
80
640 NEXT K
650 IF ASC(N$)=8 OR ASC(N$)=56 OR ASC(N$)=57 THEN J=J-2:IF J<0 THEN J=32
660 IF ASC(N$)=49 THEN J=32
670 IF ASC(N$)=55 THEN J=0
680 NEXT J
690 GOTO 450
700 '
710 '    Edit Mode
720 '
730 COLOR 26,0:LOCATE 25,66:PRINT " $ Edit Mode $";
740 X=LEN(O2$(J)):Y=INSTR(O2$(J),CHR$(95)):Z=X-Y+1
750 Y=INSTR(O2$(J),CHR$(58))
760 IF J<=17 THEN COLOR 10,0:LOCATE 6+J,2:PRINT MID$(O2$(J),1,19);MID$(O2$(J),20
,Z+1)
770 IF J>=18 THEN COLOR 10,0:LOCATE J-11,49:PRINT MID$(O2$(J),1,19);MID$(O2$(J),
20,Z+1)
780 IF J=12 THEN 1460
790 IF J=13 THEN 1460
800 IF J=15 THEN 1250
810 IF J=8 THEN 1350
820 IF MID$(O2$(J),21+C,1)<>"_" AND MID$(O2$(J),21+C,1)<>" " THEN N$=MID$(O2$(J),
21+C,1):GOTO 1150
830 IF J<=17 THEN LOCATE 6+J,22+C,1,0,7
840 IF J>=18 THEN LOCATE J-11,69+C,1,0,7
850 N$=INKEY$:IF N$="" THEN 850
860 IF ASC(N$)=13 OR ASC(N$)=27 THEN 1190
870 IF ASC(N$)<>8 THEN 920
880 IF C=0 THEN 850
890 C=C-1:IF C<0 THEN C=0 ELSE N1$=MID$(N1$,1,C)
900 IF MID$(O2$(J),21+C,1)<>"_" AND MID$(O2$(J),21+C,1)<>" " THEN C=C-1:IF C<0 TH
EN C=0 ELSE N1$=MID$(N1$,1,C)
```

```
910 GOTO 1160
920 IF ASC(N$)<32 OR ASC(N$)>126 THEN BEEP:GOTO 850
930 IF LEN(N1$)>=Z THEN BEEP:GOTO 850
940 IF INSTR(O2$(J),"Time")=0 AND INSTR(O2$(J),"Tm")=0 THEN 1020
950 X=VAL(N$)
960 IF C+1=1 AND X<>0 AND X<>2 THEN BEEP:GOTO 850
970 IF C+1=2 AND X>7 THEN BEEP:GOTO 850
980 IF C+1=4 AND X>5 THEN BEEP:GOTO 850
990 IF C+1=7 AND X<>0 AND X<>2 AND X<>4 THEN BEEP:GOTO 850
1000 IF C+1=8 AND X>0 THEN BEEP:GOTO 850
1010 IF C+1=2 AND MID$(N1$,1,1)="2" AND X>3 THEN BEEP:GOTO 850
1020 IF INSTR(O2$(J),"Date")=0 AND INSTR(O2$(J),"Dt")=0 THEN 1120
1030 X=VAL(N$)
1040 IF C+1=1 AND X>1 THEN BEEP:GOTO 850
1050 IF C+1=4 AND X>3 THEN BEEP:GOTO 850
1060 IF C+1=6 AND X<1 THEN BEEP:GOTO 850
1070 IF C+1=2 AND MID$(N1$,1,1)="0" AND X=0 THEN BEEP:GOTO 850
1080 IF C+1=2 AND MID$(N1$,1,1)="1" AND X>2 THEN BEEP:GOTO 850
1090 IF C+1=4 AND MID$(N1$,1,2)="02" AND X>2 THEN BEEP:GOTO 850
1100 IF C+1=5 AND MID$(N1$,4,1)="3" AND X>1 THEN BEEP:GOTO 850
1110 IF C+1=5 AND MID$(N1$,4,1)="2" AND X=0 THEN BEEP:GOTO 850
1120 IF Y=0 THEN 1150
1130 IF N$=" " OR N$="." THEN 1150
1140 IF ASC(N$)<48 OR ASC(N$)>57 THEN BEEP:GOTO 850
1150 N1$=MID$(N1$,1,C)+N$:C=C+1
1160 IF J<=17 THEN COLOR 10,0:LOCATE 6+J,22,0:PRINT N1$;MID$(O2$(J),21+C,Z-C)
1170 IF J>=18 THEN COLOR 10,0:LOCATE J-11,69,0:PRINT N1$;MID$(O2$(J),21+C,Z-C)
1180 GOTO 820
1190 IF N1$<>"" THEN O3$(J)=N1$+STRING$(Z-LEN(N1$)," ") ELSE O3$(J)=N1$
1200 IF J<=17 THEN COLOR 11,0:LOCATE 6+J,2,0:PRINT O2$(J):LOCATE 6+J,22:PRINT O3$(J)
1210 IF J>=18 THEN COLOR 11,0:LOCATE J-11,49,0:PRINT O2$(J):LOCATE J-11,69:PRINT O3$(J)
1220 O3$(J)=N1$:N1$="":C=0
1230 RETURN
1240 '
1250 COLOR 14,0:LOCATE 20,34:PRINT "Press Any":LOCATE 21,35:PRINT "Key For":LOCATE 22,34:PRINT "Selection"
1260 COLOR 10,0:LOCATE 6+J,22:PRINT O3$(J)
1270 FOR K=1 TO 6
1280 COLOR 10,0:LOCATE 6+J,22:PRINT F1$(K):O3$(J)=F1$(K):N1$=F1$(K)
1290 N$=INKEY$:IF N$="" THEN 1290
1300 IF ASC(N$)=13 OR ASC(N$)=27 THEN LOCATE 20,34:PRINT SPACE$(9):LOCATE 21,35:PRINT SPACE$(7):LOCATE 22,34:PRINT SPACE$(9):GOTO 1200
1310 IF ASC(N$)=8 OR ASC(N$)=56 OR ASC(N$)=57 THEN K=K-2:IF K<0 THEN K=5
1320 NEXT K
1330 GOTO 1270
1340 '
1350 COLOR 14,0:LOCATE 15,38:PRINT "Press Any":LOCATE 16,39:PRINT "Key For":LOCATE 17,38:PRINT "Selection"
1360 COLOR 10,0:LOCATE 6+J,22:PRINT O3$(J)
1370 FOR K=1 TO 32
1380 IF K>18 THEN COLOR 15,0 ELSE COLOR 10,0
1390 LOCATE 6+J,22:PRINT T$(K):O3$(J)=T$(K):N1$=T$(K)
1400 N$=INKEY$:IF N$="" THEN 1400
1410 IF ASC(N$)=13 OR ASC(N$)=27 THEN LOCATE 15,38:PRINT SPACE$(9):LOCATE 16,39:PRINT SPACE$(7):LOCATE 17,38:PRINT SPACE$(9):GOTO 1200
1420 IF ASC(N$)=8 OR ASC(N$)=56 OR ASC(N$)=57 THEN K=K-2:IF K<0 THEN Y=31
1430 NEXT K
1440 GOTO 1370
1450 '
```

```
1460 COLOR 14,0:LOCATE 15,38:PRINT "Press Any":LOCATE 16,39:PRINT "Key For":LOCA
TE 17,38:PRINT "Selection"
1470 COLOR 10,0:LOCATE 6+J,22:PRINT O3$(J)
1480 FOR K=34 TO 44
1490 LOCATE 6+J,22:PRINT T$(K):O3$(J)=T$(K):N1$=T$(K)
1500 N$=INKEY$:IF N$="" THEN 1500
1510 IF ASC(N$)=13 OR ASC(N$)=27 THEN LOCATE 15,38:PRINT SPACE$(9):LOCATE 16,39:
PRINT SPACE$(7):LOCATE 17,38:PRINT SPACE$(9):GOTO 1200
1520 IF ASC(N$)=8 OR ASC(N$)=56 OR ASC(N$)=57 THEN K=K-2:IF K<33 THEN K=43
1530 NEXT K
1540 GOTO 1460
1550 '
1560 '    Scan File
1570 '
1580 FOR J=1 TO 33
1590 IF O3$(J)<>"" THEN 1610
1600 NEXT J:GOTO 2040
1610 GOSUB 320
1620 FOR I=1 TO 11
1630 N$=INKEY$:IF N$="" THEN 1650
1640 IF ASC(N$)=27 THEN 2040
1650 GET #1,1:I2=CVS(I2$)
1660 IF I2=0 THEN 1940
1670 GET #2,I2
1680 FOR J=1 TO 33:O4$(J)=B$(J):NEXT J:O4$(5)=F1$(VAL(O4$(5))):O4$(6)=T$(VAL(O
4$(6))):O4$(7)=T$(VAL(O4$(7))+27):O4$(8)=T$(VAL(O4$(8))+37)
1690 COLOR 11,0:LOCATE 25,2:PRINT DATE$;" ";TIME$;
1700 COLOR 14,0:LOCATE 3,2:PRINT USING " # Scanning Account Number ##,### # ";I2

1710 FOR J=1 TO 33
1720 IF O3$(J)="" THEN 1930
1730 COLOR 14,0:LOCATE 3,39:PRINT USING " \            \ \
   ";O3$(J);O3$(J)
1740 IF INSTR(O4$(J),O3$(J))=0 THEN 1930
1750 '
1760 '    Print CRT
1770 '
1780 COLOR 14,1:LOCATE 6,25:PRINT USING " Customer Account Number ---- ##,### ";
I2
1790 FOR M=1 TO 33
1800 COLOR 11,0
1810 X=INSTR(O2$(M),"*"):IF X>0 THEN COLOR 14,1
1820 IF M<=17 THEN LOCATE 6+M,2:PRINT MID$(O2$(M),1,19):LOCATE 6+M,22:PRINT O4$(
M)
1830 IF M>=18 THEN LOCATE M-11,49:PRINT MID$(O2$(M),1,19):LOCATE M-11,69:PRINT O
4$(M)
1840 NEXT M
1850 T4$="       ":IF O4$(30)="On " THEN T4$=T3$
1860 COLOR 14,0:FOR M=20 TO 22:LOCATE M,75:PRINT T4$:NEXT M
1870 COLOR 30,0:LOCATE 3,2:PRINT "  # Press Any Key To Continue  # "
1880 TIMER ON
1890 IF S1<>0 THEN 2040
1900 N$=INKEY$:IF N$="" THEN COLOR 11,0:LOCATE 25,2:PRINT DATE$;" ";TIME$;:GOTO
1890
1910 TIMER OFF
1920 IF ASC(N$)=27 THEN 2040
1930 NEXT J
1940 NEXT I
1950 FOR J=1 TO 33:O3$(J)="":NEXT J
1960 COLOR 14,0:LOCATE 3,2:PRINT "              # End of Scan Press Any Key To Con
tinue, ESC To End.  #"
```

```
1970 TIMER ON
1980 IF S1<>0 THEN 2040
1990 N$=INKEY$:IF N$="" THEN COLOR 11,0:LOCATE 25,2:PRINT DATE$;" ";TIME$;:GOTO
 1982
2000 TIMER OFF
2010 IF ASC(N$)=27 THEN 2040
2020 COLOR 12,0:LOCATE 6,2:PRINT SPACE$(78)
2030 GOSUB 320:GOTO 340
2040 CLOSE #1,#2,#3
2050 CHAIN "bm015"
2060 END

10 'Copyright 1985 Badger Meter, Inc. - Engineering Division *** Program Name -
 bm010 *** Date 06-19-1985
20 'Author D.Wachs      \ - load "bm010"
30 'Automatic Meter Reading - Scan Key Fields, Customer Accounts On Line Printer 40 '
50 COMMON PGM$,O2$(),F1$(),T$()
60 DIM O0$(36),O4$(36),B$(36)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 3,21:PRINT " *** Please Turn Line
 Printer On. *** ";IF S1<>0 THEN 2280 ELSE RESUME
140 IF ERR=27 THEN COLOR 30,4:LOCATE 3,21:PRINT " *** Out of Paper On Line Print
er. *** ":IF S1<>0 THEN 2280 ELSE RESUME
150 COLOR 25,0:LOCATE 5,7:PRINT "Error";ERR:STOP
160 '
170 WIDTH "LPT1:",82
180 '
190 OPEN "R",#1,"pru.dat",5:FIELD #1,5 AS T2$:GET #1,7:T3$=T2$:CLOSE #1:T3=VAL(T
3$)
200 IF T3=0 THEN T3$=""
210 IF T3>=5 AND T3<=59 THEN T3$="/Min"
220 IF T3=60 THEN T3$="/Hr"
230 '
240 OPEN "R",#1,"cntr.dat",8:FIELD #1,8 AS I1$:GET #1,1:I1=CVS(I1$):CLOSE #1
250 OPEN "R",#2,"index.dat",8:FIELD #2,8 AS I2$
260 OPEN "R",#3,"aar1.dat",304
270 FIELD #3,1 AS F$:Z1=1
280 FOR J=1 TO 36
290 X=LEN(O2$(J)):Y=INSTR(O2$(J),CHR$(95)):Z=X-Y+1
300 IF X=Z-1 THEN 330
310 FIELD #3,Z1 AS DUMMY$,Z2 AS DUMMY$,Z AS B$(J)
320 IF Z1-Z<255 THEN Z1=Z1+Z ELSE Z2=Z2+Z
330 NEXT J
340 '
350 GOSUB 370:GOTO 420
360 '
370 COLOR 9,0:LOCATE 1,1:PRINT "BM010 "
380 COLOR 11,0:LOCATE 25,2:PRINT DATE$;" ";TIME$;
390 COLOR 15,0:LOCATE 1,8:PRINT " *** Access Plus Scan Key Fields - Customer Acc
ounts On Line Printer *** "
400 COLOR 12,0:LOCATE 3,2:PRINT SPACE$(78)
410 RETURN
420 COLOR 12,0:FOR I=5 TO 23:LOCATE I,1:PRINT SPACE$(80);:NEXT I
430 COLOR 14,0:LOCATE 3,2:PRINT "          Scan To Desired Line. Press Enter
 To Edit, Esc To End.      "
```

```
440 FOR J=1 TO 33
450 COLOR 11,0
460 X=INSTR(O2$(J),"1"):IF X<>0 THEN COLOR 14,1
470 IF J<=17 THEN LOCATE 6+J,2:PRINT O2$(J):LOCATE 6+J,22:PRINT O3$(J)
480 IF J>=18 THEN LOCATE J-11,49:PRINT O2$(J):LOCATE J-11,69:PRINT O3$(J)
490 NEXT J
500 '
510 '    Scan Mode
520 '
530 FOR J=1 TO 33
540 X=INSTR(O2$(J),"1"):IF X<>0 THEN 660
550 COLOR 30,0:LOCATE 25,66:PRINT " 1 Scan Mode 1";
560 IF J<=17 THEN COLOR 16,3:LOCATE 6+J,2:PRINT MID$(O2$(J),1,19)
570 IF J>=18 THEN COLOR 16,3:LOCATE J-11,49:PRINT MID$(O2$(J),1,19)
580 TIMER ON
590 IF E1<>0 THEN 2250
600 N$=INKEY$:IF N$="" THEN COLOR 11,0:LOCATE 25,2:PRINT DATE$;" ";TIME$;:GOTO 5
90
610 TIMER OFF
620 IF ASC(N$)=27 THEN 1660
630 IF ASC(N$)=13 THEN GOSUB 810:GOTO 760
640 IF J<=17 THEN COLOR 11,0:LOCATE 6+J,2:PRINT MID$(O2$(J),1,19)
650 IF J>=18 THEN COLOR 11,0:LOCATE J-11,49:PRINT MID$(O2$(J),1,19)
660 IF ASC(N$)<=64 OR ASC(N$)>=123 THEN 730
670 FOR K=J+1 TO 33
680 IF N$=MID$(O2$(K),1,1) OR ASC(N$)-32=ASC(MID$(O2$(K),1,1)) THEN J=K-1:GOTO 7
60
690 NEXT K
700 FOR K=1 TO J
710 IF N$=MID$(O2$(K),1,1) OR ASC(N$)-32=ASC(MID$(O2$(K),1,1)) THEN J=K-1:GOTO 7
60
720 NEXT K
730 IF ASC(N$)=6 OR ASC(N$)=56 OR ASC(N$)=57 THEN J=J-2:IF J<0 THEN J=32
740 IF ASC(N$)=49 THEN J=32
750 IF ASC(N$)=55 THEN J=0
760 NEXT J
770 GOTO 530
780 '
790 '    Edit Mode
800 '
810 COLOR 26,0:LOCATE 25,66:PRINT " 1 Edit Mode 1";
820 X=LEN(O2$(J)):Y=INSTR(O2$(J),CHR$(95)):Z=X-Y+1
830 Y=INSTR(O2$(J),CHR$(58))
840 IF J<=17 THEN COLOR 10,0:LOCATE 6+J,2:PRINT MID$(O2$(J),1,19);MID$(O2$(J),20
,Z+1)
850 IF J>=18 THEN COLOR 10,0:LOCATE J-11,49:PRINT MID$(O2$(J),1,19);MID$(O2$(J),
20,Z+1)
860 IF J=12 THEN 1540
870 IF J=13 THEN 1540
880 IF J=15 THEN 1330
890 IF J=3 THEN 1430
900 IF MID$(O2$(J),21+C,1)<>"_" AND MID$(O2$(J),21+C,1)<>"" THEN N$=MID$(O2$(J),
21+C,1):GOTO 1230
910 IF J<=17 THEN LOCATE 6+J,22+C,1,0,7
920 IF J>=18 THEN LOCATE J-11,69+C,1,0,7
930 N$=INKEY$:IF N$="" THEN 930
940 IF ASC(N$)=13 OR ASC(N$)=27 THEN 1270
950 IF ASC(N$)<>8 THEN 1000
960 IF C=0 THEN 930
970 C=C-1:IF C<0 THEN C=0 ELSE N1$=MID$(N1$,1,C)
```

```
960 IF MID$(O2$(J),21+C,1)<>"_" AND MID$(O2$(J),21+C,1)<>"" THEN C=C-1:IF C<0 TH
EN C=0 ELSE N1$=MID$(N1$,1,C)
990 GOTO 1240
1000 IF ASC(N$)<32 OR ASC(N$)>126 THEN BEEP:GOTO 930
1010 IF LEN(N1$)>Z THEN BEEP:GOTO 930
1020 IF INSTR(O2$(J),"Time")=0 AND INSTR(O2$(J),"Tm")=0 THEN 1100
1030 X=VAL(N$)
1040 IF C+1=1 AND X<>0 AND X<>2 THEN BEEP:GOTO 930
1050 IF C+1=2 AND X>7 THEN BEEP:GOTO 930
1060 IF C+1=4 AND X>5 THEN BEEP:GOTO 930
1070 IF C+1=7 AND X<>0 AND X<>2 AND X<>4 THEN BEEP:GOTO 930
1080 IF C+1=8 AND X>0 THEN BEEP:GOTO 930
1090 IF C+1=2 AND MID$(N1$,1,1)="2" AND X>3 THEN BEEP:GOTO 930
1100 IF INSTR(O2$(J),"Date")=0 AND INSTR(O2$(J),"Dt")=0 THEN 1200
1110 X=VAL(N$)
1120 IF C+1=1 AND X>1 THEN BEEP:GOTO 930
1130 IF C+1=4 AND X>3 THEN BEEP:GOTO 930
1140 IF C+1=6 AND X<1 THEN BEEP:GOTO 930
1150 IF C+1=2 AND MID$(N1$,1,1)="0" AND X=0 THEN BEEP:GOTO 930
1160 IF C+1=2 AND MID$(N1$,1,1)="1" AND X>2 THEN BEEP:GOTO 930
1170 IF C+1=4 AND MID$(N1$,1,2)="02" AND X>2 THEN BEEP:GOTO 810
1180 IF C+1=5 AND MID$(N1$,4,1)="3" AND X>1 THEN BEEP:GOTO 930
1190 IF C+1=5 AND MID$(N1$,4,1)="0" AND X=0 THEN BEEP:GOTO 930
1200 IF Y=0 THEN 1230
1210 IF N$=" " OR N$="." THEN 1230
1220 IF ASC(N$)<48 OR ASC(N$)>57 THEN BEEP:GOTO 930
1230 N1$=MID$(N1$,1,C)+N$:C=C+1
1240 IF J<=17 THEN COLOR 10,0:LOCATE 6+J,22,0:PRINT N1$;MID$(O2$(J),21+C,Z-C)
1250 IF J>=18 THEN COLOR 10,0:LOCATE J-11,69,0:PRINT N1$;MID$(O2$(J),21+C,Z-C)
1260 GOTO 900
1270 IF N1$<>"" THEN O3$(J)=N1$+STRING$(Z-LEN(N1$)," ") ELSE O3$(J)=N1$
1280 IF J<=17 THEN COLOR 11,0:LOCATE 6+J,2,0:PRINT O2$(J):LOCATE 6+J,22:PRINT O3
$(J)
1290 IF J>=18 THEN COLOR 11,0:LOCATE J-11,49,0:PRINT O2$(J):LOCATE J-11,69:PRINT
 O3$(J)
1300 O3$(J)=N1$:N1$="":C=0
1310 RETURN
1320 '
1330 COLOR 14,0:LOCATE 20,34:PRINT "Press Any":LOCATE 21,35:PRINT "Key For":LOCA
TE 22,34:PRINT "Selection"
1340 COLOR 10,0:LOCATE 6+J,22:PRINT O3$(J)
1350 FOR K=1 TO 6
1360 COLOR 10,0:LOCATE 6+J,22:PRINT F1$(K):O3$(J)=F1$(K):N1$=F1$(K)
1370 N$=INKEY$:IF N$="" THEN 1370
1380 IF ASC(N$)=13 OR ASC(N$)=27 THEN LOCATE 20,34:PRINT SPACE$(9):LOCATE 21,35:
PRINT SPACE$(7):LOCATE 22,34:PRINT SPACE$(9):GOTO 1280
1390 IF ASC(N$)=8 OR ASC(N$)=56 OR ASC(N$)=57 THEN K=K-2:IF K<0 THEN K=5
1400 NEXT K
1410 GOTO 1350
1420 '
1430 COLOR 14,0:LOCATE 15,38:PRINT "Press Any":LOCATE 16,39:PRINT "Key For":LOCA
TE 17,38:PRINT "Selection"
1440 COLOR 10,0:LOCATE 6+J,22:PRINT O3$(J)
1450 FOR K=1 TO 32
1460 IF K>18 THEN COLOR 15,0 ELSE COLOR 10,0
1470 LOCATE 6+J,22:PRINT T$(K):O3$(J)=T$(K):N1$=T$(K)
1480 N$=INKEY$:IF N$="" THEN 1480
1490 IF ASC(N$)=13 OR ASC(N$)=27 THEN LOCATE 15,38:PRINT SPACE$(9):LOCATE 16,39:
PRINT SPACE$(7):LOCATE 17,38:PRINT SPACE$(9):GOTO 1280
1500 IF ASC(N$)=8 OR ASC(N$)=56 OR ASC(N$)=57 THEN K=K-2:IF K<0 THEN K=31
1510 NEXT K
```

```
1520 GOTO 1450
1530 '
1540 COLOR 14,0:LOCATE 15,38:PRINT "Press Any":LOCATE 16,39:PRINT "Key For":LOCA
TE 17,38:PRINT "Selection"
1550 COLOR 10,0:LOCATE 6+J,22:PRINT O3$(J)
1560 FOR K=34 TO 44
1570 LOCATE 6+J,22:PRINT T$(K):O3$(J)=T$(K):N1$=T$(K)
1580 N$=INKEY$:IF N$="" THEN 1580
1590 IF ASC(N$)=13 OR ASC(N$)=27 THEN LOCATE 15,38:PRINT SPACE$(9):LOCATE 16,39:
PRINT SPACE$(7):LOCATE 17,38:PRINT SPACE$(9):GOTO 1280
1600 IF ASC(N$)=8 OR ASC(N$)=56 OR ASC(N$)=57 THEN K=K-2:IF K<33 THEN K=43
1610 NEXT K
1620 GOTO 1540
1630 '
1640 '    Scan files
1650 '
1660 FOR J=1 TO 33
1670 IF O3$(J)<>"" THEN 1690
1680 NEXT J:GOTO 2280
1690 GOSUB 400:C1=4:P1=0
1700 LPRINT CHR$(18);CHR$(27);CHR$(65);CHR$(12);CHR$(27);CHR$(50):TIMER OFF:S2=0

1710 FOR I=1 TO I1
1720 N$=INKEY$:IF N$="" THEN 1740
1730 IF ASC(N$)=27 THEN 2280
1740 GET #2,I:I2=CVS(I2$)
1750 IF I2=0 THEN 2170
1760 GET #3,I2
1770 FOR J=1 TO 36:O4$(J)=B$(J):NEXT J:O4$(15)=F1$(VAL(O4$(15))):O4$(8)=T$(VAL(O
4$(8))):O4$(12)=T$(VAL(O4$(12))+33):O4$(13)=T$(VAL(O4$(13))+33)
1780 COLOR 11,0:LOCATE 25,2:PRINT DATE$;" ";TIME$;
1790 COLOR 14,0:LOCATE 3,2:PRINT USING " # Scanning Account Number ##,### # ";I
2
1800 FOR J=1 TO 33
1810 IF O3$(J)="" THEN 2160
1820 COLOR 14,0:LOCATE 3,39:PRINT USING " \            \ \
\";O2$(J);O3$(J)
1830 IF INSTR(O4$(J),O3$(J))=0 THEN 2160
1840 '
1850 '    Print CRT
1860 '
1870 COLOR 14,1:LOCATE 6,25:PRINT USING " Customer Account Number ---- ##,### ";
I2
1880 FOR M=1 TO 33
1890 COLOR 11,0
1900 X=INSTR(O2$(M),"#"):IF X<>0 THEN COLOR 14,1
1910 IF M<=17 THEN LOCATE 6+M,2:PRINT MID$(O2$(M),1,19):LOCATE 6+M,22:PRINT O4$(
M)
1920 IF M>=18 THEN LOCATE M-11,49:PRINT MID$(O2$(M),1,19):LOCATE M-11,69:PRINT O
4$(M)
1930 NEXT M
1940 T4$="      ":IF O4$(30)="On " THEN T4$=T3$
1950 COLOR 14,0:FOR M=20 TO 22:LOCATE M,75:PRINT T4$:NEXT M
1960 '
1970 '    Print Line Printer
1980 '
1990 IF C1>=3 THEN GOSUB 2010
2000 GOTO 2110
2010 P1=P1+1
2020 LPRINT CHR$(12);"BM010";CHR$(14);TAB(17);"Access Plus";CHR$(20);TAB(49);"Pa
ge";P1
```

```
2030 LPRINT TAB(23);"Copyright 1986 Badger Meter, Inc."
2040 LPRINT TAB(27);"Utility Products Division"
2050 LPRINT TAB(27);"as of ";DATE$;" ";TIME$;CHR$(10)
2060 LPRINT CHR$(14);TAB(7);"Key Fields - Customer Accounts"
2070 LPRINT STRING$(79,240)
2080 C1=0
2090 RETURN
2100 '
2110 LPRINT CHR$(27);CHR$(69);"Customer Account Number --";I2;TAB(35);MID$(O2$(J
),1,18);" ";O3$(J);CHR$(27);CHR$(70)
2120 FOR M=1 TO 17
2130 LPRINT TAB(2);MID$(O2$(M),1,18);TAB(21);O4$(M);TAB(48);MID$(O2$(M+17),1,18)
;TAB(67);O4$(M+17);
2140 IF M>=14 AND M<=16 THEN LPRINT " ";T4$
2150 NEXT M:LPRINT:C1=C1+1
2160 NEXT J
2170 NEXT I
2180 IF P1>0 THEN LPRINT TAB(27);"<<<< End of Report >>>>"
2190 FOR J=1 TO 36:O3$(J)="":NEXT J
2200 COLOR 14,0:LOCATE 3,2:PRINT "        * End of Scan Press Any Key To Cont
inue, ESC To End.  *        "
2210 TIMER ON
2220 IF S1<>0 THEN 2280
2230 N$=INKEY$:IF N$="" THEN COLOR 11,0:LOCATE 25,2:PRINT DATE$;" ";TIME$;:GOTO
2220
2240 TIMER OFF
2250 IF ASC(N$)=27 THEN 2280
2260 COLOR 12,0:LOCATE 6,2:PRINT SPACE$(78)
2270 GOSUB 400:GOTO 420
2280 CLOSE #1,#2,#3
2290 CHAIN "bm001c"
2300 END
10 'Copyright 1985 Badger Meter, Inc. - Engineering Division *** Program Name -
bm011 *** Date 12-04-1985
20 'Author D.Wachs       \ - load "bm011"
30 'Automatic Meter Reading - Time of Day Usage
40 '
50 COMMON PGM$,O2$(),F1$(),T$()
60 DIM T1$(8),O3$(8),B$(8)
70 '
80 ON TIMER(600) GOSUB 90:GOTO 110
90 S1=1:RETURN
100 '
110 OPEN "R",#1,"todu.dat",5:FIELD #1,5 AS T2$
120 '
130 DATA "Period One  ------ Start Time:..........? __:00"
140 DATA "                   Stop Time:..........? __:00"
150 DATA "Period Two  ------ Start Time:..........? __:00"
160 DATA "                   Stop Time:..........? __:00"
170 DATA "Period Three ----- Start Time:..........? __:00"
180 DATA "                   Stop Time:..........? __:00"
190 DATA "Calculate Remainder of Usage (Y or N)...? _"
200 DATA "Program for a 5 or 7 Day Week:..........? _"
210 FOR I=1 TO 8:READ T1$(I):NEXT I
220 '
230 COLOR 9,0:LOCATE 1,1:PRINT "BM011 "
240 COLOR 11,0:LOCATE 25,2:PRINT DATE$;" ";TIME$;
250 COLOR 15,0:LOCATE 1,8:PRINT "              *** Access Plus Time of Day Usag
e ***           "
260 COLOR 14,0:LOCATE 3,2:PRINT "          Scan To Desired Line, Press Enter T
o Edit, Esc To End.    "
```

```
270 '
280 COLOR 12,0:FOR I=5 TO 23:LOCATE I,1:PRINT SPACE$(80);:NEXT I
290 COLOR 12,0:LOCATE 6,15:PRINT "All Start & Stop Times Are Based On A 24 Hour
Clock."
300 LOCATE 8,26:PRINT "Midnight = 00:00   HH:MM"
310 LOCATE 9,26:PRINT "Noon     = 12:00   HH:MM"
320 LOCATE 11,10:PRINT " Start & Stop Times Cannot Be Overlaped From Period To P
eriod."
330 COLOR 3,0
340 LOCATE 13,13:PRINT CHR$(213);STRING$(52,205);CHR$(184)
350 FOR Z=14 TO 21:LOCATE Z,13:PRINT CHR$(179):LOCATE Z,66:PRINT CHR$(179):NEXT
Z
360 LOCATE 22,13:PRINT CHR$(212);STRING$(52,205);CHR$(190)
370 COLOR 14,0:LOCATE 14,15:PRINT "*":LOCATE 16,15:PRINT "*":LOCATE 18,15:PRINT
"*":LOCATE 21,15:PRINT "*"
380 LOCATE 23,8:PRINT "* Any Change To Time Periods Will Affect Peak Rate Time P
eriods."
390 FOR J=1 TO 8
400 GET #1,J:O3$(J)=T2$
410 COLOR 11,0:LOCATE 13+J,17:PRINT T1$(J)
420 IF MID$(O3$(7),1,1)="Y" THEN 430 ELSE O3$(7)="N"
430 IF VAL(O3$(8))=0 THEN O3$(8)="7"
440 IF O3$(J)="" OR O3$(J)=STRING$(5,0) OR O3$(J)=STRING$(5,32) THEN 470
450 COLOR 11,0:LOCATE 13+J,59
460 IF J<=6 THEN PRINT O3$(J) ELSE PRINT MID$(O3$(J),1,1)
470 NEXT J
480 '
490 '   Scan Mode
500 '
510 FOR J=1 TO 8
520 COLOR 30,0:LOCATE 25,66:PRINT " * Scan Mode *";
530 COLOR 16,3:LOCATE 13+J,17:PRINT MID$(T1$(J),1,41)
540 TIMER ON
550 IF S1<>0 THEN 1430
560 N$=INKEY$:IF N$="" THEN COLOR 11,0:LOCATE 25,2:PRINT DATE$;" ";TIME$;:GOTO 5
50
570 TIMER OFF
580 IF ASC(N$)=13 THEN GOSUB 760:GOTO 710
590 COLOR 11,0:LOCATE 13+J,17:PRINT MID$(T1$(J),1,41)
600 IF ASC(N$)=27 THEN 1120
610 IF ASC(N$)<=64 OR ASC(N$)=123 THEN 680
620 FOR K=J+1 TO 8
630 IF N$=MID$(T1$(K),1,1) OR ASC(N$)-32=ASC(MID$(T1$(K),1,1)) THEN J=K-1:GOTO 7
10
640 NEXT K
650 FOR K=1 TO J
660 IF N$=MID$(T1$(K),1,1) OR ASC(N$)-32=ASC(MID$(T1$(K),1,1)) THEN J=K-1:GOTO 7
10
670 NEXT K
680 IF ASC(N$)=8 OR ASC(N$)=56 OR ASC(N$)=57 THEN J=J-2:IF J<0 THEN J=7
690 IF ASC(N$)=49 THEN J=7
700 IF ASC(N$)=55 THEN J=0
710 NEXT J
720 GOTO 510
730 '
740 '   Edit Mode
750 '
760 COLOR 26,0:LOCATE 25,66:PRINT " * Edit Mode *";
770 X=LEN(T1$(J)):Y=INSTR(T1$(J),CHR$(95)):Z=X-Y+1
780 Y=INSTR(T1$(J),CHR$(58))
790 COLOR 10,0:LOCATE 13+J,17:PRINT MID$(T1$(J),1,41);MID$(T1$(J),42,Z+1)
```

```
800 IF MID$(T1$(J),43+C,1)<>"_" AND MID$(T1$(J),43+C,1)<>"" THEN N$=MID$(T1$(J),43+C,1):GOTO 1040
810 LOCATE 13+J,59+C,1,0,7
820 N$=INKEY$:IF N$="" THEN 820
830 IF ASC(N$)=13 OR ASC(N$)=27 THEN 1070
840 IF ASC(N$)<>8 THEN 900
850 IF C=0 THEN 820
860 C=C-1:IF C<0 THEN C=0 ELSE N1$=MID$(N1$,1,C)
870 IF MID$(T1$(J),43+C,1)<>"_" AND MID$(T1$(J),43+C,1)<>"" THEN C=C-1:GOTO 870
880 IF C<0 THEN C=0 ELSE N1$=MID$(N1$,1,C)
890 GOTO 1050
900 IF ASC(N$)<32 OR ASC(N$)>126 THEN BEEP:GOTO 820
910 IF LEN(N1$)=2 THEN BEEP:GOTO 820
920 IF J<>7 THEN 940
930 IF N$<>"Y" AND N$<>"N" THEN BEEP:GOTO 820
940 IF J<>8 THEN 960
950 IF VAL(N$)<>5 AND VAL(N$)<>7 THEN BEEP:GOTO 820
960 IF INSTR(T1$(J),"Time")=0 AND INSTR(T1$(J),"Tm")=0 THEN 1010
970 IF C+1=1 AND VAL(N$)>2 THEN BEEP:GOTO 820
980 IF C+1=4 AND VAL(N$)>0 THEN BEEP:GOTO 820
990 IF C+1=5 AND VAL(N$)>0 THEN BEEP:GOTO 820
1000 IF C+1=2 AND MID$(N1$,1,1)="2" AND VAL(N$)>3 THEN BEEP:GOTO 820
1010 IF Y=0 THEN 1040
1020 IF N$=" " OR N$="." THEN 1040
1030 IF ASC(N$)<48 OR ASC(N$)>57 THEN BEEP:GOTO 1050
1040 N1$=MID$(N1$,1,C)+N$:C=C+1
1050 COLOR 10,0:LOCATE 13+J,59,0:PRINT N1$;MID$(T1$(J),43+C,2-C)
1060 GOTO 800
1070 IF N1$<>"" THEN O3$(J)=N1$+STRING$(2-LEN(N1$)," ")
1080 COLOR 11,0:LOCATE 13+J,17,0:PRINT T1$(J):LOCATE 13+J,59:PRINT O3$(J)
1090 N1$="":C=0
1100 RETURN
1110 '
1120 FOR I=1 TO 6 STEP 2
1130 IF O3$(I)<>STRING$(5,0) AND O3$(I)<>STRING$(LEN(O3$(I)),32) THEN 1160
1140 IF O3$(I+1)=STRING$(5,0) OR O3$(I+1)=STRING$(LEN(O3$(I+1)),32) THEN 1160
1150 BEEP:COLOR 30,4:LOCATE 11,10:PRINT "          Start Time Missing For ";MID$(T1$(I),1,12);"          ":GOTO 510
1160 NEXT I
1170 FOR I=2 TO 6
1180 IF O3$(I)=STRING$(5,0) OR O3$(I)=STRING$(LEN(O3$(I)),32) THEN 1210
1190 IF O3$(I-1)<=O3$(I) THEN 1210
1200 BEEP:COLOR 30,4:LOCATE 11,10:PRINT " Start & Stop Times Cannot Be Overlaped From Period To Period. ":GOTO 510
1210 NEXT I
1220 FOR I=1 TO 6 STEP 2
1230 IF O3$(I)=STRING$(5,0) OR O3$(I)=STRING$(LEN(O3$(I)),32) THEN 1260
1240 IF O3$(I+1)<>STRING$(5,0) AND O3$(I+1)<>STRING$(LEN(O3$(I+1)),32) THEN 1260
1250 BEEP:COLOR 30,4:LOCATE 11,10:PRINT "          Stop Time Missing For ";MID$(T1$(I),1,12);"          ":GOTO 510
1260 NEXT I
1270 COLOR 12,0:LOCATE 11,10:PRINT " Start & Stop Times Cannot Be Overlaped From Period To Period. "
1280 FOR I=1 TO 8:LSET T2$=O3$(I):PUT #1,I:NEXT I:CLOSE #1
1290 '
1300 OPEN "R",#1,"oru.dat",5:FIELD #1,5 AS T2$
1310 FOR I=1 TO 6:LSET T2$=O3$(I):PUT #1,I:NEXT I
1320 LSET T2$=O3$(8):PUT #1,8:CLOSE #1
1330 '
1340 FOR I=1 TO 5:N1$=N1$+MID$(O3$(I),1,2)+",":NEXT I:N1$=N1$+MID$(O3$(6),1,2)
```

```
1350 FOR I=1 TO LEN(N1$)
1360 IF MID$(N1$,I,1)=" " THEN MID$(N1$,I,1)="0"
1370 NEXT I
1380 PRINT #4,"PARAM WINDOWS=";N1$;" PRMODE=";MID$(O3$(8),1,1)
1390 ON TIMER(5) GOSUB 1400:GOTO 1410
1400 BEEP:COLOR 14,0:LOCATE 25,36:PRINT "  % Window Error In CCM %  ";:TIMER O
FF:S1=1:RETURN
1410 TIMER ON:S1=0:N1$=""
1420 IF S1<>0 THEN 1450
1430 IF EOF(4) THEN 1420 ELSE N$=INPUT$(LOC(4),#4):N1$=N1$+N$
1440 IF INSTR(N1$,CHR$(13))=0 THEN 1420
1450 IF INSTR(N1$,"OK")=0 THEN GOSUB 1400
1460 TIMER OFF:S1=0
1470 '
1480 CLOSE #1:COLOR 0,0:CHAIN "ba001a"
1490 END 10 'Copyright 1985 Badger Meter, Inc. - Engineering Division *** Program Name -
bm011a *** Date 12-05-1985
20 'Author D.Wachs       \ - load "bm011a"
30 'Automatic Meter Reading - Time of Day Usage Print - CRT
40 '
50 COMMON PGMS,O2$(),F1$(),T$()
60 DIM T1$(8),O3$(8),B$(8)
70 '
80 ON TIMER(600) GOSUB 90:GOTO 110
90 S1=1:RETURN
100 '
110 OPEN "R",#1,"todu.dat",5:FIELD #1,5 AS T2$
120 '
130 DATA "Period One   ------ Start Time:..........?  _:__"
140 DATA "                    Stop  Time:..........?  _:__"
150 DATA "Period Two   ------ Start Time:..........?  _:__"
160 DATA "                    Stop  Time:..........?  _:__"
170 DATA "Period Three ------ Start Time:..........?  _:__"
180 DATA "                    Stop  Time:..........?  _:__"
190 DATA "Calculate Remainder of Usage (Y or N)...? _"
200 DATA "Program for a 5 or 7 Day Week:..........? _"
210 FOR I=1 TO 8:READ T1$(I):NEXT I
220 '
230 COLOR 9,0:LOCATE 1,1:PRINT "BM011A"
240 COLOR 11,0:LOCATE 25,2:PRINT DATE$;" ";TIME$;
250 COLOR 15,0:LOCATE 1,8:PRINT "              *** Access Plus Time of Day Usag
e ***           "
260 COLOR 14,0:LOCATE 3,2:PRINT "                           Press Esc To End
"
270 '
280 COLOR 12,0:FOR I=5 TO 23:LOCATE I,1:PRINT SPACE$(80);:NEXT I
290 COLOR 12,0:LOCATE 6,15:PRINT "All Start & Stop Times Are Based On A 24 Hour
Clock."
300 LOCATE 8,26:PRINT "Midnight = 00:00   HH:MM"
310 LOCATE 9,26:PRINT "Noon     = 12:00   HH:MM"
320 LOCATE 11,10:PRINT " Start & Stop Times Cannot Be Overlaped From Period To P
eriod. "
330 COLOR 3,0
340 LOCATE 13,13:PRINT CHR$(213);STRING$(52,205);CHR$(184)
350 FOR Z=14 TO 21:LOCATE Z,13:PRINT CHR$(179):LOCATE Z,66:PRINT CHR$(179):NEXT
I
360 LOCATE 22,13:PRINT CHR$(212);STRING$(52,205);CHR$(190)
370 FOR J=1 TO 8
380 GET #1,J:O3$(J)=T2$
390 COLOR 11,0:LOCATE 13+J,17:PRINT T1$(J)
```

```
400 IF O3$(J)="" OR O3$(J)=STRING$(5,0) OR O3$(J)=STRING$(5,32) THEN 430
410 COLOR 11,0:LOCATE 13+J,59
420 IF J<=6 THEN PRINT O3$(J) ELSE PRINT MID$(O3$(J),1,1)
430 NEXT J:CLOSE #1
440 '
450 TIMER ON
460 IF S1<>0 THEN 510
470 N$=INKEY$:IF N$="" THEN COLOR 11,0:LOCATE 25,2:PRINT DATE$;" ";TIME$;:GOTO 460
480 TIMER OFF
490 IF ASC(N$)=27 THEN 510 ELSE 460
500 '
510 COLOR 0,0:CHAIN "bm001b"
520 END

10 'Copyright 1985 Badger Meter, Inc. - Engineering Division *** Program Name - bm011b *** Date 12-05-1985
20 'Author D.Wachs        \ - load "bm011b"
30 'Automatic Meter Reading - Time of Day Usage Print - Printer
40 '
50 COMMON PGM$,O2$(),F1$(),T$()
60 DIM T1$(8),O3$(8),B$(8)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 5,19:PRINT "   ** Please Turn Line Printer On. **   ":IF S1<>0 THEN 530 ELSE RESUME
140 IF ERR=27 THEN COLOR 30,4:LOCATE 5,19:PRINT "   *** Out of Paper On Line Printer. ***   ":IF S1<>0 THEN 530 ELSE RESUME
150 COLOR 28,0:LOCATE 5,7:PRINT "Error";ERR:STOP
160 '
170 WIDTH "LPT1:",80
180 '
190 OPEN "R",#1,"todu.dat",5:FIELD #1,5 AS T2$
200 '
210 DATA "Period One   ------ Start Time:..........? __:__"
220 DATA "                    Stop Time:..........? __:__"
230 DATA "Period Two   ------ Start Time:..........? __:__"
240 DATA "                    Stop Time:..........? __:__"
250 DATA "Period Three ----- Start Time:..........? __:__"
260 DATA "                    Stop Time:..........? __:__"
270 DATA "Calculate Remainder of Usage (Y or N)...? _"
280 DATA "Program for a 5 or 7 Day Week:..........? _"
290 FOR I=1 TO 8:READ T1$(I):NEXT I
300 COLOR 9,0:LOCATE 1,1:PRINT "BM011B"
310 '
320 '     Print Line Printer
330 '
340 LPRINT CHR$(18);CHR$(27);CHR$(65);CHR$(12);CHR$(27);CHR$(50)
350 LPRINT CHR$(12);"BM011B";CHR$(14);TAB(17);"Access Plus"
360 LPRINT TAB(23);"Copyright 1986 Badger Meter, Inc."
370 LPRINT TAB(27);"Utility Products Division"
380 LPRINT TAB(27);"as of ";DATE$;" ";TIME$;CHR$(10)
390 LPRINT CHR$(14);TAB(12);"Time of Day Usage";CHR$(10)
400 LPRINT STRING$(79,240);CHR$(10)
410 '
420 LPRINT TAB(15);"All Start & Stop Times Are Based On A 24 Hour Clock.";CHR$(12)
```

```
430 LPRINT TAB(26);"Midnight = 00:00   HH:MM"
440 LPRINT TAB(26);"Noon     = 12:00   HH:MM";CHR$(10)
450 LPRINT TAB(10);"Start & Stop Times Cannot Be Overlaped From Period To Period
.";CHR$(10)
460 '
470 FOR J=1 TO 8
480 GET #1,J:O3$(J)=T2$
490 LPRINT TAB(14);MID$(T1$(J),1,40);" ";O3$(J)
500 NEXT J
510 LPRINT CHR$(10);TAB(27);"<<<< End of Report >>>>"
520 '
530 CLOSE #1:COLOR 0,0:CHAIN "bm001c"
540 END 10 'Copyright 1985 Badger Meter, Inc. - Engineering Division *** Program Name -
bm012 *** Date 12-05-1985
20 'Author D.Wachs         \ - load "bm012"
30 'Automatic Meter Reading - Peak Rate Usage
40 '
50 COMMON P6M$,O2$(),F1$(),T$()
60 DIM T1$(8),O3$(8),B$(8),I$(7)
70 '
80 ON TIMER(600) GOSUB 90:GOTO 110
90 S1=1:RETURN
100 '
110 OPEN "R",#1,"pru.dat",5:FIELD #1,5 AS T2$
120 '
130 DATA "Period One   ------ Start Time:..........? __:00"
140 DATA "                    Stop Time:..........? __:00"
150 DATA "Period Two   ------ Start Time:..........? __:00"
160 DATA "                    Stop Time:..........? __:00"
170 DATA "Period Three ----- Start Time:..........? __:00"
180 DATA "                    Stop Time:..........? __:00"
190 DATA "Interval (5 Minutes - 60 Minutes):.......? __"
200 DATA "Program for a 5 or 7 Day Week:..........? _"
210 FOR I=1 TO 8:READ T1$(I):NEXT I
220 '
230 DATA "05","10","15","20","30","60"
240 FOR I=1 TO 6:READ I$(I):NEXT I
250 '
260 '
270 COLOR 9,0:LOCATE 1,1:PRINT "BM012 "
280 COLOR 11,0:LOCATE 25,2:PRINT DATE$;" ";TIME$;
290 COLOR 15,0:LOCATE 1,8:PRINT "            *** Access Plus Peak Rate Usage
 ***            "
300 COLOR 14,0:LOCATE 3,2:PRINT "        Scan To Desired Line. Press Enter T
o Edit. Esc To End.     "
310 '
320 COLOR 12,0:FOR I=5 TO 23:LOCATE I,1:PRINT SPACE$(80);:NEXT I
330 COLOR 12,0:LOCATE 6,15:PRINT "All Start & Stop Times Are Based On A 24 Hour
Clock."
340 LOCATE 9,26:PRINT "Midnight = 00:00   HH:MM"
350 LOCATE 9,26:PRINT "Noon     = 12:00   HH:MM"
360 LOCATE 11,10:PRINT " Start & Stop Times Cannot Be Overlaped From Period To P
eriod. "
370 COLOR 3,0
380 LOCATE 13,13:PRINT CHR$(213);STRING$(52,205);CHR$(184)
390 FOR Z=14 TO 21:LOCATE Z,13:PRINT CHR$(179):LOCATE Z,66:PRINT CHR$(179):NEXT
Z
400 LOCATE 22,13:PRINT CHR$(212);STRING$(52,205);CHR$(190)
410 COLOR 14,0:LOCATE 14,15:PRINT "*":LOCATE 16,15:PRINT "*":LOCATE 18,15:PRINT
"*":LOCATE 21,15:PRINT "*"
```

```
420 LOCATE 23,7:PRINT "* Any Change To Time Periods Will Affect Time of Day Time
    Periods."
430 FOR J=1 TO 8
440 GET #1,J:O3$(J)=T2$
450 COLOR 11,0:LOCATE 13+J,17:PRINT T1$(J)
460 IF VAL(O3$(7))=0 THEN O3$(7)="60"
470 IF VAL(O3$(8))=0 THEN O3$(8)="7"
480 IF O3$(J)="" OR O3$(J)=STRING$(5,0) OR O3$(J)=STRING$(5,32) THEN 530
490 COLOR 11,0:LOCATE 13+J,59
500 IF J=7 THEN PRINT MID$(O3$(J),1,2):GOTO 530
510 IF J=8 THEN PRINT MID$(O3$(J),1,1):GOTO 530
520 PRINT O3$(J)
530 NEXT J
540 '
550 '    Scan Mode
560 '
570 FOR J=1 TO 8
580 COLOR 30,0:LOCATE 25,66:PRINT " * Scan Mode *";
590 COLOR 16,3:LOCATE 13+J,17:PRINT MID$(T1$(J),1,41)
600 TIMER ON
610 IF S1<>0 THEN 1570
620 N$=INKEY$:IF N$="" THEN COLOR 11,0:LOCATE 25,2:PRINT DATE$;" ";TIME$;:GOTO 6
    10
630 TIMER OFF
640 IF ASC(N$)=13 THEN GOSUB 820:GOTO 770
650 COLOR 11,0:LOCATE 13+J,17:PRINT MID$(T1$(J),1,41)
660 IF ASC(N$)=27 THEN 1310
670 IF ASC(N$)<=64 OR ASC(N$)=123 THEN 740
680 FOR K=J+1 TO 8
690 IF N$=MID$(T1$(K),1,1) OR ASC(N$)-32=ASC(MID$(T1$(K),1,1)) THEN J=K-1:GOTO 7
    70
700 NEXT K
710 FOR K=1 TO J
720 IF N$=MID$(T1$(K),1,1) OR ASC(N$)-32=ASC(MID$(T1$(K),1,1)) THEN J=K-1:GOTO 7
    70
730 NEXT K
740 IF ASC(N$)=8 OR ASC(N$)=56 OR ASC(N$)=57 THEN J=J-2:IF J<0 THEN J=7
750 IF ASC(N$)=49 THEN J=7
760 IF ASC(N$)=55 THEN J=0
770 NEXT J
780 GOTO 570
790 '
800 '    Edit Mode
810 '
820 COLOR 26,0:LOCATE 25,66:PRINT " * Edit Mode *";
830 X=LEN(T1$(J)):Y=INSTR(T1$(J),CHR$(95)):Z=X-Y+1
840 Y=INSTR(T1$(J),CHR$(58))
850 COLOR 10,0:LOCATE 13+J,17:PRINT MID$(T1$(J),1,41);MID$(T1$(J),42,Z+1)
860 IF J=7 THEN 1210
870 IF MID$(T1$(J),43+C,1)<>"_" AND MID$(T1$(J),43+C,1)<>"" THEN N$=MID$(T1$(J),
    43+C,1):GOTO 1130
880 LOCATE 13+J,59+C,1,0,7
890 N$=INKEY$:IF N$="" THEN 890
900 IF ASC(N$)=13 OR ASC(N$)=27 THEN 1160
910 IF ASC(N$)<>8 THEN 970
920 IF C=0 THEN 890
930 C=C-1:IF C<0 THEN C=0 ELSE N1$=MID$(N1$,1,C)
940 IF MID$(T1$(J),43+C,1)<>"_" AND MID$(T1$(J),43+C,1)<>"" THEN C=C-1:GOTO 940
950 IF C<0 THEN C=0 ELSE N1$=MID$(N1$,1,C)
960 GOTO 1140
970 IF ASC(N$)<32 OR ASC(N$)>126 THEN BEEP:GOTO 890
```

```
980 IF LEN(N1$)=2 THEN BEEP:GOTO 890
990 IF J<>7 THEN 1030
1000 IF C+1=1 AND VAL(N$)>6 THEN BEEP:GOTO 890
1010 IF C+1=2 AND MID$(N1$,1,1)="0" AND VAL(N$)<5 THEN BEEP:GOTO 890
1020 IF C+1=2 AND MID$(N1$,1,1)="6" AND VAL(N$)>0 THEN BEEP:GOTO 890
1030 IF J<>8 THEN 1050
1040 IF VAL(N$)<>5 AND VAL(N$)<>7 THEN BEEP:GOTO 890
1050 IF INSTR(T1$(J),"Time")=0 AND INSTR(T1$(J),"Tk")=0 THEN 1100
1060 IF C+1=1 AND VAL(N$)>2 THEN BEEP:GOTO 890
1070 IF C+1=4 AND VAL(N$)>0 THEN BEEP:GOTO 890
1080 IF C+1=5 AND VAL(N$)>0 THEN BEEP:GOTO 890
1090 IF C+1=2 AND MID$(N1$,1,1)="2" AND VAL(N$)>3 THEN BEEP:GOTO 890
1100 IF Y=0 THEN 1130
1110 IF N$=" " OR N$="." THEN 1130
1120 IF ASC(N$)<48 OR ASC(N$)>57 THEN BEEP:GOTO 1140
1130 N1$=MID$(N1$,1,2)+N$:C=C+1
1140 COLOR 10,0:LOCATE 13+J,59,0:PRINT N1$;MID$(T1$(J),43+C,2-C)
1150 GOTO 870
1160 IF N1$<>"" THEN O3$(J)=N1$+STRING$(2-LEN(N1$)," ")
1170 COLOR 11,0:LOCATE 13+J,17,0:PRINT T1$(J):LOCATE 13+J,59:PRINT O3$(J)
1180 N1$="":C=0
1190 RETURN
1200 '
1210 COLOR 14,0:LOCATE 19,68:PRINT "Press Any":LOCATE 20,68:PRINT "Key For":LOCATE 21,68:PRINT "Selection"
1220 COLOR 10,0:LOCATE 13+J,59:PRINT O3$(J)
1230 FOR K=1 TO 6
1240 N$=INKEY$:IF N$="" THEN 1240
1250 IF ASC(N$)=13 OR ASC(N$)=27 THEN LOCATE 19,68:PRINT SPACE$(9):LOCATE 20,68:PRINT SPACE$(7):LOCATE 21,68:PRINT SPACE$(9):GOTO 1170
1260 O3$(J)=T$(K)
1270 COLOR 10,0:LOCATE 13+J,59:PRINT O3$(J)
1280 NEXT K
1290 GOTO 1230
1300 '
1310 FOR I=1 TO 6 STEP 2
1320 IF O3$(I)<>STRING$(5,0) AND O3$(I)<>STRING$(LEN(O3$(I)),32) THEN 1350
1330 IF O3$(I+1)=STRING$(5,0) OR O3$(I+1)=STRING$(LEN(O3$(I+1)),32) THEN 1350
1340 BEEP:COLOR 30,4:LOCATE 11,10:PRINT "            Start Time Missing For ";MID$(T1$(I),1,12);"           ":GOTO 570
1350 NEXT I
1360 FOR I=2 TO 6
1370 IF O3$(I)=STRING$(5,0) OR O3$(I)=STRING$(LEN(O3$(I)),32) THEN 1400
1380 IF O3$(I-1)<=O3$(I) THEN 1400
1390 BEEP:COLOR 30,4:LOCATE 11,10:PRINT " Start & Stop Times Cannot Be Overlaped From Period To Period. ":GOTO 570
1400 NEXT I
1410 FOR I=1 TO 6 STEP 2
1420 IF O3$(I)=STRING$(5,0) OR O3$(I)=STRING$(LEN(O3$(I)),32) THEN 1450
1430 IF O3$(I+1)<>STRING$(5,0) AND O3$(I+1)<>STRING$(LEN(O3$(I+1)),32) THEN 1450
1440 BEEP:COLOR 30,4:LOCATE 11,10:PRINT "            Stop Time Missing For ";MID$(T1$(I),1,12);"           ":GOTO 570
1450 NEXT I
1460 COLOR 12,0:LOCATE 11,10:PRINT " Start & Stop Times Cannot Be Overlaped From Period To Period. "
1470 FOR I=1 TO 8:LSET T2$=O3$(I):PUT #1,I:NEXT I:CLOSE #1
1480 '
1490 OPEN "R",#1,"todu.dat",5:FIELD #1,5 AS T2$
1500 FOR I=1 TO 6:LSET T2$=O3$(I):PUT #1,I:NEXT I
1510 LSET T2$=O3$(8):PUT #1,8:CLOSE #1
```

```
1520 '
1530 FOR I=1 TO 5:N1$=N1$+MID$(D3$(I),1,2)+",":NEXT I:N1$=N1$+MID$(D3$(6),1,2)
1540 FOR I=1 TO LEN(N1$)
1550 IF MID$(N1$,I,1)=" " THEN MID$(N1$,I,1)="0"
1560 NEXT I
1570 PRINT #4,"PARAM WINDOWS=";N1$;" PRMODE=";MID$(D3$(8),1,1);" ITVL=";MID$(D3$(7),1,2)
1580 ON TIMER(5) GOSUB 1590:GOTO 1600
1590 BEEP:COLOR 14,0:LOCATE 25,36:PRINT "   * Window Error In COM *   ";:TIMER O
FF:S1=1:RETURN
1600 TIMER ON:S1=0:N1$=""
1610 IF S1<>0 THEN 1650
1620 IF EOF(4) THEN 1610 ELSE N$=INPUT$(LOC(4),#4):N1$=N1$+N$
1630 IF INSTR(N1$,CHR$(13))=0 THEN 1610
1640 IF INSTR(N1$,"OK")=0 THEN GOSUB 1590
1650 TIMER OFF:S1=0
1660 '
1670 CLOSE #1:COLOR 0,0:CHAIN "ba001a"
1680 END 10 ' Copyright 1985 Badger Meter, Inc. - Engineering Division *** Program Name -
bm012a *** Date 12-05-1985
20 'Author D.Wachs         \ - load "bm012a"
30 'Automatic Meter Reading - Peak Rate Usage Print - CRT
40 '
50 COMMON PGM$,D2$(),F1$(),T$()
60 DIM T1$(8),D3$(8),B$(8)
70 '
80 ON TIMER(600) GOSUB 90:GOTO 110
90 S1=1:RETURN
100 '
110 OPEN "R",#1,"pru.dat",5:FIELD #1,5 AS T2$
120 '
130 DATA "Period One  ------ Start Time:..........?  __:__"
140 DATA "                   Stop Time:..........?  __:__"
150 DATA "Period Two  ------ Start Time:..........?  __:__"
160 DATA "                   Stop Time:..........?  __:__"
170 DATA "Period Three ----- Start Time:..........?  __:__"
180 DATA "                   Stop Time:..........?  __:__"
190 DATA "Interval (5 Minutes - 60 Minutes):......?  _"
200 DATA "Program for a 5 or 7 Day Week:..........?  _"
210 FOR I=1 TO 8:READ T1$(I):NEXT I
220 '
230 COLOR 9,0:LOCATE 1,1:PRINT "BM012A"
240 COLOR 11,0:LOCATE 25,2:PRINT DATE$;" ";TIME$;
250 COLOR 15,0:LOCATE 1,8:PRINT "              *** Access Plus Peak Rate Usage
   ***            "
260 COLOR 14,0:LOCATE 3,2:PRINT "                              Press Esc To End
 "
270 '
280 COLOR 12,0:FOR I=5 TO 23:LOCATE I,1:PRINT SPACE$(80);:NEXT I
290 COLOR 12,0:LOCATE 6,15:PRINT "All Start & Stop Times Are Based On A 24 Hour
Clock."
300 LOCATE 8,26:PRINT "Midnight = 00:00   HH:MM"
310 LOCATE 9,26:PRINT "Noon     = 12:00   HH:MM"
320 LOCATE 11,18:PRINT " Start & Stop Times Cannot Be Overlaped From Period To P
eriod. "
330 COLOR 3,0
340 LOCATE 13,13:PRINT CHR$(213);STRING$(52,205);CHR$(184)
350 FOR I=14 TO 21:LOCATE I,13:PRINT CHR$(179);:LOCATE I,66:PRINT CHR$(179);:NEXT
 I
```

```
360 LOCATE 22,13:PRINT CHR$(212);STRING$(52,205);CHR$(190)
370 FOR J=1 TO 9
380 GET #1,J:O3$(J)=T2$
390 COLOR 11,0:LOCATE 13+J,17:PRINT T1$(J)
400 IF O3$(J)="" OR O3$(J)=STRING$(5,0) OR O3$(J)=STRING$(5,32) THEN 450
410 COLOR 11,0:LOCATE 13+J,59
420 IF J=7 THEN PRINT MID$(O3$(J),1,2):GOTO 450
430 IF J=9 THEN PRINT MID$(O3$(J),1,1):GOTO 450
440 PRINT O3$(J)
450 NEXT J:CLOSE #1
460 '
470 TIMER ON
480 IF S1<>0 THEN 530
490 N$=INKEY$:IF N$="" THEN COLOR 11,0:LOCATE 25,2:PRINT DATE$;" ";TIME$::GOTO 4
90
500 TIMER OFF
510 IF ASC(N$)=27 THEN 530 ELSE 480
520 '
530 COLOR 0,0:CHAIN "bm001b"
540 END

10 'Copyright 1985 Badger Meter, Inc. - Engineering Division *** Program Name -
bm012b *** Date 12-05-1985
20 'Author D.Wachs        \ - load "bm012b"
30 'Automatic Meter Reading - Peak Rate Usage Print - Printer
40 '
50 COMMON PGM$,O2$(),F1$(),T$()
60 DIM T1$(9),O3$(9),B$(9)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 5,19:PRINT "   ** Please Turn Li
ne Printer On. **   ":IF S1<>0 THEN 530 ELSE RESUME
140 IF ERR=27 THEN COLOR 30,4:LOCATE 5,19:PRINT "   *** Out of Paper On Line Pri
nter. ***   ":IF S1<>0 THEN 530 ELSE RESUME
150 COLOR 28,0:LOCATE 5,7:PRINT "Error";ERR:STOP
160 '
170 WIDTH "LPT1:",80
180 '
190 OPEN "R",#1,"pru.dat",5:FIELD #1,5 AS T2$
200 '
210 DATA "Period One   ------ Start Time:..........? __:__"
220 DATA "                    Stop Time:..........? __:__"
230 DATA "Period Two   ------ Start Time:..........? __:__"
240 DATA "                    Stop Time:..........? __:__"
250 DATA "Period Three ------ Start Time:..........? __:__"
260 DATA "                    Stop Time:..........? __:__"
270 DATA "Interval (5 Minutes - 60 Minutes):......? __"
280 DATA "Program for a 5 or 7 Day Week:..........? _"
290 FOR I=1 TO 9:READ T1$(I):NEXT I
300 COLOR 9,0:LOCATE 1,1:PRINT "BM012B"
310 '
320 '    Print Line Printer
330 '
340 LPRINT CHR$(18);CHR$(27);CHR$(65);CHR$(12);CHR$(27);CHR$(50)
350 LPRINT CHR$(12);"BM012B";CHR$(14);TAB(17);"Access Plus"
360 LPRINT TAB(23);"Copyright 1986 Badger Meter, Inc."
370 LPRINT TAB(27);"Utility Products Division"
```

```
340 LPRINT TAB(27);"as of ";DATE$;" ";TIME$;CHR$(10)
350 LPRINT CHR$(14);TAB(12);"Peak Rate Usage";CHR$(10)
400 LPRINT STRING$(79,240);CHR$(10)
410 '
420 LPRINT TAB(15);"All Start & Stop Times Are Based On A 24 Hour Clock.";CHR$(1
0)
430 LPRINT TAB(26);"Midnight = 00:00   HH:MM"
440 LPRINT TAB(26);"Noon     = 12:00   HH:MM";CHR$(10)
450 LPRINT TAB(10);"Start & Stop Times Cannot Be Overlaped From Period To Period
.";CHR$(10)
460 '
470 FOR J=1 TO 8
480 GET #1,J:O3$(J)=T2$
490 LPRINT TAB(14);MID$(T1$(J),1,40);" ";O3$(J)
500 NEXT J
510 LPRINT CHR$(10);TAB(27);"<<<< End of Report >>>>"
520 '
530 CLOSE #1:COLOR 0,0:CHAIN "ba00ic"
540 END 10 'Copyright 1985 Badger Meter, Inc. - Engineering Division *** Program Name -
ba014 *** Date 12-16-1985
20 'Author D.Wachs       \ - load "ba014"
30 'Automatic Meter Reading - Call Back Date & Time Management Sort
40 '
50 COMMON PGM$,O2$(),F1$(),T$()
60 DIM O3$(36),B$(36),L(100),R(100),W(36)
70 '
80 ON TIMER(600) GOSUB 90:GOTO 110
90 S3=1:RETURN
100 '
110 ON ERROR GOTO 120:GOTO 170
120 IF ERR=24 OR ERR=25 OR ERR=27 AND S4=0 THEN TIMER ON:S4=1
130 IF ERR=24 OR ERR=25 THEN COLOR 30,4:LOCATE 3,21:PRINT " *** Please Turn Line
 Printer On. *** ":IF S3<>0 THEN 1450 ELSE RESUME
140 IF ERR=27 THEN COLOR 30,4:LOCATE 3,21:PRINT " *** Out of Paper On Line Print
er. *** ":IF S3<>0 THEN 1450 ELSE RESUME
150 COLOR 28,0:LOCATE 5,7:PRINT "Error";ERR:STOP
160 '
170 WIDTH "LPT1:",254
180 '
190 OPEN "R",#1,"cntr.dat",8:FIELD #1,8 AS I1$:GET #1,1:I1=CVS(I1$):CLOSE #1
200 OPEN "R",#2,"index.dat",8:FIELD #2,8 AS I2$
210 OPEN "R",#3,"aar1.dat",304
220 FIELD #3,1 AS F$:Z1=1
230 FOR J=1 TO 36
240 X=LEN(O2$(J)):Y=INSTR(O2$(J),CHR$(95)):Z=X-Y+1
250 IF X=Z-1 THEN 280
260 FIELD #3,Z1 AS DUMMY$,Z2 AS DUMMY$,Z AS B$(J)
270 IF Z1+Z<255 THEN Z1=Z1+Z ELSE Z2=Z2+Z
280 NEXT J
290 '
300 COLOR 9,0:LOCATE 1,1:PRINT "BM014 "
310 COLOR 11,0:LOCATE 25,2:PRINT DATE$;" ";TIME$;
320 COLOR 15,0:LOCATE 1,8:PRINT " ** Access Plus Call Back Date & Time Managemen
t Sort On Line Printer ** "
330 COLOR 12,0:LOCATE 3,2:PRINT SPACE$(78)
340 FOR Z=5 TO 23:LOCATE Z,1:PRINT SPACE$(80);:NEXT Z
350 COLOR 14,0:LOCATE 3,28:PRINT " Sorting Please Wait "
360 '
370 COLOR 14,0:LOCATE 10,22:PRINT USING " Account Number Total = ###,###";I1
```

```
380 COLOR 12,0:LOCATE 12,19:PRINT " *** To Abort Sort Press Esc Key *** "
390 COLOR 14,0:LOCATE 14,23:PRINT "Comparisions Executed = "
400 LOCATE 16,23:PRINT "Switches Excuted = "
410 '
420 IF I1=0 THEN 1450
430 COLOR 14,1:LOCATE 8,14:PRINT " Copying Customer Account Index Into Work File "
440 OPEN "R",#1,"indexe.dat",8:FIELD #1,8 AS I3$
450 FOR J=1 TO I1:GET #2,J:I2=CVS(I3$):LSET I3$=MKS$(I2):PUT #1,J:NEXT J:CLOSE #2
460 COLOR 11,0:LOCATE 8,14:PRINT STRING$(47,32)
470 '
480 '    Sort
490 '
500 S1=1:S2=0
510 L(1)=1
520 R(1)=I1
530 L1=L(S1)
540 R1=R(S1)
550 S1=S1-1
560 L2=L1
570 R2=R1
580 GET #1,INT((L1+R1)/2):Y=CVS(I3$)
590 IF X=0 THEN X$="":GOTO 610
600 GET #3,X:GOSUB 950:X$=W$
610 C=C+1:COLOR 14,0:LOCATE 14,46:PRINT USING "###,###";C
620 N$=INKEY$:IF N$="" THEN 640
630 IF ASC(N$)=27 THEN 1450
640 GET #1,L2:Y=CVS(I3$)
650 IF Y=0 THEN Y$="":GOTO 670
660 GET #3,Y:GOSUB 950:Y$=W$
670 IF Y$>=X$ THEN 700
680 L2=L2+1
690 GOTO 610
700 C=C+1:COLOR 14,0:LOCATE 14,46:PRINT USING "###,###";C
710 N$=INKEY$:IF N$="" THEN 730
720 IF ASC(N$)=27 THEN 1450
730 GET #1,R2:Z=CVS(I3$)
740 IF Z=0 THEN Z$="":GOTO 760
750 GET #3,Z:GOSUB 950:Z$=W$
760 IF X$>=Z$ THEN 790
770 R2=R2-1
780 GOTO 700
790 IF L2>R2 THEN 850
800 S2=S2+1:COLOR 14,0:LOCATE 16,44:PRINT USING "###,###";S2
810 LSET I3$=MKS$(Y):PUT #1,R2
820 LSET I3$=MKS$(Z):PUT #1,L2
830 L2=L2-1
840 R2=R2-1
850 IF L2>=R2 THEN 610
860 IF L2>=R1 THEN 900
870 S1=S1+1
880 L(S1)=L2
890 R(S1)=R1
900 R1=R2
910 IF L1<R1 THEN 560
920 IF S1>0 THEN 530
930 GOTO 1030
940 '
950 IF B$(16)="  -  -    " THEN LSET B$(16)="" ELSE LSET B$(16)=MID$(B$(16),7,4)+MID$(B$(16),1,6)
```

```
960 IF B$(17)="__:__:_0" THEN LSET B$(17)=""
970 II$=MID$(STR$(LOC(3)),2,LEN(STR$(LOC(3)))-1)
980 W$="":W$=B$(16)+B$(17)+RIGHT$("00000"+RIGHT$(II$,LEN(II$)),5):RETURN
990 '
1000 '    Print Line Printer
1010 '
1020 '
1030 C1=53:GOTO 1180
1040 '
1050 P1=P1+1
1060 LPRINT CHR$(18);CHR$(27);CHR$(65);CHR$(12);CHR$(27);CHR$(50):TIMER OFF:S3=0

1070 LPRINT CHR$(12);"BM014";CHR$(14);TAB(17);"Access Plus";CHR$(20);TAB(49);"Pa
ge";P1
1080 LPRINT TAB(23);"Copyright 1986 Badger Meter, Inc."
1090 LPRINT TAB(27);"Utility Products Division"
1100 LPRINT "D = Delinquent Call";TAB(27);"as of ";DATE$;" ";TIME$;TAB(59);"R =
Retry Schedule";CHR$(10)
1110 LPRINT CHR$(14);TAB(2);"Call Back Date & Time Management Sort";CHR$(10);CHR
$(15)
1120 LPRINT TAB(4);"Account";TAB(25);"Customer";TAB(56);"Customer";TAB(81);"Cust
omer";TAB(94);"------ Call Back ------";TAB(121);"Reporting"
1130 LPRINT TAB(4);"Number";TAB(27);"Name";TAB(57);"Address";TAB(82);"Phone";TAB
(97);"Date       Time";TAB(121);"Frequency"
1140 LPRINT STRING$(132,240)
1150 C1=0
1160 RETURN
1170 '
1180 FOR I=1 TO I1
1190 GET #1,I:I2=CVS(I3$)
1200 IF I2=0 THEN 1430
1210 GET #3,I2:CY$=F1$(VAL(B$(15))):D2$=" "
1220 '
1230 IF B$(16)="__-__-____" OR B$(16)="          " OR B$(17)="__:__:_0" OR B$(17
)="        " THEN 1380
1240 GOSUB 1250:0#=N#:GOTO 1300
1250 Y1=VAL(MID$(DATE$,7,4)):M1=VAL(MID$(DATE$,1,2)):D1=VAL(MID$(DATE$,4,2))
1260 IF M1>2 THEN M0=M1-3:Y0=Y1 ELSE M0=M1+9:Y0=Y1-1
1270 C0=INT(Y0/100):D0=Y0-100*C0
1280 N#=INT(146097!*C0/4)+D1+INT(1461*D0/4)+1721119!+INT((153*M0+2)/5):RETURN
1290 '
1300 Y1=VAL(MID$(B$(16),7,4)):M1=VAL(MID$(B$(16),1,2)):D1=VAL(MID$(B$(16),4,2))
1310 GOSUB 1260
1320 IF N#>O# THEN 1380
1330 IF N#=O# AND B$(17)>TIME$ THEN 1380
1340 IF N#+3<O# THEN D2$="R":GOTO 1380
1350 IF B$(17)<TIME$ THEN D2$="D"
1360 IF N#<O# THEN D2$="D"
1370 '
1380 IF C1>=50 THEN GOSUB 1050
1390 LPRINT D2$;:LPRINT USING "    ##,###    ";I2;:LPRINT B$(1);"    ";B$(2);
"    ";B$(5);"    ";B$(16);"    ";B$(17);"    ";CY$
1400 C1=C1+1
1410 N$=INKEY$:IF N$="" THEN 1430
1420 IF ASC(N$)=27 THEN 1450
1430 NEXT I
1440 LPRINT CHR$(18);TAB(27);"<<<< End of Report >>>>"
1450 CLOSE #1,#2,#3
1460 CHAIN "bm001c"
1470 END
```

```
10 'Copyright 1985 Badger Meter, Inc. - Engineering Division *** Program Name -
bm014a *** Date 04-07-1986
20 'Author D.Wachs        \ - load "bm014a"
30 'Automatic Meter Reading - Alarm/Status & Leak Indicator Sort On Line Printer 40 '
50 COMMON PGM$,O2$(),F1$(),T$()
60 DIM D3$(36),B$(36),L(100),R(100),W(36)
70 '
80 ON TIMER(600) GOSUB 90:GOTO 110
90 S3=1:RETURN
100 '
110 ON ERROR GOTO 120:GOTO 170
120 IF ERR=24 OR ERR=25 OR ERR=27 AND S4=0 THEN TIMER ON:S4=1
130 IF ERR=24 OR ERR=25 THEN COLOR 30,4:LOCATE 3,21:PRINT " *** Please Turn Line
    Printer On. *** ":IF S3<>0 THEN 1370 ELSE RESUME
140 IF ERR=27 THEN COLOR 30,4:LOCATE 3,21:PRINT " *** Out of Paper On Line Print
er. *** ":IF S3<>0 THEN 1370 ELSE RESUME
150 COLOR 28,0:LOCATE 5,7:PRINT "Error";ERR:STOP
160 '
170 WIDTH "LPT1:",254
180 '
190 OPEN "R",#1,"cntr.dat",8:FIELD #1,8 AS I1$:GET #1,1:I1=CVS(I1$):CLOSE #1
200 OPEN "R",#2,"index.dat",8:FIELD #2,8 AS I2$
210 OPEN "R",#3,"amr1.dat",304
220 FIELD #3,1 AS F$:Z1=1
230 FOR J=1 TO 36
240 X=LEN(O2$(J)):Y=INSTR(O2$(J),CHR$(95)):Z=X-Y+1
250 IF X=Z-1 THEN 280
260 FIELD #3,Z1 AS DUMMY$,Z2 AS DUMMY$,Z AS B$(J)
270 IF Z1+Z<255 THEN Z1=Z1+Z ELSE Z2=Z2+Z
280 NEXT J
290 '
300 COLOR 9,0:LOCATE 1,1:PRINT "BM014A"
310 COLOR 11,0:LOCATE 25,2:PRINT DATE$;" ";TIME$;
320 COLOR 15,0:LOCATE 1,8:PRINT "*** Access Plus Alarm / Status & Leak Indicator
    Sort On Line Printer *** "
330 COLOR 12,0:LOCATE 3,2:PRINT SPACE$(78)
340 FOR Z=5 TO 23:LOCATE Z,1:PRINT SPACE$(80);:NEXT Z
350 COLOR 14,0:LOCATE 3,28:PRINT " Sorting Please Wait "
360 '
370 COLOR 14,0:LOCATE 10,22:PRINT USING " Account Number Total = ###,###";I1
380 COLOR 12,0:LOCATE 12,19:PRINT " *** To Abort Sort Press Esc Key *** "
390 COLOR 14,0:LOCATE 14,23:PRINT "Comparisions Executed = "
400 LOCATE 16,23:PRINT "Switches Excuted = "
410 '
420 IF I1=0 THEN GOSUB 1100:GOTO 1360
430 COLOR 14,1:LOCATE 9,14:PRINT " Copying Customer Account Index Into Work File
    "
440 OPEN "R",#1,"indexs.dat",8:FIELD #1,8 AS I3$:I3=0
450 FOR I=1 TO I1
460 GET #2,I:I2=CVS(I2$)
470 IF I2=0 THEN 510
480 GET #3,I2
490 IF VAL(B$(12))=0 AND VAL(B$(13))=0 THEN 510
500 I3=I3+1:LSET I3$=MKS$(I2):PUT #1,I3
510 NEXT I:CLOSE #2
520 IF I3=0 THEN GOSUB 1100:GOTO 1360
530 COLOR 11,0:LOCATE 9,14:PRINT STRING$(47,32)
540 '
550 '    Sort
560 '
```

```
570 S1=1:S2=0
580 L(1)=1
590 R(1)=I3
600 L1=L(S1)
610 R1=R(S1)
620 S1=S1-1
630 L2=L1
640 R2=R1
650 GET #1,INT((L1+R1)/2):X=CVS(I3$)
660 IF X=0 THEN X$="":GOTO 680
670 GET #3,X:GOSUB 1020:X$=W$
680 C=C+1:COLOR 14,0:LOCATE 14,46:PRINT USING "###,###";C
690 N$=INKEY$:IF N$="" THEN 710
700 IF ASC(N$)=27 THEN 1370
710 GET #1,L2:Y=CVS(I3$)
720 IF Y=0 THEN Y$="":GOTO 740
730 GET #3,Y:GOSUB 1020:Y$=W$
740 IF Y$>=X$ THEN 770
750 L2=L2+1
760 GOTO 690
770 C=C+1:COLOR 14,0:LOCATE 14,46:PRINT USING "###,###";C
780 N$=INKEY$:IF N$="" THEN 800
790 IF ASC(N$)=27 THEN 1370
800 GET #1,R2:Z=CVS(I3$)
810 IF Z=0 THEN Z$="":GOTO 830
820 GET #3,Z:GOSUB 1020:Z$=W$
830 IF X$>=Z$ THEN 860
840 R2=R2-1
850 GOTO 770
860 IF L2>R2 THEN 920
870 S2=S2+1:COLOR 14,0:LOCATE 16,44:PRINT USING "###,###";S2
880 LSET I3$=MKS$(Y):PUT #1,R2
890 LSET I3$=MKS$(Z):PUT #1,L2
900 L2=L2+1
910 R2=R2-1
920 IF L2<=R2 THEN 680
930 IF L2>=R1 THEN 970
940 S1=S1+1
950 L(S1)=L2
960 R(S1)=R1
970 R1=R2
980 IF L1<R1 THEN 630
990 IF S1>0 THEN 600
1000 GOTO 1080
1010 '
1020 I1$=MID$(STR$(LOC(3)),2,LEN(STR$(LOC(3)))-1)
1030 W$="":W$=B$(12)+B$(13)+RIGHT$("00000"+RIGHT$(I1$,LEN(I1$)),5):RETURN
1040 '
1050 '    Print Line Printer
1060 '
1070 '
1080 C1=53:GOTO 1230
1090 '
1100 P1=P1+1
1110 LPRINT CHR$(15);CHR$(27);CHR$(65);CHR$(12);CHR$(27);CHR$(50):TIMER OFF:S3=0

1120 LPRINT CHR$(12);"BM014A";CHR$(14);TAB(17);"Access Plus";CHR$(20);TAB(49);"Page";P1
1130 LPRINT TAB(23);"Copyright 1986 Badger Meter, Inc."
1140 LPRINT TAB(27);"Utility Products Division"
1150 LPRINT TAB(27);"as of ";DATE$;" ";TIME$;CHR$(10)
```

```
1160 LPRINT CHR$(14);TAB(2);"Alarm / Status & Leak Indicator Sort";CHR$(18);CHR$
(15)
1170 LPRINT TAB(1);"Account";TAB(19);"Customer";TAB(45);"Customer";TAB(66);"Cust
omer"
1180 LPRINT TAB(1);"Number";TAB(20);"Name";TAB(46);"Address";TAB(67);"Phone";TAB
(82);"Alarm / Status";TAB(111);"Leak Indicator"
1190 LPRINT STRING$(130,240)
1200 C1=0
1210 RETURN
1220 '
1230 FOR I=1 TO I3
1240 GET #1,I:I2=CVS(I3$)
1250 IF I2=0 THEN 1350
1260 GET #3,I2:IF VAL(B$(12))=0 AND VAL(B$(13))=0 THEN 1330
1270 A1$=T$(VAL(B$(12))+33):A2$=T$(VAL(B$(13))+33)
1280 '
1290 '
1300 IF C1>=50 THEN GOSUB 1100
1310 LPRINT USING " ##,### ";I2;:LPRINT B$(1);" ";B$(2);" ";B$(5);" ";A1$;"
  ";A2$
1320 C1=C1+1
1330 N$=INKEY$:IF N$="" THEN 1350
1340 IF ASC(N$)=27 THEN 1370
1350 NEXT I
1360 LPRINT CHR$(18);TAB(27);"<<<< End of Report >>>>"
1370 CLOSE #1,#2,#3
1380 CHAIN "bm001c"
1390 END 10 'Copyright 1986 Badger Meter, Inc. - Engineering Division *** Program Name -
bm215 *** Date 04-16-1986
20 'Author D.Wachs         \ - load "bm215"
30 'Automatic Meter Reading - Access Plus Pc to Mainframe Customer Account Trans
fer
40 '
50 COMMON PGM$,O2$(),F1$(),T$()
60 '
70 ON TIMER(120) GOSUB 80:GOTO 100
80 S1=1::RETURN
90 '
100 COLOR 9,0:LOCATE 1,1:PRINT "BM215 "
110 COLOR 11,0:LOCATE 25,2:PRINT DATE$;" ";TIME$;
120 COLOR 15,0:LOCATE 1,8:PRINT "   ***   Access Plus Pc to Mainframe Customer A
ccount Transfer  ***       "
130 COLOR 14,0:LOCATE 3,2:PRINT "                              Press Esc To Exit
 "
140 COLOR 12,0:FOR I=5 TO 23:LOCATE I,1:PRINT SPACE$(80);:NEXT I
150 '
160 COLOR 12,0
170 LOCATE 8,10:PRINT CHR$(213);STRING$(58,205);CHR$(184)
180 FOR Z=9 TO 18:LOCATE Z,10:PRINT CHR$(179):LOCATE Z,69:PRINT CHR$(179):NEXT Z 190 LOCATE 18,10:PRINT CHR$(212);STRING$(58,205);CHR$(190)
200 COLOR 14,4:LOCATE 11,14:PRINT STRING$(52,32)
210 LOCATE 12,14:PRINT "              For Future Use Only                "
220 LOCATE 13,14:PRINT "  To Be Written By Third Party Software Consultant "
230 LOCATE 14,14:PRINT STRING$(52,32)
240 TIMER ON
250 IF S1<>0 THEN 300
260 N$=INKEY$:IF N$="" THEN COLOR 11,0:LOCATE 25,2:PRINT DATE$;" ";TIME$;:GOTO 2
50
```

```
270 TIMER OFF
280 IF ASC(N$)=27 THEN 300 ELSE 240
290 '
300 CHAIN "bm001d"
310 END
10 'Copyright 1986 Badger Meter, Inc. - Engineering Division *** Program Name -
bm015a *** Date 04-16-1986
20 'Author D.Wachs         \ - load "bm015a"
30 'Automatic Meter Reading - Access Plus Mainframe to Pc Customer Account Trans
fer
40 '
50 COMMON PGM$,02$(),F1$(),T$()
60 '
70 ON TIMER(120) GOSUB 80:GOTO 100
80 S1=1:RETURN
90 '
100 COLOR 9,0:LOCATE 1,1:PRINT "BM015A"
110 COLOR 11,0:LOCATE 25,2:PRINT DATE$;" ";TIME$;
120 COLOR 15,0:LOCATE 1,8:PRINT "     ***   Access Plus Mainframe to Pc Customer A
ccount Transfer   ***       "
130 COLOR 14,0:LOCATE 3,2:PRINT "                          Press Esc To Exit
                 "
140 COLOR 12,0:FOR I=5 TO 23:LOCATE I,1:PRINT SPACE$(80);:NEXT I
150 '
160 COLOR 12,0
170 LOCATE 8,10:PRINT CHR$(213);STRING$(58,205);CHR$(184)
180 FOR Z=9 TO 18:LOCATE Z,10:PRINT CHR$(179):LOCATE Z,69:PRINT CHR$(179):NEXT Z 190 LOCATE 18,10:PRINT CHR$(212);STRING$(58,205);CHR$(190)
200 COLOR 14,4:LOCATE 11,14:PRINT STRING$(52,32)
210 LOCATE 12,14:PRINT "               For Future Use Only             "
220 LOCATE 13,14:PRINT "  To Be Written By Third Party Software Consultant  "
230 LOCATE 14,14:PRINT STRING$(52,32)
240 TIMER ON
250 IF S1<>0 THEN 300
260 N$=INKEY$:IF N$="" THEN COLOR 11,0:LOCATE 25,2:PRINT DATE$;" ";TIME$;:GOTO 2
50
270 TIMER OFF
280 IF ASC(N$)=27 THEN 300 ELSE 240
290 '
300 CHAIN "bm001d"
310 END
10 'Copyright 1986 Badger Meter, Inc. - Engineering Division *** Program Name -
bm015c *** Date 04-17-1986
20 'Author D.Wachs         \ - load "bm015d"
30 'Automatic Meter Reading - Access Plus Call Collection Module Diagnostics
40 '
50 COMMON PGM$,02$(),F1$(),T$()
60 '
70 COLOR 9,0:LOCATE 1,1:PRINT "BM015D"
80 COLOR 11,0:LOCATE 25,2:PRINT DATE$;" ";TIME$;
90 COLOR 15,0:LOCATE 1,8:PRINT "     ***   Access Plus Call Collection Module
Diagnostics   ***       "
100 COLOR 14,0:LOCATE 3,2:PRINT "                          Press Esc To Exit
                 "
110 COLOR 12,0:FOR I=5 TO 23:LOCATE I,1:PRINT SPACE$(80);:NEXT I
120 '
130 PRINT #4,"DIAGNOSTICS"
140 ON TIMER(5) GOSUB 150:GOTO 160
150 BEEP:COLOR 14,0:LOCATE 25,36:PRINT " * Diagnostics Error In CCM *";:TIMER OF
F:S1=1:RETURN
```

```
160 TIMER ON:S1=0:N1$=""
170 IF S1<>0 THEN 210
180 IF EOF(4) THEN 170 ELSE N$=INPUT$(LOC(4),#4):N1$=N1$+N$
190 IF INSTR(N1$,CHR$(13))=0 THEN 170
200 IF INSTR(N1$,"OK")=0 THEN GOSUB 150
210 TIMER OFF:S1=0
220 '
230 ON TIMER (600) GOSUB 240:GOTO 250
240 S1=1:RETURN
250 TIMER ON:S1=0
260 IF S1<>0 THEN 310
270 N$=INKEY$:IF N$="" THEN COLOR 11,0:LOCATE 25,2:PRINT DATE$;" ";TIME$;:GOTO 260
280 TIMER OFF
290 IF ASC(N$)=27 THEN 310 ELSE 250
300 '
310 CHAIN "bm001d"
320 END

10 'Copyright 1985 Badger Meter, Inc. - Engineering Division *** Program Name - bm016 *** Date 01-23-1986
20 'Author D.Wachs        \ - load "bm016"
30 'Automatic Meter Reading - AMR Programming & Startup
40 '
50 COMMON PGM$,O2$(),F1$(),T$()
60 DIM O1$(4),O2$(36),B$(36),P(2),D1(12),D1$(12)
70 '
80 OPEN "R",#1,"uphone.dat",11:FIELD #1,11 AS P1$
90 GET #1,3:P(1)=VAL(P1$):GET #1,4:P(2)=VAL(P1$)
100 CLOSE #1
110 '
120 OPEN "R",#1,"pru.dat",5:FIELD #1,5 AS T2$:GET #1,7:T3$=T2$:CLOSE #1:T3=VAL(T3$)
130 IF T3=0 THEN T3$=""
140 IF T3>=5 AND T3<=59 THEN T3$="/Min"
150 IF T3=60 THEN T3$="/Hr"
160 '
170 OPEN "R",#3,"aer1.dat",304
180 FIELD #3,1 AS F$:Z1=1
190 FOR J=1 TO 36
200 X=LEN(O2$(J)):Y=INSTR(O2$(J),CHR$(95)):Z=X-Y+1
210 IF X=Z-1 THEN 240
220 FIELD #3,Z1 AS DUMMY$,Z2 AS DUMMY$,Z AS B$(J)
230 IF Z1+Z<255 THEN Z1=Z1+Z ELSE Z2=Z2+Z
240 NEXT J
250 '
260 DATA "  * Programming & Startup        * "
270 DATA "  * Customer Account Maintenance * "
280 DATA "  * Meter Reading                * "
290 DATA "  * End - Use Esc Key            * "
300 FOR I=1 TO 4:READ O1$(I):NEXT I
310 '
320 DATA "Jan",31,"Feb",29,"Mar",31,"Apr",30,"May",31,"Jun",30,"Jul",31,"Aug",31,"Sep",30,"Oct",31,"Nov",30,"Dec",31
330 FOR I=1 TO 12:READ D1$(I),D1(I):NEXT I
340 '
350 ST$=CHR$(15)+CHR$(15)+CHR$(15)+CHR$(15)+CHR$(16)+" Startup "+CHR$(17)+CHR$(15)+CHR$(15)+CHR$(15)+CHR$(15)
360 '
370 COLOR 9,0:LOCATE 1,1:PRINT "BM016 "
380 COLOR 11,0:LOCATE 25,2:PRINT DATE$;" ";TIME$;
```

```
390 COLOR 15,0:LOCATE 1,8:PRINT "            xxx  Access Plus Programing & Start
up  xxx
400 '
410 '      Scan - Change
420 '
430 COLOR 12,0:FOR I=5 TO 23:LOCATE I,1:PRINT SPACE$(80);:NEXT I
440 LOCATE 3,2:PRINT SPACE$(78)
450 COLOR 30,0:LOCATE 25,66:PRINT " * Scan Mode *";
460 COLOR 14,0:LOCATE 3,13:PRINT " Press Any Key To Scan For Desired Line, Press
 Enter.  "
470 IF P(1)+P(2)>0 THEN 500
480 COLOR 14,12:LOCATE 12,25:BEEP:PRINT " Error In Phone Line Allocation! "
490 N$=INKEY$:IF N$="" THEN 490 ELSE I=5:GOTO 5160
500 COLOR 11,0:FOR I=1 TO 4:LOCATE 10+I,24:PRINT O1$(I):NEXT I
510 ON TIMER(600) GOSUB 520:GOTO 530
520 S1=1:RETURN
530 FOR I=1 TO 4
540 COLOR 16,3:LOCATE 10+I,24:PRINT O1$(I)
550 TIMER ON
560 IF S1<>0 THEN I=4:GOTO 610
570 N$=INKEY$:IF N$="" THEN COLOR 11,0:LOCATE 25,2:PRINT DATE$;" ";TIME$;:GOTO 5
70
580 TIMER OFF
590 IF ASC(N$)=27 THEN I=4:GOTO 610
600 IF ASC(N$)<>13 THEN 640
610 COLOR 10,0:LOCATE 3,2:PRINT SPACE$(78)
620 COLOR 0,3:LOCATE 3,2:PRINT O1$(I):COLOR 0,0
630 ON I GOTO 760,5160,5160,5160
640 COLOR 11,0:LOCATE 10+I,24:PRINT O1$(I)
650 FOR J=1 TO 4
660 IF N$=MID$(O1$(J),4,1) OR ASC(N$)-32=ASC(MID$(O1$(J),4,1)) THEN I=J:GOTO 610

670 NEXT J
680 IF ASC(N$)=8 OR ASC(N$)=56 OR ASC(N$)=57 THEN I=I-2:IF I<0 THEN I=3
690 IF ASC(N$)=49 THEN I=3
700 IF ASC(N$)=55 THEN I=0
710 NEXT I
720 GOTO 530
730 '
740 '      Enter Account Number
750 '
760 COLOR 12,0:FOR Z=11 TO 14:LOCATE Z,24:PRINT SPACE$(34):NEXT Z
770 COLOR 26,0:LOCATE 25,66:PRINT " * Edit Mode *";
780 COLOR 10,0:LOCATE 3,37:PRINT "Enter Customer Account Number? ";:N1$="":C=0
790 LOCATE 3,68+C,1,0,7
800 N$=INKEY$:IF N$="" THEN 800
810 IF ASC(N$)=13 OR ASC(N$)=27 THEN C1=VAL(N1$):N1$="":C=0:GOTO 880
820 IF ASC(N$)=8 AND C=0 THEN 800
830 IF ASC(N$)=8 THEN LOCATE 3,POS(0)-1:PRINT " ":C=C-1:IF C<0 THEN C=0 ELSE N1$
=MID$(N1$,1,C):GOTO 870
840 IF ASC(N$)<48 OR ASC(N$)>57 THEN BEEP:GOTO 800
850 IF LEN(N1$)>4 THEN BEEP:GOTO 800
860 N1$=MID$(N1$,1,C)+N$:C=C+1
870 COLOR 10,0:LOCATE 3,68,0:PRINT N1$:GOTO 790
880 LOCATE ,,0
890 IF C1=0 THEN 440
900 IF C1>=1 AND C1<=75000! THEN 990
910 COLOR 14,4:LOCATE 3,37:BEEP:PRINT " Error Invalid Account Number 1-75000 Onl
y! "
920 GOSUB 940:GOTO 760
930 '
```

```
940 FOR J=1 TO 5000:NEXT J:COLOR 10,0:LOCATE 3,37:PRINT SPACE$(44);
950 RETURN
960 '
970 '    Read Disk File & Check Account Number
980 '
990 GET #3,C1
1000 IF ASC(F$)<>89 THEN COLOR 14,4:LOCATE 3,37:BEEP:PRINT " Error Account Numb
er Not On File ":GOSUB 940:GOTO 780
1010 FOR J=1 TO 36:O3$(J)=B$(J):NEXT J:L2=VAL(O3$(15)):O3$(15)=F$(VAL(O3$(15)))
:L1=VAL(O3$(8)):O3$(8)=T$(VAL(O3$(8))):O3$(12)=T$(VAL(O3$(12))+33):O3$(13)=T$(VA
L(O3$(13))+33):O2$(34)=ST$
1020 '
1030 COLOR 14,0:LOCATE 3,2:PRINT "            Scan To Desired Line, Press Enter
 To Edit, Esc To End          "
1040 COLOR 14,1:LOCATE 6,22:PRINT USING " Customer Account Number ---- ##,### ";
C1
1050 FOR J=1 TO 34
1060 COLOR 11,0
1070 X=INSTR(O2$(J),"x"):IF X<>0 THEN COLOR 14,1
1080 IF J<=17 THEN LOCATE 6+J,2:PRINT MID$(O2$(J),1,19):LOCATE 6+J,22:PRINT O3$(
J)
1090 IF J>=18 THEN LOCATE J-11,49:PRINT MID$(O2$(J),1,19):LOCATE J-11,69:PRINT O
3$(J)
1100 '
1110 IF O3$(32)="On " THEN COLOR 14,0:FOR J=22 TO 22:LOCATE J,75:PRINT T$:NEXT
J
1120 '
1130 '    Scan Mode
1140 '
1150 L=34
1160 FOR J=L TO 34
1170 X=INSTR(O2$(J),"x"):IF X<>0 THEN 1270
1180 COLOR 30,0:LOCATE 25,66:PRINT " x Scan Mode x";
1190 IF J<=17 THEN COLOR 16,3:LOCATE 6+J,2:PRINT MID$(O2$(J),1,19)
1200 IF J>=18 THEN COLOR 16,3:LOCATE J-11,49:PRINT MID$(O2$(J),1,19)
1210 N$=INKEY$:IF N$="" THEN COLOR 11,0:LOCATE 25,2:PRINT DATE$;" ";TIME$;:GOTO
1210
1220 IF ASC(N$)=13 AND J=34 THEN 2360
1230 IF ASC(N$)=27 THEN 430
1240 IF ASC(N$)=13 THEN GOSUB 1420:GOTO 1370
1250 IF J<=17 THEN COLOR 11,0:LOCATE 6+J,2:PRINT MID$(O2$(J),1,19)
1260 IF J>=18 THEN COLOR 11,0:LOCATE J-11,49:PRINT MID$(O2$(J),1,19)
1270 IF ASC(N$)<=64 OR ASC(N$)>=123 THEN 1340
1280 FOR K=J+1 TO 34
1290 IF N$=MID$(O2$(K),1,1) OR ASC(N$)-32=ASC(MID$(O2$(K),1,1)) THEN J=K-1:GOTO
1370
1300 NEXT K
1310 FOR K=1 TO J
1320 IF N$=MID$(O2$(K),1,1) OR ASC(N$)-32=ASC(MID$(O2$(K),1,1)) THEN J=K-1:GOTO
1370
1330 NEXT K
1340 IF ASC(N$)=8 OR ASC(N$)=56 OR ASC(N$)=57 THEN J=J-2:IF J<0 THEN J=33
1350 IF ASC(N$)=49 THEN J=32
1360 IF ASC(N$)=55 THEN J=0
1370 NEXT J:L=1
1380 GOTO 1160
1390 '
1400 '    Edit Mode
1410 '
1420 IF J=15 AND VAL(O3$(36))<>0 THEN 1980
1430 IF J=16 AND VAL(O3$(36))<>0 THEN 1990
```

```
1440 IF J=17 AND VAL(O3$(36))<>0 THEN 1980
1450 IF J<>18 AND J<>25 AND J<>30 THEN 1510
1460 IF O3$(J)="Off" THEN O3$(J)="On ":GOTO 1480
1470 IF O3$(J)="On " THEN O3$(J)="Off"
1480 T4$="       ":IF O3$(38)="On " THEN T4$=T3$
1490 COLOR 14,0:FOR K=20 TO 22:LOCATE K,75:PRINT T4$:NEXT K
1500 GOTO 1980
1510 COLOR 26,0:LOCATE 25,66:PRINT " * Edit Mode *";
1520 X=LEN(O2$(J)):Y=INSTR(O2$(J),CHR$(93)):Z=X-Y+1
1530 Y=INSTR(O2$(J),CHR$(56))
1540 IF J<=17 THEN COLOR 10,0:LOCATE 6+J,2:PRINT MID$(O2$(J),1,19);MID$(O2$(J),2
0,Z+1)
1550 IF J>=18 THEN COLOR 10,0:LOCATE J-11,49:PRINT MID$(O2$(J),1,19);MID$(O2$(J)
,20,Z+1)
1560 IF J=12 THEN 2240
1570 IF J=13 THEN 2240
1580 IF J=15 THEN 2030
1590 IF J=8 THEN 2130
1600 IF MID$(O2$(J),21+C,1)<>"_" AND MID$(O2$(J),21+C,1)<>"" THEN N$=MID$(O2$(J)
,21+C,1):GOTO 1930
1610 IF J<=17 THEN LOCATE 6+J,22+C,1,0,7
1620 IF J>=18 THEN LOCATE J-11,69+C,1,0,7
1630 N$=INKEY$:IF N$="" THEN 1630
1640 IF ASC(N$)=13 OR ASC(N$)=27 THEN 1970
1650 IF ASC(N$)<>8 THEN 1700
1660 IF C=0 THEN 1630
1670 C=C-1:IF C<0 THEN C=0 ELSE N1$=MID$(N1$,1,C)
1680 IF MID$(O2$(J),21+C,1)<>"_" AND MID$(O2$(J),21+C,1)<>"" THEN C=C-1:IF C<0 T
HEN C=0 ELSE N1$=MID$(N1$,1,C)
1690 GOTO 1940
1700 IF ASC(N$)<32 OR ASC(N$)>126 THEN BEEP:GOTO 1630
1710 IF LEN(N1$)>=2 THEN BEEP:GOTO 1630
1720 IF INSTR(O2$(J),"Time")=0 AND INSTR(O2$(J),"Tm")=0 THEN 1800 ELSE 1800
1730 Y=VAL(N$)
1740 IF C+1=1 AND X<>0 AND X<>2 THEN BEEP:GOTO 1630
1750 IF C+1=2 AND X>7 THEN BEEP:GOTO 1630
1760 IF C+1=4 AND X>5 THEN BEEP:GOTO 1630
1770 IF C+1=7 AND X<>0 AND X<>2 AND X<>4 THEN BEEP:GOTO 1630
1780 IF C+1=8 AND X>0 THEN BEEP:GOTO 1630
1790 IF C+1=2 AND MID$(N1$,1,1)="2" AND X>3 THEN BEEP:GOTO 1630
1800 IF INSTR(O2$(J),"Date")=0 AND INSTR(O2$(J),"Dt")=0 THEN 1900
1810 Y=VAL(N$)
1820 IF C+1=1 AND X>1 THEN BEEP:GOTO 1630
1830 IF C+1=4 AND X>3 THEN BEEP:GOTO 1630
1840 IF C+1=6 AND X<1 THEN BEEP:GOTO 1630
1850 IF C+1=2 AND MID$(N1$,1,1)="0" AND X=0 THEN BEEP:GOTO 1630
1860 IF C+1=2 AND MID$(N1$,1,1)="1" AND X>2 THEN BEEP:GOTO 1630
1870 IF C+1=4 AND MID$(N1$,1,2)="02" AND X>2 THEN BEEP:GOTO 1630
1880 IF C+1=5 AND MID$(N1$,4,1)="3" AND X>1 THEN BEEP:GOTO 1630
1890 IF C+1=5 AND MID$(N1$,4,1)="2" AND X=0 THEN BEEP:GOTO 1630
1900 IF Y=0 THEN 1930
1910 IF N$=" " OR N$="." THEN 1930
1920 IF ASC(N$)<48 OR ASC(N$)>57 THEN BEEP:GOTO 1630
1930 N1$=MID$(N1$,1,C)+N$:C=C+1
1940 IF J<=17 THEN COLOR 10,0:LOCATE 6+J,22,0:PRINT N1$;MID$(O2$(J),21+C,Z-C)
1950 IF J>=18 THEN COLOR 10,0:LOCATE J-11,69,0:PRINT N1$;MID$(O2$(J),21+C,Z-C)
1960 GOTO 1630
1970 IF N1$<>"" THEN O3$(J)=N1$+STRING$(Z-LEN(N1$)," ")
1980 IF J<=17 THEN COLOR 11,0:LOCATE 6+J,2,0:PRINT O2$(J):LOCATE 6+J,22:PRINT O3
$(J)
```

```
1990 IF J>=15 THEN COLOR 11,0:LOCATE J-11,49,0:PRINT O2$(J):LOCATE J-11,69:PRINT
     O3$(J)
2000 N1$="":C=0
2010 RETURN
2020 '
2030 COLOR 14,0:LOCATE 20,34:PRINT "Press Any":LOCATE 21,35:PRINT "Key For":LOCA
TE 22,34:PRINT "Selection"
2040 COLOR 10,0:LOCATE 6+J,22:PRINT O3$(J)
2050 FOR K=L2 TO 6
2060 COLOR 10,0:LOCATE 6+J,22:PRINT F1$(K):O3$(J)=F1$(K)
2070 N$=INKEY$:IF N$="" THEN 2070
2080 IF ASC(N$)=13 OR ASC(N$)=27 THEN L2=K:LOCATE 20,34:PRINT SPACE$(9):LOCATE 2
1,35:PRINT SPACE$(7):LOCATE 22,34:PRINT SPACE$(9):GOTO 1980
2090 IF ASC(N$)=8 OR ASC(N$)=56 OR ASC(N$)=57 THEN K=K-2:IF K<0 THEN K=5
2100 NEXT K:L2=1
2110 GOTO 2050
2120 '
2130 COLOR 14,0:LOCATE 15,38:PRINT "Press Any":LOCATE 16,39:PRINT "Key For":LOCA
TE 17,38:PRINT "Selection"
2140 COLOR 10,0:LOCATE 6+J,22:PRINT O3$(J)
2150 FOR K=L1 TO 32
2160 IF K<9 THEN COLOR 15,0 ELSE COLOR 10,0
2170 LOCATE 6+J,22:PRINT T$(K):O3$(J)=T$(K)
2180 N$=INKEY$:IF N$="" THEN 2180
2190 IF ASC(N$)=13 OR ASC(N$)=27 THEN L1=K:LOCATE 15,38:PRINT SPACE$(9):LOCATE 1
6,39:PRINT SPACE$(7):LOCATE 17,38:PRINT SPACE$(9):GOTO 1980
2200 IF ASC(N$)=8 OR ASC(N$)=56 OR ASC(N$)=57 THEN K=K-2:IF K<0 THEN K=31
2210 NEXT K:L1=1
2220 GOTO 2150
2230 '
2240 COLOR 14,0:LOCATE 15,38:PRINT "Press Any":LOCATE 16,39:PRINT "Key For":LOCA
TE 17,38:PRINT "Selection"
2250 COLOR 10,0:LOCATE 6+J,22:PRINT O3$(J)
2260 FOR K=33 TO 44
2270 LOCATE 6+J,22:PRINT T$(K):O3$(J)=T$(K):N1$=T$(K)
2280 N$=INKEY$:IF N$="" THEN 2280
2290 IF ASC(N$)=13 OR ASC(N$)=27 THEN LOCATE 15,38:PRINT SPACE$(9):LOCATE 16,39:
PRINT SPACE$(7):LOCATE 17,38:PRINT SPACE$(9):GOTO 1980
2300 IF ASC(N$)=8 OR ASC(N$)=56 OR ASC(N$)=57 THEN K=K-2:IF K<32 THEN K=43
2310 NEXT K
2320 GOTO 2240
2330 '
2340 '    Date & Time Management - Daily - Weekly - Monthly - Quarterly
2350 '
2360 COLOR 12,0:LOCATE 5,1:PRINT SPACE$(80);
2370 P1#=VAL(O3$(5)):IF P1#<1000000 THEN 2390 ELSE 2390
2380 BEEP:COLOR 14,12:LOCATE 5,25:PRINT " Error In Cust Phone #: ":GOTO 1850
2390 IF VAL(O3$(6))>0 THEN COLOR 14,9:LOCATE 5,15:PRINT " Account Has Existing
 Date & Time Management Code: ":GOTO 3550
2400 IF B$(15)="__-__-____" OR B$(16)="        " OR B$(17)="__:__:_0" OR B$(17
=" "       THEN 2440
2410 GOSUB 2620:O3$=N$:Y1=VAL(MID$(O3$(16),7,4)):M1=VAL(MID$(O3$(16),1,2)):D1=VA
L(MID$(O3$(16),4,2)):GOSUB 2630
2420 IF N#=0# THEN 2440
2430 IF N#=2# AND B$(17)<=TIME$ THEN BEEP:COLOR 14,12:LOCATE 5,28:PRINT " Error
 In Call Back Date: ":GOTO 1850
2440 IF O3$(15)=F1$(1) THEN 3950
2450 IF O3$(15)=F1$(2) THEN 3650
2460 IF O3$(15)=F1$(3) THEN 4200
2470 IF O3$(15)=F1$(4) THEN 4200
```

```
2490 '
2498 '      ::::::::::  Monthly & Quarterly  ::::::::::
2500 '
2510 OPEN "R",#2,"ccaL.dat",29:FIELD #1,29 AS DA$:S4$="0"
2520 '
2530 P3=P(C):A1=1:A0=1:C0=0
2540 IF VAL(D3$(16))>-2 THEN A1=0
2550 IF D3$(17)="00:00:00" THEN A0=0
2560 S1=VAL(MID$(D3$(17),1,2)):S2=VAL(MID$(D3$(17),4,2)):S3=VAL(MID$(D3$(17),7,2
2570 IF S1+S2+S3=0 THEN A0=0
2580 '
2590 '    Convert Todays Gregorian Date To Julian Date
2600 '
2610 GOSUB 2620:C#=N#:GOTO 2720
2620 Y1=VAL(MID$(DATE$,7,4)):M1=VAL(MID$(DATE$,1,2)):D1=VAL(MID$(DATE$,4,2))
2630 IF (1-4*INT(Y1/4)) THEN D1(2)=28 ELSE D1(2)=29
2640 IF M1>2 THEN M3=M1-3:Y3=Y1 ELSE M3=M1+9:Y3=Y1-1
2650 C9=INT(Y3/100):Y3=Y3-100*C9
2660 N#=INT((146097*C9)/4)+INT((1461*Y3)/4)+INT((153*M3+2)/5)+D1+1721119!:RETURN
2670 '
2680 '     Find Day of Week
2690 '
2700 GOSUB 2710:D1=D1#:GOTO 2742
2710 M3=1:Y3=1:IF M1<3 THEN M3=M0-10:Y3=Y1-1
2720 N=D1+2*M3-INT(.6*(M3-1))+Y3+INT(Y3/4)-INT(Y3/100)+INT(Y3/400)+2:N=INT((N/7-
INT(N/7))*7+.5)
2730 ON N GOTO 2750,2760,2770,2780,2790,2800
2740 D1$="Saturday ":A#=7:RETURN
2750 D1$="Sunday   ":RETURN
2760 D1$="Monday   ":RETURN
2770 D1$="Tuesday  ":RETURN
2780 D1$="Wednesday":RETURN
2790 D1$="Thursday ":RETURN
2800 D1$="Friday   ":RETURN
2810 '
2820 '     Call In Frequency
2830 '
2840 D=D1
2850 IF A1=1 THEN LOCATE 5,2:COLOR 2,0:PRINT " Auto Select Day On "
2860 IF A0=1 THEN LOCATE 5,55:COLOR 2,0:PRINT " Auto Select Time On "
2870 IF CD$(15)=F1$(3) THEN Q=1
2880 IF CD$(15)=F1$(2) THEN CY=1
2890 IF CY=1 THEN X1=2161:D=25 ELSE X1=2162:CY=84
2900 S2$=STR$(CY):S2$=MID$(S2$,2,LEN(S2$)-1):S2$=RIGHT$("00"+RIGHT$(S2$,LEN(S2$)
' '
2910 '
2920 '     Start Day or Week
2930 '
2940 IF A1=1 THEN 3020
2950 D$=D3$(16)
2960 Y1=VAL(MID$(D$,7,4)):M1=VAL(MID$(D$,1,2)):D1=VAL(MID$(D$,4,2))
2970 GOSUB 2640:IF N#<C# OR N#>C#+CY*2-1 OR D1>29 THEN CLOSE #2:BEEP:COLOR 14,12
:LOCATE 5,20:PRINT " Error In Call Back Date":GOTO 1950
2980 C#=N#:GOSUB 2710:D=D1
2990 '
3000 '     Search Time Slot Based On No. of Phone Lines
3010 '
3020 FOR H=1 TO P3:M$=D$
3030 '
3040 '     Start of Time Search - 29 Days
```

```
3250 '
3260 IF D1>28 THEN M$=M$+D1(M1)-D1+1:D=1
3270 FOR I=0 TO 28
3280 GET #2,I1:DY$=DA$
3290 IF MID$(DY$,29,1)="Y" THEN 3110
3100 LSET DA$=STRING$(28,"-")+"Y":DY$=DA$:PUT #2,I1
3110 IF MID$(DY$,I,1)="F" THEN 3640
3120 IF VAL(MID$(DY$,I,1))>=H THEN 3670
3130 SEC=-20:HR=23:MIN=0
3140 S1$=STR$(I):S1$=MID$(S1$,2,LEN(S1$)-1):S1$=RIGHT$("00"+RIGHT$(S1$,LEN(S1$)
),2)
3150 '
3160 '    Search 2160 Time Slots Based On 12 Hours/Day 20 Sec. Window
3170 '
3180 FOR J=1 TO 2160
3190 COLOR 0,11:LOCATE 5,28:PRINT USING "      Slot #,###       ";J
3200 SEC=SEC+20:S1=0:N$=M$
3210 IF SEC>=60 THEN MIN=MIN+1:SEC=0 ELSE 3240
3220 IF MIN>=60 THEN HR=HR+1:MIN=0 ELSE 3240
3230 IF HR>=24 THEN HR=0:IF A1=1 THEN M$=M$+1
3240 IF A2=1 THEN 3270
3250 IF HR<>E1 OR MIN<>E2 OR SEC<>E3 THEN 3340
3260 S2=1
3270 GET #2,J:DY$=DA$
3280 IF MID$(DY$,29,1)="Y" THEN 3320
3290 LSET DA$=STRING$(28,"-")+"Y":DY$=DA$:PUT #2,J
3300 S3$=STR$(J):S3$=MID$(S3$,2,LEN(S3$)-1):S3$=RIGHT$("0000"+RIGHT$(S3$,LEN(S3$
)),4)
3310 '
3320 '    Search For Time Slot Stored By Call In Frequency
3330 '
3340 FOR K=1 TO 28 STEP CY
3350 V=VAL(MID$(DY$,K,1))
3360 IF A2=0 AND V>=P3 THEN 3710
3370 IF A2=1 AND V>H THEN 3540
3380 V=V+1:MID$(DY$,K,1)=MID$(STR$(V),2,1):G$=N$:GOSUB 3420:GOTO 3490
3390 '
3400 '    Convert Julian Date To Gregorian Date
3410 '
3420 M$=G$-1721119:Y1=INT((4*M$-1)/146097)
3430 M9=4*M$-1-146097*Y1:D1=INT(M9/4)
3440 M8=INT((4*D1+3)/1461):D1=4*D1+3-1461*M8
3450 D1=INT((D1+4)/4):M1=INT((5*D1-3)/153)
3460 D1=5*D1-3-153*M1:D1=INT((D1+5)/5):Y1=100*Y1+M8
3470 IF M1<10 THEN M1=M1+3 ELSE M1=M1-9:Y1=Y1+1
3480 RETURN
3490 N$=N$+D1(M1)
3500 IF S1=0 THEN F=K:F1=D1:F2=M1:F3=Y1:F5=HR:F6=MIN:F7=SEC:S1=1
3510 NEXT K
3520 '
3530 LSET DA$=DY$:PUT #2,J:CLOSE #2:GOTO 3770
3540 S1=0:NEXT J
3550 '
3560 '    Record Day Full
3570 '
3580 IF S2=P7 THEN 3600
3590 GET #2,I1:DY$=DA$:MID$(DY$,I,1)=MID$(STR$(H),2,1):LSET DA$=DY$:PUT #2,I1:GO
TO 3670
3600 GET #2,I1:DY$=DA$:MID$(DY$,I,1)="F":LSET DA$=DY$:PUT #2,I1
3610 '
3620 '    Check For More Time Slots
```

```
3630 '
3640 IF A1=0 THEN 3710
3650 M#=M#+1
3660 NEXT I
3670 NEXT H
3680 IF A1=0 THEN 3710
3690 IF D=1 THEN 3710
3700 O#=O#+D1(M1)-D1+1:E=D-1:D=1:GOTO 3020
3710 CLOSE #2:BEEP:COLOR 14,12:LOCATE 5,28:PRINT "  No Time Slots Left!   ":CO
LOR 11,0:GOTO 1050
3720 '
3730 Y1=F3:M1=F2:D1=F1:GOSUB 2710
3740 M$=STR$(F2):M$=MID$(M$,2,LEN(M$)-1):M$=RIGHT$("00"+RIGHT$(M$,LEN(M$)),2)
3750 D$=STR$(F1):D$=MID$(D$,2,LEN(D$)-1):D$=RIGHT$("00"+RIGHT$(D$,LEN(D$)),2)
3760 Y$=STR$(F3):Y$=MID$(Y$,2,LEN(Y$)-1):Y$=RIGHT$("0000"+RIGHT$(Y$,LEN(Y$)),4)
3770 O3$(16)=M$+"-"+D$+"-"+Y$:COLOR 11,0:LOCATE 22,22:PRINT O3$(16)
3780 H$=STR$(F5):H$=MID$(H$,2,LEN(H$)-1):H$=RIGHT$("00"+RIGHT$(H$,LEN(H$)),2)
3790 M$=STR$(F6):M$=MID$(M$,2,LEN(M$)-1):M$=RIGHT$("00"+RIGHT$(M$,LEN(M$)),2)
3800 S$=STR$(F7):S$=MID$(S$,2,LEN(S$)-1):S$=RIGHT$("00"+RIGHT$(S$,LEN(S$)),2)
3810 O3$(17)=H$+":"+M$+":"+S$:COLOR 11,0:LOCATE 23,22:PRINT O3$(17);
3820 O3$(36)=S3$+S1$+S2$+S4$
3830 PRINT:COLOR 10,1:LOCATE 5,2:PRINT USING " Start Day ## ## \  \ ####  \
 \  Time \\:\\:\\    Deletion Code \      \ ";F:F1;D1$(F2);F3;D1$;H$;M$;S$;S3$+
S1$+S2$+S4$
3840 '
3850 C1$=STR$(C1):C1$=MID$(C1$,2,LEN(C1$)-1)
3860 P1#=VAL(O3$(10)):SE$=STR$(P1#):SE$=MID$(SE$,2,LEN(SE$)-1):SE$=LEFT$(LEFT$(S
E$,LEN(SE$))+"0000000000",10)
3870 P1#=VAL(O3$(22)):PV$=STR$(P1#):PV$=MID$(PV$,2,LEN(PV$)-1)
3880 PH$=O3$(5):CB$=O3$(15):MT$=O3$(18):TD$=O3$(25):PR$=O3$(30)
3890 IF INSTR(PH$," ")-1<=0 THEN 3900 ELSE PH$=MID$(PH$,1,INSTR(PH$," ")-1)
3900 IF INSTR(CB$," ")-1<=0 THEN 3910 ELSE CB$=MID$(CB$,1,INSTR(CB$," ")-1)
3910 IF INSTR(MT$," ")-1<=0 THEN 3920 ELSE MT$=MID$(MT$,1,INSTR(MT$," ")-1)
3920 IF INSTR(TD$," ")-1<=0 THEN 3930 ELSE TD$=MID$(TD$,1,INSTR(TD$," ")-1)
3930 IF INSTR(PR$," ")-1<=0 THEN 3940 ELSE PR$=MID$(PR$,1,INSTR(PR$," ")-1)
3940 PRINT #4,"INSTALL ACCT=";C1$;" MPHONE=";PH$;" CALLIN=";O3$(16);",";O3$(17);
" CALLBACK=";CB$;" PREV=";PV$;" METER=";MT$;" TOD=";TD$;" PR=";PR$;" SERNO=";SE$
3950 '
3960 ON TIMER(5) GOSUB 3970:GOTO 3980
3970 BEEP:COLOR 14,0:LOCATE 25,36:PRINT "  # Install Error In COM #  ";:TIMER O
FF:S1=1:RETURN
3980 TIMER ON:S1=0:N1$=""
3990 IF S1<>0 THEN 4030
4000 IF EOF(4) THEN 3990 ELSE N$=INPUT$(LOC(4),#4):N1$=N1$+N$
4010 IF INSTR(N1$,CHR$(13))=0 THEN 3990
4020 IF INSTR(N1$,"OK")=0 THEN GOSUB 3970
4030 TIMER OFF:S1=0
4040 '
4050 GOSUB 4100
4060 N$=INKEY$:IF N$="" THEN COLOR 11,0:LOCATE 25,2:PRINT DATE$;" ";TIME$;:GOTO
4060 ELSE 472
4070 '
4080 '    Write Disk Record
4090 '
4100 LSET F$=CHR$(89)
4110 FOR J=1 TO 6:IF O3$(15)=F1$(J) THEN O3$(15)=MID$(STR$(J),2,1) ELSE NEXT J
4120 FOR J=1 TO 32:IF O3$(8)=T$(J) THEN O3$(8)=MID$(STR$(J),2,2) ELSE NEXT J
4130 FOR J=33 TO 44:IF O3$(12)=T$(J) THEN O3$(12)=MID$(STR$(J-33),2,2) ELSE NEXT
 J
```

```
4140 FOR J=33 TO 44:IF O3$(13)=T$(J) THEN O3$(13)=MID$(STR$(J-33),2,2) ELSE NEXT
J
4150 FOR J=1 TO 36:LSET B$(J)=O3$(J):O3$(J)="":NEXT J
4160 PUT #3,C1:RETURN
4170 '
4180 '     !!!!!!!!!!! Daily & Weekly !!!!!!!!!!
4190 '
4200 OPEN "R",#2,"dtal.dat",9:FIELD #2,9 AS DA$:S4$="1"
4210 '
4220 P3=P(1):A1=1:A2=1:S2=0
4230 IF VAL(O3$(15))<>0 THEN A1=0
4240 IF O3$(17)="00:00:00" THEN A2=0
4250 E1=VAL(MID$(O3$(17),1,2)):E2=VAL(MID$(O3$(17),4,2)):E3=VAL(MID$(O3$(17),7,2
))
4260 IF E1+E2+E3>0 THEN A2=0
4270 '
4280 GOSUB 2620:O#=N#
4290 GOSUB 2710:D2$=D1$
4300 '
4310 '     Call In Frequency
4320 '
4330 D=1:E=7
4340 IF A1=1 THEN COLOR 0,3:LOCATE 5,3:PRINT " Auto Select Day On "
4350 IF A2=1 THEN COLOR 0,3:LOCATE 5,50:PRINT " Auto Select Time On "
4360 IF O3$(15)=F1$(3) THEN CY=1
4370 IF O3$(15)=F1$(4) THEN CY=7
4380 IF CY=1 THEN I1=2161 ELSE I1=2162
4390 S2$=STR$(CY):S2$=MID$(S2$,2,LEN(S2$)-1):S2$=RIGHT$("00"+RIGHT$(S2$,LEN(S2$)
),2)
4400 '
4410 '     Start Day or Week
4420 '
4430 IF A1=1 THEN G#=O#:GOSUB 3420:GOSUB 2710:D=N:GOTO 4480
4440 D$=O3$(16)
4450 Y1=VAL(MID$(D$,7,4)):M1=VAL(MID$(D$,1,2)):D1=VAL(MID$(D$,4,2))
4460 GOSUB 2640:IF N#<O# OR N#>O#+CY*2-1 THEN CLOSE #2:BEEP:COLOR 14,12:LOCATE 5
,28:PRINT " Error In Call Back Date! ":GOTO 1050
4470 O#=N#:GOSUB 2710:D=N
4480 IF CY=1 THEN D=1
4490 '
4500 '     Search Time Slot Based On No. of Phone Lines
4510 '
4520 FOR H=1 TO P3:M#=0#
4530 '
4540 '     Start of Time Search - 7 Days
4550 '
4560 FOR I=D TO E
4570 GET #2,I1:DY$=DA$
4580 IF MID$(DY$,8,1)="Y" THEN 4600
4590 LSET DA$=STRING$(7,"-")+"Y":DY$=DA$:PUT #2,I1
4600 IF MID$(DY$,I,1)="F" THEN 5050
4610 IF VAL(MID$(DY$,I,1))>=H THEN 5070
4620 SEC=-20:HR=20:MIN=0
4630 S1$=STR$(I):S1$=MID$(S1$,2,LEN(S1$)-1):S1$=RIGHT$("00"+RIGHT$(S1$,LEN(S1$))
,2)
4640 '
4650 '     Search 2160 Time Slots Based On 12 Hours/Day 20 Sec. Window
4660 '
4670 FOR J=1 TO 2160
4680 COLOR 0,11:LOCATE 5,28:PRINT USING "       Slot #,###       ";J
4690 SEC=SEC+20:S1=0:N#=M#
```

```
4700 IF SEC>=60 THEN MIN=MIN+1:SEC=0 ELSE 4730
4710 IF MIN>=60 THEN HR=HR+1:MIN=0 ELSE 4730
4720 IF HR>=24 THEN HR=0:IF A1=1 THEN M#=M#+1
4730 IF A2=1 THEN 4750
4740 IF HR<>E1 OR MIN<>E2 OR SEC<>E3 THEN 4930
4750 S2=1
4760 GET #2,J:DY$=DA$
4770 IF MID$(DY$,8,1)="Y" THEN 4790
4780 LSET DA$=STRING$(7,"-")+"Y":DY$=DA$:PUT #2,J
4790 S3$=STR$(J):S3$=MID$(S3$,2,LEN(S3$)-1):S3$=RIGHT$("0000"+RIGHT$(S3$,LEN(S3$
)),4)
4800 '
4810 '    Search For Time Slot Steped By Call In Frequency
4820 '
4830 FOR K=1 TO 7 STEP CY
4840 V=VAL(MID$(DY$,K,1))
4850 IF A2=0 AND V>=F3 THEN 5120
4860 IF A2=1 AND V>=H THEN 4930
4870 V=V+1:MID$(DY$,K,1)=MID$(STR$(V),2,1):G#=N#:GOSUB 3420
4880 N#=N#+CY
4890 IF S1=0 THEN F=K:F1=D1:F2=M1:F3=Y1:F5=HR:F6=MIN:F7=SEC:S1=1
4900 NEXT K
4910 '
4920 LSET DA$=DY$:PUT #2,J:CLOSE #2:GOTO 3730
4930 S1=0:NEXT J
4940 '
4950 '    Record Day Full
4960 '
4970 IF H>=F3 THEN 4990
4980 GET #2,I1:DY$=DA$:MID$(DY$,I,1)=MID$(STR$(H),2,1):LSET DA$=DY$:PUT #2,I1:GO
TO 5070
4990 GET #2,I1:DY$=DA$:MID$(DY$,I,1)="F":LSET DA$=DY$:PUT #2,I1
5000 '
5010 '    Check For More Time Slots
5020 '
5030 IF CY=1 THEN 5070
5040 IF A1=0 THEN 5120
5050 M#=M#+1
5060 NEXT I
5070 NEXT H
5080 IF CY=1 THEN 5120
5090 IF A1=0 THEN 5120
5100 IF D=1 THEN 5120
5110 G#=G#+7-D+1:E=D-1:D=1:GOTO 4520
5120 CLOSE #2:BEEP:COLOR 14,12:LOCATE 5,29:PRINT "   No Time Slots Left!   ":CO
LOR 11,0:GOTO 1050
5130 '
5140 '    Close Files
5150 '
5160 CLOSE #3:O2$(34)=""
5170 ON I GOTO 760,5180,5190,5200,5210
5180 CHAIN "b#005"
5190 CHAIN "b#010"
5200 CHAIN "b#001a"
5210 CHAIN "b#002"
5220 END
```

```
10 ' Copyright 1986 Badger Meter, Inc. - Engineering Division *** Program Name - be016a *** Date 20-11-1986
20 ' Author D.Wachs        \ - load "be016a"
30 ' Automatic Meter Reading Test For Date Time Management Print
40 '
50 COMMON PGM$,D2$(),F1$(),T$()
60 DIM T(28)
70 '
80 ON TIMER(600) GOSUB 90:GOTO 110
90 S3=1:RETURN
100 '
110 ON ERROR GOTO 120:GOTO 170
120 IF ERR=24 OR ERR=25 OR ERR=27 AND S4=0 THEN TIMER ON:S4=1
130 IF ERR=24 OR ERR=25 THEN COLOR 30,4:LOCATE 3,19:PRINT "   *** Please Turn Line Printer On. *** ":IF S3<>0 THEN 980 ELSE RESUME
140 IF ERR=27 THEN COLOR 30,4:LOCATE 3,19:PRINT "   *** Out of Paper On Line Printer. *** ":IF S3<>0 THEN 990 ELSE RESUME
150 COLOR 29,0:LOCATE 5,7:PRINT "Error";ERR:STOP
160 '
170 WIDTH "LPT1:",254
180 '
190 OPEN "R",#1,"uphone.dat",11:FIELD #1,11 AS P1$
200 GET #1,3:P1=VAL(P1$):GET #1,4:P2=VAL(P1$):CLOSE #1
210 '
220 C1=53:GOTO 450
230 '
240 P3=P3+1
250 LPRINT CHR$(19);CHR$(27);CHR$(65);CHR$(12);CHR$(27);CHR$(50);:TIMER OFF:S3=0
260 LPRINT CHR$(12);"BM016A";CHR$(14);TAB(17);"Access Plus";CHR$(20);TAB(49);"Page"P3
270 LPRINT TAB(27);"Copyright 1986 Badger Meter, Inc."
280 LPRINT TAB(27);"Utility Products Division"
290 LPRINT TAB(27);"as of ";DATE$;" ";TIME$;CHR$(10)
300 LPRINT CHR$(14);TAB(4);"Call Back Date & Time Management";CHR$(10)
310 C1=0:RETURN
320 '
330 LPRINT "# of Phone Lines ";P1
340 LPRINT CHR$(14);TAB(13);"Daily & Weekly";CHR$(10)
350 LPRINT "Time Slot   Time"
360 LPRINT " Number     Slot     Sunday Monday Tuesday Wednesday Thursday Friday Saturday"
370 LPRINT STRING$(79,240):RETURN
380 '
390 LPRINT "# of Phone Lines ";P2
400 LPRINT CHR$(14);TAB(11);"Monthly & Quarterly";CHR$(10)
410 LPRINT CHR$(15);"Time Slot  Time    ";STRING$(45,"-");" Days Of The Month ";STRING$(45,"-")
420 LPRINT " Number    Slot";TAB(18);:FOR J=1 TO 28:LPRINT USING "  ##";J;:NEXT J:LPRINT
430 LPRINT STRING$(129,240):RETURN
440 '
450 IF P1=0 THEN GOSUB 240:GOSUB 330:GOTO 690
460 OPEN "R",#1,"dtm1.dat",8:FIELD #1,8 AS DA$
470 '
480 SEC=-20:HR=20:MIN=0
490 FOR I=1 TO 2160
500 SEC=SEC+20
510 IF SEC =60 THEN MIN=MIN+1:SEC=0 ELSE 540
520 IF MIN =60 THEN HR=HR+1:MIN=0 ELSE 540
530 IF HR=24 THEN HR=0
540 GET #1,I:DY$=DA$
550 IF MID$(DY$,2,1)<>"Y" THEN 620
```

```
560 IF C1>=48 THEN GOSUB 240:GOSUB 330
570 H$=STR$(HR):H$=MID$(H$,2,LEN(H$)-1):H$=RIGHT$("00"+RIGHT$(H$,LEN(H$)),2)
580 M$=STR$(MIN):M$=MID$(M$,2,LEN(M$)-1):M$=RIGHT$("00"+RIGHT$(M$,LEN(M$)),2)
590 S$=STR$(SEC):S$=MID$(S$,2,LEN(S$)-1):S$=RIGHT$("00"+RIGHT$(S$,LEN(S$)),2)
600 LPRINT USING " #,###  \\:\\:\\ ";I;H$;M$;S$;:C1=C1+1
610 FOR J=1 TO 7 :A$=MID$(DY$,J,1):T(J)=T(J)+VAL(A$):LPRINT USING "   \\ ";A$;
    :NEXT J:LPRINT
620 N$=INKEY$:IF N$="" THEN 640
630 IF ASC(N$)=27 THEN 980
640 NEXT I:CLOSE #1
650 IF C1>=47 THEN GOSUB 240:GOSUB 330
660 LPRINT TAB(20);STRING$(40,"=")
670 LPRINT TAB(11);"% of Load";
680 FOR I=1 TO 7:LPRINT USING " ###.## ";(T(I)/(2160*P1))*100;:NEXT I
690 LPRINT CHR$(18);TAB(27);"<<<< End of Report >>>>"
700 C1=53:P3=0:FOR I=1 TO 7:T(I)=0:NEXT I
710 '
720 IF P2=0 THEN GOSUB 240:GOSUB 390:GOTO 970
730 OPEN "R",#1,"dtm2.dat",29:FIELD #1,29 AS DA$
740 '
750 SEC=-20:HR=20:MIN=0
760 FOR I=1 TO 2160
770 SEC=SEC+20
780 IF SEC>=60 THEN MIN=MIN+1:SEC=0 ELSE 810
790 IF MIN>=60 THEN HR=HR+1:MIN=0 ELSE 810
800 IF HR>=24 THEN HR=0
810 GET #1,I:DY$=DA$
820 IF MID$(DY$,29,1)<>"Y" THEN 900
830 IF C1=48 THEN GOSUB 240:GOSUB 390
840 H$=STR$(HR):H$=MID$(H$,2,LEN(H$)-1):H$=RIGHT$("00"+RIGHT$(H$,LEN(H$)),2)
850 M$=STR$(MIN):M$=MID$(M$,2,LEN(M$)-1):M$=RIGHT$("00"+RIGHT$(M$,LEN(M$)),2)
860 S$=STR$(SEC):S$=MID$(S$,2,LEN(S$)-1):S$=RIGHT$("00"+RIGHT$(S$,LEN(S$)),2)
870 LPRINT CHR$(15);:LPRINT USING " #,###  \\:\\:\\ ";I;H$;M$;S$;:C1=C1+1
880 '
890 FOR J=1 TO 28:A$=MID$(DY$,J,1):T(J)=T(J)+VAL(A$):LPRINT USING " \\";A$;:NEX
    T J:LPRINT
900 N$=INKEY$:IF N$="" THEN 920
910 IF ASC(N$)=27 THEN 980
920 NEXT I:CLOSE #1
930 IF C1>=47 THEN GOSUB 240:GOSUB 390
940 LPRINT TAB(20);STRING$(110,"=")
950 LPRINT TAB(7);"% of Load   ";
960 FOR I=1 TO 28:LPRINT USING "### ";(T(I)/(2160*P2))*100;:NEXT I
970 LPRINT CHR$(18);TAB(27);"<<<< End of Report >>>>"
980 CLOSE #1:CHAIN "bm001c"
990 END 10 ' Copyright 1986 Badger Meter, Inc. - Engineering Division *** Program Name -
   bm016b *** Date 03-11-1986
20 ' Author D.Wachs       \ - load "bm016b"
30 ' Automatic Meter Reading Test For Date Time Management % of Load Print CRT
40 '
50 COMMON PGM$,O2$(),F1$(),T$()
60 DIM T(28)
70 '
80 ON TIMER(600) GOSUB 90:GOTO 110
90 S3=1:RETURN
100 '
110 OPEN "R",#1,"uphone.dat",11:FIELD #1,11 AS P1$
120 GET #1,3:P1=VAL(P1$):GET #1,4:P2=VAL(P1$):CLOSE #1
130 '
```

```
140 COLOR 9,0:LOCATE 1,1:PRINT "CHR$169"
150 COLOR 11,0:LOCATE 25,2:PRINT DATE$;" ";TIME$;
160 COLOR 15,0:LOCATE 1,8:PRINT "    *** Access Plus Date & Time Management Perc
ent of Load ***        "
170 COLOR 14,0:PRINT 3,2:PRINT "                                        Press Esc To End
"
180 '
190 COLOR 12,0:FOR I=5 TO 23:LOCATE I,1:PRINT SPACE$(80);:NEXT I
200 GOTO 340
210 '
220 COLOR 11,0:LOCATE 5,2:PRINT USING "# Phone Lines";P1:COLOR 14,0:LOCATE 5,33;
PRINT " Daily & Weekly ":COLOR 11,0:LOCATE 5,60:PRINT USING "###,### Time Slots"
;2160*P1*7
230 COLOR 11,0:LOCATE 7,8:PRINT "Sunday   Monday   Tuesday  Wednesday Thursday
    Friday   Saturday"
240 LOCATE 8,6:PRINT STRING$(70,249):RETURN
250 '
260 COLOR 11,0:LOCATE 12,2:PRINT USING "# Phone Lines";P2:COLOR 14,0:LOCATE 12,3
1:PRINT " Monthly & Quarterly ":COLOR 11,0:LOCATE 12,60:PRINT USING "###,### Tim
e Slots";2160*P2*28
270 COLOR 11,0:LOCATE 14,13:PRINT STRING$(19,249);" Days Of The Month ";STRING$(
18,249)
280 LOCATE 15,16:FOR I=1 TO 7:PRINT USING "##      ";I;:NEXT I
290 LOCATE 16,16:FOR I=8 TO 14:PRINT USING "##      ";I;:NEXT I
300 LOCATE 17,16:FOR I=15 TO 21:PRINT USING "##     ";I;:NEXT I
310 LOCATE 18,16:FOR I=22 TO 28:PRINT USING "##     ";I;:NEXT I
320 LOCATE 19,13:PRINT STRING$(56,249):RETURN
330 '
340 IF P1=0 THEN GOSUB 220:GOTO 500
350 OPEN "R",#1,"dts1.dat",8:FIELD #1,8 AS DA$
360 '
370 GOSUB 220
380 FOR I=1 TO 2160
390 COLOR 0,11:LOCATE 5,18:PRINT USING " Slot #,### ";I
400 GET #1,I:DY$=DA$
410 IF MID$(DY$,8,1)<>"Y" THEN 430
420 FOR J=1 TO 7:A$=MID$(DY$,J,1):T(J)=T(J)+VAL(A$):NEXT J
430 N$=INKEY$:IF N$="" THEN 450
440 IF ASC(N$)=27 THEN 870
450 NEXT I:CLOSE #1
460 FOR I=1 TO 7:T=T+T(I)
470 IF T(I)=0 THEN 490
480 T(I)=(T(I)/(2160*P1))*100
490 NEXT I
500 COLOR 11,0:LOCATE 6,60:PRINT USING "###,### Used";T:T=0
510 LOCATE 7,6
520 FOR I=1 TO 7:PRINT USING " ###.##%   ";T(I);:T(I)=0:NEXT I
530 COLOR 5,0:LOCATE 11,1:PRINT STRING$(80,205);
540 '
550 IF P2=0 THEN GOSUB 260:GOTO 710
560 OPEN "R",#1,"dts2.dat",29:FIELD #1,29 AS DA$
570 '
580 GOSUB 260
590 FOR I=1 TO 2160
600 COLOR 0,11:LOCATE 12,18:PRINT USING " Slot #,### ";I
610 GET #1,I:DY$=DA$
620 IF MID$(DY$,29,1)<>"Y" THEN 640
630 FOR J=1 TO 28:A$=MID$(DY$,J,1):T(J)=T(J)+VAL(A$):NEXT J
640 N$=INKEY$:IF N$="" THEN 660
650 IF ASC(N$)=27 THEN 870
660 NEXT I:CLOSE #1
```

```
670 FOR I=1 TO 28:T=T+T(I)
680 IF T(I)=0 THEN 700
690 T(I)=(T(I)/(2160*P2))*100
700 NEXT I
710 COLOR 11,0:LOCATE 13,60:PRINT USING "###,### Used";T:T=0
720 LOCATE 20,14
730 FOR I=1 TO 7:PRINT USING "###.##% ";T(I);:NEXT I
740 LOCATE 21,14
750 FOR I=8 TO 14:PRINT USING "###.##% ";T(I);:NEXT I
760 LOCATE 22,14
770 FOR I=15 TO 21:PRINT USING "###.##% ";T(I);:NEXT I
780 LOCATE 23,14
790 FOR I=22 TO 28:PRINT USING "###.##% ";T(I);:NEXT I
800 '
810 TIMER ON
820 IF S3<>0 THEN 870
830 N$=INKEY$:IF N$="" THEN COLOR 11,0:LOCATE 25,2:PRINT DATE$;" ";TIME$;:GOTO 820
840 IF ASC(N$)<>27 THEN 820
850 TIMER OFF
860 '
870 CLOSE #1:CHAIN "ba001b"
880 END 10 'Copyright 1986 Badger Meter, Inc. - Engineering Division * Program Name - ba017 * Date 04-16-1986
20 'Author D.Wachs        \ - load "ba017"
30 'Automatic Meter Reading - Demand Meter Reading
40 '
50 COMMON PGM$,O2$(),F1$(),T$()
60 DIM O3$(36),B$(36),D1$(14),D1(14)
70 '
80 ON ERROR GOTO 90:GOTO 150
90 IF ERR=5 THEN GOSUB 1030:RESUME 450
100 IF ERR=24 OR ERR=25 OR ERR=27 AND S2=0 THEN TIMER ON:S2=1
110 IF ERR=24 OR ERR=25 THEN COLOR 30,4:LOCATE 5,21:PRINT "  *** Please Turn Line Printer On. *** ":IF S1<>0 THEN 450 ELSE RESUME
120 IF ERR=27 THEN COLOR 30,4:LOCATE 5,21:PRINT "  *** Out of Paper On Line Printer. *** ":IF S1<>0 THEN 450 ELSE RESUME
130 COLOR 28,0:LOCATE 5,7:PRINT "Error";ERR:STOP
140 '
150 WIDTH "LPT1:",60:S2=0
160 '
170 OPEN "R",#1,"todu.dat",5:FIELD #1,5 AS T2$:GET #1,7:CU$=T2$:CLOSE #1
180 '
190 OPEN "R",#1,"pru.dat",5:FIELD #1,5 AS T2$:GET #1,7:T3$=T2$:CLOSE #1:T3=VAL(T3$)
200 IF T3=0 THEN T3$=""
210 IF T3>=5 AND T3<=59 THEN T3$="/min"
220 IF T3=60 THEN T3$="/hr"
230 '
240 OPEN "R",#3,"amr1.dat",304
250 FIELD #3,1 AS F$:Z1=1
260 FOR J=1 TO 36
270 X=LEN(O2$(J)):Y=INSTR(O2$(J),CHR$(95)):Z=X-Y+1
280 IF Y=Z-1 THEN 310
290 FIELD #3,Z1 AS DUMMY$,Z2 AS DUMMY$,Z AS B$(J)
300 IF Z1+Z<255 THEN Z1=Z1+Z ELSE Z2=Z2+Z
310 NEXT J
320 '
330 DATA "Jan",31,"Feb",29,"Mar",31,"Apr",30,"May",31,"Jun",30,"Jul",31,"Aug",31,"Sep",30,"Oct",31,"Nov",30,"Dec",31,"Jan",31,"Feb",29
```

```
740 FOR I=1 TO 14:READ D1$(I),D1(I):NEXT I
750 '
760 COLOR 9,0:LOCATE 1,1:PRINT "SM017 "
370 COLOR 11,0:LOCATE 25,2:PRINT DATE$;" ";TIME$;
380 COLOR 15,0:LOCATE 1,8:PRINT "            *** Access Plus Demand Meter Readi
ng ***"
390 COLOR 12,0:FOR I=5 TO 23:LOCATE I,1:PRINT SPACE$(80);:NEXT I
400 '
410 '    Enter Account Number
420 '
430 COLOR 26,0:LOCATE 25,62:PRINT " * Edit Mode *";
440 COLOR 14,0:LOCATE 3,4:PRINT " To End Press Enter.            "
450 COLOR 10,0:LOCATE 3,61:PRINT SPACE$(19)
460 ON TIMER(600) GOSUB 470:GOTO 490
470 S1=1:RETURN
480 COLOR 10,0:LOCATE 3,30:PRINT "Enter Customer Account Number? ";:N1$="":C=0
490 LOCATE 3,61+C,1,0,7
500 TIMER ON:S1=0
510 IF S1<>0 THEN 2290
520 N$=INKEY$:IF N$="" THEN 510
530 TIMER OFF
540 IF ASC(N$)=13 OR ASC(N$)=27 THEN C1=VAL(N1$):GOTO 610
550 IF ASC(N$)=8 AND C=0 THEN 520
560 IF ASC(N$)=8 THEN LOCATE 3,POS(0)-1:PRINT " ";:C=C-1:IF C>0 THEN C=0 ELSE N1
$=MID$(N1$,1,C):GOTO 600
570 IF ASC(N$)<48 OR ASC(N$)>57 THEN BEEP:GOTO 520
580 IF LEN(N1$)>4 THEN BEEP:GOTO 520
590 N1$=MID$(N1$,1,C)+N$:C=C+1
600 COLOR 10,0:LOCATE 3,61,0:PRINT N1$:GOTO 490
610 LOCATE ,,0
620 IF C1=0 THEN 2290
630 IF C1>=1 AND C1<=75000! THEN 720
640 COLOR 14,4:LOCATE 3,30:BEEP:PRINT " Error Invalid Account Number 1-75000 Onl
y!!! "
650 GOSUB 670:GOTO 480
660 '
670 FOR J=1 TO 5000:NEXT J:COLOR 10,0:LOCATE 3,30:PRINT SPACE$(50)
690 RETURN
690 '
700 '    Read Disk File & Check Account Number
710 '
720 GET #3,C1
730 IF ASC(F$)<>89 THEN COLOR 14,4:LOCATE 3,30:BEEP:PRINT " Error Account Numbe
r Not On File! ":GOSUB 670:GOTO 480
740 FOR J=1 TO 36:D3$(J)=B$(J):NEXT J:D3$(15)=F1$(VAL(D3$(15))):D3$(8)=T$(VAL(D3
$(8))):D3$(12)=T$(VAL(D3$(12))+33):D3$(13)=T$(VAL(D3$(13))+33)
750 COLOR 14,1:LOCATE 6,22:PRINT USING " Customer Account Number ---- ##,### ";C
1
760 FOR J=1 TO 34
770 COLOR 11,0
780 X=INSTR(D2$(J),"*"):IF X<>0 THEN COLOR 14,1
790 IF J<=17 THEN LOCATE 6+J,2:PRINT MID$(D2$(J),1,19):LOCATE 6+J,22:PRINT D3$(J
)
800 IF J>=18 THEN LOCATE J-11,49:PRINT MID$(D2$(J),1,19):LOCATE J-11,69:PRINT D3
$(J)
810 NEXT J
820 T4$="        ":IF D3$(30)="On " THEN T4$=T$
830 COLOR 14,0:FOR J=20 TO 22:LOCATE J,75:PRINT T4$:NEXT J
840 '
850 C1$=STR$(C1):C1$=MID$(C1$,2,LEN(C1$)-1)
```

```
960 F1$=VAL(O3$(10)):SE$=STR$(P1$):SE$=MID$(SE$,2,LEN(SE$)-1):SE$=LEFT$(LEFT$(SE
$,LEN(SE$))+"0000000000",10)
970 PH$=O3$(5):MT$=O3$(18)
980 IF INSTR(PH$," ")-1<=0 THEN 890 ELSE PH$=MID$(PH$,1,INSTR(PH$," ")-1)
990 IF INSTR(MT$," ")-1<=0 THEN 900 ELSE MT$=MID$(MT$,1,INSTR(MT$," ")-1)
900 IF INSTR(TD$," ")-1<=0 THEN 910 ELSE TD$=MID$(TD$,1,INSTR(TD$," ")-1)
910 IF INSTR(PR$," ")-1<=0 THEN 920 ELSE PR$=MID$(PR$,1,INSTR(PR$," ")-1)
920 PRINT #4,"DEMAND ACCT=";C1$;" MPHONE=";PH$;" METER=";MT$;" SERNO=";SE$
930 '
940 ON TIMER(5) GOSUB 1030
950 TIMER ON:S1=0:N1$=""
960 IF S1<>0 THEN 1000
970 IF EOF(4) THEN 960 ELSE N$=INPUT$(LOC(4),#4):N1$=N1$+N$
980 IF INSTR(N1$,CHR$(13))=0 THEN 960
990 IF INSTR(N1$,"OK")=0 THEN GOSUB 1030
1000 TIMER OFF:S1=0:GOTO 450
1010 '
1020 ON TIMER(5) GOSUB 1030:GOTO 1040
1030 BEEP:COLOR 14,0:LOCATE 25,36:PRINT "  * Demand Error In CCM *  ";:TIMER O
FF:S1=1:RETURN
1040 TIMER ON:S1=0:N1$=""
1050 IF S1<>0 THEN 450
1060 IF EOF(4) THEN 1050 ELSE N$=INPUT$(LOC(4),#4):N1$=N1$+N$
1070 IF INSTR(N1$,CHR$(13))=0 THEN 1050
1080 TIMER OFF:S1=0
1090 L=INSTR(N1$,"ACCT=")
1100 IF L=0 THEN GOSUB 1030:GOTO 450
1110 C1=VAL(MID$(N1$,L+5,INSTR(N1$," ")-6))
1120 IF C1<=0 OR C1>75000! THEN GOSUB 1030:GOTO 450
1130 '
1140 '    Read Disk File & Check Account Number
1150 '
1160 GET #7,C1
1170 IF ASC(F$)<>80 THEN COLOR 14,0:LOCATE 25,36:BEEP:PRINT " Account Number Not
 On File! ";:FOR J=1 TO 36:O3$(J)="":NEXT J:O3$(12)="Account Number Not On File"
:GOTO 2120
1180 FOR J=1 TO 36:O3$(J)=B$(J):NEXT J:O3$(5)=F1$(VAL(O3$(15))):O3$(8)=T$(VAL(O
3$(9))):O3$(12)=T$(VAL(O3$(12))+33):O3$(13)=T$(VAL(O3$(13))+33)
1190 '
1200 '    Update Account
1210 '
1220 O3$(12)=T$(33):L=INSTR(N1$,"ALARMS=")
1230 M=VAL(MID$(N1$,L+7)):IF M=0 OR M>11 THEN 1250 ELSE O3$(12)=T$(M+33)
1240 '
1250 IF O3$(35)="  " THEN 1310
1260 L=INSTR(N1$,"OLDINDEX=")
1270 IF L=0 THEN 1310
1280 O1$=MID$(N1$,L+9,2)
1290 IF O1$<>O3$(35) THEN O3$(12)=T$(43)
1300 '
1310 L=INSTR(N1$,"NEWINDEX=")
1320 IF L=0 THEN 1350
1330 O3$(35)=MID$(N1$,L+9,2)
1340 '
1350 L=INSTR(N1$,"LEAK=")
1360 IF L=0 THEN O3$(13)=T$(33):GOTO 1390
1370 M=VAL(MID$(N1$,L+5)):IF M>1 THEN 1390 ELSE O3$(13)=T$(M+43)
1380 '
1390 L=INSTR(N1$,"MTIME=")
1400 IF L=0 THEN 1440
1410 '
```

```
1420 '
1430 '
1440 L=INSTR(N1$,"NUMCALL=")
1450 IF L=0 THEN O3$(14)="1":GOTO 1480
1460 M#=VAL(MID$(N1$,L+8)):O3$(14)=STR$(M#):O3$(14)=MID$(O3$(14),2,LEN(O3$(14))-
1):O3$(14)=LEFT$(LEFT$(O3$(14),LEN(O3$(14)))+"    ",2)
1470 '
1480 L=INSTR(N1$,"READ=")
1490 IF L=0 THEN 1520
1500 M#=VAL(MID$(N1$,L+5)):M#=M#*(VAL(O3$(8))/10):O3$(20)=STR$(M#):O3$(20)=MID$(
O3$(20),2,LEN(O3$(20))-1):O3$(20)=LEFT$(LEFT$(O3$(20),LEN(O3$(20)))+"         "
,10)
1510 '
1520 L=INSTR(N1$,"PREV=")
1530 IF L=0 THEN 1560
1540 M#=VAL(MID$(N1$,L+5)):M#=M#*(VAL(O3$(8))/10):O3$(19)=STR$(M#):O3$(19)=MID$(
O3$(19),2,LEN(O3$(19))-1):O3$(19)=LEFT$(LEFT$(O3$(19),LEN(O3$(19)))+"         "
,10)
1550 '
1560 L=INSTR(N1$,"ACCT=")
1570 IF L=0 THEN 1620
1580 L=INSTR(L+5,N1$," ")
1590 O3$(21)=O3$(22):O3$(22)=MID$(N1$,L+1,6)+MID$(N1$,L+9,2)
1600 O3$(23)=O3$(24):O3$(24)=MID$(N1$,L+12,8)
1610 '
1620 IF O3$(25)<>"On " THEN 1760
1630 L=INSTR(N1$,"TODATA=")
1640 IF L=0 THEN 1760
1650 M#=VAL(MID$(N1$,L+8)):M#=M#*(VAL(O3$(8))/10):O3$(26)=STR$(M#):O3$(26)=MID$(
O3$(26),2,LEN(O3$(26))-1):O3$(26)=LEFT$(LEFT$(O3$(26),LEN(O3$(26)))+"     ",6)
1660 L=INSTR(L+8,N1$,",")
1670 IF L=0 THEN 1760
1680 M#=VAL(MID$(N1$,L+1)):M#=M#*(VAL(O3$(8))/10):O3$(27)=STR$(M#):O3$(27)=MID$(
O3$(27),2,LEN(O3$(27))-1):O3$(27)=LEFT$(LEFT$(O3$(27),LEN(O3$(27)))+"     ",6)
1690 L=INSTR(L+1,N1$,",")
1700 IF L=0 THEN 1760
1710 M#=VAL(MID$(N1$,L+1)):M#=M#*(VAL(O3$(8))/10):O3$(28)=STR$(M#):O3$(28)=MID$(
O3$(28),2,LEN(O3$(28))-1):O3$(28)=LEFT$(LEFT$(O3$(28),LEN(O3$(28)))+"     ",6)
1720 IF CU$<>"Y " THEN 1760
1730 M#=((VAL(O3$(20))-VAL(O3$(19)))-(VAL(O3$(26))+VAL(O3$(27))+VAL(O3$(28)))
1740 O3$(29)=STR$(M#):O3$(29)=MID$(O3$(29),2,LEN(O3$(29))-1):O3$(29)=LEFT$(LEFT$
(O3$(29),LEN(O3$(29)))+"      ",7)
1750 '
1760 IF O3$(30)<>"On " THEN 1870
1770 L=INSTR(N1$,"PRDATA=")
1780 IF L=0 THEN 1870
1790 M#=VAL(MID$(N1$,L+7)):M#=M#*(VAL(O3$(8))/10):O3$(31)=STR$(M#):O3$(31)=MID$(
O3$(31),2,LEN(O3$(31))-1):O3$(31)=LEFT$(LEFT$(O3$(31),LEN(O3$(31)))+"    ",5)
1800 L=INSTR(L+7,N1$,",")
1810 IF L=0 THEN 1870
1820 M#=VAL(MID$(N1$,L+1)):M#=M#*(VAL(O3$(8))/10):O3$(32)=STR$(M#):O3$(32)=MID$(
O3$(32),2,LEN(O3$(32))-1):O3$(32)=LEFT$(LEFT$(O3$(32),LEN(O3$(32)))+"    ",5)
1830 L=INSTR(L+1,N1$,",")
1840 IF L=0 THEN 1870
1850 M#=VAL(MID$(N1$,L+1)):M#=M#*(VAL(O3$(8))/10):O3$(33)=STR$(M#):O3$(33)=MID$(
O3$(33),2,LEN(O3$(33))-1):O3$(33)=LEFT$(LEFT$(O3$(33),LEN(O3$(33)))+"    ",5)
1860 '
1870 COLOR 14,1:LOCATE 1,22:PRINT USING " Customer Account Number ---- ##,###";
C!
1880 FOR J=1 TO 34
1890 COLOR 11,0
```

```
1900 X=INSTR(O2$(J),"X"):IF X<>0 THEN COLOR 14,1
1910 IF J<=17 THEN LOCATE 6+J,2:PRINT MID$(O2$(J),1,19):LOCATE 6+J,22:PRINT O3$(J)
1920 IF J>=18 THEN LOCATE J-11,49:PRINT MID$(O2$(J),1,19):LOCATE J-11,69:PRINT O3$(J)
1930 NEXT J
1940 T4$="      ":IF O3$(30)="On " THEN T4$=T3$
1950 COLOR 14,0:FOR J=20 TO 22:LOCATE J,75:PRINT T4$:NEXT J
1960 '
1970 '   Write Disk Record
1980 '
1990 LSET F$=CHR$(89)
2000 FOR J=1 TO 6:IF O3$(15)=F1$(J) THEN O3$(15)=MID$(STR$(J),2,1) ELSE NEXT J
2010 FOR J=1 TO 32:IF O3$(8)=T$(J) THEN O3$(8)=MID$(STR$(J),2,2) ELSE NEXT J
2020 FOR J=33 TO 44:IF O3$(12)=T$(J) THEN O3$(12)=MID$(STR$(J-33),2,2) ELSE NEXT J
2030 FOR J=33 TO 44:IF O3$(13)=T$(J) THEN O3$(13)=MID$(STR$(J-33),2,2) ELSE NEXT J
2040 FOR J=1 TO 36:LSET B$(J)=O3$(J):NEXT J
2050 PUT #3,C1
2060 '
2070 '   Print Line Printer
2080 '
2090 O3$(15)=F1$(VAL(O3$(15))):O3$(8)=T$(VAL(O3$(8))):O3$(12)=T$(VAL(O3$(12))+33):O3$(13)=T$(VAL(O3$(13))+33)
2100 IF O3$(12)<>SPACE$(26) THEN 2120
2110 IF O3$(13)<>SPACE$(26) THEN 2120 ELSE 450
2120 S1=0:SC=0:ON TIMER(10) GOSUB 2130:GOTO 2140
2130 S1=1:RETURN
2140 LPRINT CHR$(18);CHR$(27);CHR$(65);CHR$(12);CHR$(27);CHR$(50)
2150 LPRINT CHR$(12);"RM018";CHR$(14);TAB(17);"Access Plus"
2160 LPRINT TAB(23);"Copyright 1986 Badger Meter, Inc."
2170 LPRINT TAB(27);"Utility Products Division"
2180 LPRINT TAB(27);"as of ";DATE$;" ";TIME$;CHR$(10)
2190 LPRINT CHR$(14);TAB(14);"Alarm Status";CHR$(10)
2200 LPRINT STRING$(79,240)
2210 LPRINT CHR$(27);CHR$(69);TAB(30);"Customer Account Number ----";C1;CHR$(27);CHR$(70)
2220 FOR J=1 TO 17
2230 LPRINT TAB(2);MID$(O2$(J),1,18);TAB(21);O3$(J);TAB(48);MID$(O2$(J+17),1,18);TAB(67);O3$(J+17);
2240 IF J>=14 AND J<=16 THEN LPRINT " ";T4$
2250 NEXT J
2260 LPRINT TAB(27);"<<<< End of Report >>>>"
2270 GOTO 450
2280 '
2290 CLOSE #3
2300 CHAIN "bm001a"
2310 END
10 'Copyright 1985 Badger Meter, Inc. - Engineering Division *** Program Name - bm018 *** Date 08-07-1985
20 'Author D.Wachs        \ - load "bm018"
30 'Automatic Meter Reading - Access Plus Meter Reading
40 '
50 COMMON PGM$,O2$(),F1$(),T$()
60 DIM O3$(36),B$(36),D1$(14),C1(14)
70 '
80 ON COM(1) GOSUB 90:GOTO 110
90 COLOR 12,0:X1=CSRLIN:Y1=POS(0):LOCATE 25,36:PRINT " * Incoming Meter Reading * ";:LOCATE X1,Y1:COM(1) OFF:RETURN
100 '
```

```
110 ON ERROR GOTO 120:GOTO 180
120 IF ERR=5 THEN GOSUB 490:RESUME 450
130 IF ERR=24 OR ERR=25 OR ERR=27 AND S2=0 THEN TIMER ON:S2=1
140 IF ERR=24 OR ERR=25 THEN COLOR 30,4:LOCATE 5,21:PRINT " *** Please Turn Lin
e Printer On. *** ":IF S1<>0 THEN 450 ELSE RESUME
150 IF ERR=27 THEN COLOR 30,4:LOCATE 5,21:PRINT " *** Out of Paper On Line Prin
ter. *** ":IF S1<>0 THEN 450 ELSE RESUME
160 COLOR 30,0:LOCATE 5,7:PRINT "Error";ERR:STOP
170 '
180 WIDTH "LPT1:",80:S2=0:S3=0:M1$="DUMP"
190 '
200 OPEN "R",#1,"todu.dat",5:FIELD #1,5 AS T2$:GET #1,7:CU$=T2$:CLOSE #1
210 '
220 OPEN "R",#1,"pru.dat",5:FIELD #1,5 AS T2$:GET #1,7:T3$=T2$:CLOSE #1:T3=VAL(T
3$)
230 IF T3=0 THEN T3$="    "
240 IF T3>=5 AND T3<=59 THEN T3$="/Min"
250 IF T3=60 THEN T3$="/Hr"
260 '
270 OPEN "R",#3,"aar1.dat",304
280 FIELD #3,1 AS F$:Z1=1
290 FOR J=1 TO 36
300 X=LEN(D2$(J)):Y=INSTR(D2$(J),CHR$(95)):Z=X-Y+1
310 IF X=Z-1 THEN 340
320 FIELD #3,Z1 AS DUMMY$,Z2 AS DUMMY$,Z AS B$(J)
330 IF Z1+Z<255 THEN Z1=Z1+Z ELSE Z2=Z2+Z
340 NEXT J
350 '
360 DATA "Jan",31,"Feb",29,"Mar",31,"Apr",30,"May",31,"Jun",30,"Jul",31,"Aug",31
,"Sep",30,"Oct",31,"Nov",30,"Dec",31,"Jan",31,"Feb",29
370 FOR I=1 TO 14:READ D1$(I),D1(I):NEXT I
380 '
390 COLOR 9,0:LOCATE 1,1:PRINT "BM018 "
400 COLOR 11,0:LOCATE 25,2:PRINT DATE$;" ";TIME$;
410 COLOR 15,0:LOCATE 1,8:PRINT "              ***   Access Plus Meter Reading
   ***            "
420 COLOR 14,0:LOCATE 3,2:PRINT "                              Press Esc To Exit
                     "
430 COLOR 12,0:FOR I=5 TO 23:LOCATE I,1:PRINT SPACE$(80);:NEXT I
440 '
450 N$=INKEY$:IF N$="" THEN COLOR 11,0:LOCATE 25,2:PRINT DATE$;" ";TIME$;:GOTO 4
70
460 IF ASC(N$)=27 THEN 2180
470 PRINT #4,M1$:M1$="N":S3=1
480 ON TIMER(5) GOSUB 490:GOTO 510
490 BEEP:COLOR 14,0:LOCATE 25,36:PRINT "    * Dump Error In COM *   ";:TIMER OF
F:S1=1:RETURN
500 '
510 TIMER ON:S1=0:N1$=""
520 IF S1<>0 THEN 450
530 IF EOF(4) THEN 520 ELSE N$=INPUT$(LOC(4),#4):N1$=N1$+N$
540 IF INSTR(N1$,CHR$(13))=0 THEN 520
550 TIMER OFF:S1=0
560 L=INSTR(N1$,"ACCT=")
570 IF L=0 THEN 450
580 C1=VAL(MID$(N1$,L+5,INSTR(N1$," ")-6))
590 IF C1<=0 OR C1>75000! THEN GOSUB 490:GOTO 450
600 '
610 '     Read Disk File & Check Account Number
620 '
630 GET #3,C1
```

```
640 IF ASC(F$)<>69 THEN COLOR 14,0:LOCATE 25,36:BEEP:PRINT " Account Number Not
    On File" ":FOR J=1 TO 36:O3$(J)=" ":NEXT J:O3$(12)="Account Number Not On File":
    GOTO 2010
650 FOR J=1 TO 36:O3$(J)=B$(J):NEXT J:O3$(15)=F1$(VAL(O3$(15))):O3$(8)=T$(VAL(O3
    $(8))):O3$(12)=T$(VAL(O3$(12))+33):O3$(13)=T$(VAL(O3$(13))+33)
660 '
670 '     Update Account
680 '
690 IF INSTR(N1$,"** ALARM **")=0 THEN S4=0 ELSE S4=1
700 O3$(12)=T$(33):L=INSTR(N1$,"ALARMS=")
710 M=VAL(MID$(N1$,L+7)):IF M=0 OR M>11 THEN 730 ELSE O3$(12)=T$(M+33)
720 '
730 IF O3$(35)=" " THEN 790
740 L=INSTR(N1$,"OLDINDEX=")
750 IF L=0 THEN 790
760 O1$=MID$(N1$,L+9,2)
770 IF O1$<>O3$(35) THEN O3$(12)=T$(43)
780 '
790 L=INSTR(N1$,"NEWINDEX=")
800 IF L=0 THEN 830
810 O3$(35)=MID$(N1$,L+9,2)
820 '
830 L=INSTR(N1$,"LEAK=")
840 IF L=0 THEN O3$(13)=T$(33):GOTO 870
850 M=VAL(MID$(N1$,L+5)):IF M<>1 THEN 870 ELSE O3$(13)=T$(M+43)
860 '
870 L=INSTR(N1$,"MTIME=")
880 IF L=0 THEN 920
890 '
900 '
910 '
920 L=INSTR(N1$,"NUMCALL=")
930 IF L=0 THEN O3$(14)="1":GOTO 960
940 M#=VAL(MID$(N1$,L+8)):O3$(14)=STR$(M#):O3$(14)=MID$(O3$(14),2,LEN(O3$(14))-1
    ):O3$(14)=LEFT$(LEFT$(O3$(14),LEN(O3$(14)))+"    ",2)
950 '
960 L=INSTR(N1$,"READ=")
970 IF L=0 THEN 1000
980 M#=VAL(MID$(N1$,L+5)):M#=M#*(VAL(O3$(8))/10):O3$(20)=STR$(M#):O3$(20)=MID$(O
    3$(20),2,LEN(O3$(20))-1):O3$(20)=LEFT$(LEFT$(O3$(20),LEN(O3$(20)))+"            ",
    12)
990 '
1000 L=INSTR(N1$,"PREV=")
1010 IF L=0 THEN 1040
1020 M#=VAL(MID$(N1$,L+5)):M#=M#*(VAL(O3$(9))/10):O3$(19)=STR$(M#):O3$(19)=MID$(
    O3$(19),2,LEN(O3$(19))-1):O3$(19)=LEFT$(LEFT$(O3$(19),LEN(O3$(19)))+"            "
    ,12)
1030 '
1040 L=INSTR(N1$,"ACCT=")
1050 IF L=0 THEN 1100
1060 L=INSTR(L+5,N1$," ")
1070 O3$(21)=O3$(22):O3$(22)=MID$(N1$,L+1,6)+MID$(N1$,L+9,2)
1080 O3$(23)=O3$(24):O3$(24)=MID$(N1$,L+12,8)
1090 '
1100 IF O3$(25)<>"On " THEN 1240
1110 L=INSTR(N1$,"TODDATA=")
1120 IF L=0 THEN 1240
1130 M#=VAL(MID$(N1$,L+8)):M#=M#*(VAL(O3$(8))/10):O3$(26)=STR$(M#):O3$(26)=MID$(
    O3$(26),2,LEN(O3$(26))-1):O3$(26)=LEFT$(LEFT$(O3$(26),LEN(O3$(26)))+"      ",6)
1140 L=INSTR(L+8,N1$,",")
1150 IF L=0 THEN 1240
```

```
1160 M#=VAL(MID$(N1$,L+1)):M#=M#*(VAL(O3$(8))/10):O3$(27)=STR$(M#):O3$(27)=MID$(
O3$(27),2,LEN(O3$(27))-1):O3$(27)=LEFT$(LEFT$(O3$(27),LEN(O3$(27)))+"      ",6)
1170 L=INSTR(L+1,N1$,",")
1180 IF L=0 THEN 1240
1190 M#=VAL(MID$(N1$,L+1)):M#=M#*(VAL(O3$(8))/10):O3$(28)=STR$(M#):O3$(28)=MID$(
O3$(28),2,LEN(O3$(28))-1):O3$(28)=LEFT$(LEFT$(O3$(28),LEN(O3$(28)))+"     ",6)
1200 IF CU$<>"Y " THEN 1240
1210 M#=(VAL(O3$(20))-VAL(O3$(19)))-(VAL(O3$(26))+VAL(O3$(27))+VAL(O3$(28)))
1220 O3$(29)=STR$(M#):O3$(29)=MID$(O3$(29),2,LEN(O3$(29))-1):O3$(29)=LEFT$(LEFT$
(O3$(29),LEN(O3$(29)))+"        ",7)
1230 '
1240 IF O3$(30)<>"On " THEN 1370
1250 L=INSTR(N1$,"PRDATA=")
1260 IF L=0 THEN 1370
1270 M#=VAL(MID$(N1$,L+7)):M#=M#*(VAL(O3$(8))/10):O3$(31)=STR$(M#):O3$(31)=MID$(
O3$(31),2,LEN(O3$(31))-1):O3$(31)=LEFT$(LEFT$(O3$(31),LEN(O3$(31)))+"    ",5)
1280 L=INSTR(L+7,N1$,",")
1290 IF L=0 THEN 1370
1300 M#=VAL(MID$(N1$,L+1)):M#=M#*(VAL(O3$(8))/10):O3$(32)=STR$(M#):O3$(32)=MID$(
O3$(32),2,LEN(O3$(32))-1):O3$(32)=LEFT$(LEFT$(O3$(32),LEN(O3$(32)))+"    ",5)
1310 L=INSTR(L+1,N1$,",")
1320 IF L=0 THEN 1370
1330 M#=VAL(MID$(N1$,L+1)):M#=M#*(VAL(O3$(8))/10):O3$(33)=STR$(M#):O3$(33)=MID$(
O3$(33),2,LEN(O3$(33))-1):O3$(33)=LEFT$(LEFT$(O3$(33),LEN(O3$(33)))+"    ",5)
1340 '
1350 '   Convert Todays Gregorian Date To Julian Date
1360 '
1370 IF S4=1 THEN 1760
1380 Y1=VAL(MID$(O3$(16),7,4)):M1=VAL(MID$(O3$(16),1,2)):D1=VAL(MID$(O3$(16),4,2
)):HR=VAL(MID$(O3$(17),1,2)):MIN=VAL(MID$(O3$(17),4,2)):SEC=VAL(MID$(O3$(17),7,2
))
1390 IF Y1/4<>INT(Y1/4) THEN D1(2)=28:D1(14)=28 ELSE D1(2)=29:D1(14)=29
1400 IF M1>2 THEN M8=M1-3:Y8=Y1 ELSE M8=M1+9:Y8=Y1-1
1410 C8=INT(Y8/100):D8=Y8-100*C8
1420 N#=INT(146097!*C8/4)+D1+INT(1461*D8/4)+1721119!+INT((153*M8+2)/5)
1430 '
1440 IF O3$(15)<>F1$(1) THEN 1480
1450 MIN=MIN+5
1460 IF MIN>=60 THEN HR=HR+1:MIN=MIN-60
1470 IF HR>=24 THEN HR=0:N#=N#+1
1480 IF O3$(15)<>F1$(2) THEN 1510
1490 HR=HR-1
1500 IF HR>=24 THEN HR=0:N#=N#+1
1510 IF O3$(15)=F1$(3) THEN CY=1
1520 IF O3$(15)=F1$(4) THEN CY=7
1530 IF O3$(15)=F1$(5) THEN CY=D1(M1)
1540 IF O3$(15)=F1$(6) THEN CY=D1(M1)+D1(M1+1)+D1(M1+2)
1550 N#=N#+CY
1560 '
1570 '   Convert Julian Date To Gregorian Date
1580 '
1590 M8=N#-1721119!:Y1=INT((4*M8-1)/146097!)
1600 M8=4*M8-1-146097!*Y1:D1=INT(M8/4)
1610 M8=INT((4*D1+3)/1461):D1=4*D1+3-1461*M8
1620 D1=INT((D1+4)/4):M1=INT((5*D1-3)/153)
1630 D1=5*D1-3-153*M1:D1=INT((D1+5)/5):Y1=100*Y1+M8
1640 IF M1<10 THEN M1=M1+3 ELSE M1=M1-9:Y1=Y1+1
1650 '
1660 M$=STR$(M1):M$=MID$(M$,2,LEN(M$)-1):M$=RIGHT$("00"+RIGHT$(M$,LEN(M$)),2)
1670 D$=STR$(D1):D$=MID$(D$,2,LEN(D$)-1):D$=RIGHT$("00"+RIGHT$(D$,LEN(D$)),2)
1680 Y$=STR$(Y1):Y$=MID$(Y$,2,LEN(Y$)-1):Y$=RIGHT$("0000"+RIGHT$(Y$,LEN(Y$)),4)
```

```
1690 O3$(16)=H$+":"+M$+":"+Y$
1700 '
1710 H$=STR$(HR):H$=MID$(H$,2,LEN(H$)-1):H$=RIGHT$("00"+RIGHT$(H$,LEN(H$)),2)
1720 M$=STR$(MIN):M$=MID$(M$,2,LEN(M$)-1):M$=RIGHT$("00"+RIGHT$(M$,LEN(M$)),2)
1730 S$=STR$(SEC):S$=MID$(S$,2,LEN(S$)-1):S$=RIGHT$("00"+RIGHT$(S$,LEN(S$)),2)
1740 O3$(17)=H$+":"+M$+":"+S$
1750 '
1760 COLOR 14,1:LOCATE 6,22:PRINT USING " Customer Account Number ---- ##,### ";
C1
1770 FOR J=1 TO 34
1780 COLOR 11,0
1790 X=INSTR(O2$(J),"*"):IF X<>0 THEN COLOR 14,1
1800 IF J<=17 THEN LOCATE 6+J,2:PRINT MID$(O2$(J),1,19):LOCATE 6+J,22:PRINT O3$(J)
1810 IF J>=18 THEN LOCATE J-11,49:PRINT MID$(O2$(J),1,19):LOCATE J-11,69:PRINT O3$(J)
1820 NEXT J
1830 T4$="         ":IF O3$(30)="On " THEN T4$=T3$
1840 COLOR 14,0:FOR J=20 TO 22:LOCATE J,75:PRINT T4$:NEXT J
1850 '
1860 '    Write Disk Record
1870 '
1880 LSET F$=CHR$(89)
1890 FOR J=1 TO 6:IF O3$(15)=F1$(J) THEN O3$(15)=MID$(STR$(J),2,1) ELSE NEXT J
1900 FOR J=1 TO 32:IF O3$(8)=T$(J) THEN O3$(8)=MID$(STR$(J),2,2) ELSE NEXT J
1910 FOR J=33 TO 44:IF O3$(12)=T$(J) THEN O3$(12)=MID$(STR$(J-33),2,2) ELSE NEXT J
1920 FOR J=33 TO 44:IF O3$(13)=T$(J) THEN O3$(13)=MID$(STR$(J-33),2,2) ELSE NEXT J
1930 FOR J=1 TO 36:LSET P$(J)=O3$(J):NEXT J
1940 PUT #3,C1:GOTO 450
1950 '
1960 '    Print Line Printer
1970 '
1980 O3$(15)=F1$(VAL(O3$(15))):O3$(8)=T$(VAL(O3$(8))):O3$(12)=T$(VAL(O3$(12))+33):O3$(13)=T$(VAL(O3$(13))+33)
1990 IF O3$(12)<>SPACE$(25) THEN 2010
2000 IF O3$(13)<>SPACE$(25) THEN 2010 ELSE 450
2010 S1=0:S2=0:ON TIMER(10) GOSUB 2020:GOTO 2030
2020 S1=1:RETURN
2030 LPRINT CHR$(18);CHR$(27);CHR$(65);CHR$(12);CHR$(27);CHR$(50)
2040 LPRINT CHR$(12);"BM018";CHR$(14);TAB(17);"Access Plus"
2050 LPRINT TAB(23);"Copyright 1986 Badger Meter, Inc."
2060 LPRINT TAB(27);"Utility Products Division"
2070 LPRINT TAB(27);"as of ";DATE$;" ";TIME$;CHR$(10)
2080 LPRINT CHR$(14);TAB(14);"Alarm Status";CHR$(10)
2090 LPRINT STRING$(79,240)
2100 LPRINT CHR$(27);CHR$(69);TAB(30);"Customer Account Number ----";C1;CHR$(27);CHR$(70)
2110 FOR J=1 TO 17
2120 LPRINT TAB(2);MID$(O3$(J),1,19);TAB(21);O3$(J);TAB(49);MID$(O2$(J+17),1,19);TAB(67);O3$(J+17);
2130 IF J>=14 AND J<=16 THEN LPRINT " ";T4$
2140 NEXT J
2150 LPRINT TAB(27);"<<<< End of Report >>>>"
2160 GOTO 450
2170 '
2180 COLOR 11,0:LOCATE 25,22:PRINT SPACE$(13);:LOCATE 25,36:PRINT SPACE$(29);
2190 IF S2=2 THEN 2290
2200 PRINT #4,"0"
2210 ON TIMER(5) GOSUB 2220:GOTO 2230
```

```
2220 BEEP:COLOR 14,0:LOCATE 25,36:PRINT "   * Dump Error In CCM *   ";:TIMER O
FF:S1=1:RETURN
2230 TIMER ON:S1=0:N1$=""
2240 IF S1<>0 THEN 2280
2250 IF EOF(4) THEN 2240 ELSE N$=INPUT$(LOC(4),#4):N1$=N1$+N$
2260 IF INSTR(N1$,CHR$(13))=0 THEN 2240
2270 IF INSTR(N1$,"OK")=0 THEN GOSUB 2220
2280 TIMER OFF:S1=0
2290 CLOSE #3:CHAIN "bm001"
2300 END
10 'Copyright 1985 Badger Meter, Inc. - Engineering Division *** Program Name -
bm019 *** Date 07-29-1985
20 'Author D.Wachs        \ - load "bm019"
30 'Automatic Meter Reading - Sort Key Fields, Customer Accounts On Line Printer 40 '
50 COMMON PGM$,O2$(),F1$(),T$()
60 DIM O3$(36),B$(36),L(100),R(100),W(36)
70 '
80 ON TIMER(600) GOSUB 90:GOTO 110
90 S0=1:RETURN
100 '
110 ON ERROR GOTO 120:GOTO 170
120 IF ERR=24 OR ERR=25 OR ERR=27 AND S4=0 THEN TIMER ON:S4=1
130 IF ERR=24 OR ERR=25 THEN COLOR 30,4:LOCATE 3,21:PRINT " *** Please Turn Line
 Printer On. *** ":IF S3<>0 THEN 2390 ELSE RESUME
140 IF ERR=27 THEN COLOR 30,4:LOCATE 3,21:PRINT " *** Out of Paper On Line Print
er. *** ":IF S3<>0 THEN 2390 ELSE RESUME
150 COLOR 28,0:LOCATE 5,7:PRINT "Error";ERR:STOP
160 '
170 WIDTH "LPT1:",80
180 '
190 OPEN "R",#1,"pru.dat",5:FIELD #1,5 AS T2$:GET #1,7:T3$=T2$:CLOSE #1:T3=VAL(T
3$)
200 IF T3=0 THEN T3$=""
210 IF T3>=5 AND T3<=59 THEN T3$="/Min"
220 IF T3=60 THEN T3$="/Hr"
230 '
240 OPEN "R",#1,"cntr.dat",9:FIELD #1,8 AS I1$:GET #1,1:I1=CVS(I1$):CLOSE #1
250 OPEN "R",#2,"index.dat",8:FIELD #2,8 AS I2$
260 OPEN "R",#3,"amr1.dat",384
270 FIELD #3,1 AS F$:Z1=1
280 FOR J=1 TO 36
290 X=LEN(O2$(J)):Y=INSTR(O2$(J),CHR$(95)):Z=X-Y+1
300 IF X=Z-1 THEN 330
310 FIELD #3,Z1 AS DUMMY$,Z2 AS DUMMY$,Z AS B$(J)
320 IF Z1+Z<255 THEN Z1=Z1+Z ELSE Z2=Z2+Z
330 NEXT J
340 '
350 DATA "Daily","Weekly","Monthly","Quarterly"
360 FOR I=1 TO 4:READ F1$(I):NEXT I
370 '
380 D$="__"
390 GOSUB 410:GOTO 460
400 '
410 COLOR 6,0:LOCATE 1,1:PRINT "BM019 "
420 COLOR 11,0:LOCATE 25,2:PRINT DATE$;" ";TIME$;
430 COLOR 15,0:LOCATE 1,6:PRINT " *** Access Plus Sort Key Fields - Customer Acc
ounts On Line Printer *** "
440 COLOR 12,0:LOCATE 3,2:PRINT SPACE$(79)
450 RETURN
```

```
460 COLOR 12,0:FOR I=5 TO 23:LOCATE I,1:PRINT SPACE$(80);:NEXT I
470 COLOR 14,0:LOCATE 3,2:PRINT "        Scan To Desired Line, Press Enter To
Edit, Esc To Start Sort  "
480 COLOR 14,1:LOCATE 6,15:PRINT " Enter Number's 1, 2, 3, Etc. For Sort Paramet
er's "
490 FOR J=1 TO 33
500 COLOR 11,0
510 X=INSTR(O2$(J),"*"):IF X<>0 THEN COLOR 14,1
520 IF J<=17 THEN LOCATE 6+J,2:PRINT MID$(O2$(J),1,19);" ";D$:LOCATE 6+J,22:PRIN
T O2$(J)
530 IF J>=18 THEN LOCATE J-11,49:PRINT MID$(O2$(J),1,19);" ";D$:LOCATE J-11,69:P
RINT O2$(J)
540 NEXT J:C=0
550 '
560 '    Scan Mode
570 '
580 FOR J=1 TO 33
590 Y=INSTR(O2$(J),"*"):IF Y<>0 THEN 710
600 COLOR 30,0:LOCATE 25,66:PRINT " * Scan Mode *";
610 IF J<=17 THEN COLOR 16,3:LOCATE 6+J,2:PRINT MID$(O2$(J),1,19)
620 IF J>=18 THEN COLOR 16,3:LOCATE J-11,49:PRINT MID$(O2$(J),1,19)
630 TIMER ON
640 IF S3<>0 THEN 2390
650 N$=INKEY$:IF N$="" THEN COLOR 11,0:LOCATE 25,2:PRINT DATE$;" ";TIME$;:GOTO 6
40
660 TIMER OFF
670 IF ASC(N$)=27 THEN 1100
680 IF ASC(N$)=13 THEN GOSUB 860:GOTO 910
690 IF J<=17 THEN COLOR 11,0:LOCATE 6+J,2:PRINT MID$(O2$(J),1,19)
700 IF J>=18 THEN COLOR 11,0:LOCATE J-11,49:PRINT MID$(O2$(J),1,19)
710 IF ASC(N$)<=64 OR ASC(N$)=123 THEN 780
720 FOR K=J+1 TO 34
730 IF N$=MID$(O2$(K),1,1) OR ASC(N$)-32=ASC(MID$(O2$(K),1,1)) THEN J=K-1:GOTO 8
10
740 NEXT K
750 FOR K=1 TO J
760 IF N$=MID$(O2$(K),1,1) OR ASC(N$)-32=ASC(MID$(O2$(K),1,1)) THEN J=K-1:GOTO 8
10
770 NEXT K
780 IF ASC(N$)=8 OR ASC(N$)=56 OR ASC(N$)=57 THEN J=J-2:IF J<0 THEN J=32
790 IF ASC(N$)=49 THEN J=32
800 IF ASC(N$)=55 THEN J=0
810 NEXT J
820 GOTO 580
830 '
840 '    Edit Mode
850 '
860 COLOR 26,0:LOCATE 25,66:PRINT " * Edit Mode *";
870 Z=2
880 IF J<=17 THEN COLOR 10,0:LOCATE 6+J,2:PRINT MID$(O2$(J),1,19);" ";D$
890 IF J>=18 THEN COLOR 10,0:LOCATE J-11,49:PRINT MID$(O2$(J),1,19);" ";D$
900 IF J<=17 THEN LOCATE 6+J,22+C,1,0,7
910 IF J>=18 THEN LOCATE J-11,69+C,1,0,7
920 N$=INKEY$:IF N$="" THEN 920
930 IF ASC(N$)=13 OR ASC(N$)=27 THEN 1020
940 IF ASC(N$)=8 AND C=0 THEN 920
950 IF ASC(N$)=8 THEN C=C-1:IF C<0 THEN C=0 ELSE N1$=MID$(N1$,1,C):GOTO 990
960 IF LEN(N1$)>=Z THEN BEEP:GOTO 920
970 IF ASC(N$)<48 OR ASC(N$)>57 THEN BEEP:GOTO 990
980 N1$=MID$(N1$,1,C)+N$:C=C+1
990 IF J<=17 THEN COLOR 10,0:LOCATE 6+J,22,0:PRINT N1$;MID$(D$,1+C,2-C)
```

```
1000 IF J>=18 THEN COLOR 10,0:LOCATE J-11,69,0:PRINT N1$;MID$(D$,1+C,Z-C)
1010 GOTO 900
1020 IF N1$<>"" THEN O3$(J)=N1$+STRING$(Z-LEN(N1$)," ") ELSE O3$(J)=N1$
1030 IF J<=17 THEN COLOR 11,0:LOCATE 6+J,2,0:PRINT MID$(O2$(J),1,19);" ";D$:LOCA
TE 6+J,22:PRINT O3$(J)
1040 IF J>=18 THEN COLOR 11,0:LOCATE J-11,49,0:PRINT MID$(O2$(J),1,19);" ";D$:LO
CATE J-11,69:PRINT O3$(J)
1050 O3$(J)=N1$:N1$="":C=0
1060 RETURN
1070 '
1080 '    Scan File
1090 '
1100 FOR J=1 TO I3
1110 IF O3$(J)<>"" AND O3$(J)<>" " AND O3$(J)<>"  " THEN 1140
1120 NEXT J:GOTO 2390
1130 COLOR 11,0:LOCATE 25,2:PRINT DATE$;" ";TIME$;
1140 COLOR 12,0:LOCATE 3,2:PRINT SPACE$(78)
1150 FOR Z=5 TO 23:LOCATE Z,1:PRINT SPACE$(80);:NEXT Z
1160 COLOR 14,0:LOCATE 3,28:PRINT " Sorting Please Wait "
1170 '
1180 COLOR 14,0:LOCATE 10,22:PRINT USING " Account Number Total = ###,###";I1
1190 COLOR 12,0:LOCATE 12,19:PRINT " *** To Abort Sort Press Esc Key *** "
1200 COLOR 14,0:LOCATE 14,23:PRINT "Comparisions Executed = "
1210 LOCATE 16,23:PRINT "Switches Excuted = "
1220 '
1230 IF S9=1 THEN 1270
1240 COLOR 14,1:LOCATE 8,14:PRINT " Copying Customer Account Index Into Work Fil
e "
1250 OPEN "R",#1,"indexs.dat",8:FIELD #1,8 AS I3$
1260 FOR J=1 TO I1:GET #2,J:I2=CVS(I2$):LSET I3$=MKS$(I2):PUT #1,J:NEXT J:CLOSE
#2:S9=1
1270 C2=0
1280 FOR J=1 TO I3
1290 FOR K=1 TO I3
1300 IF O3$(K)="" THEN 1320
1310 IF VAL(O3$(K))=J THEN C2=C2+1:W(C2)=K
1320 NEXT K,J
1330 COLOR 11,0:LOCATE 8,14:PRINT STRING$(47,32)
1340 '
1350 '    Sort
1360 '
1370 S1=1:S2=0
1380 L(1)=1
1390 R(1)=I1
1400 L1=L(S1)
1410 R1=R(S1)
1420 S1=S1-1
1430 L2=L1
1440 R2=R1
1450 GET #1,INT((L1+R1)/2):X=CVS(I3$)
1460 IF X=0 THEN X$="":GOTO 1480
1470 GET #3,X:GOSUB 1820:X$=W$
1480 C=C+1:COLOR 14,0:LOCATE 14,46:PRINT USING "###,###";C
1490 N$=INKEY$:IF N$="" THEN 1510
1500 IF ASC(N$)=27 THEN 2390
1510 GET #1,L2:Y=CVS(I3$)
1520 IF Y=0 THEN Y$="":GOTO 1540
1530 GET #3,Y:GOSUB 1820:Y$=W$
1540 IF Y$>=X$ THEN 1570
1550 L2=L2+1
1560 GOTO 1490
```

```
1570 C=C+1:COLOR 14,0:LOCATE 14,46:PRINT USING "###,###";C
1580 N$=INKEY$:IF N$="" THEN 1600
1590 IF ASC(N$)=27 THEN 2390
1600 GET #1,R2:Z=CVS(I3$)
1610 IF Z=0 THEN Z$="":GOTO 1630
1620 GET #3,Z:GOSUB 1820:Z$=W$
1630 IF X$>=Z$ THEN 1660
1640 R2=R2-1
1650 GOTO 1570
1660 IF L2>R2 THEN 1720
1670 S2=S2+1:COLOR 14,0:LOCATE 16,44:PRINT USING "###,###";S2
1680 LSET I3$=MKS$(Y):PUT #1,R2
1690 LSET I3$=MKS$(Z):PUT #1,L2
1700 L2=L2+1
1710 R2=R2-1
1720 IF L2<=R2 THEN 1480
1730 IF L2>=R1 THEN 1770
1740 S1=S1+1
1750 L(S1)=L2
1760 R(S1)=R1
1770 R1=R2
1780 IF L1<R1 THEN 1430
1790 IF S1>0 THEN 1400
1800 GOTO 1950
1810 '
1820 LSET B$(11)=MID$(B$(11),7,2)+MID$(B$(11),1,6)
1830 IF B$(16)="  -  -    " THEN LSET B$(16)="" ELSE LSET B$(16)=MID$(B$(16),7,4)+MID$(B$(16),1,6)
1840 IF B$(17)="  :  : 0" THEN LSET B$(17)=""
1850 LSET B$(21)=MID$(B$(21),7,2)+MID$(B$(21),1,6)
1860 LSET B$(22)=MID$(B$(22),7,2)+MID$(B$(22),1,6)
1870 W$="":I1$=MID$(STR$(LOC(3)),2,LEN(STR$(LOC(3)))-1)
1880 FOR J=1 TO C2
1890 IF LEN(W$+B$(W(J)))>250 THEN 1910
1900 W$=W$+B$(W(J))
1910 NEXT J:W$=W$+RIGHT$("00000"+RIGHT$(I1$,LEN(I1$)),5):RETURN
1920 '
1930 '    Print Line Printer
1940 '
1950 LPRINT CHR$(18);CHR$(27);CHR$(65);CHR$(10);CHR$(27);CHR$(50):TIMER OFF:S4=0

1960 C1=7:P1=0
1970 GOTO 2130
1980 '
1990 P1=P1+1
2000 LPRINT CHR$(12);"BM019";CHR$(14);TAB(17);"Access Plus";CHR$(20);TAB(49);"Page";P1
2010 LPRINT TAB(23);"Copyright 1986 Badger Meter, Inc."
2020 LPRINT TAB(27);"Utility Products Division"
2030 LPRINT TAB(27);"as of ";DATE$;" ";TIME$;CHR$(10)
2040 LPRINT CHR$(14);TAB(4);"Sort Key Fields - Customer Accounts";CHR$(10)
2050 LPRINT TAB(14);"Sort Parameter's";
2060 FOR J=1 TO C2
2070 LPRINT TAB(32);MID$(O2$(W(J)),1,18)
2080 NEXT J
2090 LPRINT STRING$(79,240)
2100 C1=0
2110 RETURN
2120 '
2130 FOR I=1 TO I1
2140 GET #1,I:N2=CVS(I3$)
```

```
2150 IF N2=0 THEN 2280
2160 GET #3,N2
2170 FOR J=1 TO 36:O3$(J)=B$(J):NEXT J:O3$(15)=F1$(VAL(O3$(15))):O3$(8)=T$(VAL(O
3$(8))):O3$(12)=T$(VAL(O3$(12))+33):O3$(13)=T$(VAL(O3$(13))+33)
2180 IF C1>=3 THEN GOSUB 1990
2190 LPRINT CHR$(27);CHR$(69);TAB(30);"Customer Account Number ----";N2;CHR$(27)
;CHR$(70)
2200 FOR J=1 TO 17
2210 LPRINT TAB(2);MID$(O2$(J),1,18);TAB(21);O3$(J);TAB(48);MID$(O2$(J+17),1,18)
;TAB(67);O3$(J+17);
2220 T4$="      ":IF O3$(30)="On " THEN T4$=T3$
2230 IF J>=14 AND J<=16 THEN LPRINT " ";T4$
2240 NEXT J:LPRINT
2250 C1=C1+1
2260 N$=INKEY$:IF N$="" THEN 2280
2270 IF ASC(N$)=27 THEN 2390
2280 NEXT I
2290 LPRINT TAB(27);"<<<< End of Report >>>>"
2300 FOR J=1 TO 36:O3$(J)="":NEXT J
2310 COLOR 14,0:LOCATE 3,2:PRINT "          $ End of Sort Press Any Key To Co
ntinue, Esc To End  $         "
2320 TIMER ON
2330 IF S1<>0 THEN 2390
2340 N$=INKEY$:IF N$="" THEN COLOR 11,0:LOCATE 25,2:PRINT DATE$;" ";TIME$;:GOTO
2330
2350 TIMER OFF
2360 IF ASC(N$)=27 THEN 2390
2370 COLOR 12,0:FOR Z=5 TO 23:LOCATE Z,1:PRINT SPACE$(80);:NEXT Z
2380 GOSUB 440:GOTO 470
2390 CLOSE #1,#2,#3
2400 CHAIN "bm001c"
2410 END
10 'Copyright 1985 Badger Meter, Inc. - Engineering Division *** Program Name -
bm020 *** Date 12-06-1985
20 'Author D.Wachs      \ - load "bm020"
30 'Automatic Meter Reading - Delinquent Call Back On CRT
40 '
50 COMMON PGM$,O2$(),F1$(),T$()
60 DIM B$(36)
70 '
80 ON TIMER(600) GOSUB 90:GOTO 110
90 S1=1:RETURN
100 '
110 OPEN "R",#1,"cntr.dat",8:FIELD #1,8 AS I1$:GET #1,1:I1=CVS(I1$):CLOSE #1
120 OPEN "R",#2,"index.dat",8:FIELD #2,8 AS I2$
130 OPEN "R",#3,"amr1.dat",384
140 FIELD #3,1 AS F$:Z1=1
150 FOR J=1 TO 36
160 X=LEN(O2$(J)):Y=INSTR(O2$(J),CHR$(95)):Z=X-Y+1
170 IF Y=Z-1 THEN 200
180 FIELD #3,Z1 AS DUMMY$,Z2 AS DUMMY$,Z AS B$(J)
190 IF Z1+Z<255 THEN Z1=Z1+Z ELSE Z2=Z2+Z
200 NEXT J
210 '
220 COLOR 9,0:LOCATE 1,1:PRINT "BM020 "
230 COLOR 11,0:LOCATE 25,2:PRINT DATE$;" ";TIME$;
240 COLOR 15,0:LOCATE 1,8:PRINT "    *** Access Plus Delinquent Call Backs on CRT
 ***           "
250 COLOR 12,0:LOCATE 1,62:PRINT "R = Retry Schedule"
260 COLOR 30,0:LOCATE 25,66:PRINT " $ Scan Mode $";
```

```
270 COLOR 14,0:LOCATE 3,2:PRINT "                          Searching. Esc To E
nd."
280 COLOR 12,0:FOR I=5 TO 23:LOCATE I,1:PRINT SPACE$(80);:NEXT I
290 COLOR 14,0:LOCATE 5,2:PRINT "Account":LOCATE 5,15:PRINT "Customer":LOCATE 5,
36:PRINT "Customer":LOCATE 5,51:PRINT "Customer":LOCATE 5,61:PRINT "---- Call Ba
ck ----"
300 LOCATE 6,2:PRINT "Number":LOCATE 6,17:PRINT "Name":LOCATE 6,37:PRINT "Addres
s":LOCATE 6,52:PRINT "Phone":LOCATE 6,64:PRINT "Date     Time"
310 COLOR 9,0:LOCATE 7,1:PRINT STRING$(80,205)
320 '
330 N$=CHR$(32):X=0
340 FOR I=1 TO 11
350 N$=INKEY$: IF N$="" THEN 370
360 IF ASC(N$)=27 THEN 780
370 GET #2,I:I2=CVS(I2$)
380 IF I2=0 THEN 670
390 GET #3,I2:C1=11:B$=""
400 '
410 IF B$(16)="  -  -    " OR B$(16)="          " OR B$(17)="  :  :  " OR B$(17)
="         " THEN C1=12:B$="E":GOTO 560
420 GOSUB 430:D$=N$:GOTO 480
430 Y1=VAL(MID$(DATE$,7,4)):M1=VAL(MID$(DATE$,1,2)):D1=VAL(MID$(DATE$,4,2))
440 IF M1>2 THEN M8=M1-3:Y8=Y1 ELSE M8=M1+9:Y8=Y1-1
450 C8=INT(Y8/100):D8=Y8-100*C8
460 N#=INT(146097*C8/4)+D1+INT(1461*D8/4)+1721119!+INT((153*M8+2)/5):RETURN
470 '
480 Y1=VAL(MID$(B$(16),7,4)):M1=VAL(MID$(B$(16),1,2)):D1=VAL(MID$(B$(16),4,2))
490 GOSUB 440
500 IF N#>D# THEN 670
510 IF N#=D# AND B$(17)>TIME$ THEN 670
520 IF N#+3>D# THEN C1=18:B$="R":GOTO 560
530 IF B$(17)<TIME$ THEN C1=11
540 IF N#<D# THEN C1=11
550 '
560 X=X+1:IF X<17 THEN 660
570 COLOR 32,0:LOCATE 3,2:PRINT "                          $ Press Any Key To Cont
inue $              "
580 TIMER ON
590 IF S1<>0 THEN 780
600 N$=INKEY$:IF N$="" THEN COLOR 11,0:LOCATE 25,2:PRINT DATE$;" ";TIME$;:GOTO 5
90
610 TIMER OFF
620 IF ASC(N$)=27 THEN 780
630 COLOR 14,0:LOCATE 3,2:PRINT "                          Searching. Esc To E
nd."
640 COLOR 12,0:FOR J=8 TO 23:LOCATE J,1:PRINT SPACE$(80);:NEXT J:X=1
650 '
660 COLOR C1,0:LOCATE X+7,2:PRINT USING "##,###";I2;:PRINT MID$(B$(1),1,12);" "
;MID$(B$(2),1,20);" ";B$(5);" ";B$(16);" ";B$(17);B$;
670 NEXT I
680 COLOR 14,0:LOCATE 3,2:PRINT "           $ End of Search Press Any Key To Con
tinue. ESC To End. $        "
690 '
700 TIMER ON
710 IF S1<>0 THEN 780
720 N$=INKEY$:IF N$="" THEN COLOR 11,0:LOCATE 25,2:PRINT DATE$;" ";TIME$;:GOTO 7
10
730 TIMER OFF
740 IF ASC(N$)=27 THEN 780
750 COLOR 14,0:LOCATE 3,2:PRINT "                          Searching. Esc To E
nd."
```

```
760 GOTO 340
770 '
780 CLOSE #1,#2,#3
790 CHAIN "bm001b"
800 END
10 'Copyright 1985 Badger Meter, Inc. - Engineering Division *** Program Name - bm020a *** Date 12-06-1985
20 'Author D.Wachs         \ - load "bm020a"
30 'Automatic Meter Reading - Delinquent Call Back On Printer
40 '
50 COMMON PGM$,O2$(),F1$(),T$()
60 DIM B$(36)
70 '
80 ON TIMER(600) GOSUB 90:GOTO 110
90 S1=1:RETURN
100 '
110 ON ERROR GOTO 120:GOTO 170
120 IF ERR=24 OR ERR=25 OR ERR=27 AND S2=0 THEN TIMER ON:S2=1
130 IF ERR=24 OR ERR=25 THEN COLOR 30,4:LOCATE 5,19:PRINT "   ** Please Turn Line Printer On. **   ":IF S1<>0 THEN 740 ELSE RESUME
140 IF ERR=27 THEN COLOR 30,4:LOCATE 5,19:PRINT "   *** Out of Paper On Line Printer. ***   ":IF S1<>0 THEN 740 ELSE RESUME
150 COLOR 28,0:LOCATE 5,7:PRINT "Error";ERR:STOP
160 '
170 WIDTH "LPT1:",82
180 '
190 OPEN "R",#1,"cntr.dat",8:FIELD #1,8 AS I1$:GET #1,1:I1=CVS(I1$):CLOSE #1
200 OPEN "R",#2,"index.dat",8:FIELD #2,8 AS I2$
210 OPEN "R",#3,"amr1.dat",384
220 FIELD #3,1 AS F$:Z1=1
230 FOR J=1 TO 36
240 X=LEN(O2$(J)):Y=INSTR(O2$(J),CHR$(95)):Z=X-Y+1
250 IF X=Z-1 THEN 280
260 FIELD #3,Z1 AS DUMMY$,Z2 AS DUMMY$,Z AS B$(J)
270 IF Z1+Z<255 THEN Z1=Z1+Z ELSE Z2=Z2+Z
280 NEXT J
290 COLOR 9,0:LOCATE 1,1:PRINT "BM020A"
300 COLOR 11,0:LOCATE 25,2:PRINT DATE$;" ";TIME$;
310 '
320 LPRINT CHR$(18);CHR$(27);CHR$(65);CHR$(12);CHR$(27);CHR$(50):TIMER OFF:S2=0
330 C1=53:GOTO 470
340 '
350 P1=P1+1
360 LPRINT CHR$(12);"BM020A";CHR$(14);TAB(17);"Access Plus";CHR$(20);TAB(49);"Page";P1
370 LPRINT TAB(23);"Copyright 1986 Badger Meter, Inc."
380 LPRINT TAB(27);"Utility Products Division"
390 LPRINT TAB(27);"as of ";DATE$;" ";TIME$;TAB(59);"R = Retry Schedule";CHR$(10)
400 LPRINT CHR$(14);TAB(7);"Delinquent Call Back Report";CHR$(18)
410 LPRINT TAB(2);"Account";TAB(15);"Customer";TAB(36);"Customer";TAB(51);"Customer";TAB(61);"---- Call Back ----"
420 LPRINT TAB(2);"Number";TAB(17);"Name";TAB(37);"Address";TAB(52);"Phone";TAB(64);"Date      Time"
430 LPRINT STRING$(79,240)
440 C1=0
450 RETURN
460 '
470 FOR I=1 TO I1
480 GET #2,I:I2=CVS(I2$)
```

```
490 IF I2=2 THEN 720
500 GET #3,I2:D2$=" "
510 '
520 IF B$(16)="__-__-____" OR B$(16)="          " OR B$(17)="__:__:_0" OR B$(17)="        " THEN D2=69:GOTO 670
530 GOSUB 540:D#=N#:GOTO 590
540 Y1=VAL(MID$(DATE$,7,4)):M1=VAL(MID$(DATE$,1,2)):D1=VAL(MID$(DATE$,4,2))
550 IF M1>2 THEN M8=M1-3:Y8=Y1 ELSE M8=M1+9:Y8=Y1-1
560 C8=INT(Y8/100):D8=Y8-100*C8
570 N#=INT(146097!*C8/4)+D1+INT(1461*D8/4)+1721119!+INT((153*M8+2)/5):RETURN
580 '
590 Y1=VAL(MID$(B$(16),7,4)):M1=VAL(MID$(B$(16),1,2)):D1=VAL(MID$(B$(16),4,2))
600 GOSUB 550
610 IF N#>D# THEN 720
620 IF N#=D# AND B$(17)>TIME$ THEN 720
630 IF N#+3>D# THEN D2$="R":GOTO 670
640 IF B$(17)<TIME$ THEN D2$=" "
650 IF N#<D# THEN D2$=" "
660 '
670 IF C1>=52 THEN GOSUB 350
680 LPRINT D2$;:LPRINT USING "##,### ";I2;:LPRINT MID$(B$(1),1,18);" ";MID$(B$(27),1,28);" ";B$(5);" ";B$(16);" ";B$(17)
690 C1=C1+1
700 N$=INKEY$:IF N$="" THEN 720
710 IF ASC(N$)=27 THEN 740
720 NEXT I
730 LPRINT TAB(27);"<<<< End of Report >>>>"
740 CLOSE #1,#2,#3
750 CHAIN "ba001c"
760 END
10 'Copyright 1986 Badger Meter, Inc. - Engineering Division *** Program Name - install *** Date 04-01-1986
20 'Author D.Wachs      \ - load "install"
30 'Automatic Meter Reading - Install Software
40 '
50 SHELL "C:"
60 SHELL "copy a:*.bat c:
70 '
80 MKDIR "aerdir":CHDIR "\aerdir"
90 SHELL "copy a:*.bas c:
100 '
110 OPEN "R",#1,"uphone.dat",11:FIELD #1,11 AS P1$
120 FOR I=1 TO 4:LSET P1$=STRING$(11,32):PUT #1,I:NEXT I
130 CLOSE #1
140 '
150 OPEN "R",#1,"todu.dat",5:FIELD #1,5 AS T2$
160 FOR I=1 TO 8:LSET T2$=STRING$(5,32):PUT #1,I:NEXT I
170 CLOSE #1
180 '
190 OPEN "R",#1,"pru.dat",5:FIELD #1,5 AS T2$
200 FOR I=1 TO 8:LSET T2$=STRING$(5,32):PUT #1,I:NEXT I
210 CLOSE #1
220 '
230 OPEN "R",#1,"dta1.dat",8:FIELD #1,8 AS DA$
240 FOR I=1 TO 2162:LSET DA$=STRING$(7,"-")+"N":PUT #1,I:NEXT I
250 CLOSE #1
260 '
270 OPEN "R",#1,"dta2.dat",29:FIELD #1,29 AS DA$
280 FOR I=1 TO 2162:LSET DA$=STRING$(28,"-")+"N":PUT #1,I:NEXT I
290 CLOSE #1
300 '
310 END
```

We claim:

1. A metering system comprising: a plurality of automatic meter readers, each arranged for connection to a telephone line and for dialing of a certain telephone number and transmission of meter data, utility control center means including data storage means and data processing means, and call collection means including data storage means and data processing means and arranged for connection to a certain telephone line to which said certain telephone number is assigned, said call collection means further including means for responding to a call on said certain line for reception of meter data and immediate storage of said meter data in said data storage means thereof, and means controlled by said utility control center means for effecting transfer of stored meter data from said data storage means of said call collection means to said data storage means of said utility control center means, each of said automatic meter readers including data storage means and processor means for controlling operation thereof in accordance with control data stored in said data storage means of said automatic meter readers, and said call collection means including means for storing control data in said data storage means thereof and means for transferring control data from said data storage means thereof through said telephone lines and telephone exchange equipment to said automatic meter readers for storage in said data storage means to said automatic meter readers, said utility control center means including means for storing control data in said data storage means thereof and means for transferring control data from said data storage means thereof to said call collection means for storage of control data in said data storage means of said call collection means, each of said automatic meter readers including means for generating periodic signals, means in said data storage means thereof for storing count data and means for counting said periodic signals for effecting dialing of said certain telephone number and transmission of meter data, said call collection means being arranged to send control data including said count data to an automatic meter reader during a response to a call from the same automatic meter reader.

2. A system as defined in claim 1, wherein said count data sent by said call collection means to said automatic meter readers and stored in said data storage means of said automatic meter readers controls the next call-in times by said automatic meter readers, wherein said control data in said data storage means of said call collection means includes data as to the number of days in the current month, and wherein said call collection means includes means for controlling count data sent to said automatic meter readers to control said next call-in times in accordance with data as to the number of days in the current month.

3. A system as defined in claim 1, wherein said control data in said data storage means of said call collection means includes data as to forthcoming exemption days, and said call collection means includes means for sending count data to an automatic meter reader to control metering operations in accordance with exemption day control data.

4. A system as defined in claim 1, wherein said control data in said storage means of said call collection means includes count data for establishing time-of-day window periods of meter pulse accumulations.

5. A system as defined in claim 4, wherein said control data in said data storage means of said call collection means includes means for controlling window periods of peak rate measurements.

6. A metering system as defined in claim 1, wherein said call collection means (being) are arranged for connection to a plurality of lines with said certain telephone number being assigned to all lines and with the telephone exchange equipment being operative to make a connection to one of said lines as long as all lines are not busy, said call collection means including means for responding to an incoming call on any of said lines and to substantially immediately receive data from a calling automatic meter reader.

7. An automatic meter reader comprising: a battery, meter pulse counter means continuously energized from said battery, oscillator driven clock means continuously energized from said battery and arranged for developing a periodic tick signal, wake-up timer means continuously energized from said battery and including counter means arranged to be loaded with a control number and driven by said tick signal to develop a wake-up signal after said control number of tick signals, memory means, program means, processor means connected to said battery for energization therefrom, power-up means responsive to said wake-up signal to change said processor means from a power-down sleep condition to a power-up wake condition, said processor means being controlled by said program means in said wake condition to perform processing operations including accumulation of pulses from said meter pulse counter means and storage of corresponding accumulated meter data in said memory means, reset of said meter pulse counter means, loading of said control number in said counter means of said wake-up timer means and a final power-down to said sleep condition.

8. An automatic meter reader as defined in claim 7, arranged for connection to a telephone line and comprising: call-in means for effecting a dialing operation to establish communication with a data receiving means, and call-in time control means for controlling the time of operation of said call-in means, said call-in means including wake-up signal counter means for counting said wake-up signals.

9. A reader as defined in claim 8, wherein said call-in time control means includes means for loading a post-call-in control number in said wake-up timer means after a call-in operation to control the time of the next wake-up operation.

10. A reader as defined in claim 9, said call-in time control means further including means controlled by said wake-up signal counter means to load a pre-call-in control number in said wake-up timer means and to effect a call-in operation in response to the next wake-up signal.

11. A reader as defined in claim 8, wherein a wake-up signal count entered in said wake-up signal counter after a call-in operation is controllable from call collection means.

12. A reader as defined in claim 9, said post-call-in control number entered in said counter means of said wake-up timer means after a call-in operation being controllable from call collection means.

13. A reader as defined in claim 10, said pre-call-in control number which is entered in said counter means of said wake-up timer means under control of said wake-up signal counter means and which controls the next following wake-up and call-in operation being controllable from call collection means.

14. A reader as defined in claim 10, wherein after a call-in operation control numbers and counts are enterable from call collection means to control the next subsequent call-in operation, said control numbers and counts including a post-call-in control number entered in said counter means of said wake-up timer means to control the next wake-up operation, a wake-up signal count entered in said wake-up signal counter means to control the number of wake-up signals before the next subsequent call-up operation, and a pre-call-in control number entered in said counter means of said wake-up timer means under control of said wake-up signal counter means to control the next wake-up operation and thereby said next subsequent call-in operation.

15. Control apparatus for use in a metering system which includes a plurality of meter readers each arranged for connection to a data transmission over a telephone line and for calling a certain telephone number, said control apparatus comprising: call collection means for connection to a telephone line to which said certain number is assigned and including means for responding to a call on said line to receive and store transmitted data, and computer means including memory means and data processing means, said computer means being operable to send a dump command to said call collection means, said collection means being operable in response to said dump command to send data to said computer means, and said data processing means of said computer means being operable to process received data and to store data in said memory means including identification data corresponding to the meter reader from which data was received, meter reading data corresponding to a cumulative meter reading at a certain reading time and time data corresponding to said certain reading time.

16. Control apparatus as defined in claim 15, wherein said computer means includes a keyboard and a display operable from said keyboard to display said identification, meter reading and time data.

17. Control apparatus as defined in claim 16, wherein said identification data includes customer's name and address information, and wherein said data processing means is operable from said keyboard for entry and editing of said identification data.

18. Control apparatus as defined in claim 16, wherein said data processing means is operable from said keyboard for controlling said certain reading time.

19. Control apparatus as defined in claim 15, said certain reading time being the time of a call by a meter reader and said call collection means being operable during a call from a meter reader to receive data corresponding to a current cumulative meter reading at the time of said call.

20. Control apparatus as defined in claim 15, said computer being operable to send schedule data to said call collection means which includes data defining the calling times for meter readers, and said call collection means being operable to send corresponding data to said meter readers for control of the calling times thereof.

21. Control apparatus as defined in claim 20, wherein each meter reader of said system may be assigned one of a number of possible time slots for calling of said certain telephone number, said data processing means of said computer being operable to store data in said memory corresponding to time slots which have been assigned to meter readers of the system.

22. Control apparatus as defined in claim 21, said data processing means being operable to generate data as to an open time slot for assignment to a meter reader being added to said system and to send said generated open time slot data to said call collection means for transmission to said meter reader being added to said system.

23. Control apparatus as defined in claim 22, wherein said computer means includes a keyboard and a display operable from said keyboard, said keyboard being usable to select a time slot for a meter reader to be added to said system, and said data processing means being operable to send corresponding data to said call collection means when said time slot has not been assigned and to indicate on said display when said time slot has been assigned.

24. Control apparatus for use in a metering system which includes a plurality of meter readers each arranged for connection to and data transmission over a telephone line and for calling a certain telephone number and each being arranged for assignment of one of a large number of possible time slots for calling of said certain telephone number, said control apparatus comprising: computer means including memory means and data processing means, means for connection between said computer means and a telephone line to which said certain number is assigned and arranged for responding to a call on said line and for transmission of received data to said computer means, said data processing means of said computer means being operable to store data in said memory corresponding to time slots which have been assigned to meter readers of the system, and said data processing means being operable to generate data as to an open time slot for transmission to a meter reader being added to said system.

25. Control apparatus as defined in claim 24, wherein said computer means includes a keyboard and a display operable from said keyboard, said keyboard being usable to select a time slot for a meter reader being added to said system, and said data processing means being operable to indicate on said display when a selected time slot has been previously assigned.

26. Control apparatus for use in a metering system which includes a plurality of meter readers each arranged for connection to and data transmission over a telephone line and for a calling a certain telephone number and each being arranged for assignment of one of a large number of possible time slots for calling of said certain telephone number, said control apparatus comprising: computer means including memory means and data processing means, means for connection between said computer means and a telephone line to which said certain number is assigned and arranged for responding to a call on said line and for transmission of received data to said computer means, said data processing means of said computer means being operable to store data in said memory corresponding to name, address and other customer identification data and also data corresponding to the time slot which has been assigned to each meter reader connected to the system, said computer means including a keyboard and a display and including output means for transmission of data to a printer or utilization means, said computer being operable from said keyboard means for viewing of customer identification data and time slot data on said display and for transmission of such data through said output means.

27. A metering system comprising: a plurality of automatic meter readers each arranged for connection to a telephone line and for transmission of meter data to utility control center means, each of said meter readers including means for generating meter data, sampling means for accumulating generated meter data over sampling time intervals of a certain duration, and indicating means for generating an indicating signal under conditions in which during a number of said sampling time intervals there are no intervals of no generated meter data.

28. A metering system as defined in claim 27, wherein said indicating means comprises a status indicator, means for initially shifting said status indicator from a cleared condition to a set condition, means for shifting said status indicator to said cleared condition in response to generation of meter data during any sampling time interval, and means for generating said indicating signal when said status indicator remains in said set condition after a number of sampling time intervals.

29. A metering system as defined in claim 27, wherein said meter readers are operable for measuring cumulative volume flow of water or other fluids wherein said indicating signal indicates a leakage condition.

30. A reader as defined in claim 7, further including sampling means for accumulating generated meter data over sampling time intervals of a certain duration, and indicating means for generating an indicating signal under conditions in which during a certain number of said sampling time intervals there are no intervals of no generated meter data.

31. A reader as defined in claim 30, wherein said indicating means comprises a status indicator and an indicator counter, said status indicator being initially shifted from a cleared condition to a set condition and said indicator counter being initially cleared, and said processing operations including clearing of said counter when no meter pulses were accumulated since the preceding wake-up signal and clearing of said status indicator when said counter registers a certain count.

32. A metering system comprising: a plurality of automatic meter readers each arranged for connection to a telephone line and for transmission of meter data to a utility control center means, each of said meter readers including data generating means for generating meter data, data storage means for storing generated meter data, data transmission means for transmitting stored meter data from said data storage means over a telephone line, status control means for setting said meter reader in either an active condition or an inactive condition and alarm generating means coupled to said data generating means and said status control means and arranged to generate an alarm signal in response to the generation of meter data while said status control means is in said inactive condition.

33. A metering system as defined in claim 32, each of said meter readers further including data receiving means for receiving control signals from said utility control center to control said status control means.

34. A metering system as defined in claim 32, said data transmission means being arranged to transmit said alarm signal over said telephone line to said utility control center means.

35. An automatic meter reader as defined in claim 7, further including means for generating a phone signal in response to predetermined signals applied to said telephone line, and data receiving means for receiving data sent over said telephone line, said power-up means being responsive to said phone signal to change said processor means from said sleep condition to said wake-up condition, and said processing operations including a determination of whether a phone signal initiated the change to said wake-up condition and operation of said data receiving means in response to said phone signal.

36. An automatic meter reader as defined in claim 7, further including call-in means for effecting a dialing operation to effect communication with data receiving means, electronic alarm circuitry for generating a tamper alarm signal in response to tampering with said meter reader, said power-up means being responsive to said tamper alarm signal to change said processor means from said sleep condition to said wake-up condition, and said processing operations including a determination of whether a tamper alarm signal initiated the change to said wake-up condition and initiation of operation of said call-in means in response to said tamper alarm signal.

37. A metering system as defined in claim 36, said data generating means being arranged for coupling through a connection line to a meter signal generating device to receive meter signals therefrom, and said electronic alarm circuitry including means for sensing tampering with said connection line.

38. A metering system as defined in claim 37, said electronic alarm circuitry including means for sensing a high impedance open circuit condition of said connection line.

39. A metering system as defined in claim 37, said electronic alarm circuitry including means for sensing a low impedance short circuit condition of said connection line.

40. A metering system as defined in claim 37, said electronic alarm circuitry including means for sensing either of high impedance open circuit condition of said connection line or a low impedance short circuit condition thereof.

41. A metering system as defined in claim 36, said electronic circuitry being operable in response to a low temperature freeze condition of said meter reader.

42. A metering system comprising: a plurality of automatic meter readers each arranged for connection to a telephone line and for transmission of meter data to a utility control center means, each of said meter readers including data generating means for generating meter data, data storage means for storing data including control data and generated meter data, said generated meter data being stored in accordance with predetermined criteria established by said control data, and data transmission means for transmitting stored meter data from said data storage means over a telephone line, computer means including memory means and data processing means and arranged for receiving data transmitted from said meter readers and for controlling transmission of control data to said meter readers to control said predetermined criteria, said computer means including a keyboard, a display operable from said keyboard and means responsive to operation of said keyboard for transmitting control data to said meter readers to control said predetermined criteria of storage of generated meter data.

43. In a system as defined in claim 42, each of said meter readers including control data means for supplying data establishing said predetermined criteria, processor means coupled to said control data means and to said data generating and storage means for controlling the storage of data in accordance with control data supplied by said control data means, and means for receiving control data from said computer means.

44. A system as defined in claim 43, wherein said control data include data establishing at least one time of day window for storage of generated meter data.

45. A system as defined in claim 43, wherein said computer means are operable from said keyboard to store global control data and to normally transmit said global control data to each meter reader to establish criteria for storage of generated meter data.

46. A system as defined in claim 45, wherein said computer means are operable from said keyboard to develop local control data applicable to a selected meter reader and to transmit said local control data to a selected meter reader to at least partially override said global control data.

47. A system as defined in claim 42, wherein said predetermined criteria include predetermined periods of the day for storage of generated meter data.

48. A system as defined in claim 42, wherein said predetermined criteria include predetermined days during periods of a number of days for storage of generated meter data.

49. A system as defined in claim 48, wherein said control data transmitted from said computer means to said meter readers include digital data establishing predetermined exemption days for non-storage of certain generated meter data.

50. A system as defined in claim 49, wherein said predetermined exemption days are days numbered from the day of transmission of said control data from said computer means.

51. A system as defined in claim 42, wherein said predetermined criteria include the peak rate of generation of meter data during at least one predetermined time period.

52. A system as defined in claim 42, wherein said generated meter data are stored by said data storage means of said meter readers in a plurality of separate storage locations corresponding to a plurality of criteria of said predetermined criteria, said computer means being arranged to store data received from each meter reader in a plurality of fields corresponding to said separate storage locations and being operable from said keyboard means to display received and stored data in said fields.

53. A system as defined in claim 52, said computer means being operable from said keyboard means to compile data received from all meter readers in each of said fields.

54. A system as defined in claim 53, a first one of said fields being total cumulative meter data generated during a number of days and a second one of said fields being cumulative meter data generated during a certain window portion of each of at least certain days of said number of days.

55. A system as defined in claim 54, a third one of said fields being the peak rate of generation of meter data during certain time periods.

56. A system as defined in claim 55, said certain time periods of peak rate generation being window portions of at least certain days of said number of days.

57. A system as defined in claim 56, each of said meter readers including means for sensing certain conditions and storing alarm data in said data storage means, a fourth one of said field being alarm data initially stored in said data storage means and transmitted to said computer means.

58. A system as defined in claim 42, call collection means associated with said computer means, said call collection means including data storage means and data processing means and being arranged for connection to a telephone line to receive data from said meter readers, said call collection means further including means for reception of meter data and storage of meter data in said data storage means thereof and being also arranged for storage of control data from said computer means and transmission of said control data to said meter readers.

59. A system as defined in claim 58, said call collection means being arranged for connection to a plurality of lines to which one telephone number is assigned with the telephone exchange equipment being operative to make a connection through one of said line to a calling meter reader as long as all lines are not busy, and said call collection means including means for responding to an incoming call on any of said lines and to substantially immediately receive and store data from a calling meter reader for subsequent transmission to said computer means.

60. Control apparatus as defined in claim 58, wherein said data processing means and data storage means of said call collection means are separate from said data processing and memory means of said computer means.

61. Control apparatus as defined in claim 60, wherein serial communication means are provided for communication between said data processing means of said call collection means and said data processing means of said computer means.

* * * * *

UNITED STATES PATENT AND TRADEMARK OFFICE
CERTIFICATE OF CORRECTION

PATENT NO. : 4,817,131

DATED : March 28, 1989

INVENTOR(S) : Raymond J. Thornborough, et al

It is certified that error appears in the above-identified patent and that said Letters Patent is hereby corrected as shown below:

```
Column 6, line 27, after telephone, insert -- connected
     thereto --.
Column 6, line 30, after system, delete -- connected
     thereto --.
Column 9, line 30, change "then it" to -- it then --.
Column 10, line 57, change "to" to -- at --.
Column 13, line 66, after 25, insert -- or --.

Column 17, line, 6, after call-in, insert -- is --.
Column 18, line 22, change "in" to -- is --.
Column 18, line 30, delete -- also --.
Column 21, line 17, change "MS" to --M --.
Column 23, line 11, change "preformed" to
   -- performed --.

Column 26, item 6, change "callback = ccccc" to --
     callback = cccccc --.
Column 27, item 15, add 3 dots before and after --
     Hex Records --.
Column 27, lower half of page, in the heading,
     after "CC" insert -- M --.
Column 32, line 10, change "of" to -- to --. (2nd occurrence)
Column 32, line 10, after "customer" delete the
     comma (,).
```

UNITED STATES PATENT AND TRADEMARK OFFICE
CERTIFICATE OF CORRECTION

PATENT NO. : 4,817,131

DATED : March 28, 1989

INVENTOR(S) : Raymond J. Thornborough, et al

It is certified that error appears in the above-identified patent and that said Letters Patent is hereby corrected as shown below:

```
Column 32, line 15, change "mulfunction" to
    -- malfunction --.
Column 32, line 60, change "eiyther" to  -- either --.
Column 32, line 63, change "pulsees" to -- pulses --.
Column 291, line 29, (claim 1), change "to"  to -- of --.
Column 292, claim 6, line 6, after "means", delete
    "(being)".
Column 293, claim 15, line 19, change "a" to  -- and --.
Column 295, claim 32, line 51, add a comma (,)
    after "tion"
Column 298, claim 57, line 17, change "field" to --
    fields --.
```

Signed and Sealed this

Thirty-first Day of July, 1990

Attest:

HARRY F. MANBECK, JR.

Attesting Officer     Commissioner of Patents and Trademarks